United States Patent
Mizuno et al.

(10) Patent No.: US 7,085,438 B2
(45) Date of Patent: Aug. 1, 2006

(54) OPTICAL MULTI/DEMULTIPLEXING CIRCUIT EQUIPPED WITH PHASE GENERATING DEVICE

(75) Inventors: Takayuki Mizuno, Yamato (JP); Tsutomu Kitoh, Atsugi (JP); Manabu Oguma, Yamato (JP); Yasuyuki Inoue, Isehara (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 108 days.

(21) Appl. No.: 10/727,171

(22) Filed: Dec. 3, 2003

(65) Prior Publication Data

US 2004/0136647 A1    Jul. 15, 2004

(30) Foreign Application Priority Data

Dec. 6, 2002 (JP) ............................. 2002-354640

(51) Int. Cl.
*G02B 6/26* (2006.01)

(52) U.S. Cl. .................. 385/3; 385/15; 385/24; 398/43; 398/48; 398/53

(58) Field of Classification Search ............ 385/3, 385/14, 15, 24, 39, 40, 49; 398/43, 48, 53
See application file for complete search history.

(56) References Cited

U.S. PATENT DOCUMENTS

| | | | |
|---|---|---|---|
| 5,488,680 A | | 1/1996 | Dragone |
| 5,596,661 A | | 1/1997 | Henry et al. |
| 6,711,313 B1 * | | 3/2004 | Takiguchi et al. ............ 385/15 |
| 6,856,724 B1 * | | 2/2005 | Bohn et al. .................... 385/27 |
| 6,882,772 B1 * | | 4/2005 | Lowery et al. ................ 385/27 |
| 6,892,021 B1 * | | 5/2005 | Doerr .......................... 385/140 |
| 2002/0044712 A1 | | 4/2002 | Hung |
| 2002/0044742 A1 * | | 4/2002 | Yoneda ........................ 385/37 |
| 2002/0172447 A1 | | 11/2002 | MacDonald et al. |
| 2004/0008927 A1 * | | 1/2004 | Kowalkowski et al. ....... 385/24 |

FOREIGN PATENT DOCUMENTS

| | | |
|---|---|---|
| EP | 0382461 | 2/1990 |
| EP | 1168010 | 6/2001 |
| EP | 1158318 | 11/2001 |
| EP | 1227359 | 1/2002 |
| EP | 1231490 | 2/2002 |
| JP | 3175499 | 7/1991 |
| JP | 11-109147 | 4/1999 |
| JP | 1 094 625 * | 4/2001 |
| JP | 2002-40493 | 2/2002 |

OTHER PUBLICATIONS

Oguma, M. Ed, *Compact and High Performance Waveguide — Type Interleave Filters for WDM Networks*, Planar Lightwave Circuits 1.2.1.

(Continued)

*Primary Examiner*—John D. Lee
*Assistant Examiner*—James D. Stein
(74) *Attorney, Agent, or Firm*—Workman Nydegger

(57) ABSTRACT

An optical multi/demultiplexing circuit includes at least one phase generating optical coupler and an optical delay line coupled to the phase generating optical coupler. The phase generating optical coupler consists of at least one input and at least two outputs. At least one of the phase generating optical coupler has a wavelength dependent or frequency dependent output phase difference in the passband of the circuit so that it can change the transmittance characteristics of the optical multi/demultiplexing circuit.

41 Claims, 80 Drawing Sheets

OTHER PUBLICATIONS

K. Jinguji et al., "*Synthesis of Coherent Two-Port Lattice-Form Optical Delay-Line Circuit,*" Journal of Lighwave Technology, vol. 13, No. 1, Jan. 1995, pp. 73-82.

N. Takato et al., "*Silica-Based Integrated Optic Mach-Zehnder Multi/Demultiplexer Family with Channel Spacing of 0.01-250 nm,*" IEEE Journal of Selected Areas in Communications, vol. 8, No. 6, Aug. 1990, pp. 1120-1127.

M. Kuznetsov, "*Cascaded Coupler Mach-Zehnder Channel Dropping Filters for Wavelength-Division-Multiplexed Optical Systems,*" Journal of Lightwave Technology, vol. 12, No. 2, Feb. 1994, pp. 226-230.

K. Oda et al., "*A Wide-Band Guided-Wave Periodic Multi/Demultiplexer with a Ring Resonator for Optical FDM Transmission Systems,*" Journal of Lightwave Technology, vol. 6, No. 2, Jun. 1988, pp. 1016-1023.

C. Kostrzewa et al., "*Bandwidth Optimization of Optical Add/Drop Multiplexers Using Cascaded Couplers and Mach-Zehnder Sections,*" IEEE Photonics Technology Letters, vol. 7, No. 8, Aug. 1995, pp. 902-904.

K. Jinguji et al., "*Two-Port Optical Wavelength Circuits Composed of Cascaded Mach-Zehnder Interferometers with Point-Symmetrical Configurations,*" Journal of Lightwave Technology, vol. 14, No. 10, Oct. 1996, pp. 2301-2310.

M. Oguma et al., *Passband-Width Broadening Design for WDM Filter with Lattice-Form Interleave Filter and Arrayed-Waveguide Gratings*, IEEE Photonics Technology Letters, vol. 14, No. 3, Mar. 2002, pp. 328-330.

J. De Merlier et al., *All-Optical 2R Regeneration Based on Integrated Asymmetric Mach-Zehnder Interferometer incorporating MMI-SOA*, Electronics Letters, vol. 38, No. 5, Feb. 28, 2002, pp. 238-239.

Y. Hashizume et al., *Integrated Polarisation Beam Splitter Using Waveguide Birefringence Dependence on Waveguide Core Width*, Electronics Letters, vol. 37, No. 25, Dec. 6, 2001, pp. 1517-1518.

K. Suzuki et al., *PLC-based Dynamic Gain Equaliser Consisting of Integrated Mach-Zehnder Interferometers with C- and L-band Equalising Range*, Electronics Letters, vol. 38, No. 18, Aug. 29, 2002, pp. 1030-1031.

T. Mizuno et al., *Dispersionless Interleave Filter Based on Transversal Form Optical Filter*, Electronics Letters, vol. 38, No. 19, Sep. 12, 2002, pp. 1121-1122.

R. R. Patel, et al., *Multi-mode Fiber Coarse WDM Grating Router Using Broadband Add/Drop Filters with Wavelength Re-Use*, LEOS' 1999 12$^{th}$ Annual Meeting, vol. 2, Nov. 1999, pp. 826-827.

K. Okamoto, *Fundamentals of Optical Waveguides*, Academic Press 2000, first published in Japan 1992, pp. 159-161.

M. Oguma et al., *Flat-Passband Interleave Filter with 200 GHz Channel Spacing Based on Planar Lightwave Circuit-type Lattice Structure*, Electronics Letters, vol. 36, No. 15, Jul. 20, 2000, pp. 1299-1300.

C. R. Doerr et al., *Compact and Low-Loss Integrated Flat-Top Passband Demux*, European Conference on Optical Communication ECOC, vol. 6, 2001, pp. 24-25.

M. Oguma, et al., *Compactly Folded Waveguide-Type Interleave Filter with Stabilized Couplers*, OFC, Mar. 19, 2002, TuK3, pp. 70-72.

M. Kawachi, *Silica Waveguides on Silicon and their Application on Integrated-Optic Components*, Optical and Quantum Electronics, vol. 22, 1990, pp. 391-416.

Youfa Wang et al., *Phase Jump in an Optical Directional Coupler*, J. Opt. Soc. Am., B/vol. 18, No. 11, Nov. 2001, pp. 1554-1562.

\* cited by examiner

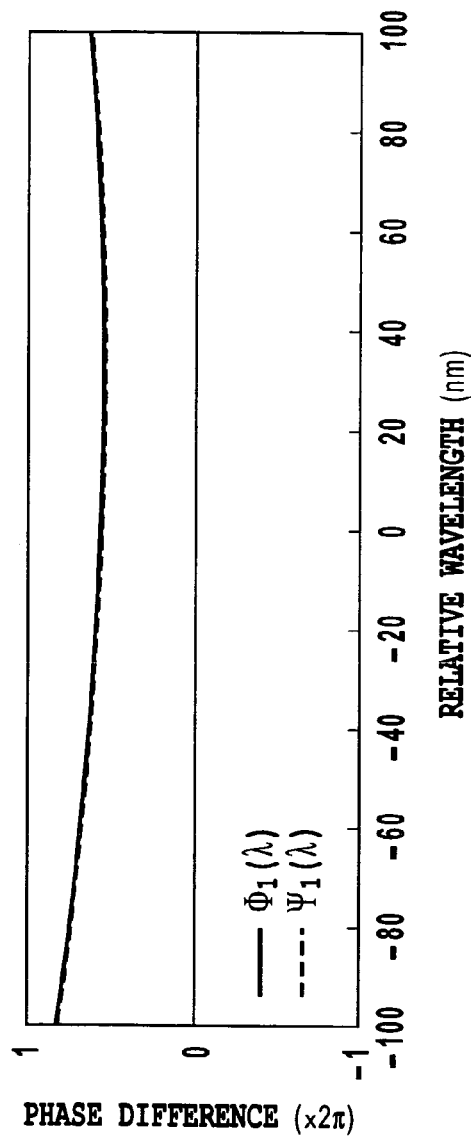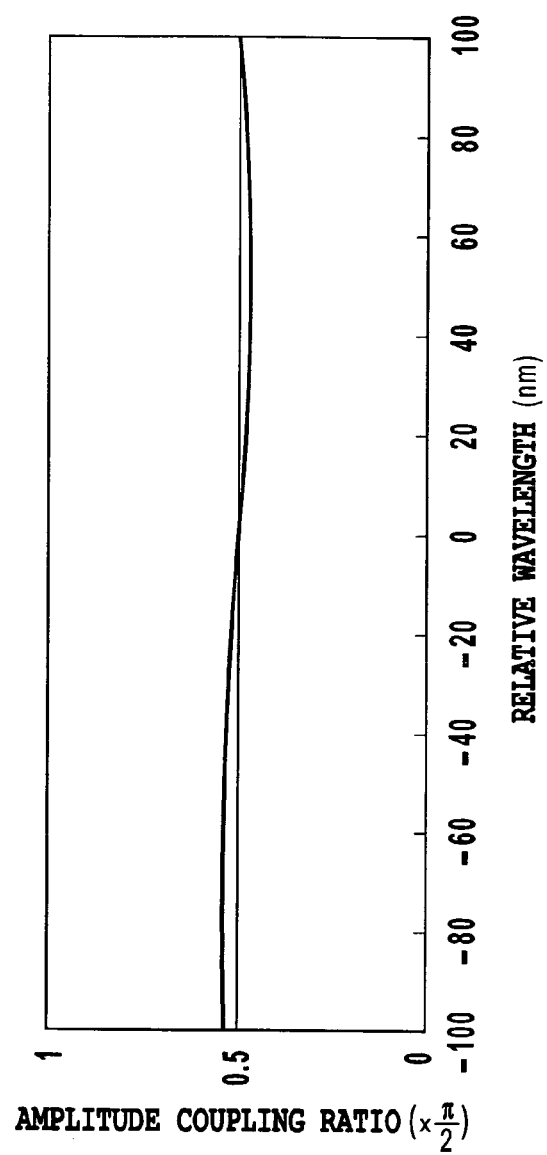
FIG.30A
FIG.30B

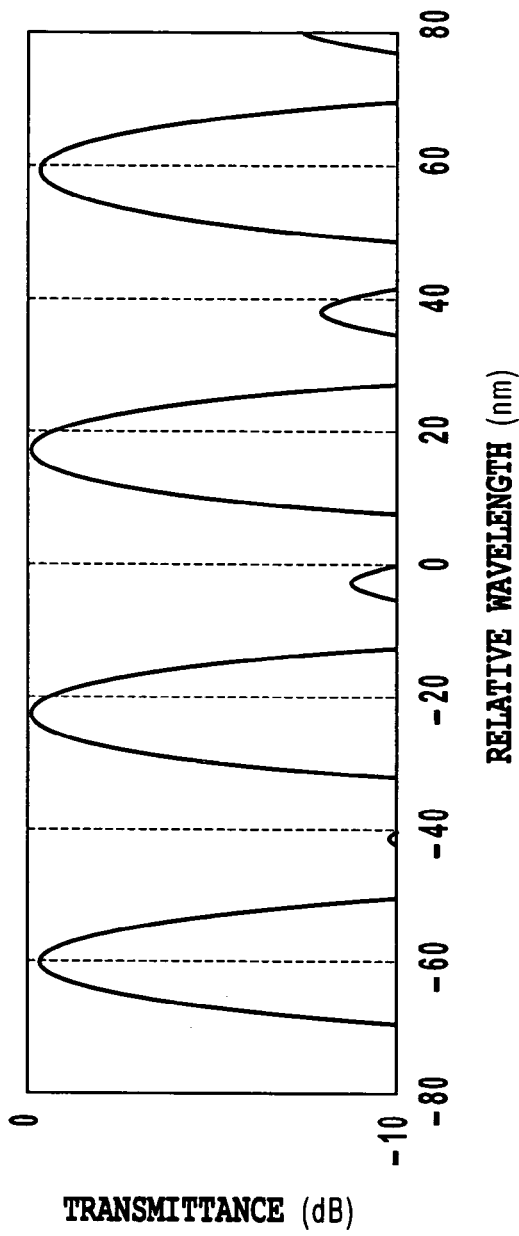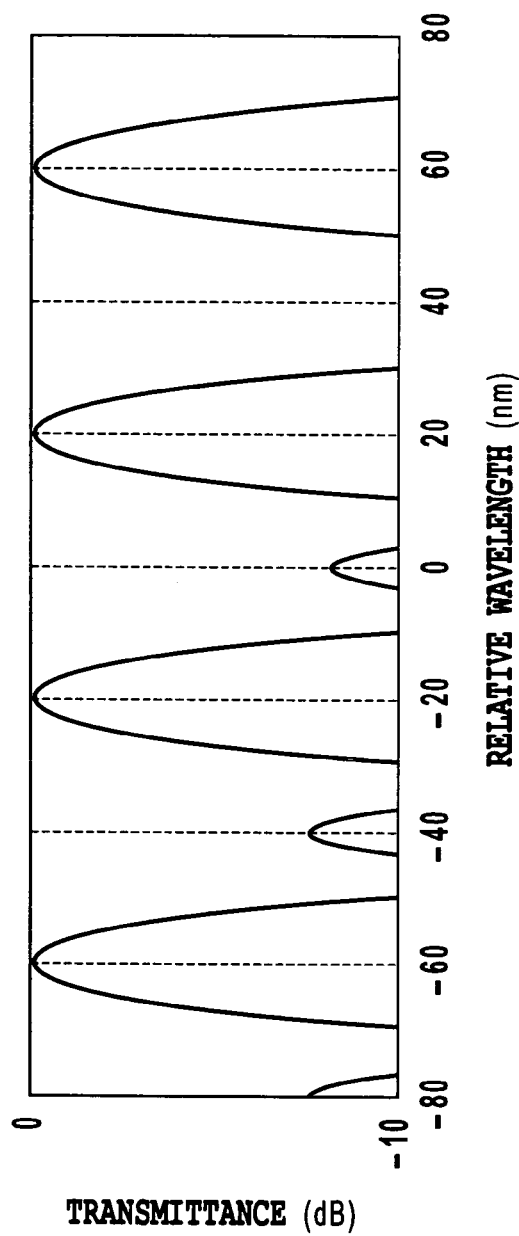

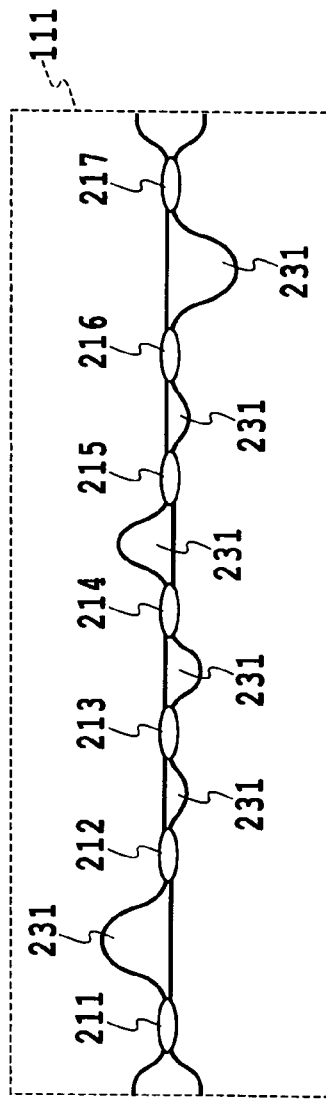
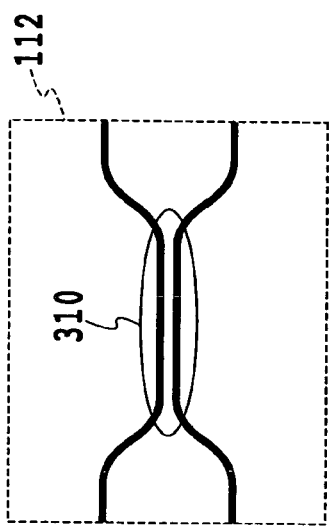
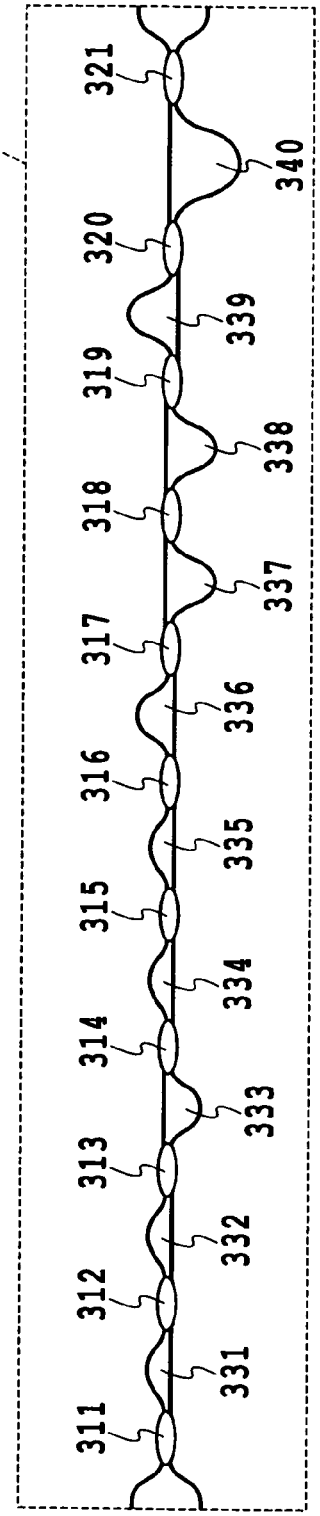
FIG.43A
FIG.43B
FIG.43C

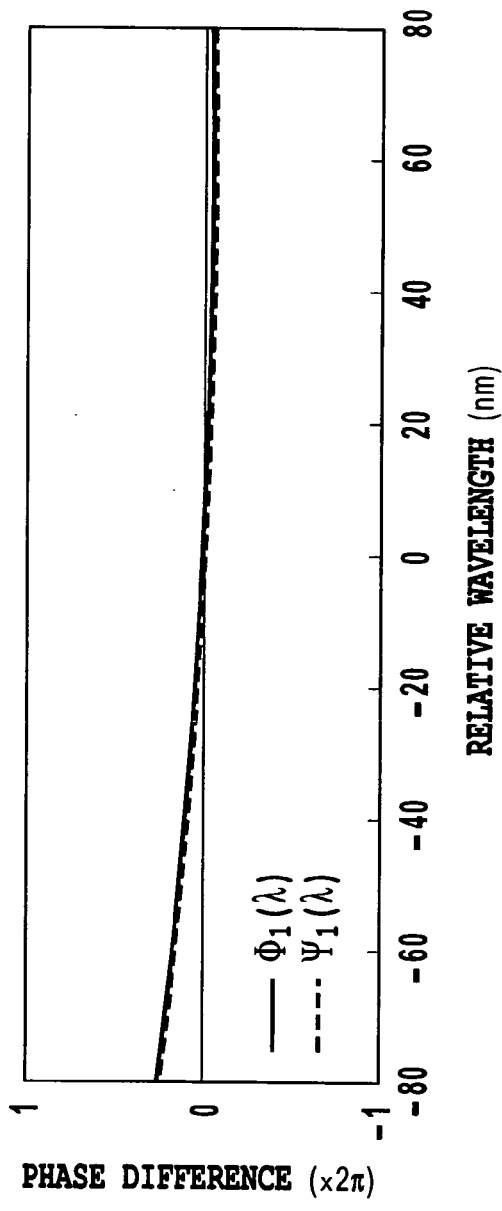
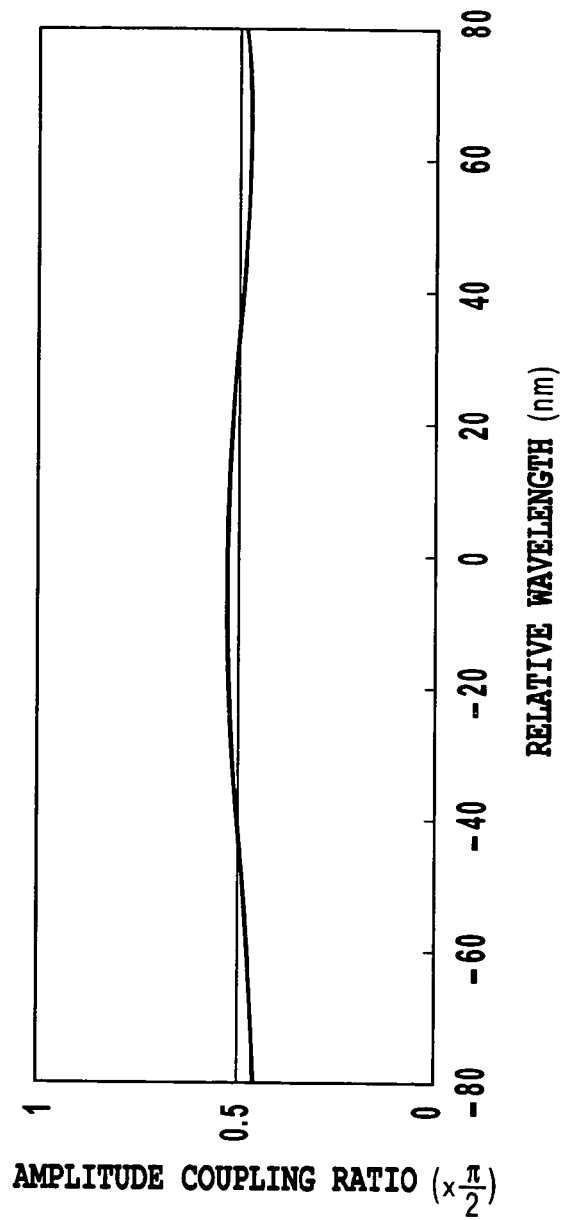
FIG.44A
FIG.44B

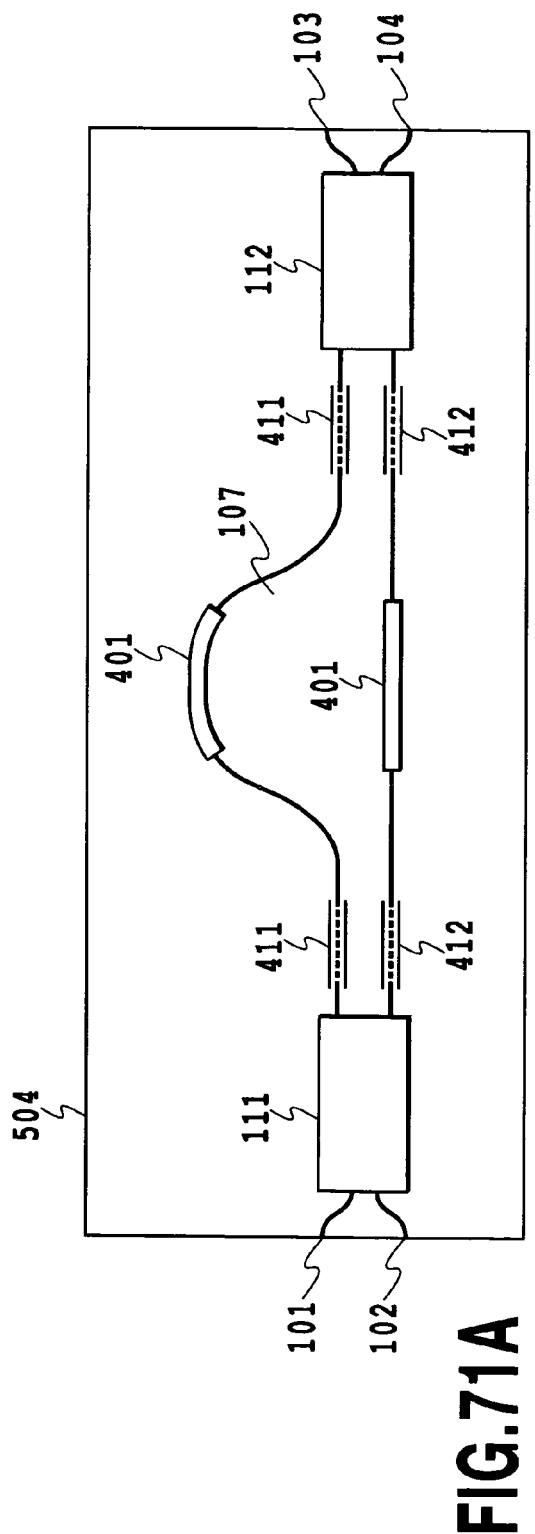
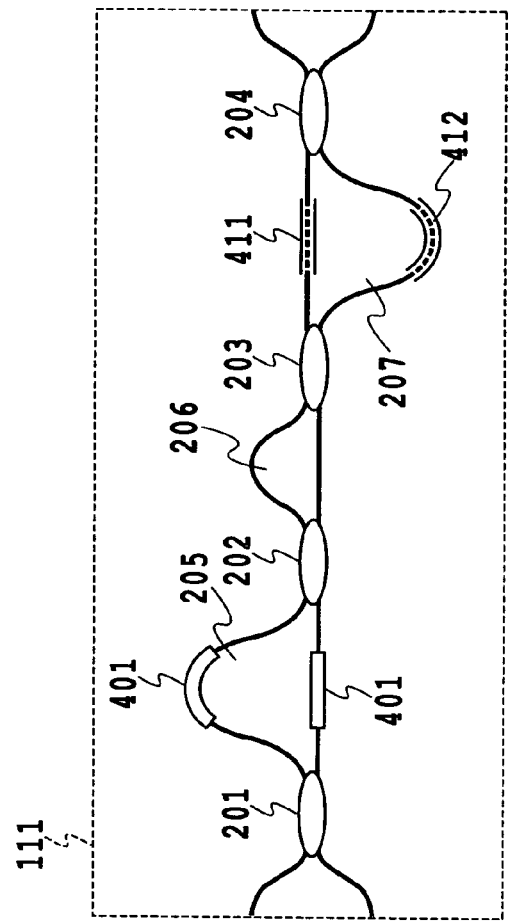
FIG.71A
FIG.71B

OPTICAL MULTI/DEMULTIPLEXING CIRCUIT EQUIPPED WITH PHASE GENERATING DEVICE

This application claims priority from Japanese Patent Application No. 2002-354640 filed Dec. 6, 2002, which is incorporated hereinto by reference.

BACKGROUND OF THE INVENTION

1. Field of the Invention

The present invention relates to an optical multi/demultiplexing circuit used in an optical communication field, and particularly to an optical multi/demultiplexing circuit used for wavelength division multiplexing.

2. Description of the Related Art

With the recent development of dense wavelength division multiplexing (DWDM) systems, optical devices with a variety of functions which are essential for the WDM systems have been developed such as wavelength multi/demultiplexers, optical filters and optical switches.

As examples of the optical devices, the following devices are reported: an arrayed waveguide grating and lattice-form filter (see, for example, M. Oguma et al. "Passband-width broadening design for WDM filter with lattice-form interleave filter and arrayed-waveguide gratings", IEEE Photonics Technology Letters 2002, Vol. 14, pp. 328–330); an asymmetric Mach-Zehnder interferometer (see, for example, De Merlier et al., "All-optical 2R regeneration based on integrated asymmetric Mach-Zehnder interferometer incorporating MMI-SOA", Electronics Letters 2002, Vol. 38, pp. 238–239); a symmetric Mach-Zehnder interferometer (see, for example, Y. Hashizume et al., "Integrated polarization beam splitter using waveguide birefringence dependence on waveguide core width", Electronics Letters 2001, Vol. 37, pp. 1517–1518); a cascaded Mach-Zehnder interferometer (see, for example, K. Suzuki et al., "PLC-based dynamic gain equalizer consisting of integrated Mach-Zehnder interferometers with C- and L-band equalizing range", Electronics Letters 2002, Vol. 38, pp. 1030–1031); and a transversal-form filter (see, for example, T. Mizuno et al., "Dispersionless interleave filter based on transversal form optical filter" Electronics Letters 2002, Vol. 38, pp. 1121–1122).

Recently, the demand for optical devices for CWDM (Coarse Wavelength Division Multiplexing) systems used particularly in metro-network have increased remarkably (see, for example, R. R. Patel et al., "Multi-mode fiber coarse WDM grating router using broadband add/drop filters for wavelength re-use" LEOS' 99 12th Annual Meeting Vol. 2, pp. 826–827).

The wavelength grid of such a CWDM system has a uniform wavelength period of 20 nm. Accordingly, the optical devices for the CWDM system must be designed to have the passband with uniform wavelength period.

However, since the transmittance spectra of the conventional optical multi/demultiplexing circuits such as Mach-Zehnder interferometers have a uniform frequency period, its wavelength characteristics do not become periodic on a uniform wavelength axis. Consequently, they are not applicable to the CWDM systems because of their variations in an insertion loss, passband width and extinction ratio depending on the wavelength grid.

FIG. 1 shows a conventional Mach-Zehnder interferometer as a concrete example. The Mach-Zehnder interferometer consists of two optical couplers 905 and 906, an optical delay line section 907 between the two optical couplers, and two input/output optical waveguides connected to the optical couplers 905 and 906 (see, for example, K. Okamoto, "Fundamentals of optical waveguides" Academic Press 2000, pp. 159–161). As the optical couplers 905 and 906, directional couplers are used whose power coupling ratio is set at 50%.

The Mach-Zehnder interferometer is a multi/demultiplexing circuit with uniform frequency period as will be described below. The two optical output powers of the Mach-Zehnder interferometer are given by the following expressions.

$$|A|^2 = |A_0|^2 \sin^2(\xi/2) \quad (1)$$

$$|B|^2 = |A_0|^2 \cos^2(\xi/2) \quad (2)$$

where $A_0$ is the intensity of light input to one of the input ports, and $\xi$ is the phase given by the optical delay line.

Using the relationship of $f=c/\lambda$, $\xi$ is given by the following expression.

$$\varphi = \frac{2\pi}{\lambda} n\Delta L = \frac{2\pi n\Delta L}{c} f_m \quad (3)$$

where n is a refractive index, $\Delta L$ is a path length difference, f is a frequency, c is the speed of light, $\lambda$ is the wavelength, and m is an integer.

The frequency period are given by the following expression using the foregoing expression (3) considering that the squares of cosine and sine functions have a period $\pi$.

$$\Delta f = f_m - f_{m-1} = \frac{c\pi}{2\pi n\Delta L} = \text{const.} \quad (4)$$

Thus, the frequency period become constant, which means that the Mach-Zehnder interferometer constitutes a multi/demultiplexing circuit with uniform frequency period.

FIG. 2 illustrates transmission characteristics when the central wavelength of the Mach-Zehnder interferometer is set at 1470 nm, and the optical path length difference through the optical delay line section is set at 55.9 μm that gives the frequency period of 20 nm as the demultiplexing period between the through port and cross port near the central wavelength. In FIG. 2, the horizontal axis represents wavelength, on which the wavelength grid is arranged at uniform period; the solid lines represents the transmission characteristics of the optical signal output from the cross port; and the broken lines represents the transmission characteristics of the optical signal output from the through port.

FIG. 3 illustrates transmission characteristics when the horizontal axis represents the optical frequency for comparison purposes. As illustrated in FIG. 3, the Mach-Zehnder interferometer has transmission characteristics with uniform frequency period rather than with uniform wavelength period. Although the demultiplexing periods of the through port and cross port are 20 nm near 1470 nm, and hence agree with the wavelength grid, the wavelength periods increase as they move from 1470 nm toward a longer wavelength side, thereby departing from the wavelength grid clearly. Therefore these optical devices are inappropriate for use in the CWDM system because their insertion loss, passband width and extinction ratio vary greatly depending on the wavelength grid.

In other words, since the interferometers with the conventional configurations such as the Mach-Zehnder interferometer do not have a uniform wavelength period, they present a problem in that their passband deviates from the grid on the wavelength axis as the passband departs from the central wavelength, and that the insertion losses vary remarkably depending on the wavelength.

As another example, a conventional optical multi/demultiplexing circuit has a uniform period in the optical frequency domain, and its transmission characteristics are characterized by the optical frequency period and the central optical frequency. The conventional optical multi/demultiplexing circuit, however, has only one design parameter that can be set freely in connection with the optical frequency period and central optical frequency: that is, the optical path length difference of the optical delay line. Therefore, the optical frequency period and the center optical frequency could not be set simultaneously.

Therefore the optical multi/demultiplexing circuit, which has the uniform frequency period in principle, cannot set the optical frequency period and the central optical frequency at the same time, thereby offering a problem of deteriorating the transmission characteristics even when it is used in the optical frequency domain.

SUMMARY OF THE INVENTION

The inventors have reached an idea that the foregoing problems can be solved by providing a path length difference corresponding to the amount of deviation from each wavelength grid, to adjust the center of passbands to the wavelength grid. To achieve this, we focused our attention to the fact that although an optical delay line usually implements the path length difference, it can also be implemented by utilizing a phase difference of optical signals output from an optical coupler. For example, if we suppose that there is a phase difference of $2\pi$ when optical signals are output from a certain optical coupler, it will correspond to a path length difference of one wavelength. Therefore, if an optical coupler, whose output phase difference has wavelength dependence, can be devised, a path length difference corresponding to the amount of deviation from the wavelength grid can be provided to the optical delay line.

The conventional optical coupler such as a directional coupler and multimode interferometer used in the conventional technique, however, cannot provide a path length difference $\Delta L$ with wavelength dependence. This is because the phase difference of the optical signals output from its outputs is constant, thereby being unable to cause any phase difference depending on the wavelength.

Therefore an object of the present invention is to provide an optical multi/demultiplexing circuit with uniform wavelength period whose center of passbands agrees with the grid on the wavelength axis. The invention is accomplished by implementing an optical coupler, whose output phase difference has wavelength (frequency) dependence. The optical coupler has a phase generating function, which provides a phase corresponding to wavelength (frequency) in the passbands of the optical multi/demultiplexing circuit.

Another object of the present invention is to provide an optical multi/demultiplexing circuit capable of setting the optical frequency period and the center optical frequency at any desired values by installing a phase generating device, to provide an optical multi/demultiplexing circuit with frequency dependent phase.

To solve the foregoing problems, according to a first aspect of the present invention, there is provided an optical multi/demultiplexing circuit with a phase generating function comprising: an optical multi/demultiplexing device including at least one input section and a plurality of output sections; an optical delay line device connected to the optical multi/demultiplexing device; and at least one phase generating device, wherein the phase generating device generates a phase corresponding to a wavelength or frequency of light in a passband of the optical multi/demultiplexing circuit.

The phase generating device may be installed in the optical multi/demultiplexing device, or in the optical delay line device.

The phase generated by the phase generating device may preferably be given by a function of a wavelength ($\lambda$) of light in a transmission wavelength band of the optical multi/demultiplexing circuit or by a function of an angular frequency ($\omega$) of light in a transmission optical frequency band, wherein the functions are a polynomial consisting of a quadratic or higher order function.

The phase generating device may preferably comprise an optical coupler and an optical delay line connected with each other.

An amplitude coupling ratio $\theta$ of the optical coupler and an optical path length difference $\delta 1$ of the optical delay line in the phase generating device, and an optical path length difference $\delta L$ provided to the optical delay line device in the optical multi/demultiplexing circuit may preferably be each optimized such that the phase generating device generates the phase $\phi$ equal to a correct phase $\Psi$, and functions as an optical coupler with an amplitude coupling ratio $\Theta$.

The phase generating device may preferably comprise (M+1) optical couplers, and M optical delay lines interposed between adjacent two of the optical couplers, where M is an integer equal to or greater than two.

The optical multi/demultiplexing circuit may preferably consist of an optical interferometer comprising (N+1) optical multi/demultiplexing devices, and N optical delay line devices interposed between adjacent two of the optical multi/demultiplexing devices, where N is an integer equal to or greater than one.

The optical multi/demultiplexing circuit may preferably consist of a Mach-Zehnder interferometer including two of the optical multi/demultiplexing devices, the optical delay line device interposed between the two optical multi/demultiplexing devices, at least one input waveguide connected to one of the optical multi/demultiplexing devices, and a plurality of output waveguides connected to the other of the optical multi/demultiplexing devices, wherein the two optical multi/demultiplexing devices are disposed in left-right symmetry with respect to a middle line of the Mach-Zehnder interferometer; the two optical multi/demultiplexing devices are a phase generating optical coupler, which functions as a phase generating device; and the phase generating optical coupler includes four optical couplers, and three optical delay lines each interposed between adjacent two of the optical couplers.

The optical multi/demultiplexing circuit may preferably consist of a Mach-Zehnder interferometer including two of the optical multi/demultiplexing devices, the optical delay line device interposed between the two optical multi/demultiplexing devices, at least one input waveguide connected to one of the optical multi/demultiplexing devices, and a plurality of output waveguides connected to the other of the optical multi/demultiplexing devices, wherein one of the two optical multi/demultiplexing devices is a phase generating optical coupler, which functions as a phase generating device; and the phase generating optical coupler includes (M+1) optical couplers, and M optical delay lines each interposed between adjacent two of the optical couplers, where M is an integer equal to or greater than two.

The optical multi/demultiplexing circuit may preferably consist of a lattice-form filter including first to third, three, optical multi/demultiplexing devices, two optical delay line devices each interposed between adjacent two of the three optical multi/demultiplexing devices, at least one input waveguide connected to the first optical multi/demultiplexing device, and at least one output waveguide connected to the third optical multi/demultiplexing device, wherein the first and third optical multi/demultiplexing devices are a phase generating optical coupler, which functions as a phase generating device; and the phase generating optical coupler includes (M+1) optical couplers, and M optical delay lines each interposed between adjacent two of the optical couplers, where M is an integer equal to or greater than two.

The optical multi/demultiplexing circuit may consist of a transversal-form filter.

The optical multi/demultiplexing circuit may preferably configured such that a plurality of output light waves output from the optical multi/demultiplexing circuit are launched into or emitted from at least one of a first slab waveguide and second slab waveguide included in an arrayed waveguide grating which includes array waveguides having their first ends connected to the first slab waveguide and their second ends connected to the second slab waveguide, and that the first slab waveguide includes at least one input waveguide and the second slab waveguide includes at least one output waveguide.

The optical multi/demultiplexing circuit may preferably comprise two of the optical multi/demultiplexing devices, and the optical delay line device may comprise two optical delay lines disposed between the optical multi/demultiplexing devices, wherein one of the two optical multi/demultiplexing devices is connected to at least one of the input waveguides, and the other of the two optical multi/demultiplexing devices is connected to the first slab waveguide of the arrayed waveguide grating.

According to a second aspect of the present invention, there is provided an optical multi/demultiplexing circuit comprising a first optical multi/demultiplexing circuit as described above, and at least one second optical multi/demultiplexing circuit as described above, the second optical multi/demultiplexing circuit being connected to at least one of outputs of the first optical multi/demultiplexing circuit.

The optical delay line may preferably comprise a path length difference adjusting device, or undergoes path length adjustment.

The optical delay line may preferably comprise a birefringent adjustment device, or undergoes birefringent adjustment.

The optical multi/demultiplexing circuit may be composed of silica-based glass optical waveguides.

According to a third aspect of the present invention, there is provided an optical multi/demultiplexing-circuit module comprising an optical multi/demultiplexing circuit as described above installed in a casing, and having optical fibers held by the casing for carrying out the input and output of an optical signal to and from the optical multi/demultiplexing circuit.

Using the optical multi/demultiplexer equipped with phase generating device in accordance with the present invention can implement the uniform period transmission characteristics even on the wavelength axis, thereby being able to provide an optical device applicable to optical communication systems with uniform wavelength period.

In addition, using the phase generating device in accordance with the present invention makes it possible to exert an effect of the phase with the optical frequency dependence on the optical multi/demultiplexing circuit, thereby being able to provide the optical multi/demultiplexing circuit capable of setting the optical frequency period and central optical frequency simultaneously at any desired values.

The above and other objects, effects, features and advantages of the present invention will become more apparent from the following description of embodiments thereof taken in conjunction with the accompanying drawings.

BRIEF DESCRIPTION OF THE DRAWINGS

FIG. 30A is a diagram showing the relative wavelength dependences of the phase difference output from phase generating optical couplers and a target phase;

FIG. 30B is a diagram showing the relative wavelength dependence of the amplitude coupling ratio when the phase generating optical couplers are used as optical couplers;

FIG. 39A is a diagram showing the wavelength dependence of the transmission characteristics of a conventional lattice-filter-type wavelength reference device;

FIG. 39B is a diagram showing the wavelength dependence of the transmission characteristics of the uniform-wavelength-period lattice-filter-type wavelength reference device in the seventh embodiment of the present invention;

FIG. 43A is a diagram schematically showing a six-stage lattice-form-filter-type phase generating optical coupler used in the uniform-wavelength-period interleave filter in the eighth embodiment of the present invention;

FIG. 43B is a diagram schematically showing a directional coupler used in the uniform-wavelength-period interleave filter in the eighth embodiment of the present invention;

FIG. 43C is a diagram schematically showing a ten-stage lattice-form-filter-type phase generating optical coupler used in the uniform-wavelength-period interleave filter in the eighth embodiment of the present invention;

FIG. 44A is a diagram showing the relative dependence of the target phase and the phase acting on the first optical delay line that is generated by the adjacent couplers;

FIG. 44B is a diagram showing the relative wavelength dependence of the amplitude coupling ratio when the phase generating optical coupler is used as an optical coupler;

FIG. 71A is a diagram schematically showing an optical multi/demultiplexing circuit in a fourteenth embodiment of the present invention;

FIG. 71B is a diagram showing the configuration of a phase generating device in the fourteenth embodiment of the present invention;

DETAILED DESCRIPTION OF PREFERRED EMBODIMENTS

The embodiments of the present invention will now be described in detail with reference to the accompanying drawings. In the following description, an "optical multi/demultiplexing device" refers to a circuit configured by optical couplers and optical delay lines; a "phase generating device" refers to a device for generating a phase Φ; and a "phase generating optical coupler" refers to a circuit functioning as the phase generating device and optical multi/demultiplexing device.

First Embodiment

Figure 4:
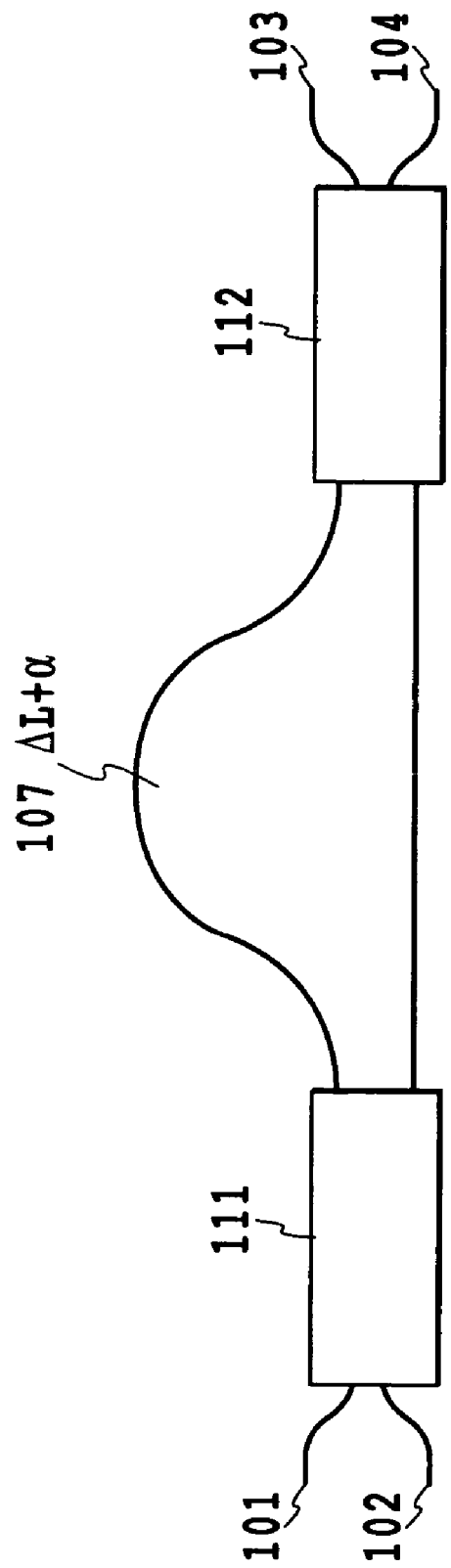
FIG. 4 is a diagram showing a configuration of a first embodiment of the optical multi/demultiplexing circuit in accordance with the present invention.

FIG. 4 shows a first embodiment of the optical multi/demultiplexing circuit in accordance with the present invention. The present embodiment includes two two-input/two-output phase generating optical couplers 111 and 112; an optical delay line section 107 consisting of two optical waveguides between the two phase generating optical couplers 111 and 112; and two input/output optical waveguides 101 and 102, and 103 and 104 connected to the phase generating optical couplers 111 and 112.

The optical multi/demultiplexing circuit has a function (phase generating function) for correcting the deviation of the wavelength period so that the transmission characteristics have an approximately uniform period on the wavelength axis. The function can be achieved by configuring at least one of the phase generating optical couplers 111 and 112 in such a fashion that the output phase difference of the phase generating optical coupler has a wavelength dependence in the passband of the optical multi/demultiplexing circuit. Alternatively, such a function is also achievable by installing on the optical waveguides of the optical delay line section 107 a phase generating device capable of generating a phase that has a wavelength dependence.

The phase correction will be described in a more detail.

Figure 5:
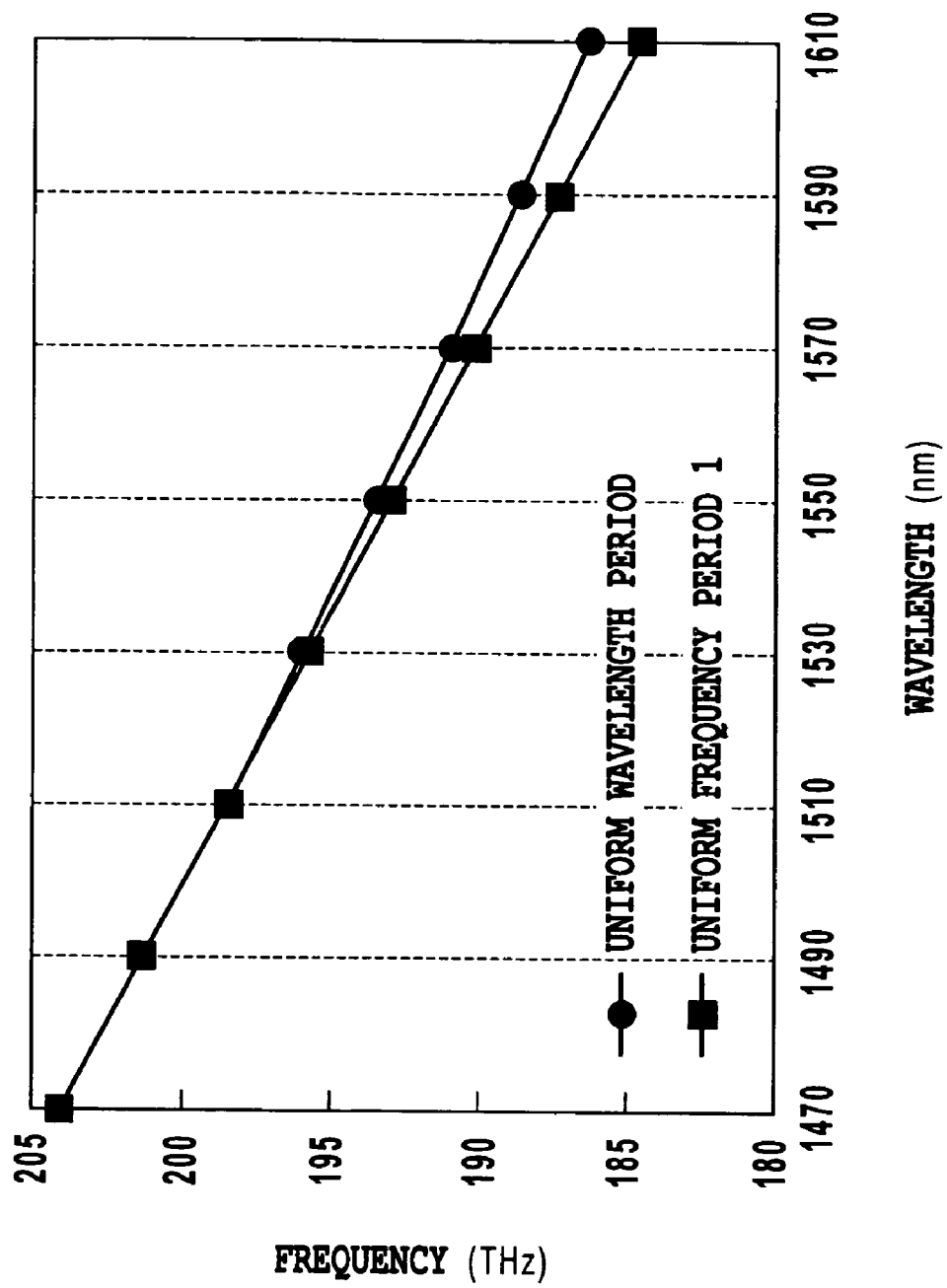
FIG. 5 is a graph illustrating relationships between the wavelength and frequency.

FIG. 5 illustrates general relationships between the wavelength and frequency. In FIG. 5, frequencies, which corresponds to the wavelengths on the CWDM grid are obtained from f=c/λ, and plotted as "uniform wavelength period", where f is the frequency, c is the speed of light, and λ is the wavelength. In addition, a frequency period Δf1 (≅2.74 THz) near 1470 nm is obtained, and frequencies are plotted in a uniform period of Δf1 with reference to the frequency at 1470 nm, which is labeled as "uniform frequency period 1".

Figure 1:
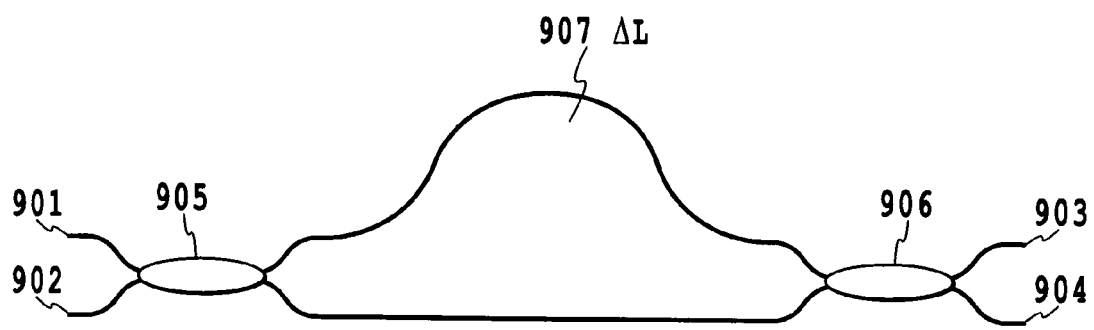
FIG. 1 is a diagram showing a configuration of a conventional Mach-Zehnder interferometer.
Figure 2:
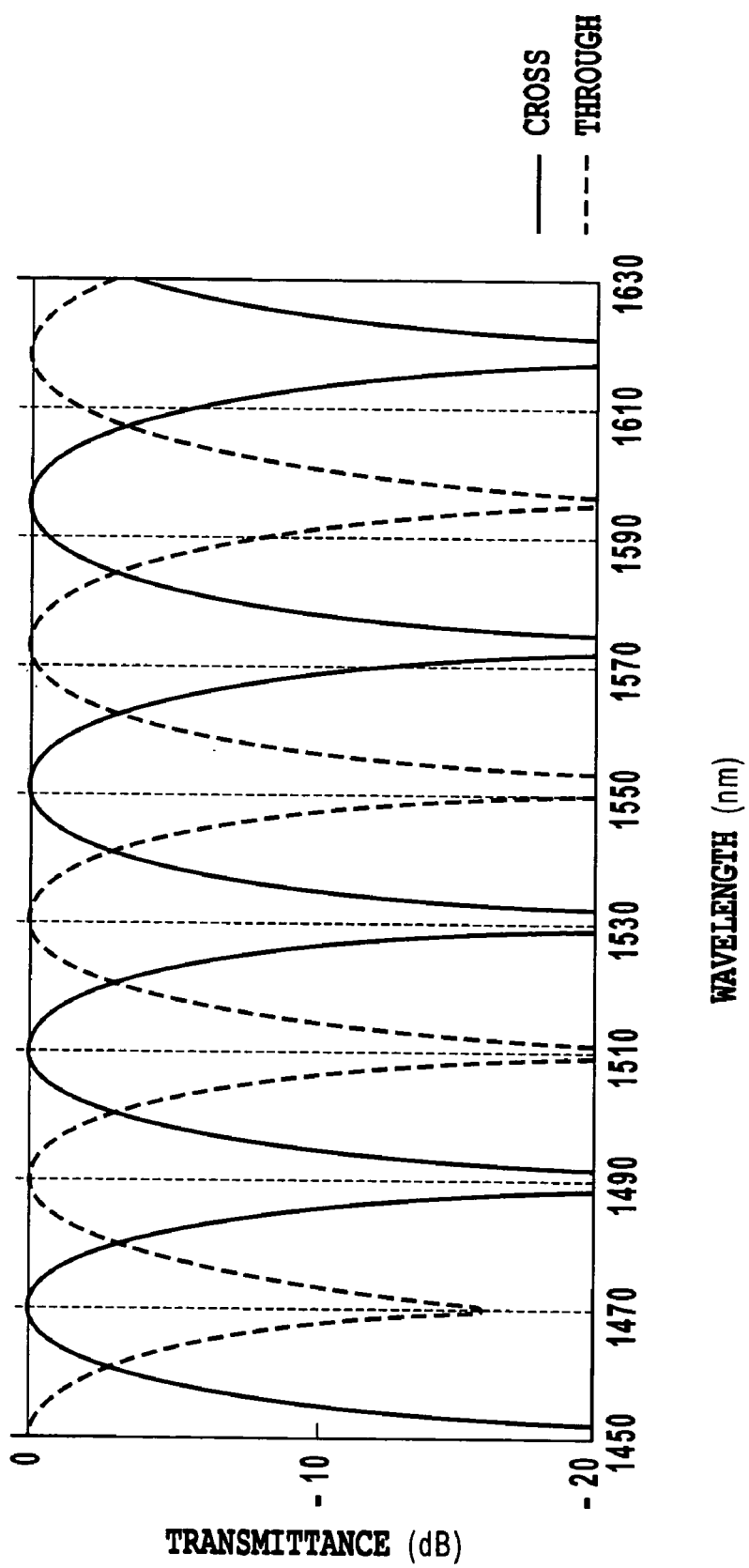
FIG. 2 is a graph illustrating transmission characteristics of the conventional Mach-Zehnder interferometer, in which the horizontal axis represents the wavelength.
Figure 3:
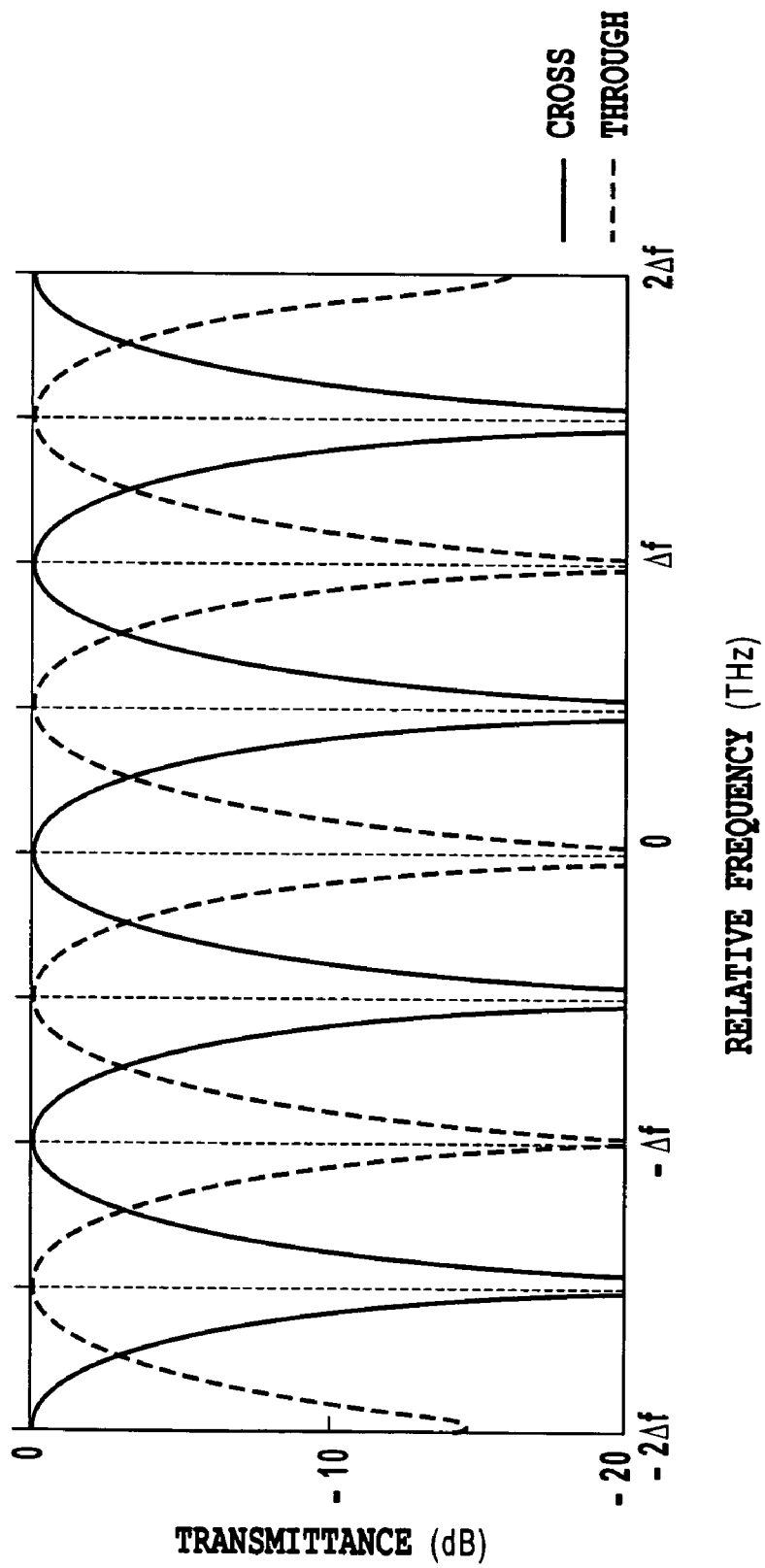
FIG. 3 is a graph illustrating transmission characteristics of the conventional Mach-Zehnder interferometer, in which the horizontal axis represents the relative optical frequency.

Although the two agree with each other near 1470 nm, the deviation between the two increases as they depart from 1470 nm. The fact agrees with the tendency of the transmission characteristics of the conventional Mach-Zehnder interferometer as shown in FIG. 2. In other words, although the transmittance across the cross ports is high and the crosstalk across the through ports is low near 1470 nm, the center of the passbands deviates from the grid toward the longer wavelength side, and hence the transmittance on the wavelength grid is reduced and the crosstalk is degraded.

To correct the deviation between the uniform wavelength period and uniform frequency period 1 of FIG. 5, the deviation is divided into a linear section and a nonlinear section. First, a method will be described for correcting the linear section of the deviation between the uniform wavelength period and uniform frequency period 1.

Figure 6:
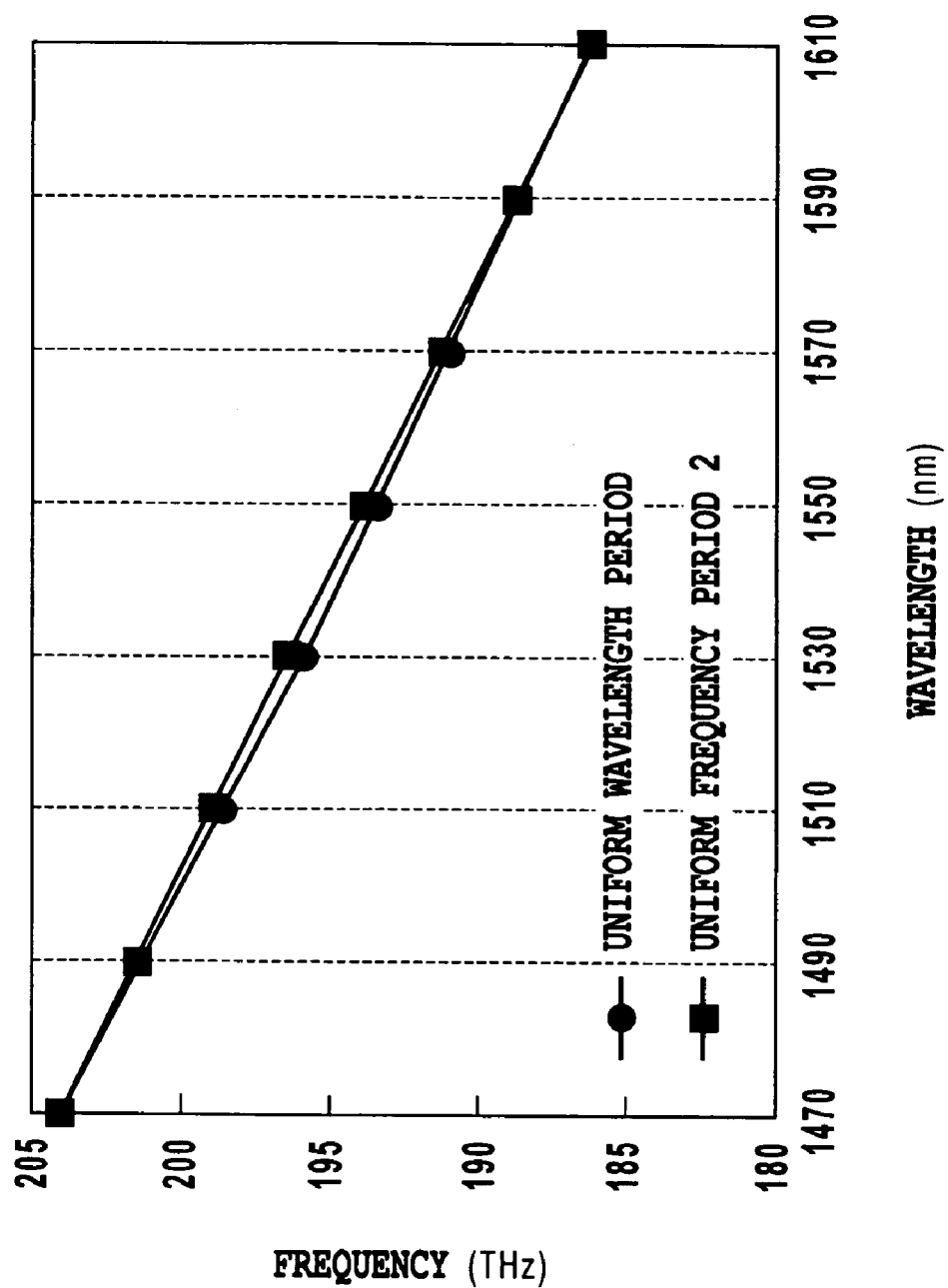
FIG. 6 is a graph illustrating relationships between the wavelength and frequency.

First, a frequency period Δf2 (≅2.53 THz) is obtained as the average value of the frequency period near 1470 nm and the frequency period near 1610 nm. Next, the frequencies are plotted in a uniform period of Δf2 with reference to the frequency at 1470 nm, which is labeled as "uniform frequency period 2" as illustrated in FIG. 6.

The uniform wavelength period and uniform frequency period 2 agree with each other near 1470 nm, deviate slightly as they proceed toward the longer wavelength side, and agree again near 1610 nm. This proves that the deviation between the uniform wavelength period and uniform frequency period can be corrected substantially by the correction in the linear section.

Figure 7:
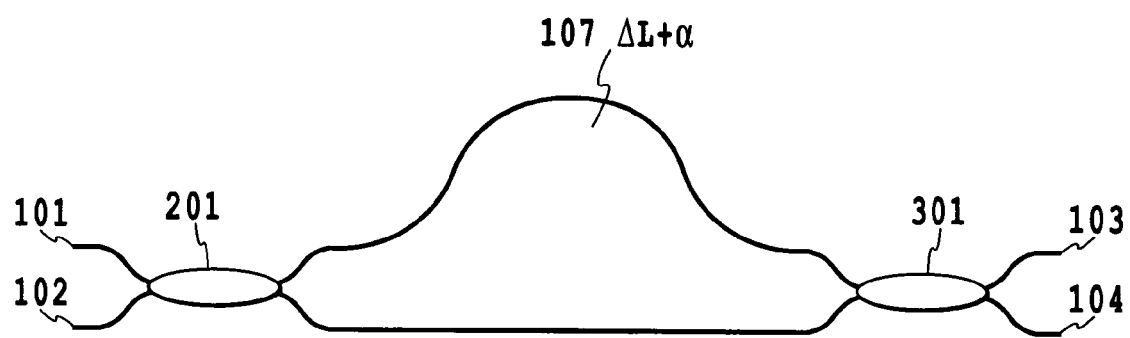
FIG. 7 is a diagram showing a configuration of a Mach-Zehnder interferometer in which a linear section of deviation between the wavelength and frequency is corrected.

FIG. 7 shows a Mach-Zehnder interferometer in which the linear section of the deviation between the uniform wavelength period and uniform frequency period is corrected. The circuit includes two optical couplers 201 and 301; an optical delay line section 107 between the two optical couplers 201 and 301; and two input/output optical waveguides 101 and 102, and 103 and 104 connected to the optical couplers 201 and 301, respectively. Here, as the optical couplers 201 and 301, directional couplers with the power coupling ratio of 50% are used.

In contrast with the conventional Mach-Zehnder interferometer whose optical path length difference in the optical delay line section is ΔL, the path length difference of the present circuit is set at ΔL'=ΔL+α, where ΔL=55.9 μm, and α, which is a path length of the wavelength order, is set at α=2·λc (λc is the central wavelength). For example, it is set at α=2.94 μm when λc=1.47 μm.

Figure 8:
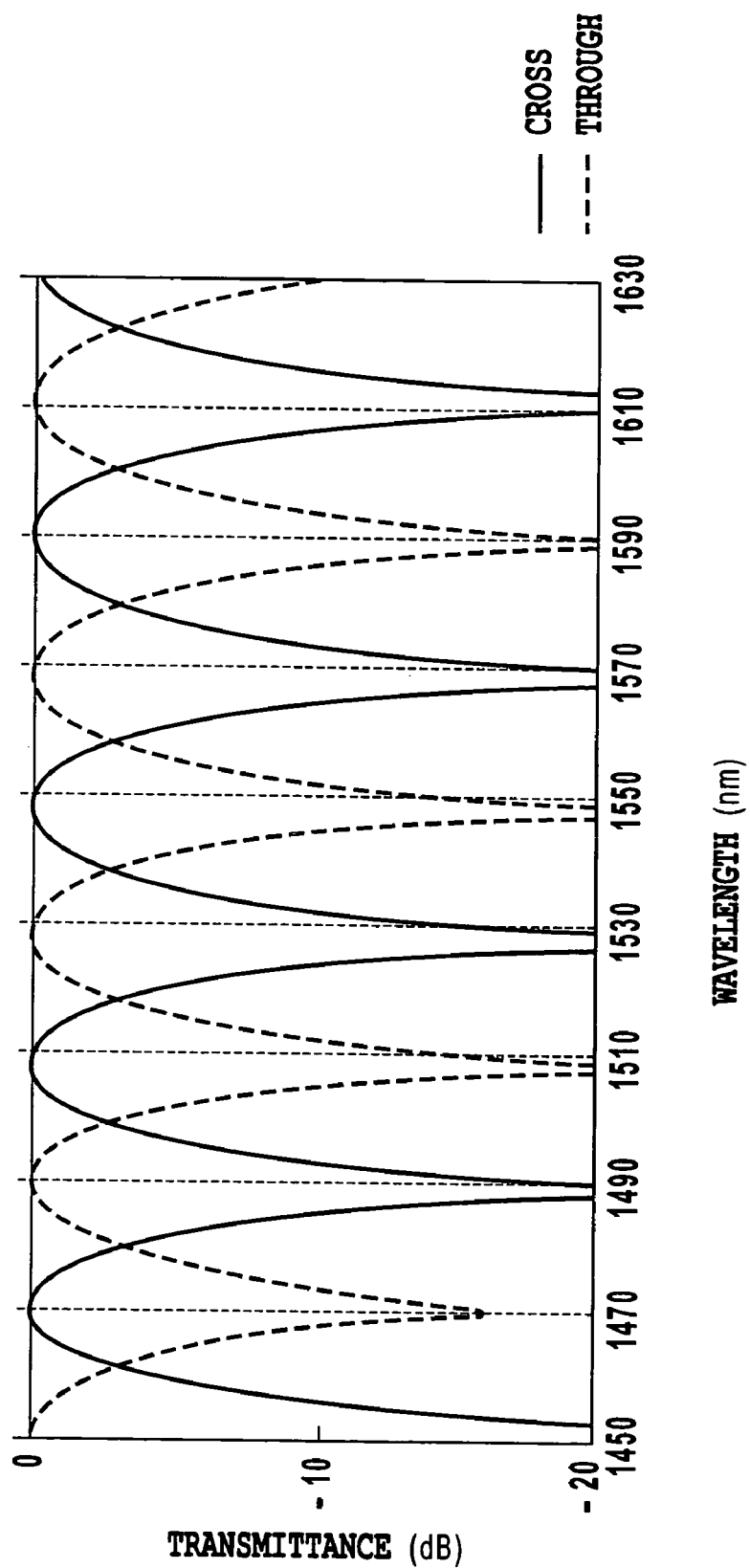
FIG. 8 is a graph illustrating the wavelength dependence of the transmission characteristics of the Mach-Zehnder interferometer in which the linear section of the deviation between the wavelength and frequency is corrected.

FIG. 8 illustrates the wavelength dependence of the transmission characteristics in this case. Just as the tendency of the deviation between the uniform wavelength period and uniform frequency period 2 illustrated in the FIG. 6, the center of the passbands are exactly on the grid at both ends although it deviates slightly at the middle of the wavelength axis. Thus, the transmittance on the wavelength grid is high at both ends of the wavelength region, thereby being able to reduce the crosstalk and improve the characteristics.

Thus, the linear section of the deviation between the uniform wavelength period and uniform frequency period can be corrected by providing the optical delay line with an additional path length of the wavelength order. However, the central section on the wavelength axis still has slight deviation. Thus, a method will be described for correcting the nonlinear section of the deviation between the uniform wavelength period and uniform frequency period by using a phase generating optical coupler.

Figure 9:
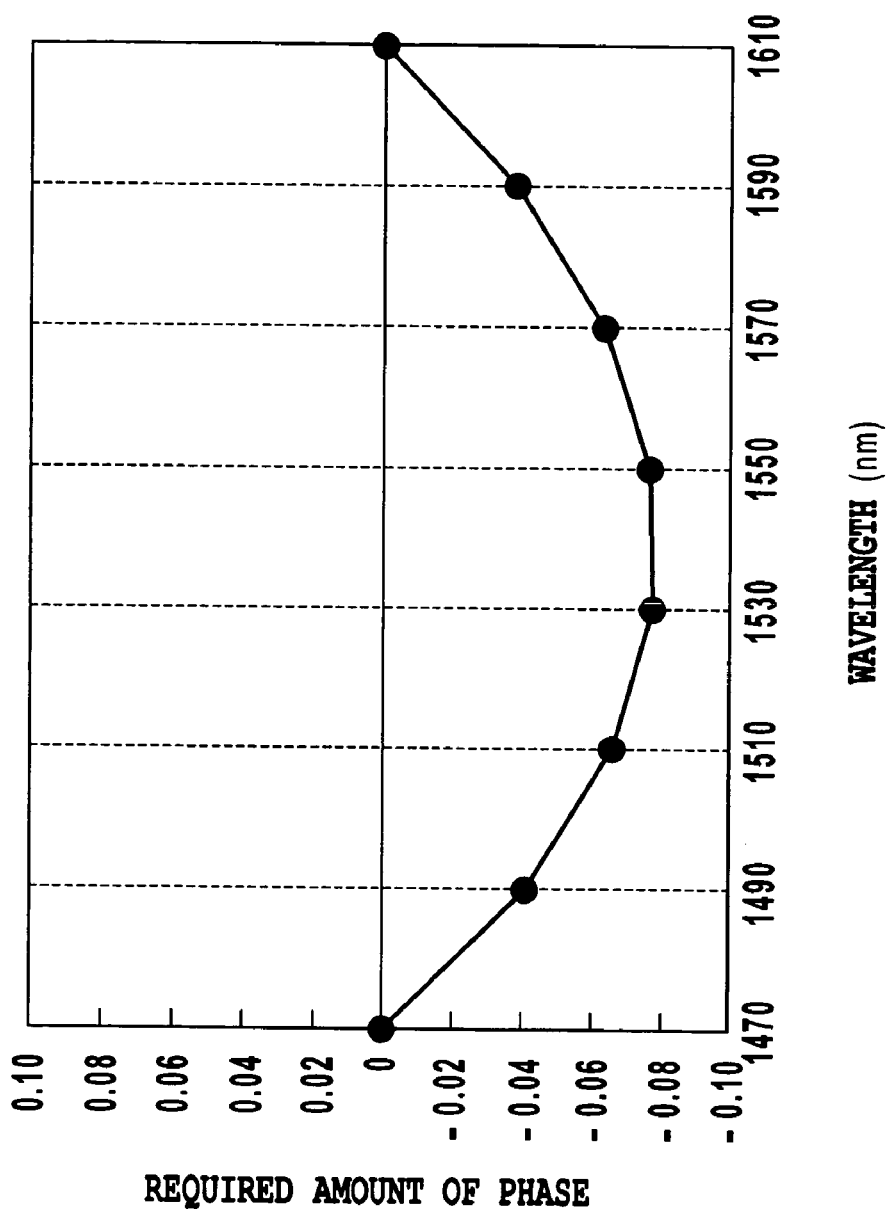
FIG. 9 is a graph illustrating the wavelength dependence of the amount of phase necessary for correcting the nonlinear section of the deviation between the wavelength and frequency.

FIG. 9 illustrates, for the individual wavelengths on the CWDM grid, a plot of the values obtained by dividing the frequency deviation between the uniform wavelength period and uniform frequency period 2 illustrated in FIG. 6 by a frequency period Δf2, that is, the amount of phase necessary for correcting the nonlinear section of the deviation between the uniform wavelength period and uniform frequency period. In other words, it is possible to correct the nonlinear section of the deviation between the uniform wavelength period and uniform frequency period 2 by providing the optical delay lines with an appropriate phase as illustrated in FIG. 9.

First, an example will be described on how to express the wavelength dependent phase in FIG. 9 in terms of a function.

Using equation f=c/λ expressing the relationship between the wavelength and frequency, relationships between the mth wavelength $\lambda_m$ and mth frequency $f_m = f_0 + m\Delta f$ can be expressed as follows.

$$\lambda_m = \frac{c}{f_0 + m\Delta f} \quad (5)$$

where m is an integer, and Δf is a frequency period. Expanding the foregoing equation gives the following expression.

$$\lambda_m = \frac{c}{f_0}\left\{1 - \frac{\Delta f}{f_0}m + \left(\frac{\Delta f}{f_0}\right)^2 m^2 \ldots\right\} \quad (6)$$

$$= \lambda_0 - \frac{\Delta f}{f_0}\lambda_0 m^2 + \left(\frac{\Delta f}{f_0}\right)^2 \lambda_0 m^2 \ldots$$

In the foregoing equation (6), the second term and the third term onward represent the linear section and nonlinear section in the relationships between the wavelength and frequency, respectively. Accordingly, using a nonlinear polynomial, especially, a quadratic function or a function of a higher order can give good approximation of the phase required to correct the deviation between the uniform wavelength period and uniform frequency period.

For example, when carrying out an approximation using a quadratic polynomial, the curve of FIG. 9 is approximated as follows by the phase Ψ as a result of a multiple regression analysis.

$$\Psi \cong 8.12 \times 10^{-6}\lambda^2 - 0.025\lambda + 19.2$$

It is obvious that the polynomial used is not limited to the quadratic function or a function of a higher order, and any desired function can be used for the approximation. For example, the approximation using a Gaussian function gives the following phase correction amount Ψ.

$$\Phi \cong 0.122 - \frac{37.94}{186.5\sqrt{0.5\pi}}\exp\left[\frac{-2(x-1539.54)^2}{186.5^2}\right]$$

Figure 10:
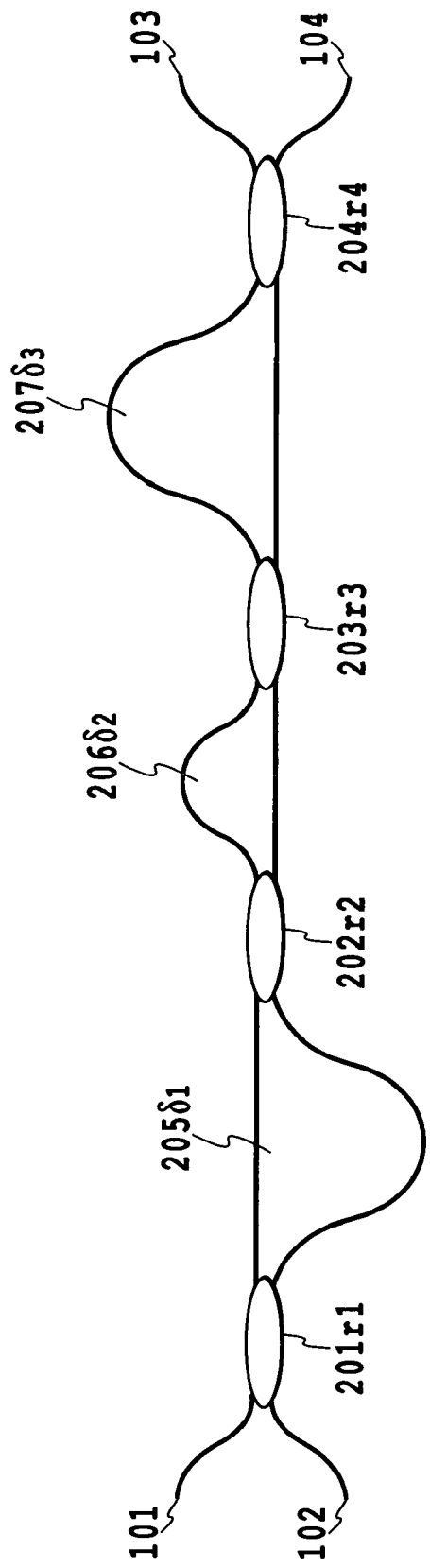
FIG. 10 is a diagram showing a configuration of a phase generating optical coupler having phase characteristics with wavelength dependence.

As a device for providing such a wavelength dependent phase, a phase generating optical coupler is used, which creates a phase with wavelength dependence in the passbands of the interferometer (1470–1610 nm in the present embodiment), using the difference of the phase output from the two output ports. FIG. 10 shows a configuration of the phase generating optical coupler whose output phase difference varies in the passbands of the multi/demultiplexing circuit.

The phase generating optical coupler comprises four optical couplers 201–204, and three optical delay line sections 205–207 interposed between the adjacent optical couplers 201–204. It is possible to set the power coupling ratio of the phase generating optical coupler and the wavelength dependence of the output phase difference by determining the power coupling ratios of the four optical couplers 201–204 and by providing the three optical delay lines 205–207 with appropriate path length differences.

As the optical couplers 201, 202, 203 and 204, directional couplers with the power coupling ratios r1, r2, r3 and r4 are used, respectively. In addition, the path length differences of the optical delay lines 205, 206 and 207 are set at δ1, δ2 and δ3. As a result of fitting the phase characteristics of the output of the phase generating optical coupler to the approximation function of the foregoing equation (7), the power coupling ratios r1=82%, r2=82%, r3=82% and r4=82%, and the path length differences δ1=−1.13λc, δ2=0.24λc and δ3=1.13λc are obtained.

Although the phase generating optical coupler includes three optical delay lines (or four optical couplers), the number of the optical delay lines may be two or four. As the number of the optical delay lines increases, the flexibility of controlling the phase characteristics of the phase generating optical coupler increases, thereby improving the accuracy of the fitting. However, as the number of the optical delay lines increases, the size of the circuit increases as well. Accordingly, it is preferable that the phase generating optical coupler be configured using the minimum number of the optical delay lines that can achieve a sufficient degree of approximation. More specifically, if the number of the optical delay lines exceeds six (or the number of the optical couplers exceeds seven), the size of the circuit becomes too large. Consequently, the number of the optical delay lines is preferably set equal to or less than six.

Figure 11:
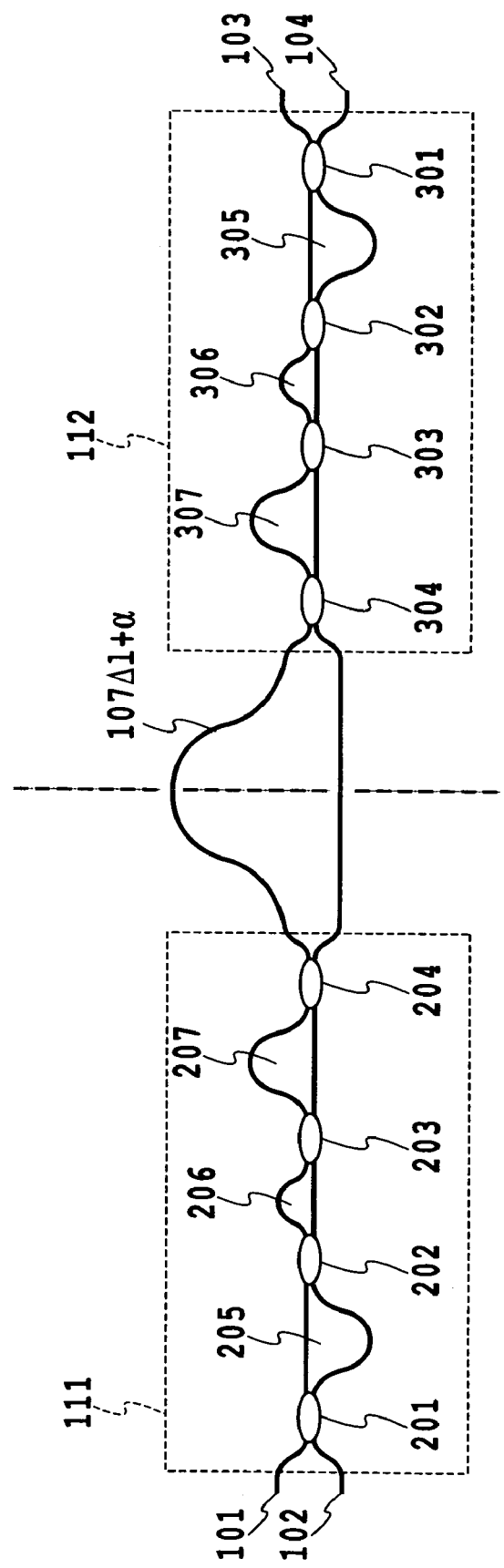
FIG. 11 is a diagram showing a state in which the phase generating optical coupler is configured such that it has left-right symmetry with respect to the middle line (broken line of FIG. 11) of an optical delay line.

As a matter of course, the size of the optical delay line varies depending on the relative refractive index difference and path length of the waveguides, and on the power coupling ratio and circuit configuration of the optical coupler. In addition, the phase correction amount required varies depending on the wavelength dependence of the optical coupler used, the characteristics of waveguide materials, the demultiplexing period and the circuit configuration. Accordingly, the number of the optical delay lines can be determined in accordance with the circuit fabricated. An interferometer suitable for the present embodiment includes two optical multiplexing sections 111 and 112 which are interconnected through the optical delay line 107 as shown in FIG. 11, and include three optical delay lines (205, 206 and 207, and 305, 306 and 307) each.

Figure 12A:
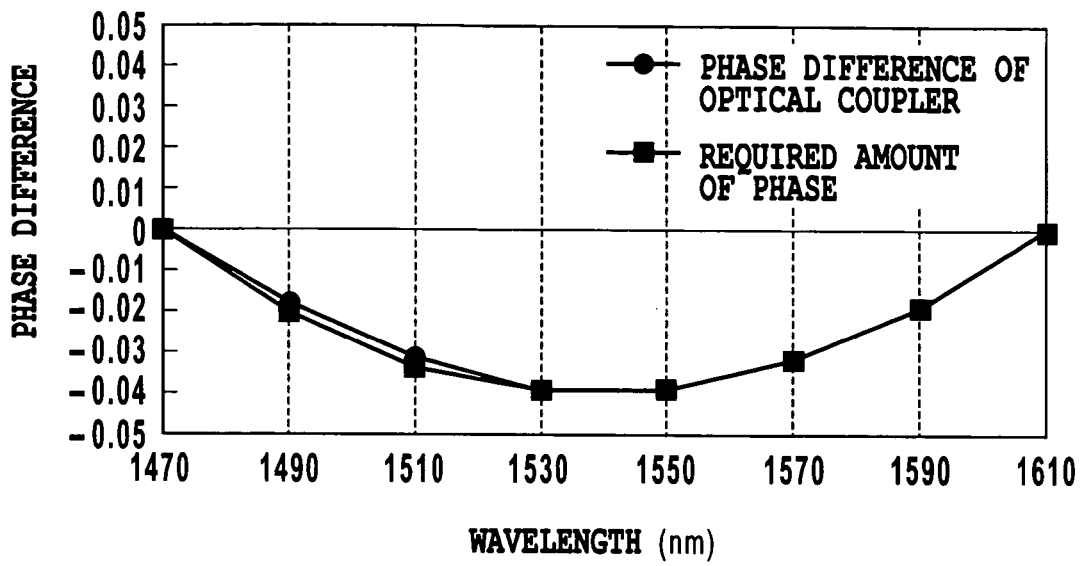
FIG. 12A is a graph illustrating the wavelength dependence of the phase difference between the optical signals output from the two output ports of the phase generating optical coupler.
Figure 12B:
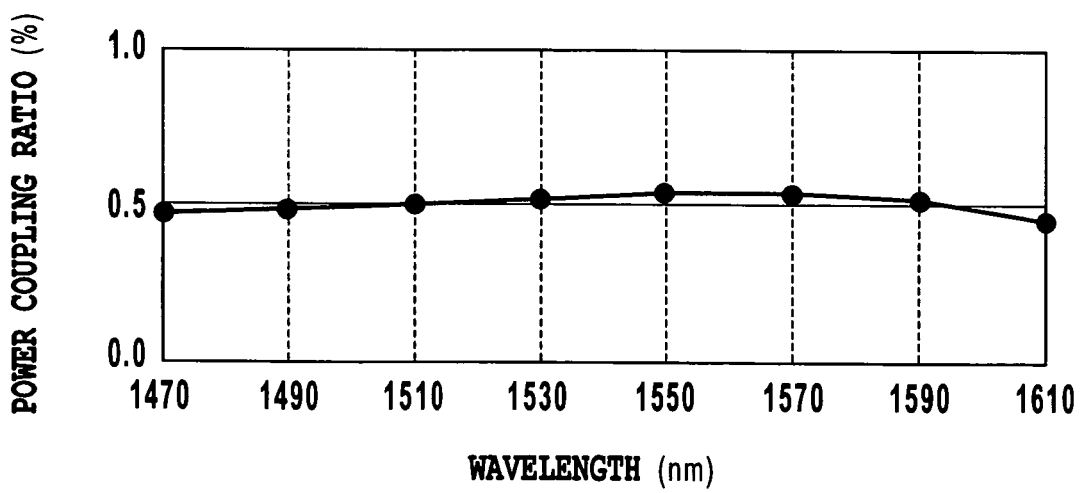
FIG. 12B is a graph illustrating the wavelength dependence of the power coupling ratio of the optical signals output from the output ports of the phase generating optical coupler.

A pair of the phase generating optical couplers with the configuration as shown in FIG. 10 is used as the two optical couplers of the asymmetric Mach-Zehnder interferometer with the conventional configuration. FIG. 12A is a graph illustrating the wavelength dependence of the phase difference between the optical signals output from the two output ports of the two optical couplers (phase generating optical couplers) of the asymmetric Mach-Zehnder interferometer; and FIG. 12B illustrates the wavelength dependence of the power coupling ratio. Here, the variation in the path length per phase difference of 2π is 1·λc, where λc is the central wavelength, and the path length difference is represented in terms of the relative path length of one of the waveguides (lower waveguide of FIG. 10) against that of the other. Replacing the two conventional optical couplers of the asymmetric Mach-Zehnder interferometer by the phase generating optical couplers of the present embodiment makes it possible to halve the amount of phase required for each phase generating optical coupler from that of FIG. 9 as illustrated in FIG. 12A.

It is obvious that the phase generating optical couplers on both sides of the asymmetric Mach-Zehnder interferometer can be used to provide different amount of phase, or that only the phase generating optical coupler on one side can be used to carry out the phase correction. For example, as the phase generating optical coupler 111 in FIG. 4, a conventional optical coupler whose output phase difference is constant can be used, and as the phase generating optical coupler 112, a phase generating optical coupler whose output phase difference is wavelength dependent in the passbands of the multi/demultiplexer can be used (for example, the phase generating optical coupler including six optical delay lines (or seven optical couplers) can be used). In this case, the phase generating optical coupler 112 alone can be used to compensate for the phase difference as illustrated in FIG. 12A while the power coupling ratio is set as illustrated in FIG. 12B with offering similar advantages.

Thus, the uniform wavelength period circuit can also be implemented by the configuration in which the interferometer includes only one phase generating optical coupler whose output phase difference has the wavelength dependence.

According to the wavelength dependence of the phase difference as illustrated in FIG. 12A, it is seen that the phase difference between the optical signals, which are output from the two output ports of the phase generating optical coupler with the configuration as illustrated in FIG. 10, has the wavelength dependence given by a quadratic or higher order polynomial, and that the phase difference of the phase generating optical coupler agree with the amount of phase necessary for the correction of the nonlinear section of the deviation between the uniform wavelength period and uniform frequency period. In addition, since the wavelength dependence of the power coupling ratio of the phase generating optical coupler is small, it is expected that the wavelength dependence is small for the transmission characteristics of the multi/demultiplexing circuit using the phase generating optical coupler.

Figure 13:
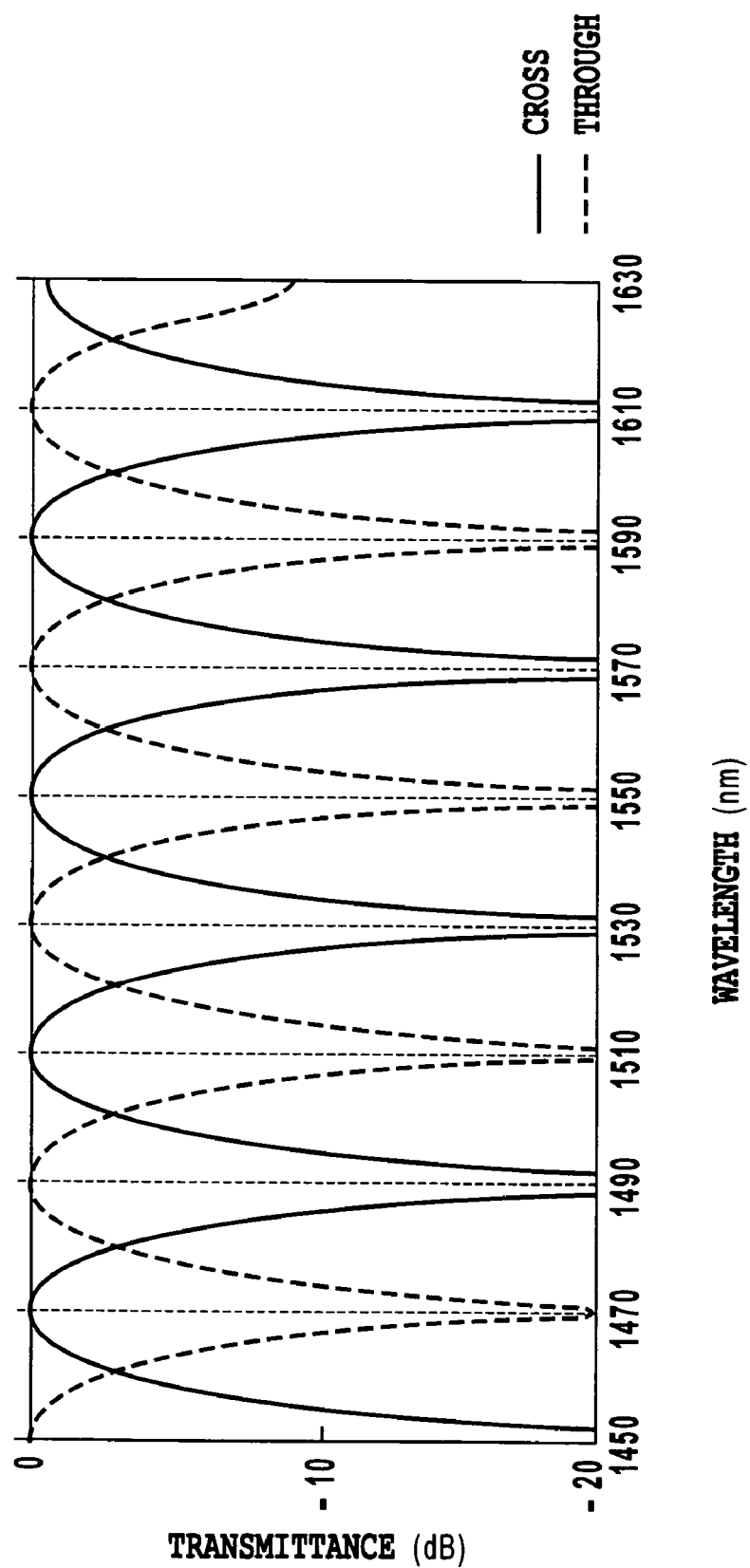
FIG. 13 is a graph illustrating the wavelength dependence of the transmission characteristics of the first embodiment of the uniform wavelength period Mach-Zehnder interferometer in accordance with the present invention.

FIG. 13 illustrates the wavelength dependence of the transmission characteristics in the case where the phase generating optical couplers as illustrated in FIG. 10 are used as the two phase generating optical couplers 111 and 112 that constitute the multi/demultiplexing circuit of FIG. 4. The optical path length difference of the optical delay line section 107 is given by $\Delta L' = \Delta L + \alpha$, and the values are set at $\Delta L = 55.9$ μm and $\alpha = 3.5 \cdot \lambda c$, where $\lambda c$ is the central wavelength, and hence at $\lambda c = 1.47$ μm and $\alpha = 5.145$ μm.

The two phase generating optical couplers are placed in left-right symmetry with respect to the middle line (broken line of FIG. 11) of the optical delay line 107 as illustrated in FIG. 11 so that the phase differences given by the two phase generating optical coupler is added.

The linear section of the deviation between the uniform wavelength period and uniform frequency period is corrected through the optical delay line. In contrast, the nonlinear section of the deviation between the uniform wavelength period and uniform frequency period is corrected by the phase generating optical couplers whose output phase differences have a wavelength dependence. Thus, the center of the passbands are placed on the CWDM grid throughout the wavelength range. Since the wavelength dependence of the transmission characteristics is small, low crosstalk are achieved throughout the wavelength range.

The optical multi/demultiplexing circuit was fabricated by forming silica-based optical waveguides on a silicon substrate using flame hydrolysis deposition, photolithography and reactive ion etching. The relative refractive index difference of the waveguides was 0.75%, the core thickness of the waveguides was 7 μm, and the core width was 7 μm. The fabricated wafer was cut, and optical fibers were connected to the circuit to assemble a module. Since the wavelength dependence of the refractive index of the waveguide materials used in the present embodiment was small in the wavelength band, the refractive index was assumed to be constant.

However, when the wavelength dependence of the refractive index is large, the relationship between the uniform wavelength period and uniform frequency period in FIG. 6 changes. In such a case, however, it is possible to correct the deviation between the uniform wavelength period and uniform frequency period together with the wavelength dependence of the refractive index as in the case where the refractive index is constant, by deriving the required amount of phase as illustrated in FIG. 12A considering the wavelength dependence of the refractive index, and by appropriately determining the phase characteristics of the phase generating optical couplers for example using multiple regression analysis.

Although the foregoing optical multi/demultiplexing circuit is described by way of example with a minimum configuration for implementing the optical device, it is also possible to take a configuration for reducing the polarization dependence or temperature dependence of the optical multi/demultiplexing circuit.

Thus the optical multi/demultiplexing circuit in accordance with the present invention enables the implementation of the optical device with the uniform wavelength period.

Second Embodiment

Figure 14:
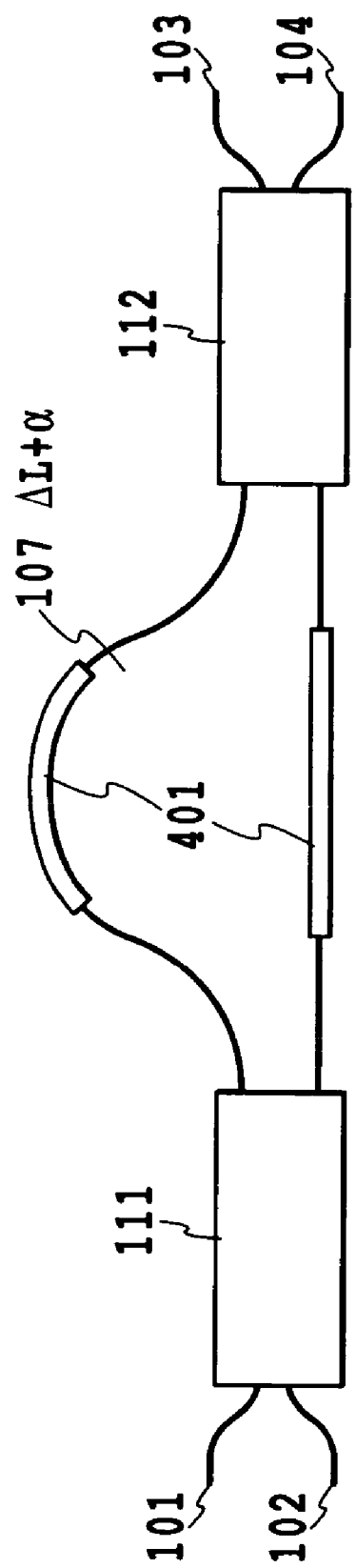
FIG. 14 is a diagram showing a configuration of a second embodiment of the optical multi/demultiplexing circuit in accordance with the present invention.

FIG. 14 shows a second embodiment of the optical multi/demultiplexing circuit in accordance with the present invention. The present embodiment includes two phase generating optical couplers 111 and 112 whose output phase differences have a wavelength dependence in the passband; an optical delay line section 107 between the two phase generating optical couplers 111 and 112; and two input/output optical waveguides 101 and 102, and 103 and 104 connected to the phase generating optical couplers 111 and 112, respectively.

Figure 15:
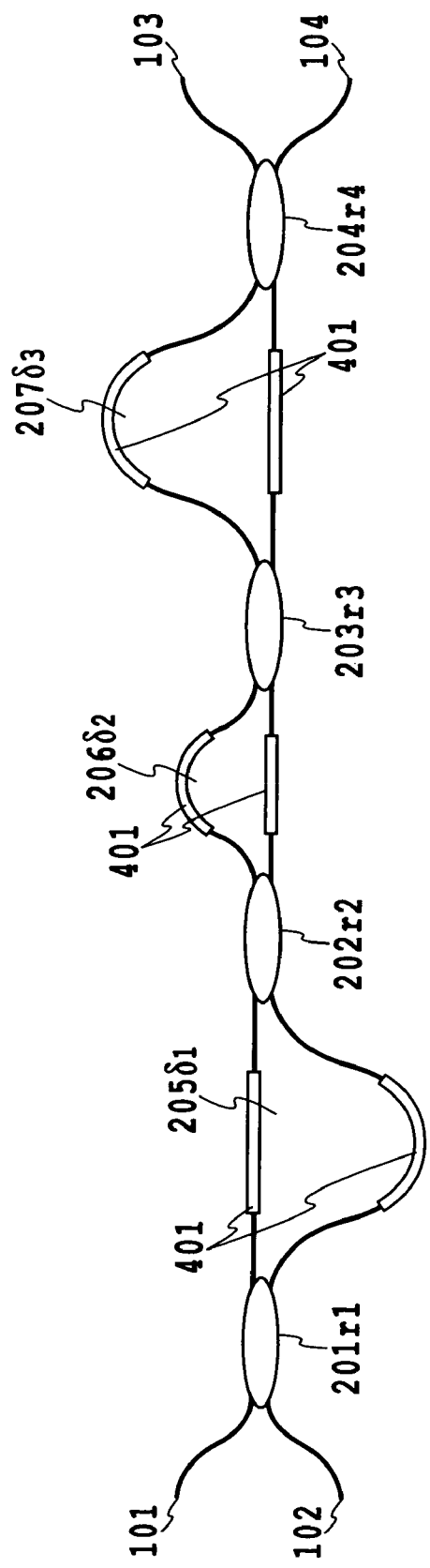
FIG. 15 is a diagram showing a configuration of a phase generating optical coupler with a path length difference adjusting device formed on the optical delay lines.

The two phase generating optical couplers 111 and 112 are each configured as shown in FIG. 15. They include four optical couplers 201–204, and three optical delay line sections 205–207 between the adjacent optical couplers 201–204.

The multi/demultiplexing circuit has the transmission characteristics with approximately uniform period on the wavelength axis. In addition, to achieve such a transmission characteristics, the deviation between the uniform wavelength period and uniform frequency period is corrected by the optical delay line and the phase generating optical couplers whose phase differences between the outputs vary within the passband of the multi/demultiplexing circuit.

The characteristics of an optical interferometer generally depends on the path lengths of the optical delay line section. Thus, if the path lengths deviate from the designed values because of fabrication errors, the desired characteristics cannot be achieved. In view of this, the present embodiment of the optical multi/demultiplexing circuit includes a path length difference adjusting device formed on the optical delay line to improve the accuracy of the path lengths of the optical delay line section.

As shown in FIG. 14, the Mach-Zehnder interferometer with the uniform wavelength period includes a path length difference adjusting device 401 in the optical delay line section 107 so that it can vary the optical path length difference $\Delta L' = \Delta L + \alpha$ by the path length adjustment.

In addition, the optical delay line sections 205–207 of the phase generating optical couplers constituting the Mach-Zehnder interferometer as shown in FIG. 15 include path length difference adjusting devices 401 so that they can vary the path length differences $\delta 1$, $\delta 2$ and $\delta 3$ by the path length adjustment.

The least square approximation was used to optimize the phase $\Psi$ needed to compensate for the deviation between the uniform wavelength period and uniform frequency period:

$$\Psi \cong 8.12 \times 10^{-6} \lambda^2 - 0.025 \lambda + 19.2$$

As the optical couplers 201, 202, 203 and 204 constituting the phase generating optical couplers 111 and 112 that provide such phase characteristics, directional couplers whose power coupling ratios are r1=82%, r2=82%, r3=82% and r4=82% are used, and the path length differences of the optical delay lines 205, 206 and 207 are adjusted to δ1=−1.13λc, δ2=0.24λc and δ3=1.13λc by controlling the optical path length using the path length difference adjusting devices.

In addition, the optical path length difference of the optical delay line section 107 of the Mach-Zehnder interferometer is adjusted to ΔL'=ΔL+α (ΔL=55.9 μm and α=3.5·λc) by controlling the optical path length with the path length difference adjusting devices.

As a result, the deviation between the uniform wavelength period and uniform frequency period was corrected as illustrated in FIG. 13, thereby being able to match the transmission characteristics approximately to the CWDM grid throughout the wavelength range. In addition, since the wavelength dependence of the transmission characteristics is small, the crosstalk are low throughout the wavelength range.

Since the present embodiment includes the path length difference adjusting devices in the optical delay line, they can be used to vary the optical path lengths freely.

Thus, the path length differences of the optical delay lines that constitute the phase generating couplers can be initially set at 0, and after fabricating the circuit, they can be set at certain values using the path length difference adjusting devices.

Figure 16:
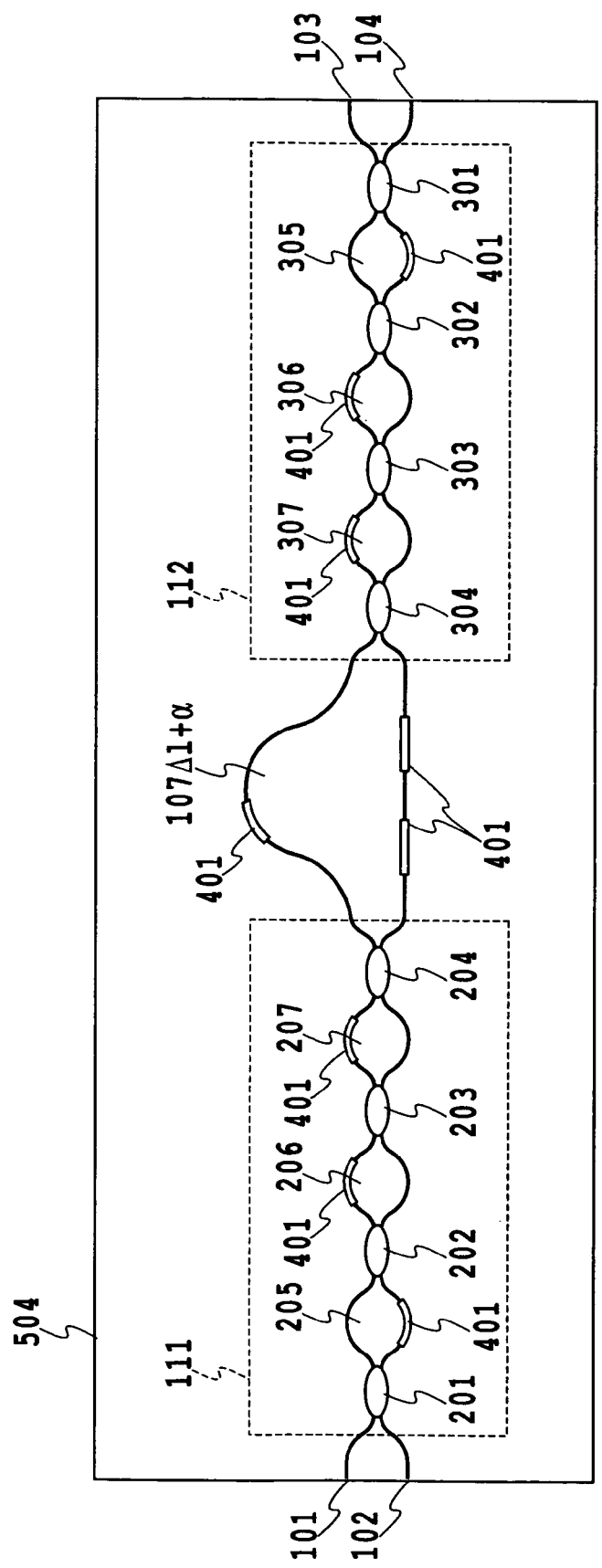
FIG. 16 is a diagram showing another configuration of the second embodiment of the optical multi/demultiplexing circuit in accordance with the present invention.
Figure 17:
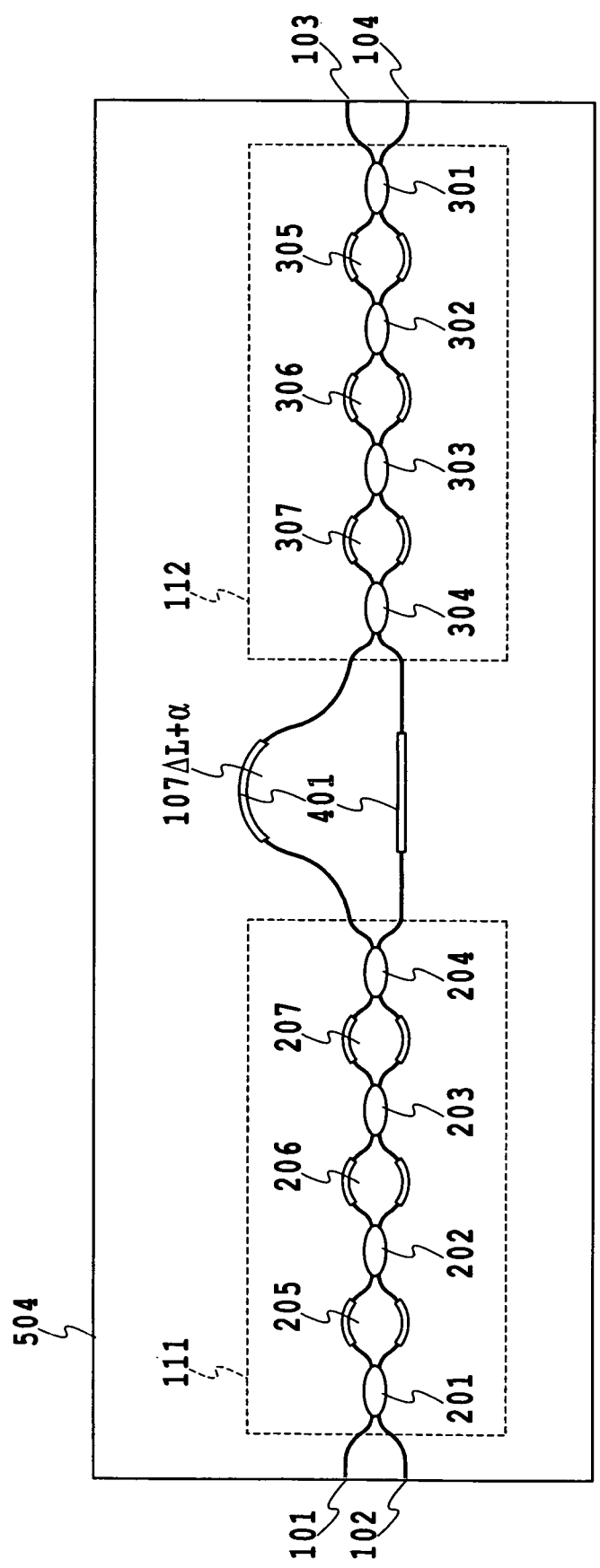
FIG. 17 is a diagram showing still another configuration of the second embodiment of the optical multi/demultiplexing circuit in accordance with the present invention.

The path length adjustment can be carried out for one of the pair of waveguides in the optical delay line as illustrated in FIG. 16, or for both of them as illustrated in FIG. 17.

In addition, as for the path length difference adjusting devices, they can be provided to a plurality of places of the same waveguide as illustrated in the optical delay line 107 of FIG. 16. Furthermore, the geometry and positions of the path length difference adjusting devices can be set freely.

It is obvious that the path lengths can be set at certain values by providing the path length differences in advance as shown in FIG. 15, and then by adjusting the path length using the path length difference adjusting devices.

Figure 18:
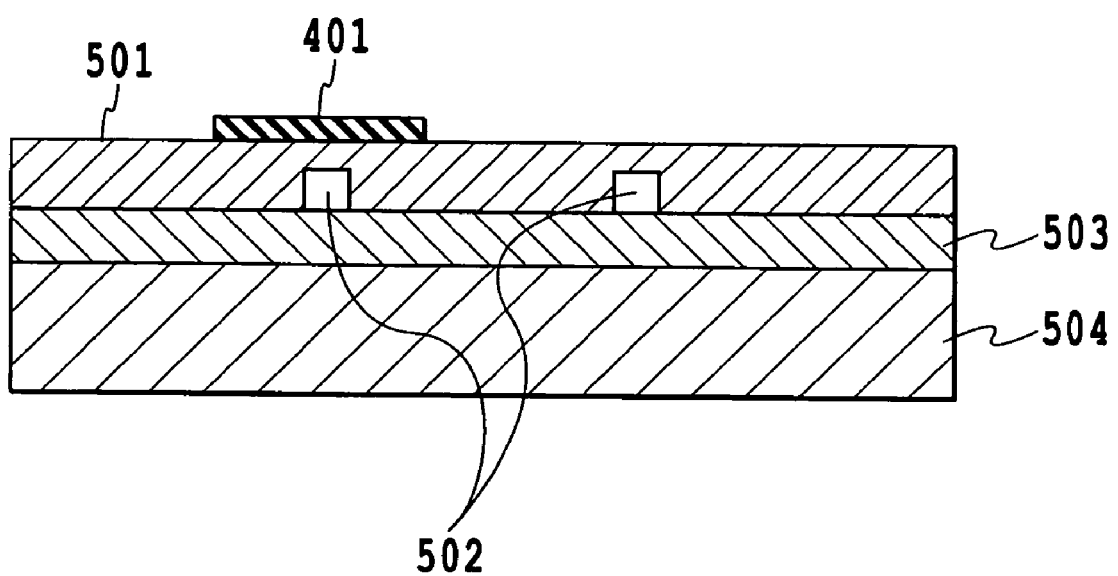
FIG. 18 is a cross-sectional view showing an optical multi/demultiplexing circuit including a path length difference adjusting device.

As shown in FIG. 18, the optical multi/demultiplexing circuit was fabricated by forming silica-based optical waveguides composed of an undercladding 503, cores 502 and an overcladding 501 on a silicon substrate 504 using flame hydrolysis deposition, photolithography and reactive ion etching. In addition, after forming the optical waveguides, thin film heaters were formed are the optical waveguides to use them as path length difference adjusting devices 401.

The optical multi/demultiplexing circuit was fabricated in such a manner that the relative refractive index difference of the waveguides was 0.75%, the core thickness of the waveguides was 7 μm, and the core width was 7 μm. The fabricated wafer was cut, and optical fibers were connected to the circuit to assemble a module. The optical path length differences of the optical delay lines were adjusted by changing the refractive index of the waveguides by the local heat treatment method involving thin film heaters.

Although the path length difference adjusting devices 401 are described by way of example using the thermooptic effect by the thin film heaters, other methods can be used. For example, it is also possible to use light irradiation with a laser, electro-optic effect, magnetooptic effect or any other means that can carry out the path length adjustment.

Since the wavelength dependence of the refractive index of the waveguide materials used in the present embodiment was small in the wavelength band, the refractive index was assumed to be constant. However, when the wavelength dependence of the refractive index is large, the relationship between the uniform wavelength period and uniform frequency period in FIG. 6 changes. In such a case, however, it is possible to correct the deviation between the uniform wavelength period and uniform frequency period together with the wavelength dependence of the refractive index as in the case where the refractive index is constant, by deriving the required amount of phase considering the wavelength dependence of the refractive index, and by appropriately determining the phase characteristics of the phase generating optical coupler for example using least square approximation.

Although the foregoing optical multi/demultiplexing circuit is described by way of example with a minimum configuration for implementing the optical device, it is also possible to take a configuration for reducing the polarization dependence or temperature dependence of the optical multi/demultiplexing circuit.

As described above, the present embodiment employs the path length difference adjusting devices such as thin film heaters, and uses them to adjust the optical path length difference of the optical delay line by varying the refractive index of the waveguides, thereby reducing the effect of the fabrication errors. Thus, the optical path length differences of the optical delay lines that constitute the multi/demultiplexing circuit can be set exactly at the designed values by operating the path length difference adjusting devices. As a result, the present embodiment can implement the optical multi/demultiplexing circuit with the uniform wavelength period.

Third Embodiment

Figure 19:
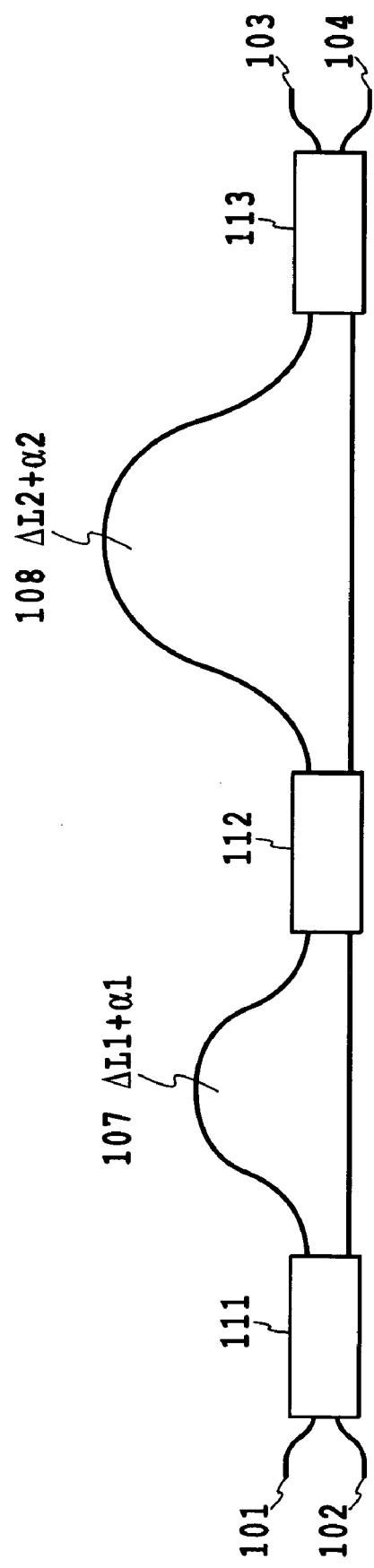
FIG. 19 is a diagram showing a configuration of a third embodiment of the optical multi/demultiplexing circuit in accordance with the present invention.

FIG. 19 shows a third embodiment of the multi/demultiplexing circuit in accordance with the present invention. The circuit includes three phase generating optical couplers 111, 112 and 113; two optical delay line sections 107 and 108 between the three phase generating optical couplers; two input/output optical waveguides 101 and 102 connected to the phase generating optical coupler 111; and two input/output optical waveguides 103 and 104 connected to the phase generating optical coupler 113.

The path length difference of the optical delay line section 107 is set at ΔL1'=ΔL1+α1, and that of the optical delay line section 108 is set at ΔL2'=ΔL2+α2, where α1 and α2 are path lengths of the wavelength order as described in the first embodiment.

In addition, at least one of the three optical multi/demultiplexing devices consists of a phase generating optical coupler, and the phase difference between the outputs varies corresponding to wavelength in the passband of the interferometer, thereby equipped with a the phase generating function.

Although the first and second embodiments are an optical multi/demultiplexer with the phase generating function based on the conventional Mach-Zehnder interferometer, the present embodiment is based on a conventional lattice-form filter, in which the path length differences of the optical delay lines 107 and 108 are ΔL1=ΔL and ΔL2=2·ΔL+π, and the power coupling ratios of the phase generating optical couplers 111, 112 and 113 are approximately 50%, 70% and 10% (see, M. Oguma et al., "Flat-passband interleave filter with 200 GHz channel spacing based on planar lightwave circuit-type lattice structure", Electronics Letters 2000, Vol. 36, pp. 1299–1300, for example).

As for such an optical multi/demultiplexing circuit, the method as described in the first embodiment can implement the optical multi/demultiplexing circuit with the uniform wavelength period from the optical multi/demultiplexing circuit with the uniform frequency period.

Figure 20:
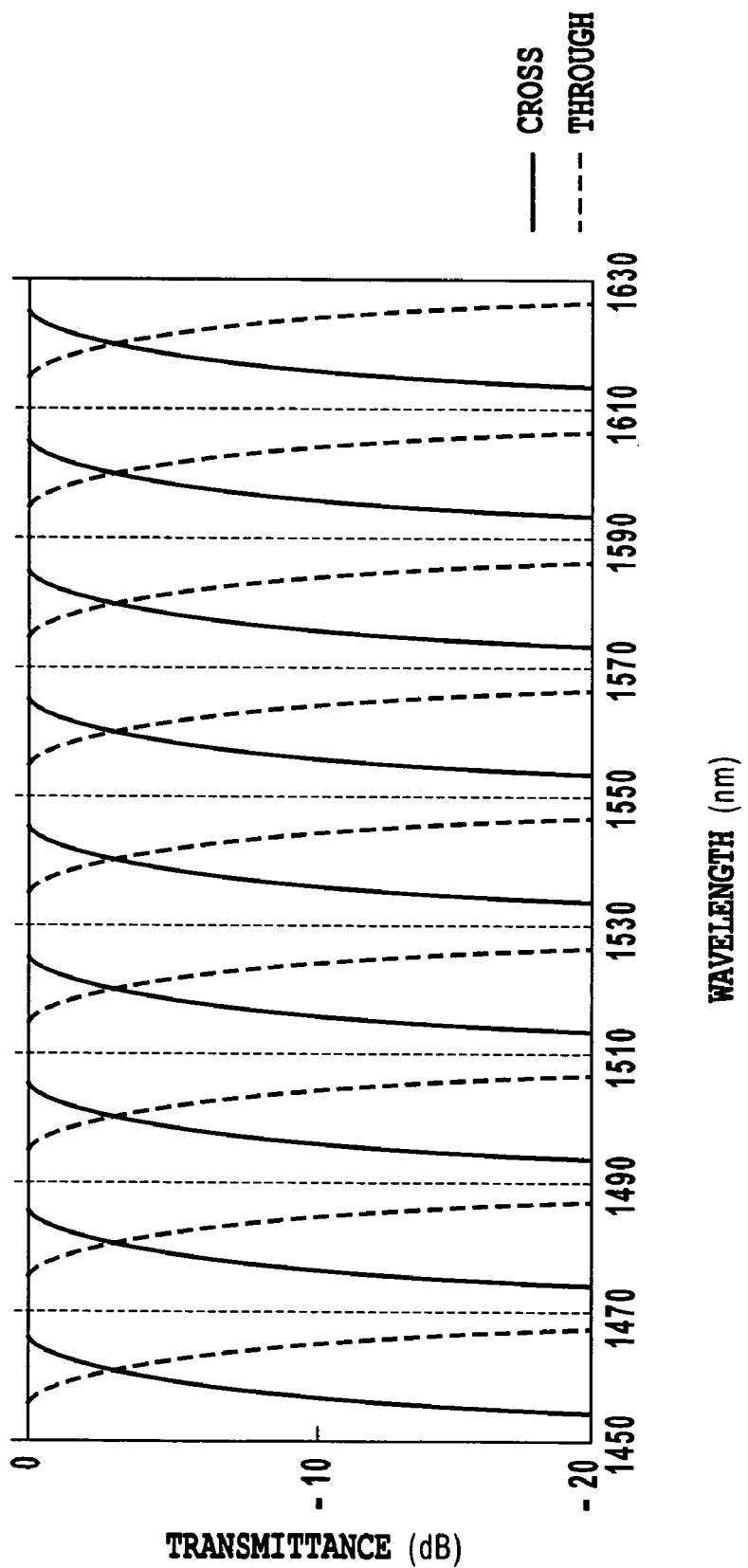
FIG. 20 is a graph illustrating the wavelength dependence of the transmission characteristics of the third embodiment of the optical multi/demultiplexing circuit in accordance with the present invention.

FIG. 20 illustrates the wavelength dependence of the transmission characteristics of the present embodiment of the optical multi/demultiplexing circuit. The optical multi/demultiplexing circuit corrects the deviation between the uniform wavelength period and uniform frequency period by using the phase generating optical couplers whose output phase differences varies corresponding to wavelength in the passbands of the optical multi/demultiplexing circuit, thereby implementing the optical multi/demultiplexing circuit with uniform period on the wavelength axis.

Figure 21:
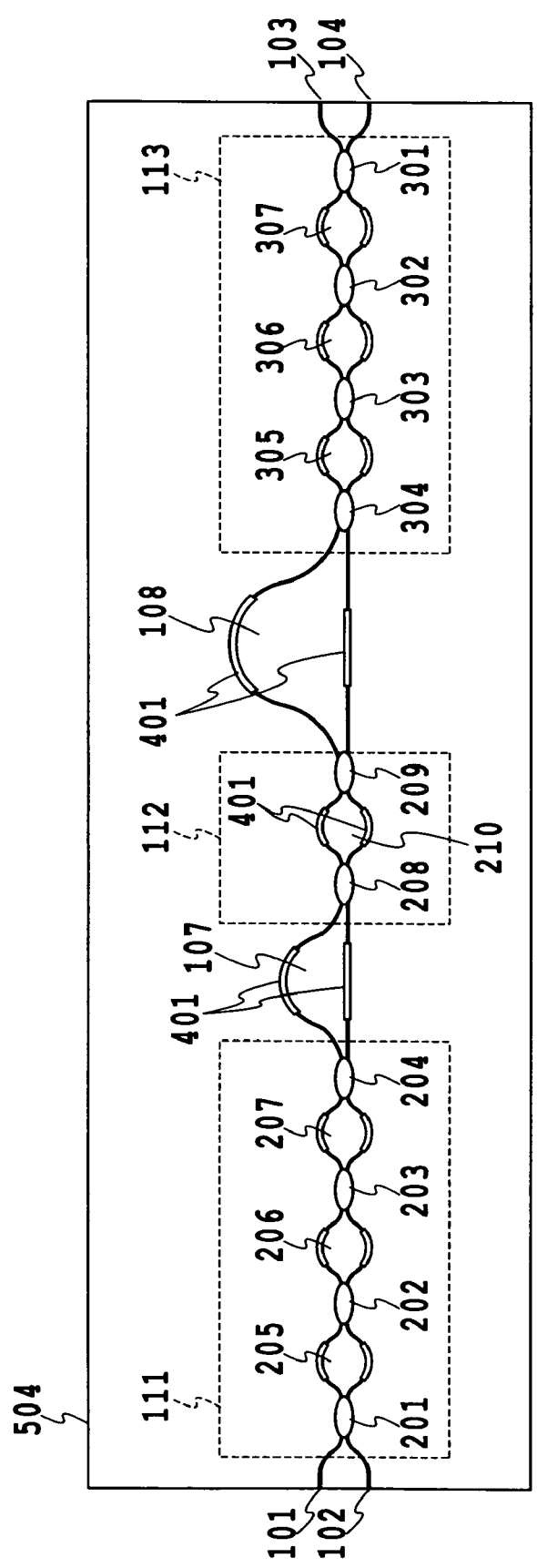
FIG. 21 is a diagram showing another configuration of the third embodiment of the optical multi/demultiplexing circuit in accordance with the present invention.

As one of the phase generating optical couplers constituting the present embodiment of the optical multi/demultiplexing circuit, a phase generating optical coupler can be used which includes M+1 optical couplers, and M optical delay line sections between the adjacent optical couplers, where M is an integer equal to or greater than two. For example, the optical multi/demultiplexing circuit of FIG. 21 employs the phase generating optical couplers as illustrated in FIG. 10 as the phase generating optical couplers 111 and 113, and a Mach-Zehnder-type optical coupler as the phase generating optical coupler 112.

The optical delay lines of the present embodiment of the optical multi/demultiplexing circuit can comprise a path length difference adjusting device. In addition, the optical path length differences of the optical delay lines that constitute the phase generating optical couplers can initially be set at zero, and after fabricating the circuit, they can be set at certain values using the path length difference adjusting devices.

It is obvious that the path lengths can be set at certain values by providing the path length differences in advance as shown in FIG. 15, and then by using the path length difference adjusting devices.

In addition, it is possible to make the phase generating optical coupler 112 function as a Mach-Zehnder-type optical coupler with a variable power coupling ratio by adjusting the path length difference of the optical delay line.

The optical multi/demultiplexing circuit was fabricated by forming silica-based optical waveguides composed of an undercladding 503, cores 502 and an overcladding 501 on a silicon substrate 504 using flame hydrolysis deposition, photolithography and reactive ion etching as described before in connection with FIG. 18. In addition, after forming the optical waveguides, thin film heaters were formed over the optical waveguides to use them as path length difference adjusting devices 401. The relative refractive index difference of the waveguides was 0.75%, the core thickness of the waveguides was 7 μm, and the core width was 7 μm. The fabricated wafer was cut, and optical fibers were connected to the circuit to assemble a module. The optical path length differences of the optical delay lines were adjusted by changing the refractive index of the waveguides by the local heat treatment method involving thin film heaters.

Although the path length difference adjusting devices 401 are described by way of example using the thermooptic effect by the thin film heaters, other methods can be used. For example, it is also possible to use light irradiation with a laser, electro-optic effect, magnetooptic effect or any other means that can carry out the path length adjustment.

Since the wavelength dependence of the refractive index of the waveguide materials used in the present embodiment was small in the wavelength band, the refractive index was assumed to be constant. However, when the wavelength dependence of the refractive index is large, the relationship between the uniform wavelength period and uniform frequency period in FIG. 6 changes. In such a case, however, it is possible to correct the deviation between the uniform wavelength period and uniform frequency period together with the wavelength dependence of the refractive index as in the case where the refractive index is constant by deriving the required amount of phase considering the wavelength dependence of the refractive index, and by appropriately determining the phase characteristics of the phase generating optical couplers for example using nonlinear polynomial approximation.

Although the foregoing optical multi/demultiplexing circuit is described by way of example with a minimum configuration for implementing the optical device, it is also possible to take a configuration for reducing the polarization dependence or temperature dependence of the optical multi/demultiplexing circuit.

The present embodiment applies the present invention to a lattice-form filter to demonstrate that the present invention is applicable to any conventional interferometers other than the Mach-Zehnder interferometer. The present invention is also applicable to devices other than the lattice-form filter such as a cascaded Mach-Zehnder interferometer, transversal-form filter, and other interferometers. In addition, it is applicable not only to interferometers with one-input/two-outputs, but also to interferometers with a desired number of inputs/outputs.

Thus, the present embodiment can implement the optical multi/demultiplexing circuit with the uniform wavelength period by using the multi/demultiplexing circuit of the present embodiment.

Fourth Embodiment

Figure 22:
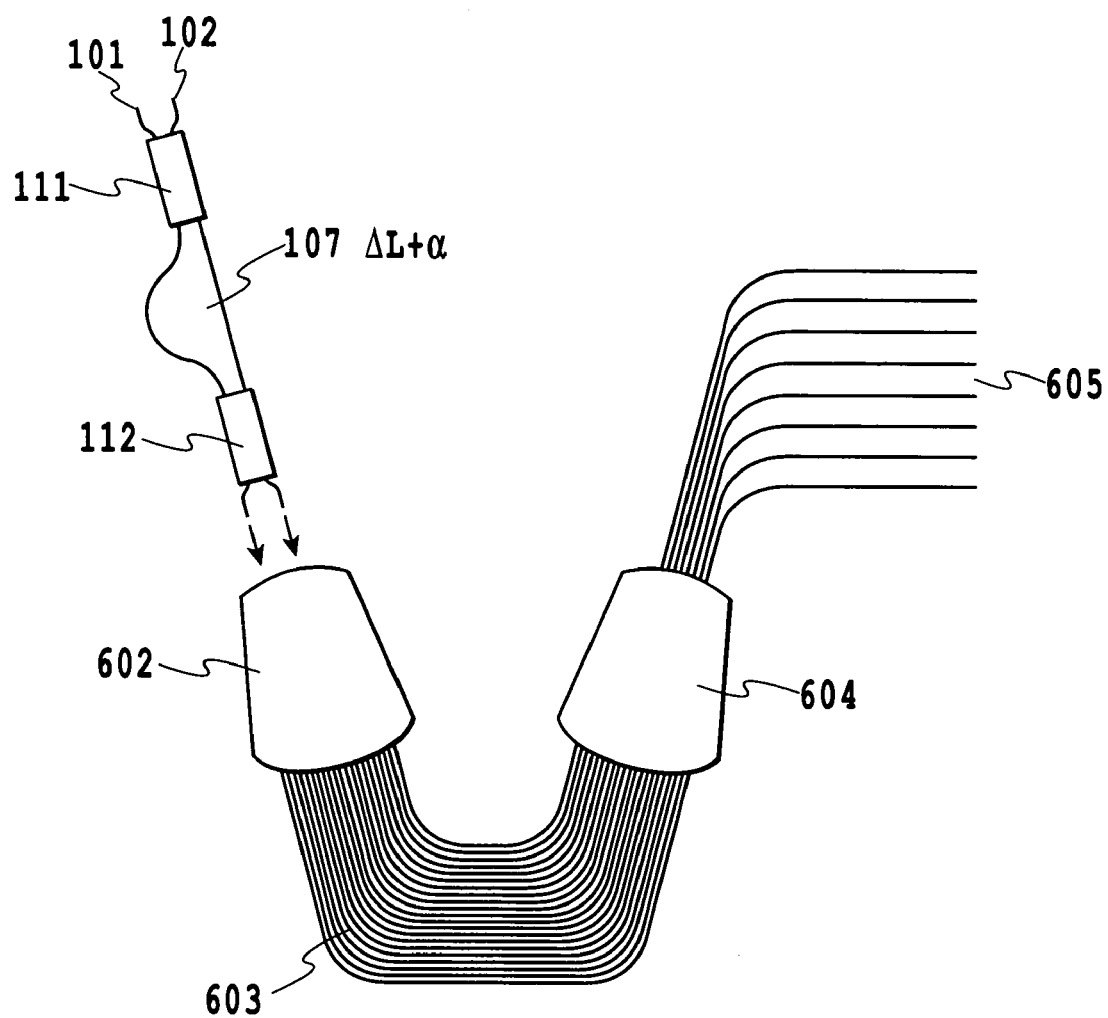
FIG. 22 is a diagram showing a configuration of a fourth embodiment of the optical multi/demultiplexing circuit in accordance with the present invention.

FIG. 22 shows a fourth embodiment of the optical multi/demultiplexing circuit in accordance with the present invention. The circuit comprises an interferometer and an arrayed waveguide grating. The interferometer includes two phase generating optical couplers 111 and 112, an optical delay line section 107 between the two phase generating optical couplers, and input waveguides 101 and 102 connected to the phase generating optical coupler 111. The arrayed waveguide grating includes array waveguides 603, a first slab waveguide 602 and a second slab waveguide 604 disposed on both sides of the array waveguides, and eight output waveguides 605 connected to the second slab waveguide. The two outputs of the phase generating optical coupler 112 of the interferometer are launched into the first slab waveguide 602 of the arrayed waveguide grating.

As for the connection of the two output waveguides of the interferometer to the first slab waveguide 602, the geometry of the contacts can take any form. For example, optical waveguides whose geometry varies such as tapered waveguides can be connected to the slab waveguide.

At least one of the optical multi/demultiplexing devices consists of a phase generating device that produces an output phase difference corresponding to a wavelength in the passbands of the optical multi/demultiplexing circuit, and at the same time functions as an optical coupler, that is, a phase generating optical coupler.

The present embodiment of the optical multi/demultiplexing circuit is based on a configuration in which the two outputs of a conventional Mach-Zehnder interferometer are launched into a first slab waveguide of an arrayed waveguide grating (see, FIG. 6 of Japanese patent application laid-open No. 11-109147/1999). The conventional configuration is not suitable for use in an optical communication system with uniform wavelength period because the interferometer at the pre-stage has the uniform frequency period. However, the present embodiment can implement an optical circuit with uniform wavelength period in its entirety by using the multi/demultiplexing circuit with the uniform wavelength period in the pre-stage, and by matching the output wavelength period of the post-stage arrayed waveguide grating to that of the pre-stage.

Figure 23:
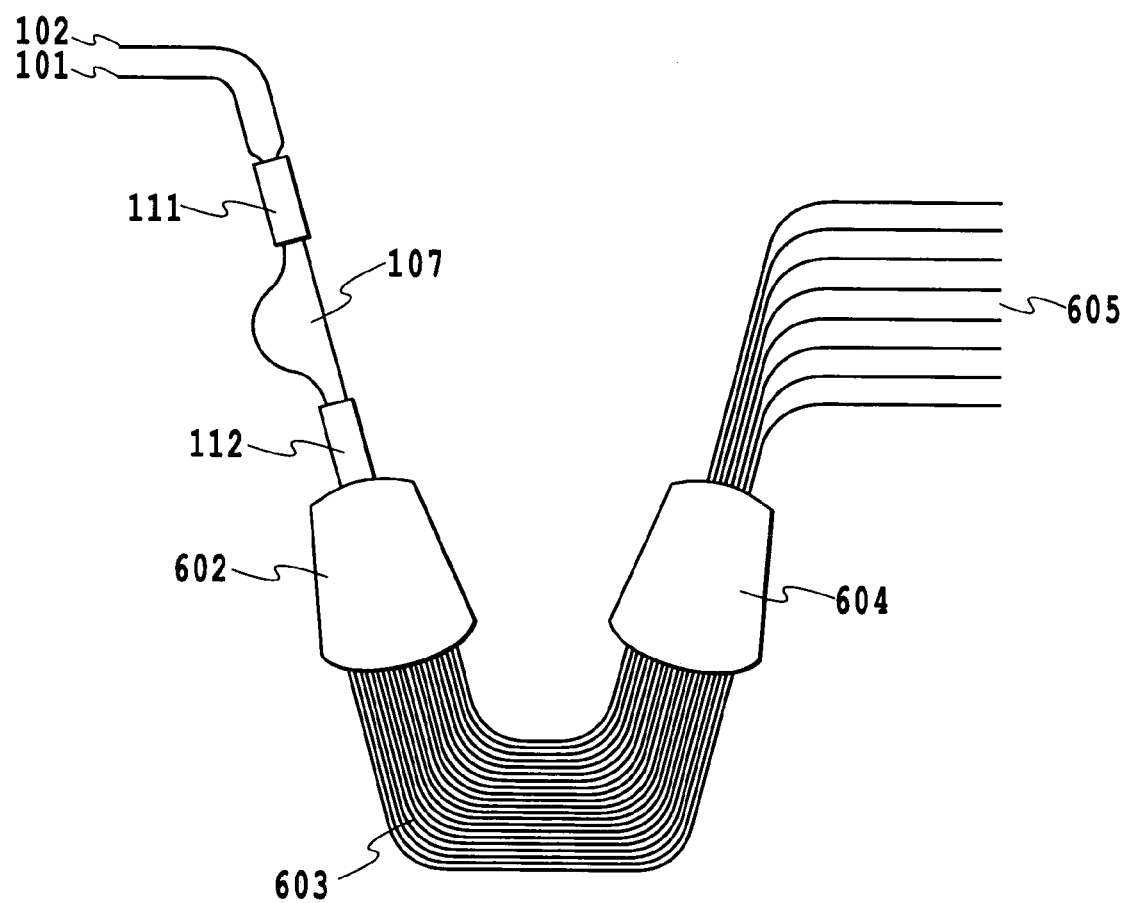
FIG. 23 is a diagram showing another configuration of the fourth embodiment of the optical multi/demultiplexing circuit in accordance with the present invention.

Alternatively, a configuration of FIG. 23 is also possible in which the phase generating optical coupler 112 constituting the Mach-Zehnder interferometer is coupled to the first slab waveguide of the arrayed waveguide grating (see, FIGS. 6 and 7 of U.S. Pat. No. 5,488,680). Here, the term "configuration in which the phase generating optical coupler is coupled to the slab waveguide" refers to a case in which the phase generating optical coupler as shown in FIG. 10 is used as the phase generating optical coupler 112, for example, and the optical coupler 204 is directly attached to the slab waveguide.

In addition, the phase generating optical coupler 111 may be configured such that it includes six optical couplers and five optical delay lines between the adjacent optical couplers, or the phase generating optical coupler 112 may be an ordinary optical coupler. Alternatively, the optical coupler may be a directional coupler, multimode interferometer or tunable coupler.

Figure 24:
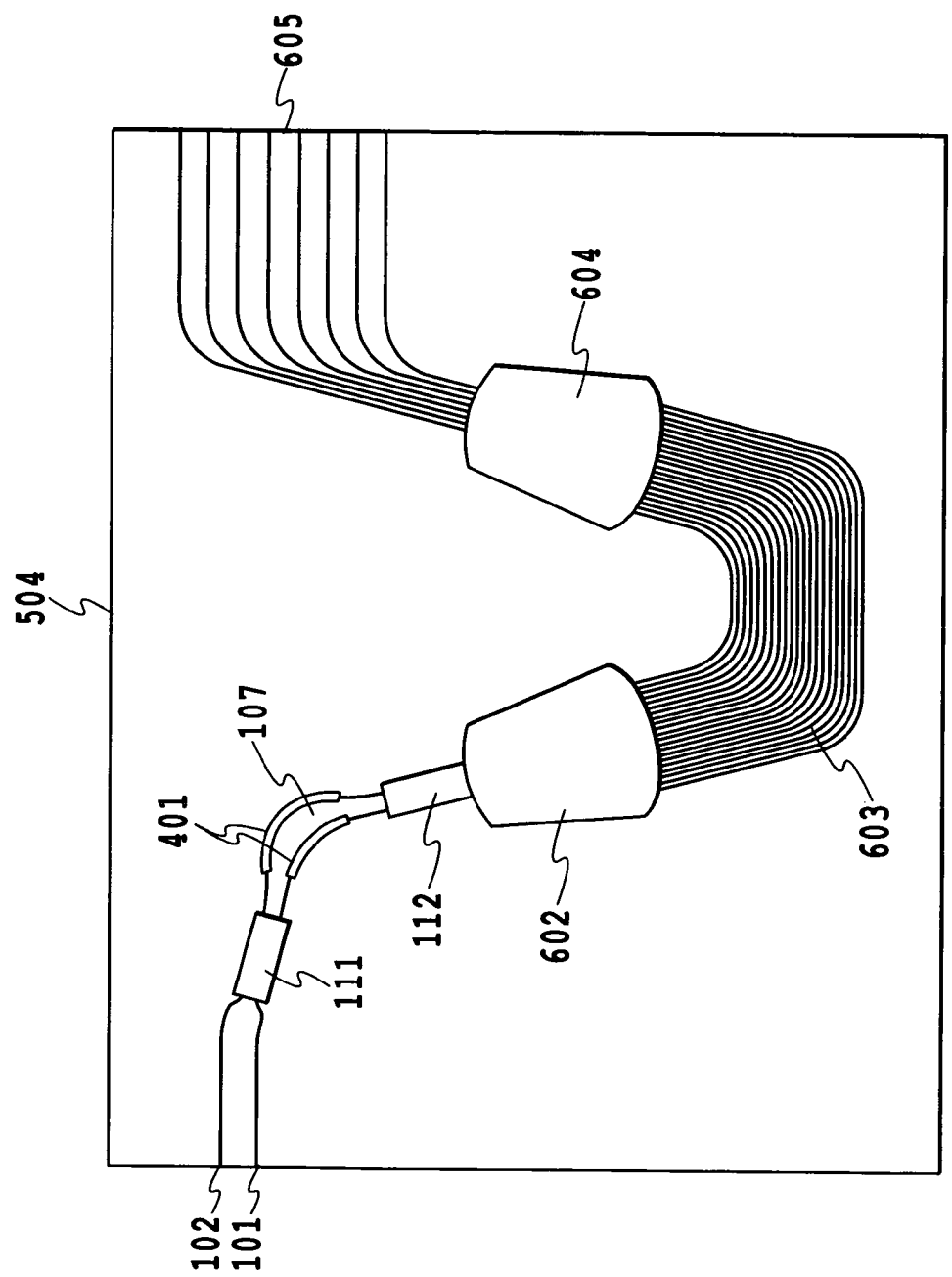
FIG. 24 is a diagram showing still another configuration of the fourth embodiment of the optical multi/demultiplexing circuit in accordance with the present invention.

Furthermore, as shown in FIG. 24, at least one of the waveguides of the optical delay line of the pre-stage Mach-Zehnder interferometer may include a path length difference adjusting device.

Using the path length difference adjusting device makes it possible to match the center of passbands of the pre-stage Mach-Zehnder interferometer to that of the post-stage arrayed waveguide grating (see, C. R. Doerr et al., "Compact and low-loss integrated flat-top passband demux" 27th European Conference on Optical Communication ECOC' O1 Vol. 6, pp. 24–25).

The optical multi/demultiplexing circuit was fabricated by forming silica-based optical waveguides on a silicon substrate using flame hydrolysis deposition, photolithography and reactive ion etching. It was fabricated in such a manner that the relative refractive index difference of the waveguides was 0.75%, the core thickness of the waveguides was 7 μm, and the core width was 7 μm. The fabricated wafer was cut, and optical fibers were connected to the circuit to assemble a module.

Figure 25:
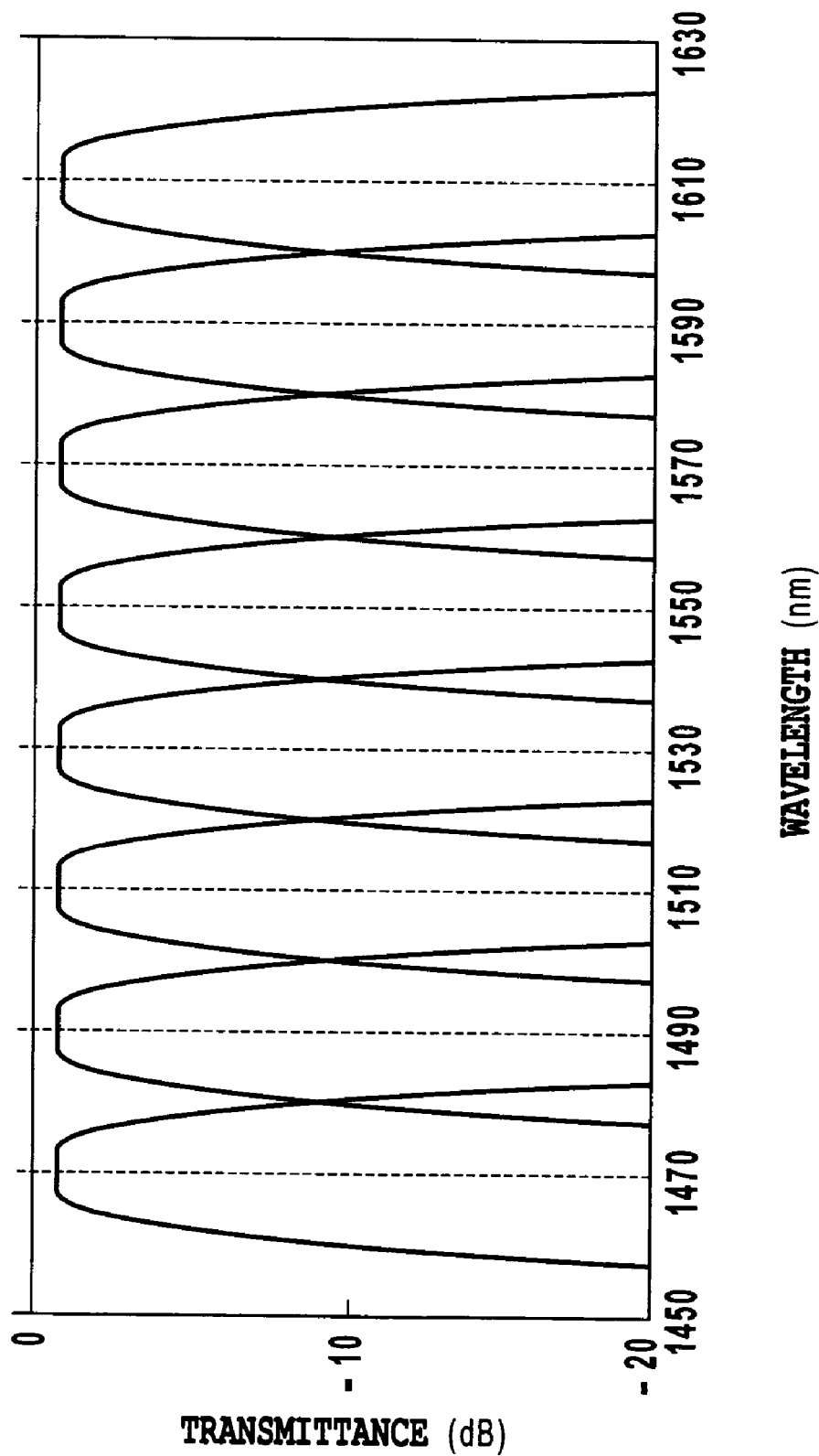
FIG. 25 is a graph illustrating the wavelength dependence of the transmission characteristics of the fourth embodiment of the optical multi/demultiplexing circuit in accordance with the present invention.

FIG. 24 shows an optical multi/demultiplexing circuit including the path length difference adjusting device 401 installed in the optical delay line of the pre-stage Mach-Zehnder interferometer; and FIG. 25 illustrates the transmission characteristics thereof.

The pre-stage interferometer has the uniform wavelength period, and the characteristics with uniform wavelength period can be implemented as a whole circuit by matching the output wavelength period of the post-stage arrayed waveguide grating to that of the pre-stage. In addition, since the circuit with the configuration has a flat passband, it is suitable for use with optical communication systems.

Although the present embodiment employs the Mach-Zehnder interferometer with the uniform wavelength period at the pre-stage, any type of optical multi/demultiplexing circuit with the uniform wavelength period can be used such as a lattice-form filter type as illustrated in the third embodiment, a cascaded Mach-Zehnder type, a transversal-form filter type, and other interferometer.

Alternatively, a configuration is also possible in which its pre-stage consists of an optical multi/demultiplexer equipped with a phase generating device including a plurality of cascaded optical multi/demultiplexing circuits that will be described below (fifth embodiment), and at least two outputs of the optical multi/demultiplxer are launched into the slab waveguide of the arrayed waveguide grating.

Fifth Embodiment

Figure 26:
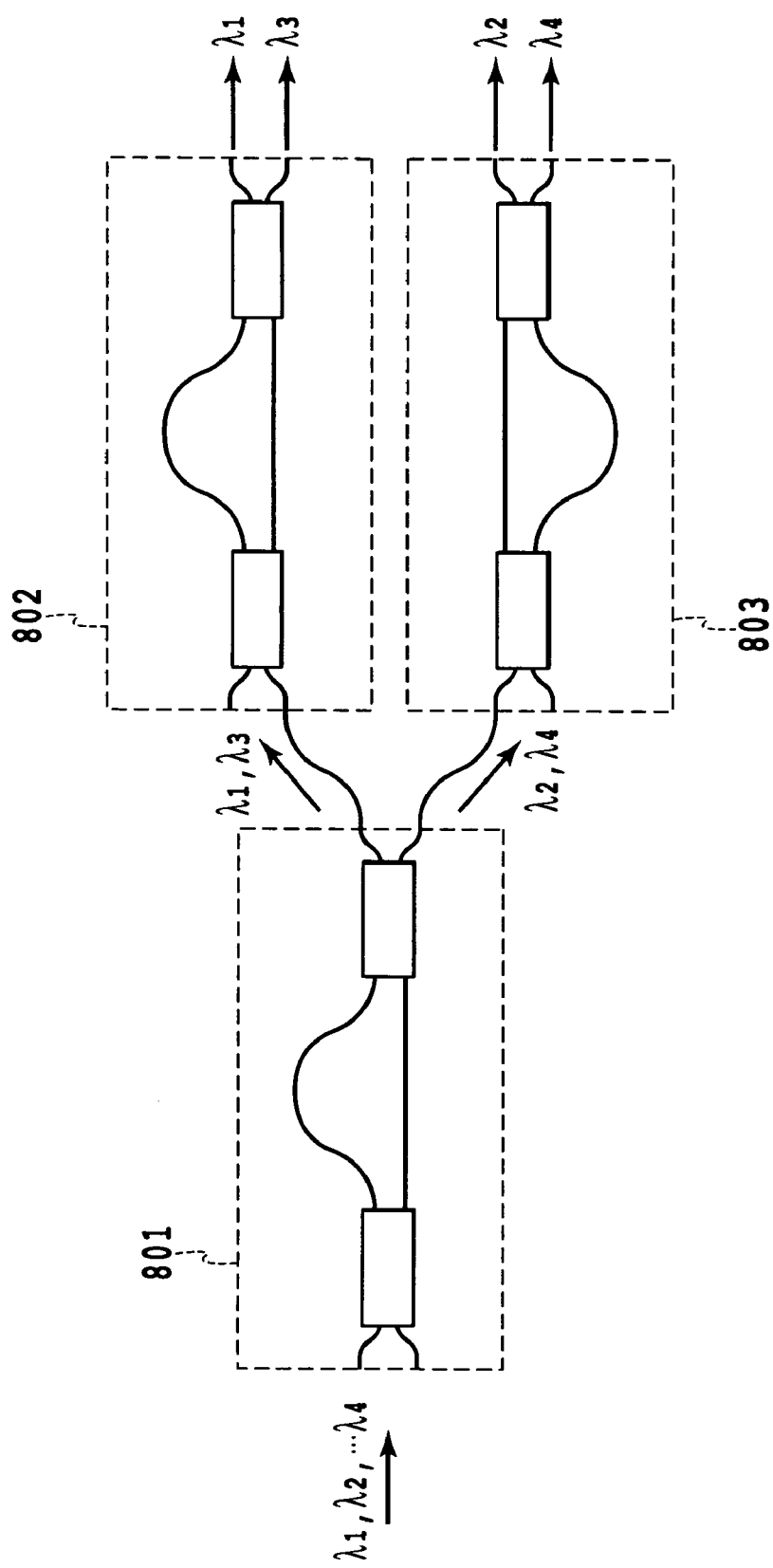
FIG. 26 is a diagram showing a configuration of a fifth embodiment of the optical multi/demultiplexing circuit in accordance with the present invention.

FIG. 26 shows a fifth embodiment of the optical multi/demultiplexing circuit in accordance with the present invention. The circuit comprises a pre-stage optical multi/demultiplexer 801 equipped with phase generating devices; and post-stage optical multi/demultiplexers 802 and 803 also equipped with phase generating devices, which are connected to the two outputs of the optical multi/demultiplexer 801, respectively. The pre-stage optical multi/demultiplexing circuit consists of a uniform wavelength period Mach-Zehnder interferometer with the wavelength period of 20 nm, and the post-stage optical multi/demultiplexing circuits each consist of a uniform wavelength period Mach-Zehnder interferometer with the wavelength period of 40 nm. In addition, their path length differences are adjusted such that the pre-stage and post-stage interferometers split the input light to four output light waves.

Thus, the one-input/four-output optical multi/demultiplexing circuit equipped with phase generating devices is implemented by the configuration including a plurality of cascaded optical multi/demultiplexing circuit equipped with phase generating devices. It is obvious that the present embodiment of the optical multi/demultiplexing circuit equipped with phase generating devices can comprise path length difference adjusting devices in the optical delay line section as described in the second embodiment. The path length difference adjusting section can be used to adjust the optical path length, or to provide the phase variation of π to the optical delay line of the optical multi/demultiplexer 802 equipped with phase generating devices to interchange the ports that output the light waves of λ1 and λ3.

The scheme as illustrated in FIG. 26 that connects the output waveguides of the pre-stage interferometer to the input waveguides of the post-stage interferometers is only an example, and any other configuration can be used. If the connection of the output and the input waveguides of the pre-stage and the post-stage interferometers are changed, the output ports of the specified wavelengths might be changed.

Furthermore, although the present embodiment of the optical multi/demultiplexing circuit cascades a plurality of uniform wavelength period Mach-Zehnder interferometers, other configurations can be taken. For example, it is possible to use as the pre-stage the uniform wavelength period Mach-Zehnder interferometer (wavelength period 20 nm) as described in the first embodiment, and as the post-stage the uniform wavelength period lattice-form filters (wavelength period 40 nm) as described in the third embodiment.

Thus cascading a plurality of uniform wavelength period multi/demultiplexer circuits can implement a one-input/N-output optical multi/demultiplexing circuit equipped with phase generating devices.

Figure 27:
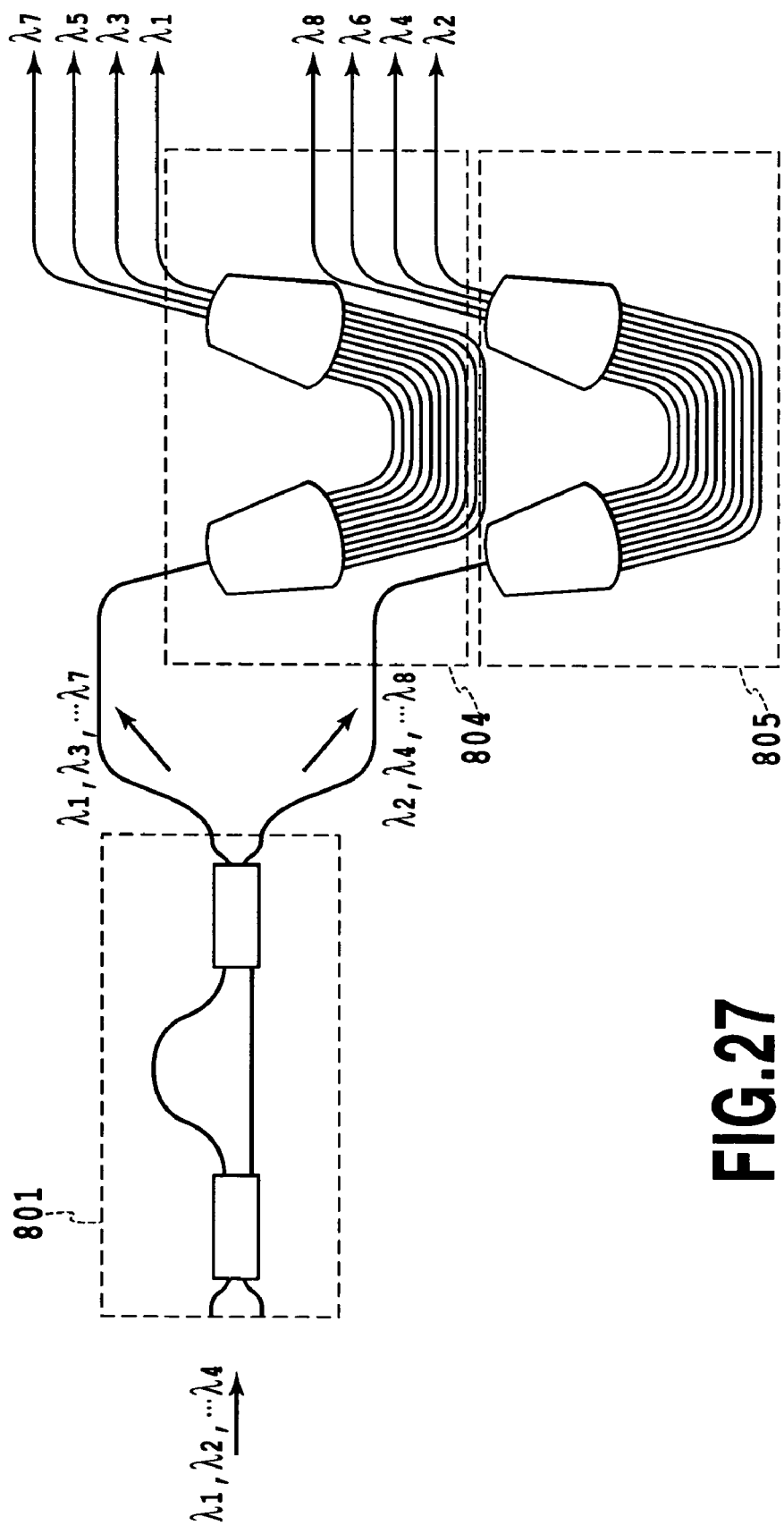
FIG. 27 is a diagram showing another configuration of the fifth embodiment of the optical multi/demultiplexing circuit in accordance with the present invention.

Alternatively, as shown in FIG. 27, the two outputs of the optical multi/demultiplexer 801 equipped with a phase generating device can be connected to arrayed waveguide gratings 804 and 805. Thus, the pre-stage optical multi/demultiplexer 801 equipped with a phase generating device multi/demultiplexes the wavelength into odd- and even-numbered channels, and the post-stage arrayed waveguide gratings 804 and 805 multi/demultiplexers them into individual wavelengths. Consequently, a one-input/N-output optical multi/demultiplexing circuit equipped with a phase generating device can be implemented.

It is obvious that the path length adjustment can be carried out for any of the optical delay line sections.

Sixth Embodiment

Figure 28:
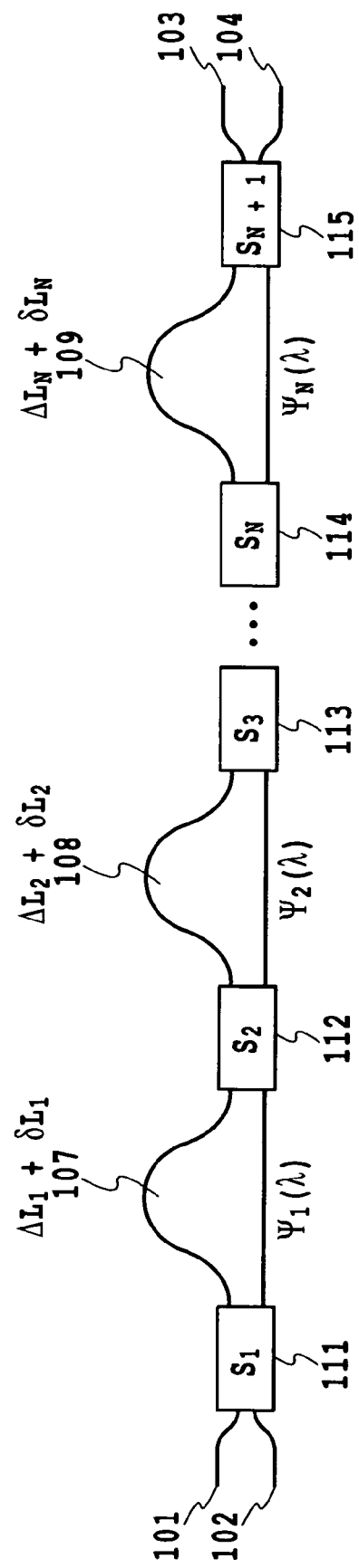
FIG. 28 is a diagram showing the configuration of an optical multi/demultiplexing circuit in a sixth embodiment of the present invention.

FIG. 28 shows an optical multi/demultiplexing circuit which represents a sixth embodiment of the present invention. This circuit is an N-stage lattice-form filter constituted by N+1 (N: an integer equal to or larger than 1) phase generating optical couplers 111 to 115, N optical delay lines 107 to 109 each interposed between one of adjacent pairs of the phase-generating optical couplers, two input waveguides 101 and 102 connected to the first phase generating optical coupler 111, and two output waveguides 103 and 104 connected to the (N+1)-th phase generating optical coupler 115.

Each of the N optical delay lines 107, 108, and 109 is formed by two optical delay elements. The path length differences of the optical delay lines 107, 108, and 109 are set at $\Delta L_1 + \delta L_1$, $\Delta L_2 + \delta L_2$, ..., $\Delta L_N + \delta L_N$. As each of the phase generating optical couplers 111 to 115, a phase generating optical coupler in which its output phase difference has a wavelength dependence with respect to a passband is used. These phase generating optical couplers are used as a phase generating device to apply phases $\Psi_1(\lambda)$, $\Psi_2(\lambda)$, ..., $\Psi_N(\lambda)$ each having a wavelength dependence to the optical delay lines 107, 108, and 109. It is possible to freely set the optical characteristics of the optical multi/demultiplexing circuit shown in FIG. 28 by suitably setting these phases $\Psi_1(\lambda)$, $\Psi_2(\lambda)$, ..., $\Psi_N(\lambda)$.

A designing method with which the transmittance spectra of a conventional optical multi/demultiplexing circuit with a uniform frequency period can be transformed into an optical multi/demultiplexing circuit with a uniform wavelength period, will be described as a method used in this embodiment. Needless to say, an interferometer which is uniformly periodic with respect to frequency in theory can be changed into an interferometer uniformly periodic with respect to wavelength by using the method described in the first embodiment and so on. However, a different design method is used in this embodiment.

In general, the transmission characteristics of an optical multi/demultiplexing circuit, e.g., an N-order (N: an integer equal to or larger than 1) optical multi/demultiplexing circuit (optical delay line circuit), which consists of optical delay lines and optical couplers can be expressed as the Fourier transform of the impulse response of the optical multi/demultiplexing circuit, as shown by the following equation:

$$X(\omega) = \sum_{q=0}^{N} x_q \exp\left(\frac{-jq\Delta L\omega}{c}\right) \quad (8)$$

where $\omega$ is the relative optical angular frequency, $\Delta L$ is the optical path length difference of the optical delay line, which includes a wavelength dependence of the refractive index, and c is the speed of light. From the equation (8), it can be understood that the conventional optical multi/demultiplexing circuit is uniformly periodic against a relative optical angular frequency. If a wavelength dependent phase $\Psi(\lambda)$ can be applied to the optical delay line, equation (8) can be transformed into an equation representing the transmission characteristics of the optical multi/demultiplexing circuit of the present invention:

$$X(\lambda) = \sum_{q=0}^{N} x_q \exp\left\{-j2\pi q\left[\frac{\Delta L'}{\lambda} - \Psi(\lambda)\right]\right\} \quad (9)$$

where $c = \omega\lambda/2\pi$, $\lambda$ is a wavelength and $\Delta L'$ is the optical path length difference of the optical delay line. From this equation (9), it can be understood that the transmission characteristics of the optical multi/demultiplexing circuit can be freely changed by suitably setting the wavelength dependent phase $\Psi(\lambda)$.

Since in this embodiment a transformation of the transmission spectrum is made by way of example such that the transmission spectrum becomes uniformly periodic with respect to wavelength, a nonlinear phase $\Psi(\lambda)$ shown by the following equation may be generated:

$$\Psi(\lambda) = \frac{(\Delta L + \delta L)}{\lambda} + \frac{\lambda}{\Delta\lambda} - \left(m + \frac{\lambda_c}{\Delta\lambda}\right) \quad (10)$$

where $\delta L (= \Delta L' - \Delta L)$ is a microscopic optical path length difference, $\Delta\lambda$ is a wavelength period, m is an integer, and $\lambda c$ is the center wavelength. By expanding equation (10), the phase can be approximated by a quadratic or higher-degree polynomial function:

$$\Psi(\lambda) \cong \frac{\Delta L + \delta L}{\lambda_c} - m + \left[\frac{-(\Delta L + \delta L)}{\lambda_c^2} + \frac{1}{\Delta\lambda}\right](\lambda - \lambda_c) + \sum_{q \geq 2}(-1)^q \frac{(\Delta L + \delta L)(\lambda - \lambda_c)^q}{\lambda_c^{q+1}} \quad (11)$$

The phase shown by the equation (11) is applied to the optical delay line, thus realizing a uniform-wavelength-period optical multi/demultiplexing circuit having the center wavelength $\lambda c$ and the wavelength period $\Delta\lambda$.

In this embodiment, a phase generating optical coupler is used as a phase generating device. Such a wavelength-dependent optical multi/demultiplexing devices capable of generating a wavelength dependent phase will be referred to as "phase generating optical coupler".

As a phase generating optical coupler, an interferometer-type phase generating optical coupler constituted by an optical coupler and an optical delay line may be used. More specifically, a lattice-form filter type phase generating optical coupler constituted by M+1 (M: an integer equal to or larger than 1) optical couplers and M optical delay lines each interposed between adjacent pairs of the optical couplers is used as each phase generating optical coupler in this embodiment.

The advantage of using a phase generating optical coupler of this construction as the phase generating optical coupler resides in that the lattice-form filter theoretically has no loss, and that it is possible to make an optical coupler of this construction function as a phase generating optical coupler by suitably setting the M+1 power coupling ratios (amplitude coupling ratios) of the optical couplers and the M optical path length differences of the optical delay lines. Also, a directional coupler formed of two optical waveguides placed close to each other can be used as each optical coupler.

The transfer matrix of the n-th two-input two-output lattice-form-filter-type phase generating optical coupler of the present invention is written as:

$$S_n = \begin{pmatrix} H_n(z) & -F_{n*}(z) \\ F_n(z) & H_{n*}(z) \end{pmatrix} = S_{n,M_n+1} S_{n,M_n} \cdots S_{n,2} S_{n,1} \quad (12)$$

where $H_n(z)$ and $F_n(z)$ are the through port and cross port transfer functions, respectively, of the n-th lattice-form-filter-type phase generating optical coupler, $M_n$ is the number of optical delay lines of the n-th lattice-form-filter-type phase generating optical coupler, z is a complex variable replaced for $\exp(j2\pi\delta l/\lambda)$, and $H_{n*}(z)$ is a para-Hermitian conjugate of $H_n(z)$ defined by $$H_{n*}(z) \equiv H_n^*\left(\frac{1}{z^*}\right) \quad (13)$$

with the superscript * indicating the usual complex conjugation. In the equation (12), $S_{n,p}$ (p=1 to $M_n$) is the transfer matrix of the fundamental circuit component formed of the p-th optical coupler and the p-th optical delay line:

$$S_{n,p} = \begin{pmatrix} \cos\theta_{n,p}\exp\left(\frac{-j\pi\delta l_{n,p}}{\lambda}\right) & -j\sin\theta_{n,p}\exp\left(\frac{-j\pi\delta l_{n,p}}{\lambda}\right) \\ -j\sin\theta_{n,p}\exp\left(\frac{j\pi\delta l_{n,p}}{\lambda}\right) & \cos\theta_{n,p}\exp\left(\frac{j\pi\delta l_{n,p}}{\lambda}\right) \end{pmatrix} \quad (14)$$

and $S_{n,p}$ (p=$M_{n+1}$) is the transfer matrix of the ($M_n$+1)-th optical coupler:

$$S_{n,M_n+1} = \begin{pmatrix} \cos\theta_{n,M_n+1} & -j\sin\theta_{n,M_n+1} \\ -j\sin\theta_{n,M_n+1} & \cos\theta_{n,M_n+1} \end{pmatrix} \quad (15)$$

In these equations, $\delta l_{n,p}$ is the optical path length difference of the p-th optical delay line in the n-th lattice-form-filter-type phase generating optical coupler, and $\theta_{n,p}$ is the amplitude coupling ratio of the p-th optical coupler in the n-th lattice-form-filter-type phase generating optical coupler, more specifically the angular expression of the wavelength dependent amplitude coupling ratio.

Figure 29:
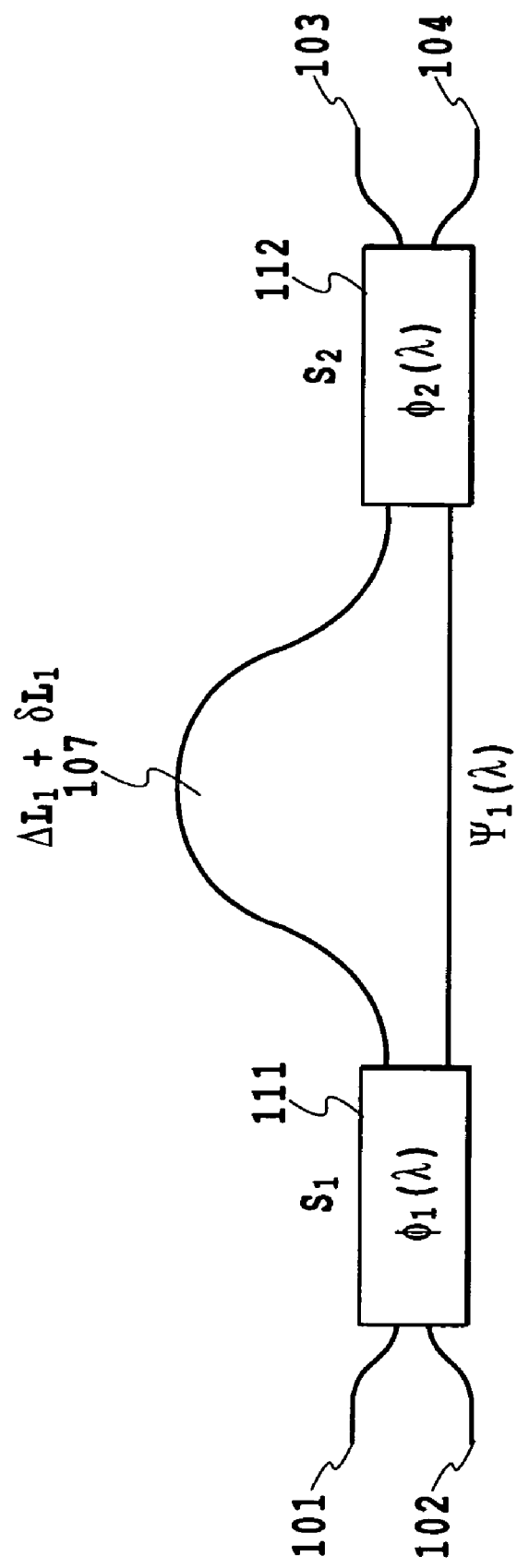
FIG. 29 is a diagram showing the configuration of a Mach-Zehnder interferometer which is an example of the optical multi/demultiplexing circuit in the sixth embodiment of the present invention.

The above-described principle is applied to a Mach-Zehnder interferometer, which is an example of the optical multi/demultiplexing circuit. As shown in FIG. 29, a uniform-wavelength-period Mach-Zehnder interferometer in accordance with the present invention is constituted by N+1=2 phase generating optical couplers 111 and 112, N=1 optical delay line 107 interposed between the adjacent pair of phase generating optical couplers 111 and 112, two input waveguides 101 and 102 connected to the first phase generating optical coupler 111, and two output waveguides 103 and 104 connected to the second phase generating optical coupler 112. The optical delay line 107 is formed of two optical delay elements. The path length difference of the optical delay line 107 is set to $\Delta L_1 + \delta L_1$. The phase generating optical couplers 111 and 112 are $M_1$-stage and $M_2$-stage lattice-form-filter-type phase generating optical couplers respectively having transfer matrices $S_1$ and $S_2$.

The phase applied to the optical delay line 107 of the Mach-Zehnder interferometer with the phase difference created by the phase generating optical couplers is shown by the following equation formed by using equation (12):

$$\Phi[\phi_1(\lambda), \phi_2(\lambda)] = \frac{\{\arg[-F_{1*}(z)] + \arg[F_2(z)] - \arg[H_{1*}(z)] - \arg[H_{2*}(z)]\}}{2\pi} \quad (16)$$

In the Mach-Zehnder interferometer, one of the two optical couplers may be formed as a phase generating optical coupler or both of the two optical couplers may be formed as a phase generating optical coupler. In this embodiment, two phase generating optical couplers identical with each other were used and were placed so as to be line-symmetric about the middle point of the optical delay line 107 of the Mach-Zehnder interferometer, as described above in the description of the first embodiment. In this case, since the relations $H_{1*}(z)=H_{2*}(z)=H_*(z)$ and $-F_{1*}(z)=F_2(z)=-F_*(z)$ are satisfied, equation (16) can be simplified into:

$$\Phi[\phi_1(\lambda), \phi_2(\lambda)] = \frac{\{\arg[-F_*(z)] - \arg[H_*(z)]\}}{\pi} \quad (17)$$

Therefore, the uniform-wavelength-period Mach-Zehnder interferometer of the present invention can be realized by setting the phase generating optical couplers so that the phase generated by the phase generating optical couplers as shown by equation (17) is identical to equation (11), and so that the phase generating optical couplers function as 3-dB optical couplers having an amplitude coupling ratio of 0.5.

Numerical analysis was performed to derive the design parameters for the phase generating optical coupler. If the number of parameters was smaller, the phase generating optical coupler will become easier to fabricate. Accordingly, $\theta_1(\lambda)=\theta_2(\lambda)=\theta_3(\lambda)=\theta_4(\lambda)=\theta(\lambda)$ and $\delta l_1=-\delta l_3$ were set as restrictive conditions for optimization. Needless to say, these restrictive conditions are not necessary for derivation of parameters for the design of the phase generating optical coupler. If the number of stages formed by the lattice-form-filter-type phase generating optical couplers is increased, the degree of approximation to the desired characteristics can be increased. The degree of approximation is also increased by using arbitrary design parameters without imposing restrictive conditions. However, even when the above-described restrictive conditions were imposed, design parameters were obtained with a sufficiently high degree of approximation by optimization. Further, if a variable is introduced into the phase function for approximation, parameters for the design of the phase generating optical coupler can be set with flexibility to facilitate the approximation.

For this reason, a variable $\delta L$ was introduced into the phase function for approximation, as shown in equation (11). However, the variable is not indispensable to the design of the phase generating optical coupler, and a variable other than this may be used. The reason for using $\delta L$ is that the variable can be easily reflected into the optical multi/demultiplexing circuit by simply setting the optical path length difference of the optical delay line of the optical multi/demultiplexing circuit at $\Delta L'(=\Delta L+\delta L)$.

The amplitude coupling ratios of optical couplers constituting the phase generating optical coupler, the optical path length differences of optical delay lines constituting the optical coupler and the variable δL were optimized by nonlinear polynomial approximation so that equation (17) was identical to equation (11) and the amplitude coupling ratio was 0.5. As a result of the optimization, a phase generating optical coupler having the phase difference shown in FIG. 30A and the amplitude coupling ratio shown in FIG. 30B was obtained. The phase difference between the outputs of the phase generating optical coupler, i.e., the generated phase Φ(λ) coincided with the target phase Ψ(λ):

$$\Psi(\lambda) \cong 0.55 - 0.84(\lambda - \lambda_c) + 17(\lambda - \lambda_c)^2 - 11(\lambda - \lambda_c)^3 \quad (18)$$

It can be understood that the phase generating optical coupler functions as a 3-dB optical coupler having an amplitude coupling ratio of approximately 0.5.

Figure 31:
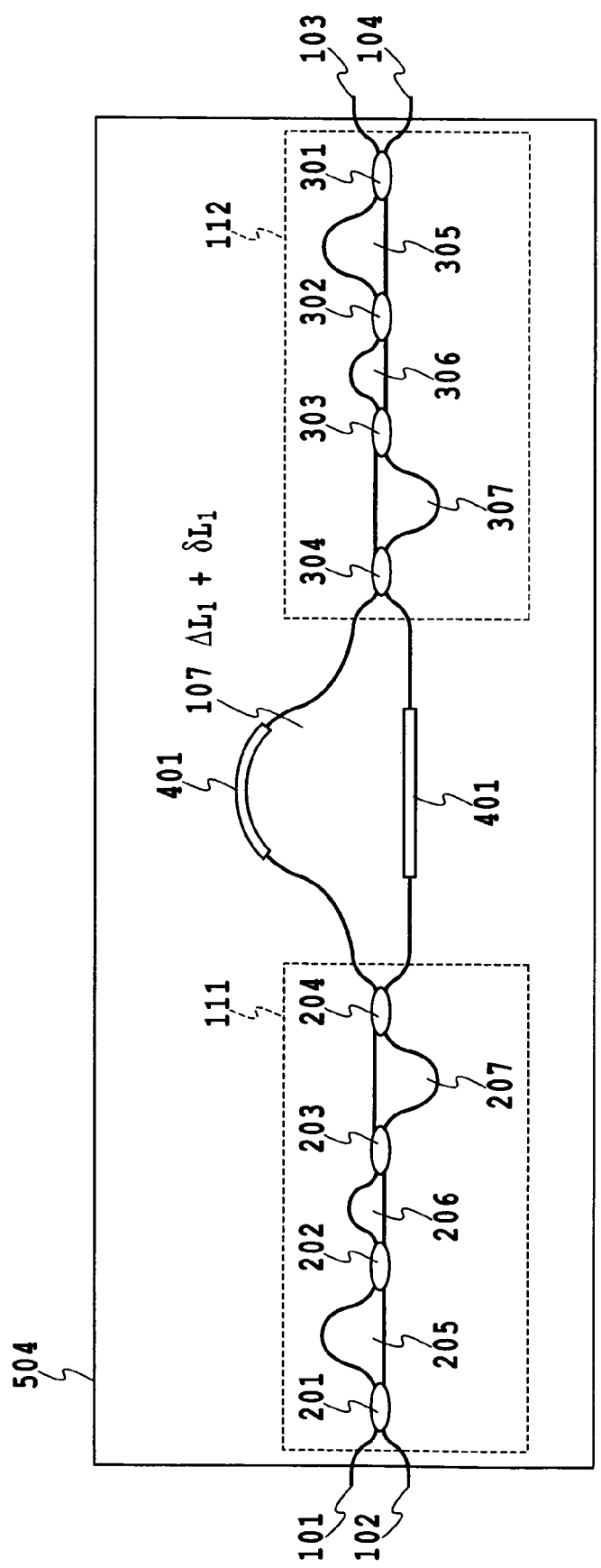
FIG. 31 is a diagram schematically showing the uniform-wavelength-period Mach-Zehnder interferometer in the sixth embodiment of the present invention.

FIG. 31 is a diagram schematically showing a fabricated uniform-wavelength-period Mach-Zehnder interferometer in accordance with the present invention. The amplitude coupling ratio of the optical couplers 201 to 204, and 301 to 304 constituting the phase generating optical couplers 111 and 112 was set at $\theta(\lambda_c)=0.33$; the optical path length difference of each optical delay lines 205 and 305 of the phase generating optical couplers 111 and 112 was set at $\delta l_1 = 1.8\lambda_c$; the optical path length difference of each of optical delay lines 206 and 306 of the phase generating optical couplers 111 and 112 was set at $\delta l_2 = 0.2\lambda_c$; and the optical path length difference of each of optical delay lines 207 and 307 of the phase generating optical couplers 111 and 112 was set at $\delta l_3 = -1.8\lambda_c$. The optical path length difference of the optical delay line 107 formed of two optical delay elements was set at $\Delta L_1'(=\Delta L_1 + \delta L_1)$. $\Delta L_1$ is the optical path length difference of the optical delay line of the conventional Mach-Zehnder interferometer. The optical path length difference added to the optical delay line was set at $\Delta L_1 = 2.0\lambda_c$.

The above-described optical multi/demultiplexing circuit was fabricated by forming silica-based waveguides on a silicon substrate 504 by flame hydrolysis deposition, photolithography, and reactive ion etching. After the formation of the optical waveguides, thin film heaters having a width of 40 μm and a heater length of 4 mm were formed as a path length difference adjusting device 401 on the optical waveguides, and the refractive indices of the waveguides were changed by using the thin film heaters to correct fabrication errors of the optical path length differences of optical delay lines.

The waveguides were made so as to have a relative refractive index difference of 1.5%, a core thickness of 4.5 μm and a core width of 4.5 μm. The chip on which this Mach-Zehnder interferometer was fabricated was cut out by dicing, and an optical module was assembled by connecting single-mode fibers to the input and output waveguides.

Figure 32:
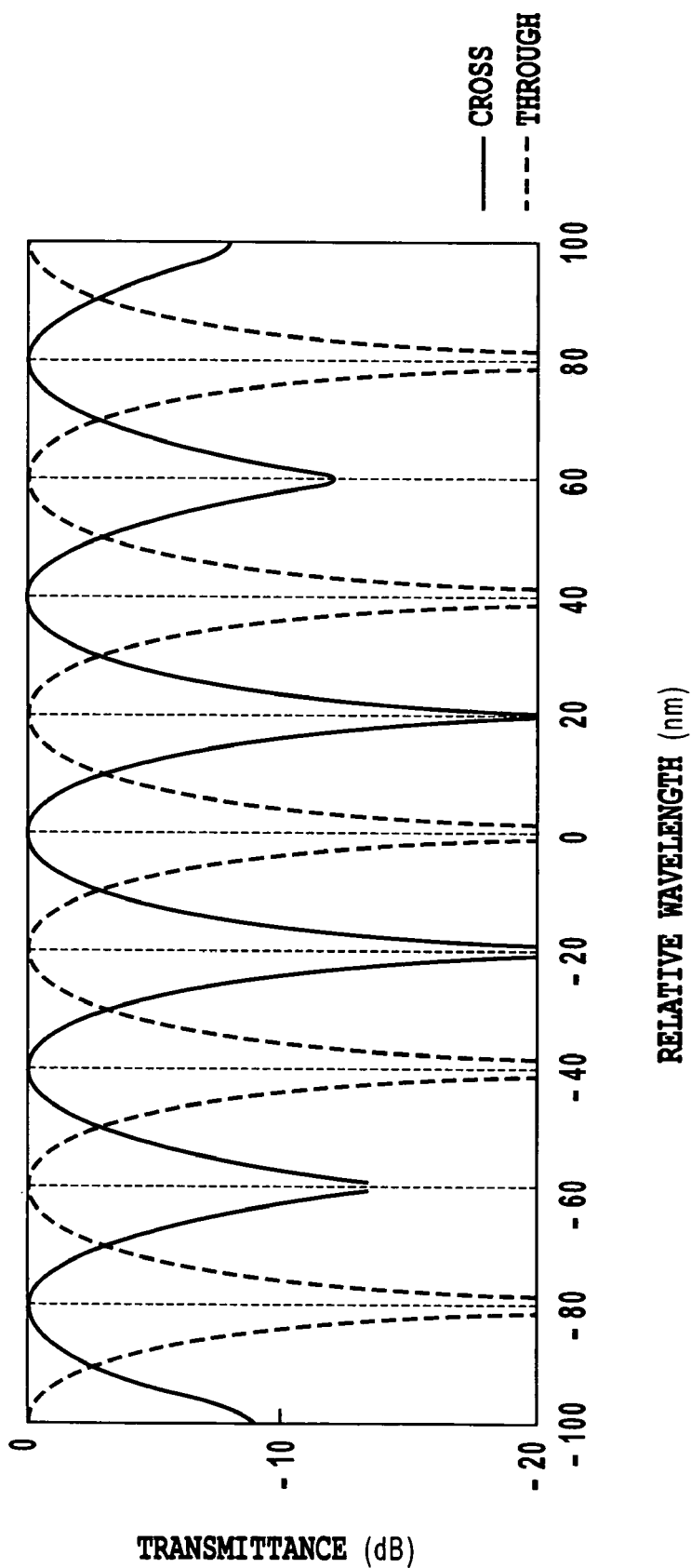
FIG. 32 is a diagram showing the wavelength dependence of the transmission characteristics of the uniform-wavelength-period Mach-Zehnder interferometer in the sixth embodiment of the present invention.

FIG. 32 shows the optical characteristics of the fabricated uniform-wavelength-period Mach-Zehnder interferometer optical module of the present invention. The characteristic relating to light which is input through the input waveguide 102 and output through the output waveguide 103 is indicated as "CROSS", while the characteristic relating to light which is input through the input waveguide 102 and output through the output waveguide 104 is indicated as "THROUGH". The optical multi/demultiplexing circuit having a uniform wavelength period of 40 nm was realized by using the principle of the present invention.

Figure 33:
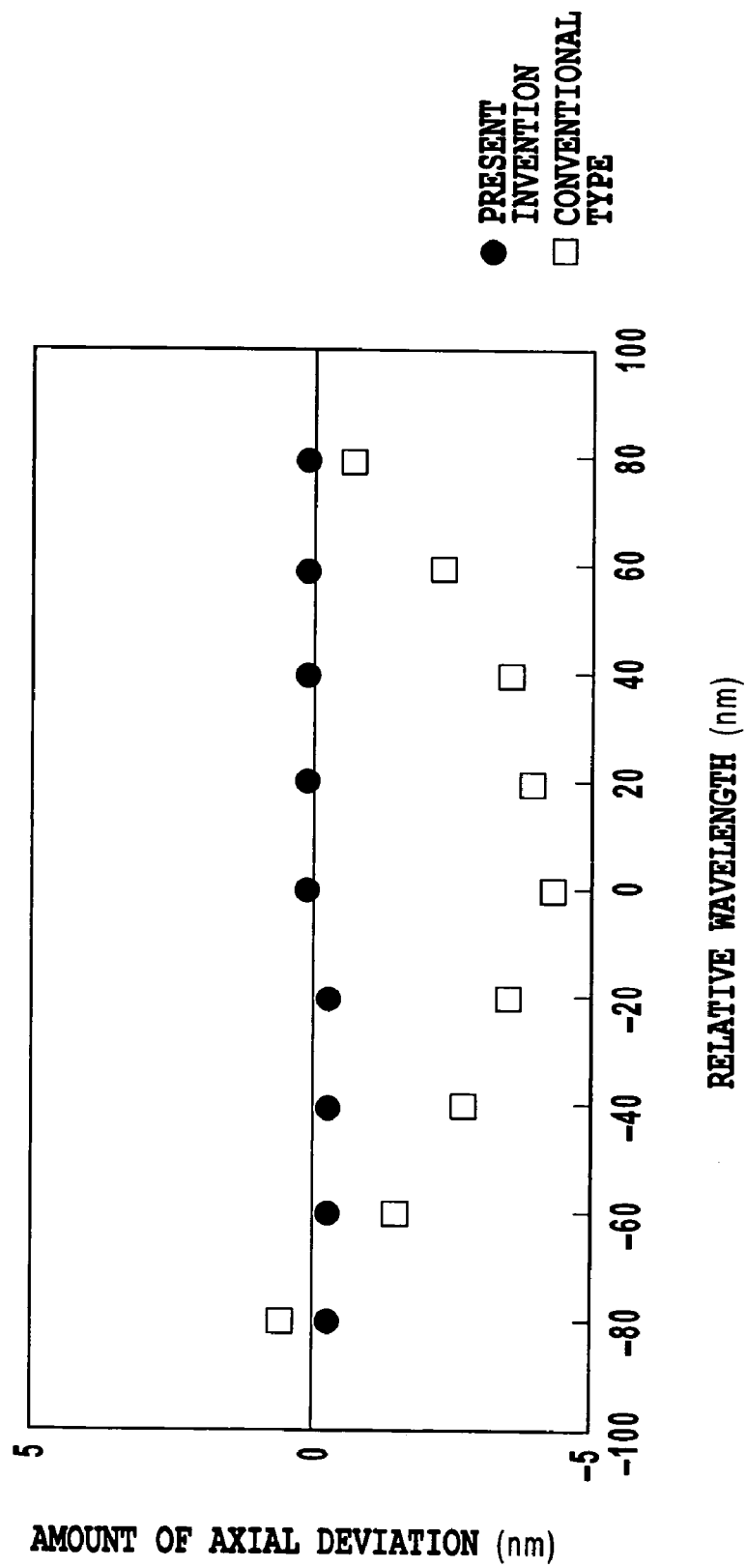
FIG. 33 is a diagram showing the amount of axial deviation from a CWDM grid of the center point of the passband in the transmission characteristics of the uniform-wavelength-period Mach-Zehnder interferometer in the sixth embodiment of the present invention.

FIG. 33 shows the misalignment of the center point of the passbands of the Mach-Zehnder interferometer from the CWDM grid with respect to the relative wavelength. It can be understood that a large axial misalignment occurs in the conventional Mach-Zehnder interferometer since the conventional Mach-Zehnder interferometer is uniformly periodic with respect to frequency and not uniformly periodic with respect to wavelength. In contrast, no axial misalignment occurs in the uniform-wavelength-period Mach-Zehnder interferometer of the present invention since the Mach-Zehnder interferometer of the present invention has a uniform wavelength period of 40 nm. Therefore, the Mach-Zehnder interferometer of the present invention is suitable for use as an optical multi/demultiplexing circuit for the CWDM system using a grid periodic in a wavelength region.

Figure 34:
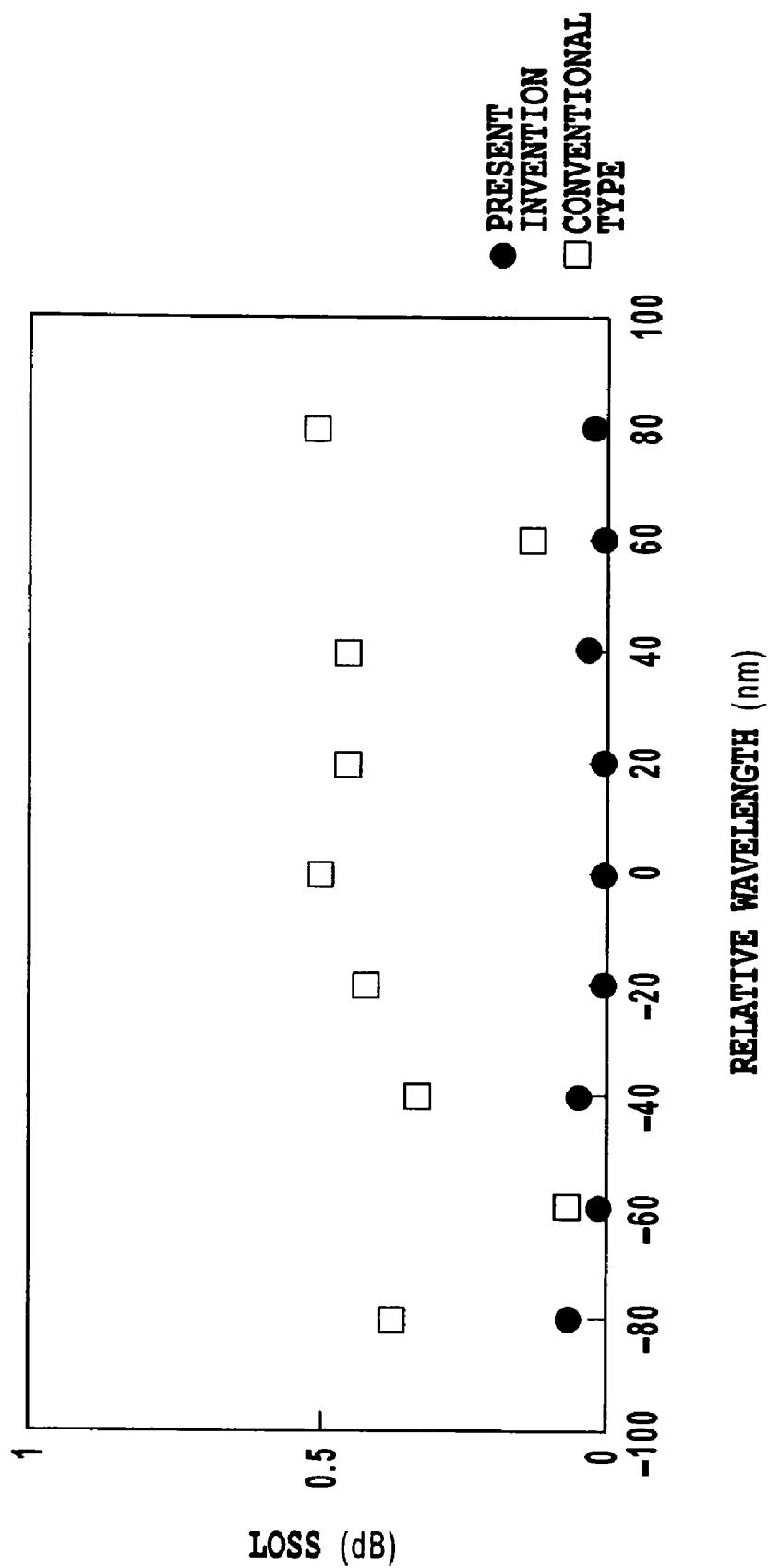
FIG. 34 is a diagram showing the loss on the CWDM grid in the transmission characteristics of the uniform-wavelength-period Mach-Zehnder interferometer in the sixth embodiment of the present invention.
Figure 35:
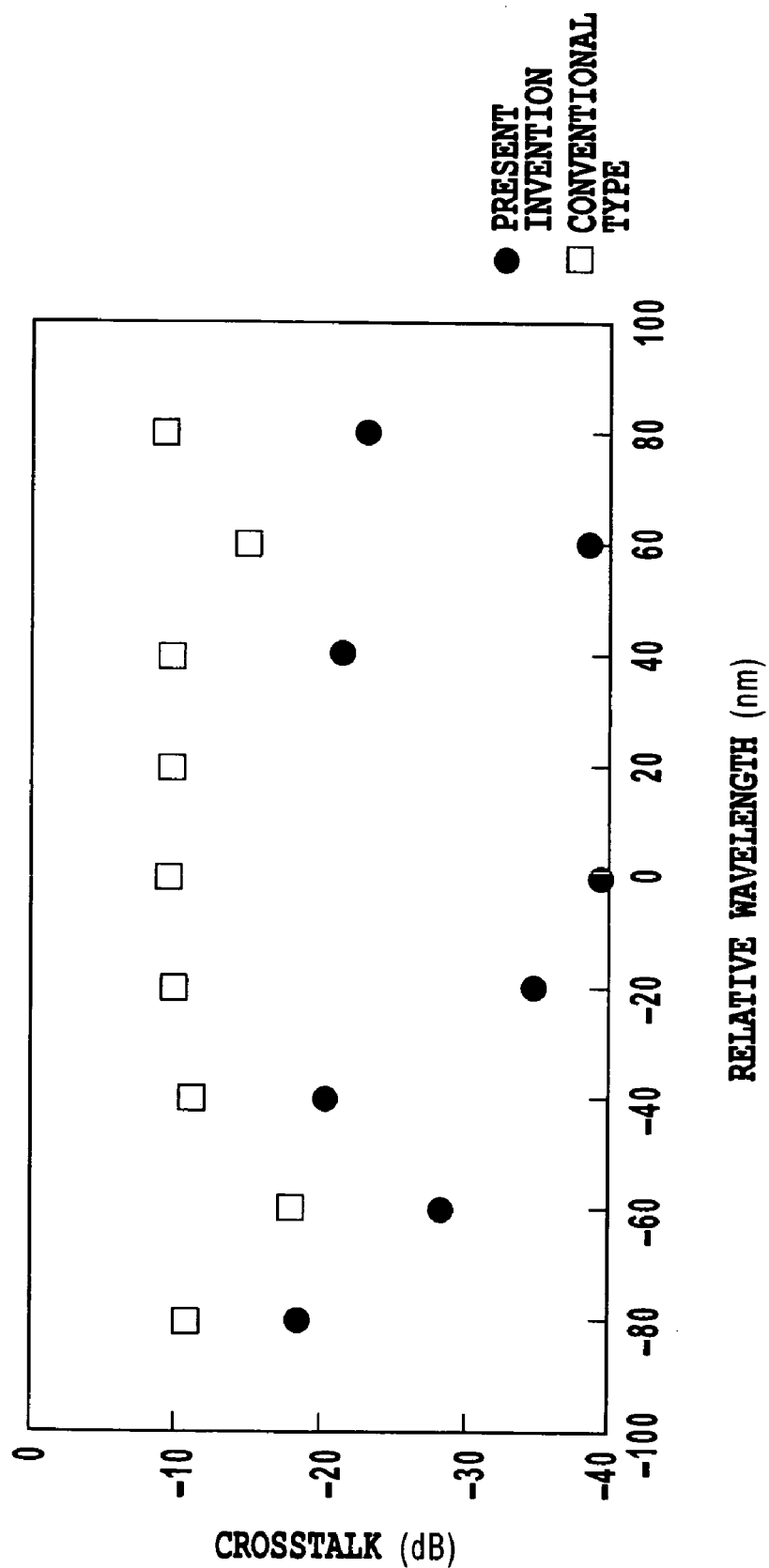
FIG. 35 is a diagram showing the crosstalk on the CWDM grid in the transmission characteristics of the uniform-wavelength-period Mach-Zehnder interferometer in the sixth embodiment of the present invention.

FIG. 34 shows the loss with respect to the relative wavelength, and FIG. 35 shows the crosstalk with respect to the relative wavelength. In the conventional Mach-Zehnder interferometer, the loss is increased on the CWDM grid and the crosstalk characteristic is also deteriorated since the center point of the passband deviates from the wavelength grid. In the Mach-Zehnder interferometer of the present invention, the characteristics in terms of loss and crosstalk are good since the center point of the passband just coincides with the wavelength grid.

Thus, in this embodiment, a uniform-wavelength-period optical multi/demultiplexing circuit was realized in such a manner that in an interferometer-type optical circuit constituted by a phase generating optical coupler having at least one input and at least two outputs and an optical delay line coupled to the phase generating optical coupler, a phase designed to obtain a uniform-wavelength-period characteristic was applied to the optical delay line by a phase generating device.

To be more specific, a phase generating optical coupler characterized in that the output phase difference varies with respect to a passband was used as the phase generating device. More concretely, a lattice-form filter type phase generating optical coupler was used as the phase generating optical coupler, and the parameters for designing the phase generating optical coupler were optimized so that the optical coupler had the desired phase and amplitude coupling ratio, thus achieving success in enabling the phase generating optical coupler to function as desired. By using the series of design techniques described in connection with this embodiment, a conventional Mach-Zehnder interferometer was transformed into a uniform-wavelength-period Mach-Zehnder interferometer as an example of an optical multi/demultiplexing circuit. This means that ordinary optical delay line circuits uniformly periodic with respect to frequency can be transformed to become uniformly periodic with respect to wavelength.

Needless to say, the above-described series of design algorithms for the process of deriving the phase for realization of the desired characteristics and optimizing the parameters for designing the phase generating optical coupler by numerical analysis is one possible method for implementation of the present invention, and a uniform-wavelength multi/demultiplexing circuit can also be realized by a different method, e.g., a method such as those described in the first embodiment where the target phase was derived directly from the transmittance spectra, to obtain the desired optical characteristics.

The target phase function is not limited to the one described in this embodiment, and other phase functions can be used to obtain the desired characteristics. Moreover, the present invention is not limited to converting the transmittance characteristics into uniform wavelength period. For example, the phase may be designed such that the wavelength periods are different at different wavelength regions. Transforming the transmittance spectra of the conventional optical multi/demultiplexing circuit into equal wavelength spacing is only an example of the phase design, which is the feature of the present invention. Further, the way in which a phase is expressed is not uniquely determined. A plurality of ways of expression are possible for realization of the same characteristic. For example, since the optical multi/demultiplexing circuit used in this embodiment is a two-output lattice-form filter and since an optical signal can be taken out from either of the output waveguides, m can be set at m'/2 (m': an integer). Any other functions may be used.

This embodiment is only an example of a possible use of a phase generating device to modify the optical characteristics of the conventional optical multi/demultiplexing circuits.

Seventh Embodiment

Figure 36:
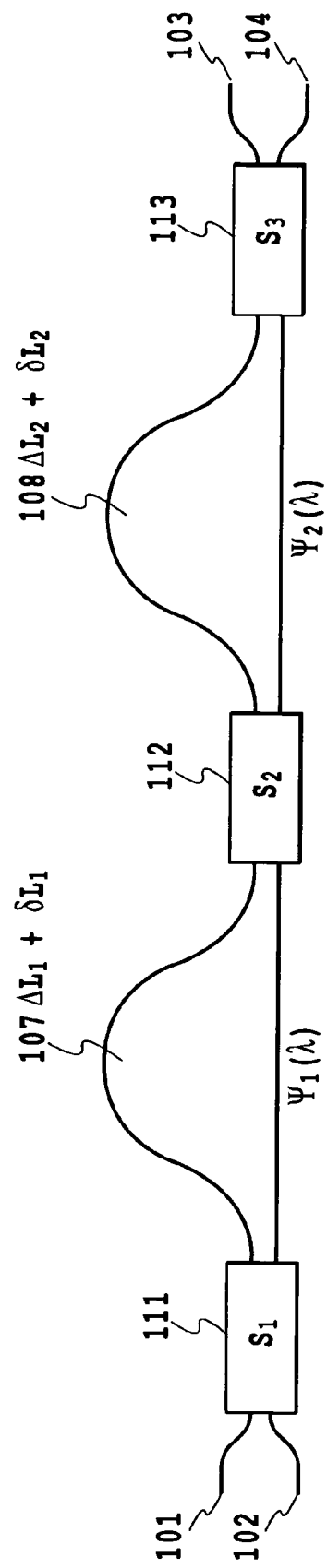
FIG. 36 is a diagram showing the configuration of a lattice-form filter which is an example of a multi/demultiplexing circuit in a seventh embodiment of the present invention.

FIG. 36 shows an optical multi/demultiplexing circuit in a seventh embodiment of the present invention. This circuit is a two-stage lattice-form filter constituted by N+1 (N=2) phase generating optical couplers 111 to 113, N (N=2) optical delay lines 107 and 108 each interposed between adjacent pairs of the phase-generating optical couplers, two input waveguides 101 and 102 connected to the first phase generating optical coupler 111, and two output waveguides 103 and 104 connected to the (N+1=3)-th (third) phase generating optical coupler 113.

Each of the two optical delay lines 107 and 108 is formed by two optical delay elements. The path length differences of the optical delay lines 107 and 108 are respectively set at $\Delta L_1 + \delta L_1$ and $\Delta L_2 + \delta L_2$. As each of the phase generating optical couplers 111 to 113, a phase generating optical coupler in which its output phase difference has a wavelength dependence with respect to a passband is used. These phase generating optical couplers are used as a phase generating device to apply phases $\Psi_1(\lambda)$ and $\Psi_2(\lambda)$, each having a wavelength dependence, to the optical delay lines 107 and 108. It is possible to freely set the optical characteristics of the optical multi/demultiplexing circuit shown in FIG. 36 by suitably setting these phases $\Psi_1(\lambda)$ and $\Psi_2(\lambda)$.

A wavelength reference device according to this embodiment in which its transmittance spectrum is transformed from uniform frequency period into uniform wavelength period, will be described by way of example. If the phase described in the description of the sixth embodiment is applied to the optical delay line, a wavelength reference device having a center wavelength $\lambda c$ and a wavelength period $\Delta \lambda$ can be realized. In this embodiment, phase generating optical couplers are used as a phase generating device to achieve the desired optical characteristics.

In this embodiment, phase generating optical couplers of a lattice-form filter type are used, the phase $\Psi_1(\lambda)$ is applied to the optical delay line 107 by the phase generating optical couplers 111 and 112, and the phase $\Psi_2(\lambda)$ is applied to the optical delay line 108 by the phase generating optical couplers 112 and 113. The optical path length difference of the first optical delay line 107 was set at $\Delta L_1 = \Delta L$ where $\Delta L$ is a fundamental optical path length difference, and the optical path length difference of the second optical delay line 108 was set at $\Delta L_2 = \Delta L$. The fundamental optical path length difference $\Delta L$ is equal to the path length difference of a conventional wavelength reference device of a lattice-form filter type.

The phase generating optical coupler 112 was formed by a directional coupler formed of two optical waveguides placed close to each other, and the phase generating optical couplers 111 and 113 were formed by $M_1$-stage and $M_3$-stage lattice-form-filter-type phase generating optical couplers respectively having transfer matrices $S_1$ and $S_3$. The entire circuit was designed so as to be line-symmetric about the phase generating optical coupler 112. The number of circuit parameters was reduced to facilitate the fabrication of the circuit. Needless to say, the above-described configuration is only an example of the circuit configuration, and any other circuit configuration, e.g., one in which the characteristics of the phase generating optical couplers 111 and 113 differ from each other may be used.

The transfer matrices of the phase generating optical couplers 111 to 113 are respectively shown as:

$$S_1 = \begin{pmatrix} H_1(z) & -F_{1^*}(z) \\ F_1(z) & H_{1^*}(z) \end{pmatrix} = S_{1,M_1+1} S_{1,M_1} \cdots S_{1,2} S_{1,1} \quad (19)$$

$$S_2 = \begin{pmatrix} \cos\theta_{2,1} & -j\sin\theta_{2,1} \\ -j\sin\theta_{2,1} & \cos\theta_{2,1} \end{pmatrix} \quad (20)$$

$$S_3 = \begin{pmatrix} H_3(z) & -F_{3^*}(z) \\ F_3(z) & H_{3^*}(z) \end{pmatrix} = S_{3,M_3+1} S_{3,M_3} \cdots S_{3,2} S_{3,1} \quad (21)$$

The design parameters of the phase generating optical couplers were optimized so that the phases $\Phi_1(\lambda)$ and $\Phi_2(\lambda)$ applied to the optical delay lines 107 and 108 and the target phases $\Psi_1(\lambda)$ and $\Psi_2(\lambda)$ respectively coincided with each other, and so that the phase generating optical couplers functions as optical couplers having an amplitude coupling ratio of 0.3, as described above in the description of the sixth embodiment.

In this embodiment, the entire circuit is made line-symmetric about the phase generating optical coupler 112 and the designs of the optical delay lines 107 and 108 are identical with each other. Therefore, only the optimization for the optical delay line 107 is necessary. As a result of the optimization, the corresponding phase generating optical coupler was formed as a six-stage lattice-form filter. If the number of parameters was smaller, the phase generating optical coupler will become easier to fabricate. Accordingly, $\theta_{1,1}(\lambda) = \theta_{1,2}(\lambda) = \theta_{1,3}(\lambda) = \theta_{1,4}(\lambda) = \theta_{1,5}(\lambda) = \theta_{1,6}(\lambda) = \theta(\lambda)$ and $\delta l_{1,1} = -\delta l_{1,5} = -\delta l_{1,6}$ and $\delta l_{1,3} = \delta l_{1,4}$ were set as restrictive conditions for optimization.

Needless to say, these restrictive conditions are not necessary for derivation of parameters for the design of the phase generating optical coupler, and other restrictive conditions may be set. If the number of stages in the lattice-form-filter-type phase generating optical coupler is increased, the degree of approximation to the desired characteristics can be increased. The degree of approximation is also increased by using arbitrary design parameters without imposing restrictive conditions.

However, even when the above-described restrictive conditions were imposed, the design parameters were derived with a sufficiently high degree of approximation by optimization. Further, if a variable is introduced into the target phase function, it will facilitate the approximation because there will be a larger flexibility in the design parameters of the phase generating optical coupler.

For this reason, a variable $\delta L_1$ was introduced into the phase function for approximation. Needless to say, the variable is not indispensable to design the phase generating optical coupler, and a variable other than this may be used. The reason for incorporating $\delta L_1$ is that the variable can be easily reflected into the optical multi/demultiplexing circuit simply by setting the optical path length difference of the optical delay line of the optical multi/demultiplexing circuit at $\Delta L_1' (=\Delta L_1+\delta L_1)$.

Figure 37A:
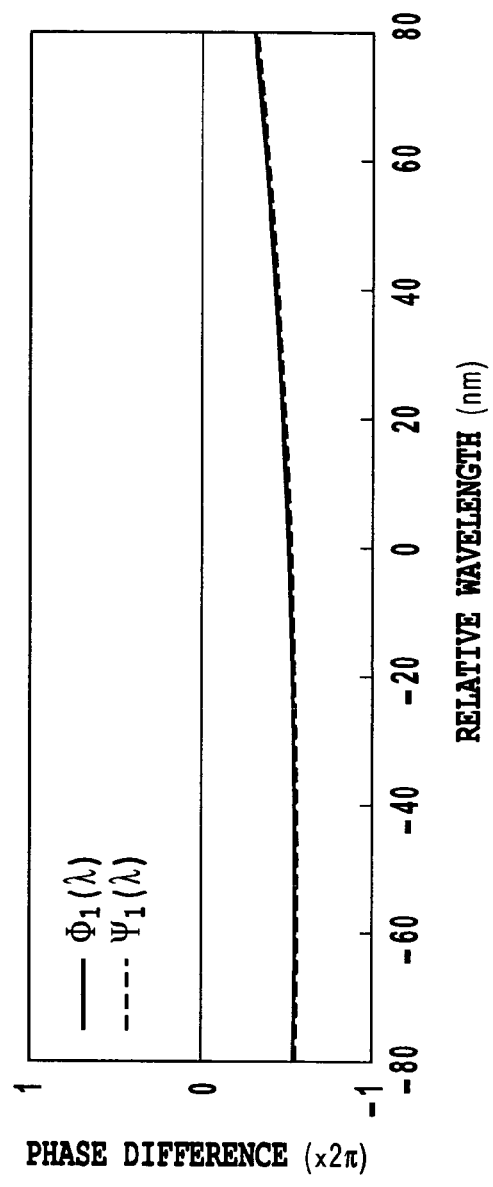
FIG. 37A is a diagram showing the relative wavelength dependences of the phase difference output from phase generating optical couplers and a target phase.
Figure 37B:
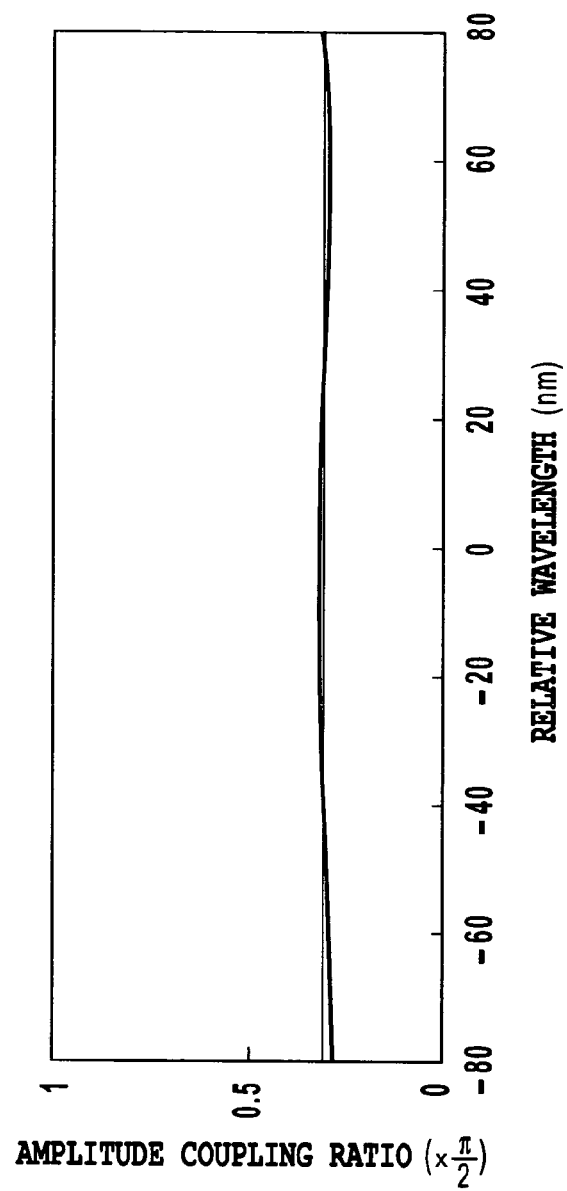
FIG. 37B is a diagram showing the relative wavelength dependence of the amplitude coupling ratio when the phase generating optical couplers are used as optical couplers.

The amplitude coupling ratios of the optical couplers constituting the phase generating optical coupler, the optical path length differences of the optical delay lines constituting the phase generating optical coupler and the variable $\delta L_1$ were optimized by the conjugate gradient method so that the generated phase difference $\Phi_1(\lambda)$ and the target phase $\Psi_1(\lambda)$ coincided with each other and the amplitude coupling ratio was 0.3. As a result of the optimization, as can be understood from FIG. 37A, the phase difference $\Phi_1(\lambda)$ shown in FIG. 37A was produced by the phase generating optical couplers 111 and 112 and the phase $\Psi_1(\lambda)$ was suitably approximated. A phase generating optical coupler (phase generating optical coupler 111) having this phase difference and the amplitude coupling ratio shown in FIG. 37B was realized.

Figure 38:
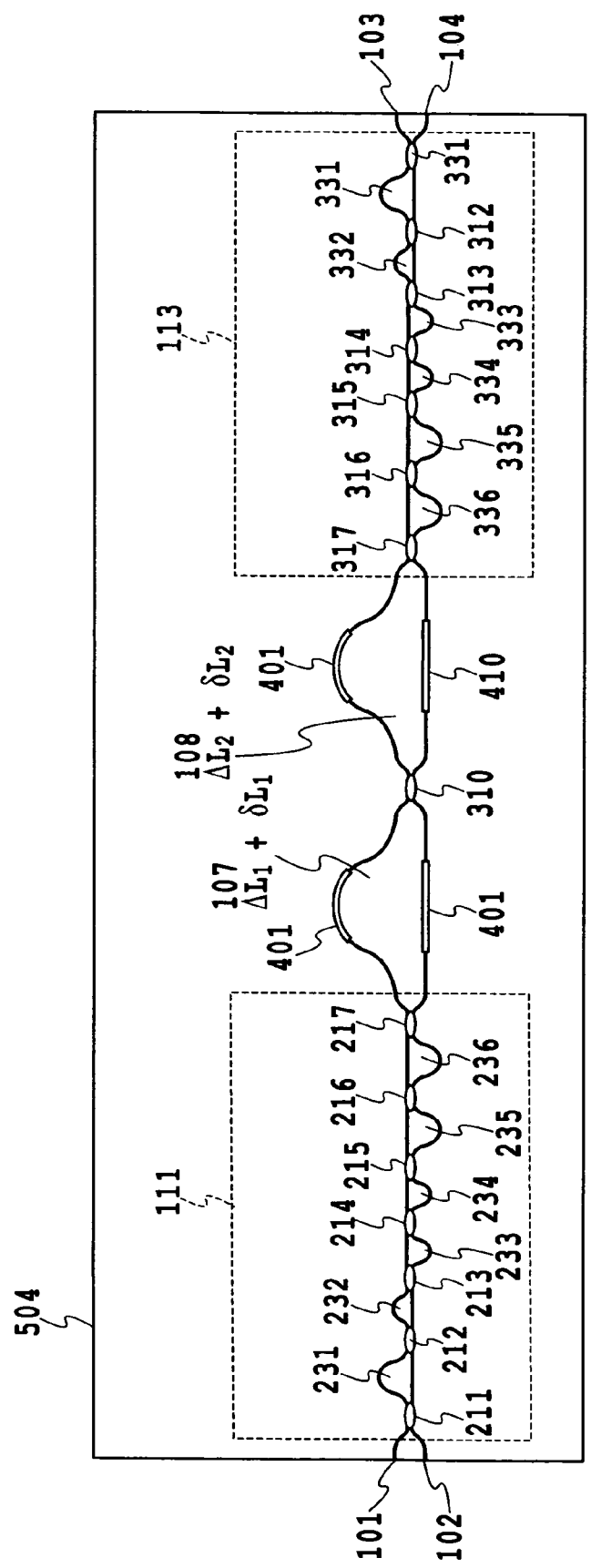
FIG. 38 is a diagram schematically showing the uniform-wavelength-period lattice-form-filter-type wavelength reference device in a seventh embodiment of the present invention.

FIG. 38 is a diagram schematically showing a fabricated uniform-wavelength-period lattice-form-filter-type wavelength reference device in accordance with the present invention. The amplitude coupling ratio of each of optical couplers 211 to 217, and 311 to 317 constituting the phase generating optical couplers 111 and 113 was set at $\theta(\lambda_c)=0.56$; the optical path length difference of each optical delay lines 231 and 331 of the phase generating optical couplers 111 and 113 at $\delta l_1=1.2\lambda_c$; the optical path length difference of each optical delay lines 232 and 332 at $\delta l_2=0.12\lambda_c$; the optical path length difference of each optical delay lines 233 and 333 at $\delta l_3=-0.2\lambda_c$; the optical path length difference of each optical delay lines 234 and 334 at $\delta l_4=-0.2\lambda_c$; the optical path length difference each of optical delay lines 235 and 335 at $\delta l_5=-1.2\lambda_c$; the optical path length difference of each optical delay lines 236 and 336 at $\delta l_6=-1.2\lambda_c$.

The optical path length differences of the optical delay lines 107 and 108 of the Mach-Zehnder interferometer each formed of two optical delay elements were set at $\Delta L_1'=\Delta L_2'=\Delta L'(=\Delta L+\delta L)$. $\Delta L$ is the optical path length difference of the optical delay lines of the conventional lattice-form filter. The optical path length difference to be added to the optical delay lines was set at $\delta L=-1.8\lambda_c$. Also, the amplitude coupling ratio of a directional coupler 310 was set at 0.4.

The above-described optical multi/demultiplexing circuit was fabricated by forming silica-based optical waveguides on a silicon substrate 504 by flame hydrolysis deposition, photolithography or reactive ion etching. After the formation of the optical waveguides, thin film heaters having a width of 70 μm and a heater length of 8 mm were formed as a path length difference adjusting device 401 on the optical waveguides, and the refractive indices of the waveguides were changed by using the thin film heaters to correct fabrication errors of the optical path length differences of the optical delay lines.

The waveguides were made so as to have a relative refractive index difference of 1.5%, a core thickness of 4.5 μm and a core width of 4.5 μm. The chip on which this Mach-Zehnder interferometer was fabricated was cut out by dicing, and an optical module was assembled by connecting dispersion-shifted fibers to the input and output waveguides.

FIG. 39A shows the transmission characteristics of the conventional wavelength reference device, and FIG. 39B shows the transmission characteristics of the wavelength reference device of the present invention. These optical characteristics were measured when light was input through the input waveguide 102 and output through the output waveguide 103. The conventional lattice-form filter cannot be made uniformly periodic on the wavelength axis since it is uniformly periodic with respect to frequency. On the other hand, the wavelength reference device having a uniform wavelength period of 40 nm was realized by using the principle of the present invention.

Figure 40:
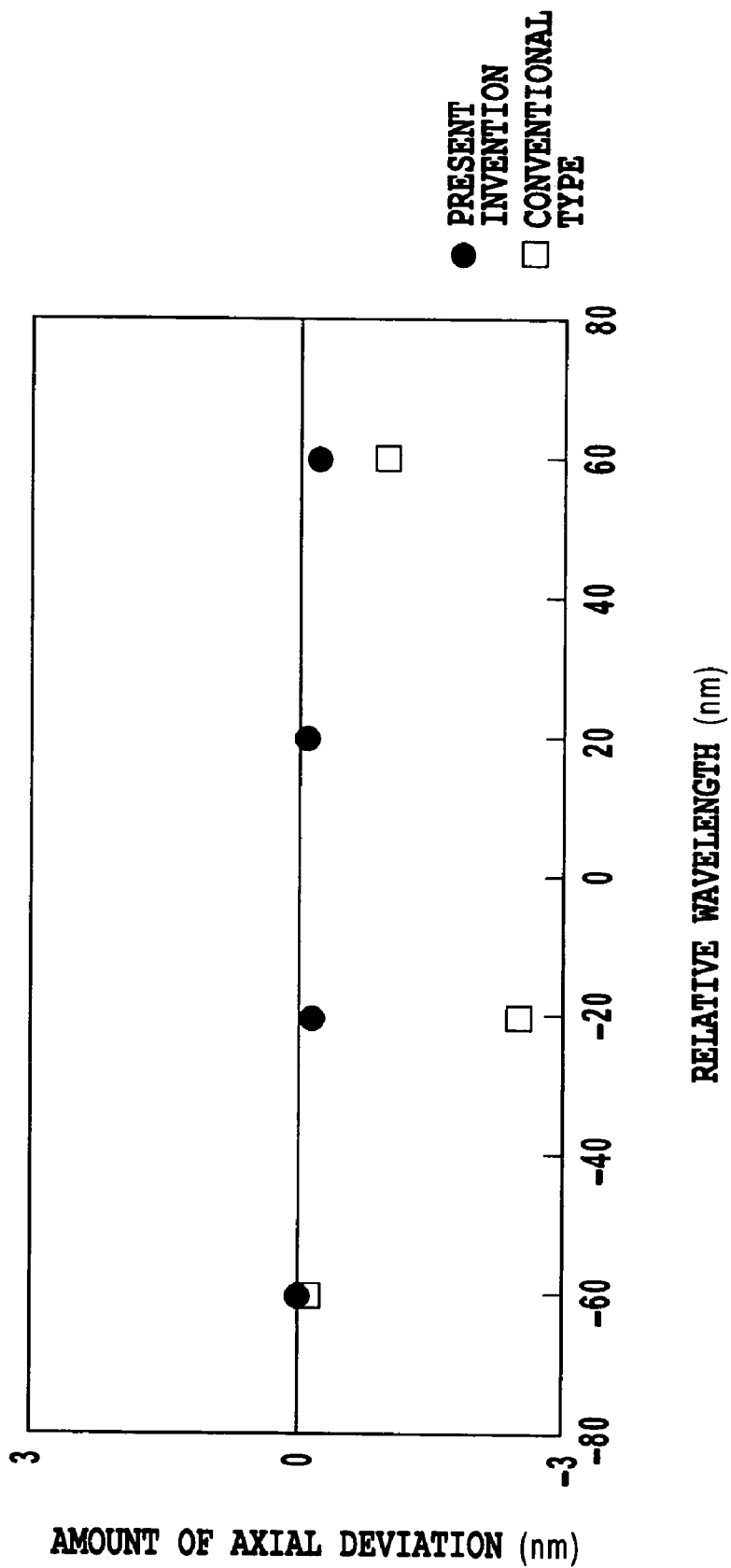
FIG. 40 is a diagram showing the amount of axial deviation from a CWDM grid of the center point of the passband in the transmission characteristics of the uniform-wavelength-period lattice-filter-type wavelength reference device in the seventh embodiment of the present invention.

FIG. 40 shows the deviation of the center point of the passband of the lattice-form filter from the CWDM grid with respect to the relative wavelength. It can be understood that a large axial deviation occurs in the conventional lattice-form filter since the conventional lattice-form filter is uniformly periodic with respect to frequency and not uniformly periodic with respect to wavelength. In contrast, no axial deviation occurs in the uniform-wavelength-period lattice-form filter of the present invention since the lattice-form filter of the present invention has a uniform wavelength period of 40 nm. Therefore, the lattice-form filter of the present invention is suitable for use as a wavelength reference device for the CWDM system using a grid periodic in a wavelength region.

Figure 41:
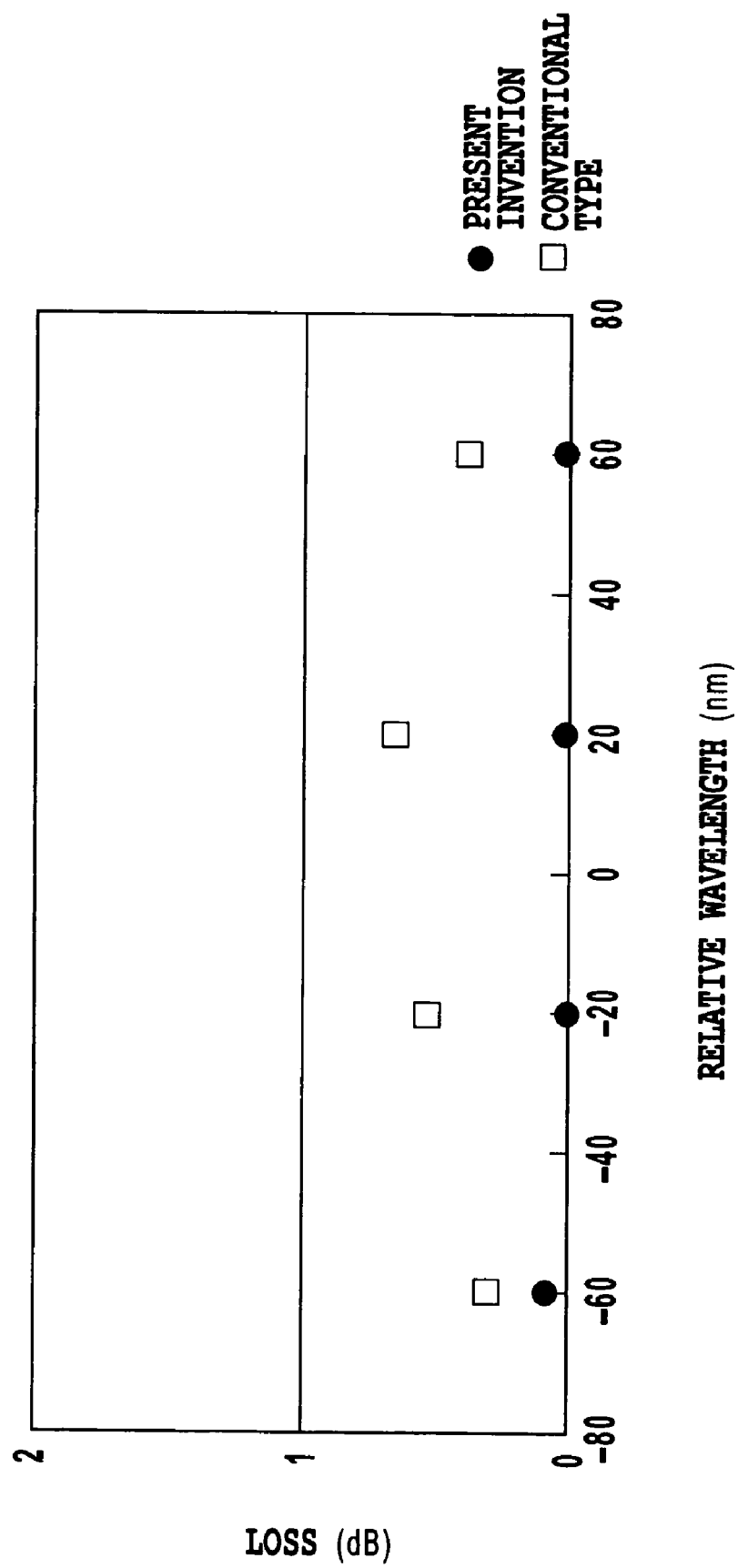
FIG. 41 is a diagram showing the loss on the CWDM grid in the transmission characteristics of the uniform-wavelength-period lattice-filter-type wavelength reference device in the eighth embodiment of the present invention.

FIG. 41 shows the loss with respect to the relative wavelength. In the conventional lattice-form filter, the loss is increased on the CWDM grid and the crosstalk characteristic is also deteriorated since the center point of the passband deviates from the wavelength grid. In the lattice-form filter of the present invention, no loss due to axial deviation occurs since the center point of the passband just coincides with the wavelength grid.

Thus, in this embodiment, a uniform-wavelength-period optical multi/demultiplexing circuit was realized in such a manner that in an interferometer-type optical circuit constituted by a phase generating optical coupler having at least one input and at least two outputs and an optical delay line coupled to the phase generating optical coupler, a phase designed to obtain a uniform-wavelength-period characteristic was applied to the optical delay line by a phase generating device.

To be more specific, a phase generating optical coupler characterized in that the output phase difference varies with respect to a passband was used as the phase generating device. More concretely, a lattice-form filter type phase generating optical coupler was used as the phase generating optical coupler, and the parameters for designing the phase generating optical coupler were optimized so that the optical coupler had the desired phase and amplitude coupling ratio, thus achieving success in enabling the phase generating optical coupler to function as desired. A conventional lattice-form-filter-type wavelength reference device was transformed into a uniform-wavelength-period lattice-form-filter-type wavelength reference device as an example of an optical multi/demultiplexing circuit.

A suitable phase function may be set as desired according to the transmission characteristics to be obtained. The present invention is not limited to the uniform-wavelength-period wavelength reference device. For example, the phase may be designed such that the wavelength periods are different at different wavelength regions. Therefore, a wavelength reference device having a peak of transmissivity, i.e., a wavelength reference point, set at an arbitrary position can be realized by suitably setting the phase.

This embodiment is only an example of a possible use of a phase generating device to modify the optical characteristics of the conventional optical multi/demultiplexing circuits.

Eighth Embodiment

Figure 42:
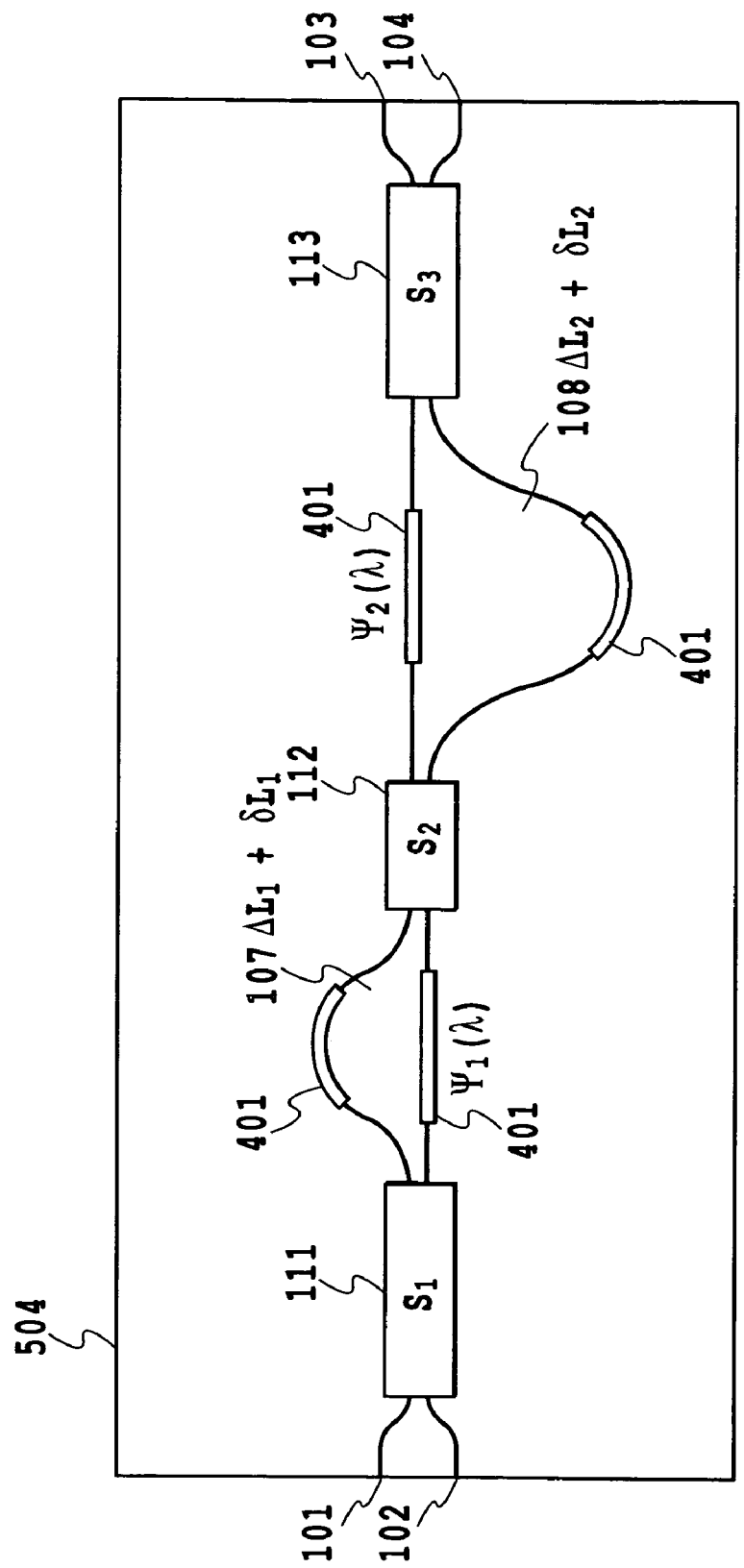
FIG. 42 is a diagram schematically showing a uniform-wavelength-period interleave filter in an eighth embodiment of the present invention.

FIG. 42 shows an optical multi/demultiplexing circuit in an eighth embodiment of the present invention. This circuit is a two-stage lattice-form filter constituted by N+1 (N=2) phase generating optical couplers 111 to 113, N (N=2) optical delay lines 107 and 108 each interposed between one of adjacent pairs of the phase-generating optical couplers, two input waveguides 101 and 102 connected to the first phase generating optical coupler 111, and two output waveguides 103 and 104 connected to the (N+1=3)-th (third) phase generating optical coupler 113.

Each of the two optical delay lines 107 and 108 is formed by two optical delay elements. The path length differences of the optical delay lines 107 and 108 are respectively set to $\Delta L_1 + \delta L_1$ and $\Delta L_2 + \delta L_2$. As each of the phase generating optical couplers 111 to 113, a phase generating optical coupler in which its output phase difference has a wavelength dependence with respect to a passband is used. These phase generating optical couplers are used as a phase generating device to apply phases $\Psi_1(\lambda)$ and $\Psi_2(\lambda)$ each having a wavelength dependence to the optical delay lines 107 and 108. It is possible to freely set the optical characteristics of the optical multi/demultiplexing circuit shown in FIG. 42 by suitably setting these phases $\Psi_1(\lambda)$ and $\Psi_2(\lambda)$.

An interleave filter according to this embodiment in which its transmittance spectrum is transformed from uniform frequency period into uniform wavelength period, will be described by way of example. If the phase described in the description of the sixth embodiment is applied to the optical delay line, an interleave filter having a center wavelength $\lambda c$ and a wavelength period $\lambda k$ can be realized. In this embodiment, phase generating optical couplers are used as a phase generating device to achieve the desired optical characteristics.

In this embodiment, phase generating optical couplers of a lattice-form filter type are used, the phase $\Psi_1(\lambda)$ is applied to the optical delay line 107 by the phase generating optical couplers 111 and 112, and the phase $\Psi_2(\lambda)$ is applied to the optical delay line 108 by the phase generating optical couplers 112 and 113. The optical path length difference of the first optical delay line 107 was set at $\Delta L_1 = \Delta L$ where $\Delta L$ is a fundamental optical path length difference, and the optical path length difference of the second optical delay line 108 was set at $\Delta L_2 = -2\Delta L$. The fundamental optical path length difference $\Delta L$ is equal to the path length difference of a conventional interleave filter of a lattice-form filter type.

As shown in FIG. 43B, the phase generating optical coupler 112 was formed by a directional coupler 310 formed of two optical waveguides placed close to each other and having an amplitude coupling ratio of 0.38. The phase generating optical couplers 111 and 113 were formed by $M_1$-stage and $M_3$-stage lattice-form-filter-type phase generating optical couplers respectively having transfer matrices $S_1$ and $S_3$.

The design parameters of the phase generating optical couplers were optimized so that the phases $\Phi_1(\lambda)$ and $\Phi_2(\lambda)$ applied to the optical delay lines 107 and 108 and the target phases $\Psi_1(\lambda)$ and $\Psi_2(\lambda)$ respectively coincided with each other, and so that the phase generating optical couplers 111 and 113 functions as optical couplers having amplitude coupling ratios of 0.5 and 0.15, respectively, as described above in the description of the sixth embodiment. As a result of the optimization, the phase generating optical couplers 111 and 113 were formed as a six-stage lattice-form filter and a ten-stage lattice-form filter, respectively, as shown in FIGS. 43A and 43C.

If the number of parameters was smaller, the phase generating optical couplers will become easier to fabricate. Accordingly,
$\theta_{1,1}(\lambda) = \theta_{1,2}(\lambda) = \theta_{1,3}(\lambda) = \theta_{1,4}(\lambda) = \theta_{1,5}(\lambda) = \theta_{1,6}(\lambda) = \theta_1(\lambda)$ and $\theta_{3,1}(\lambda) = \theta_{3,2}(\lambda) = \theta_{3,3}(\lambda) = \theta_{3,4}(\lambda) = \theta_{3,5}(\lambda) = \theta_{3,6}(\lambda) = \theta_{3,7}(\lambda) = \theta_{3,8}(\lambda) = \theta_{3,9}(\lambda) = \theta_{3,10}(\lambda) = \theta_3(\lambda)$ were set as restrictive conditions for optimization.

Needless to say, these restrictive conditions are not necessary for derivation of parameters for the design of the phase generating optical couplers, and other restrictive conditions may be set. If the number of stages in each lattice-form-filter-type phase generating optical coupler is increased, the degree of approximation to the desired characteristics can be increased. The degree of approximation is also increased by using arbitrary design parameters without imposing restrictive conditions. However, even when the above-described restrictive conditions were imposed, the design parameters were derived with a sufficiently high degree of approximation by optimization.

Further, if a variable is introduced into the target phase function, it will facilitate the approximation because there will be a larger flexibility in the design parameters of the phase generating optical coupler. For this reason, variables $\delta L_1$ and $\delta L_2$ were respectively introduced into the phase functions $\Psi_1(\lambda)$ and $\Psi_2(\lambda)$ for approximation. Needless to say, the variables are not indispensable to design the phase generating optical couplers, and other variables may be used. The reason for incorporating $\delta L_1$ and $\delta L_2$ is that the variables can be easily reflected into the optical multi/demultiplexing circuit simply by setting the optical path length differences of the optical delay lines 107 and 108 of the optical multi/demultiplexing circuit at $\Delta L_1'(=\Delta L_1 + \delta L_1)$ and $\Delta L_2'(=\Delta L_2 + \delta L_2)$, respectively.

First, the amplitude coupling ratios of the optical couplers constituting the phase generating optical coupler, the optical path length differences of the optical delay lines constituting the phase generating optical coupler and the variable $\delta L_1$ were optimized by the conjugate gradient method so that the generated phase difference $\Phi_1(\lambda)$ and the target phase $\Psi_1(\lambda)$ coincided with each other and the amplitude coupling ratio was 0.5. As a result of the optimization, as can be understood from FIG. 44A, the phase difference $\Phi_1(\lambda)$ shown in FIG. 44A was produced by the phase generating optical couplers 111 and 112 and the phase $\Psi_1(\lambda)$ was suitably approximated. A phase generating optical coupler (phase generating optical coupler 111) having this phase difference and the amplitude coupling ratio shown in FIG. 44B was realized.

Next, the amplitude coupling ratios of the optical couplers constituting the phase generating optical coupler, the optical path length differences of the optical delay lines constituting the phase generating optical coupler and the variable $\delta L_2$ were optimized by the conjugate gradient method so that the generated phase difference $\Phi_2(\lambda)$ and the target phase $\Psi_2(\lambda)$ coincided with each other and the amplitude coupling ratio was 0.15.

Figure 45A:
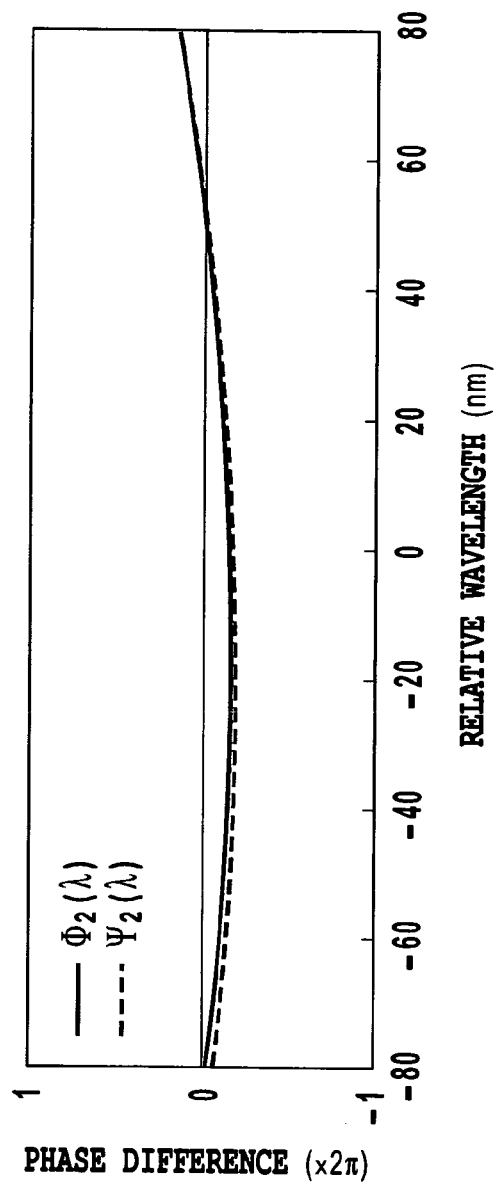
FIG. 45A is a diagram showing the relative wavelength dependence of the target phase and the phase acting on the second optical delay line that is generated by the adjacent couplers.
Figure 45B:
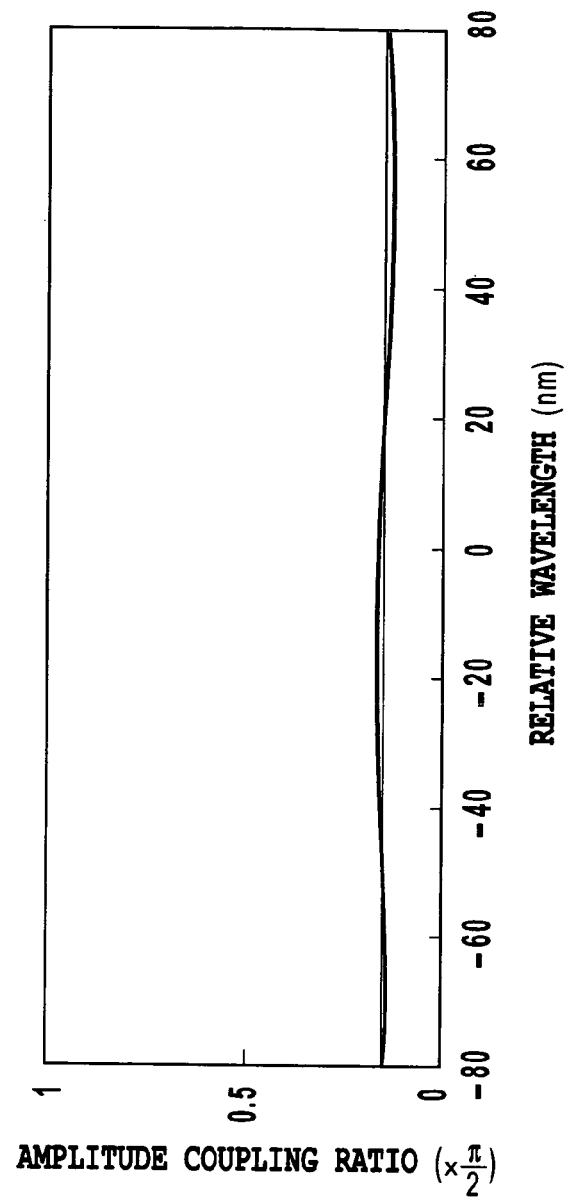
FIG. 45B is a diagram showing the relative wavelength dependence of the amplitude coupling ratio when the phase generating optical coupler is used as an optical coupler.

As a result of the optimization, as can be understood from FIG. 45A, the phase difference $\Phi_2(\lambda)$ shown in FIG. 45A was produced by the phase generating optical couplers 112 and 113 and the phase $\Phi_2(\lambda)$ was suitably approximated. The phase generating optical coupler (phase generating optical coupler 113) having this phase difference and the amplitude coupling ratio shown in FIG. 45B was realized.

The amplitude coupling ratios of optical couplers 211 to 217 and 311 to 321 constituting the phase generating optical couplers 111 and 113 were respectively set at $\theta_1(\lambda_c) = 0.64$ and $\theta_3(\lambda_c) = 0.55$. The optical path length differences of delay lines 231, 232, 233, 234, 235, and 236 of the phase generating optical coupler 111 were set at $\delta l_{1,1}=1.3\lambda_c$, $\delta l_{1,2}=0.0$, $\delta l_{1,3}=-0.4\lambda_c$, $\delta l_{1,4}=0.6\lambda_c$, $\delta l_{1,5}=-0.1\lambda_c$ and $\delta l_{1,6}=-1.5\lambda_c$. Further, the optical path length differences of delay lines 331, 332, 333, 334, 335, 336, 337, 338, 339, and 340 of the phase generating optical coupler 113 were set at $\delta l_{3,1}=0.13\lambda_c$, $\delta l_{3,2}=0.05\lambda_c$, $\delta l_{3,3}=-0.3\lambda_c$, $\delta l_{3,4}=0.2\lambda_c$, $\delta l_{3,5}=0.1\lambda_c$, $\delta l_{3,6}=0.2\lambda_c$, $\delta l_{3,7}=-0.23\lambda_c$, $\delta l_{3,8}=-0.3\lambda_c$, $\delta l_{3,9}=0.33\lambda_c$, and $\delta l_{3,10}=-0.5\lambda_c$.

The optical path length differences of the optical delay lines 107 and 108 of the Mach-Zehnder interferometer formed of two optical delay elements were set at $\Delta L_1'=\Delta L+\delta L_1$, $\Delta L_2'=-2\Delta L+\delta L_2$. $\Delta L$ is the optical path length difference of the optical delay lines of the conventional lattice-form filter. The optical path length differences to be added to the optical delay lines were set at $\delta L_1=-1.6\lambda_c$, and $\delta L_2=-3.3\lambda_c$. The amplitude coupling ratio of a directional coupler 310 was set at 0.38.

The above-described optical multi/demultiplexing circuit was fabricated by forming silica-based optical waveguides on a silicon substrate 504 by flame hydrolysis deposition, photolithography or reactive ion etching. After the formation of the optical waveguides, thin film heaters having a width of 40 μm and a heater length of 5 mm were formed as a path length difference adjusting device 401 on the optical waveguides, and the refractive indices of the waveguides were changed by using the thin film heaters to correct fabrication errors of the optical path length differences of the optical delay lines.

The waveguides were made so as to have a relative refractive index difference of 1.5%, a core thickness of 4.5 μm and a core width of 4.5 μm. The chip on which this Mach-Zehnder interferometer was fabricated was cut out by dicing, and an optical module was assembled by connecting single-mode fibers to the input and output waveguides.

Figure 46:
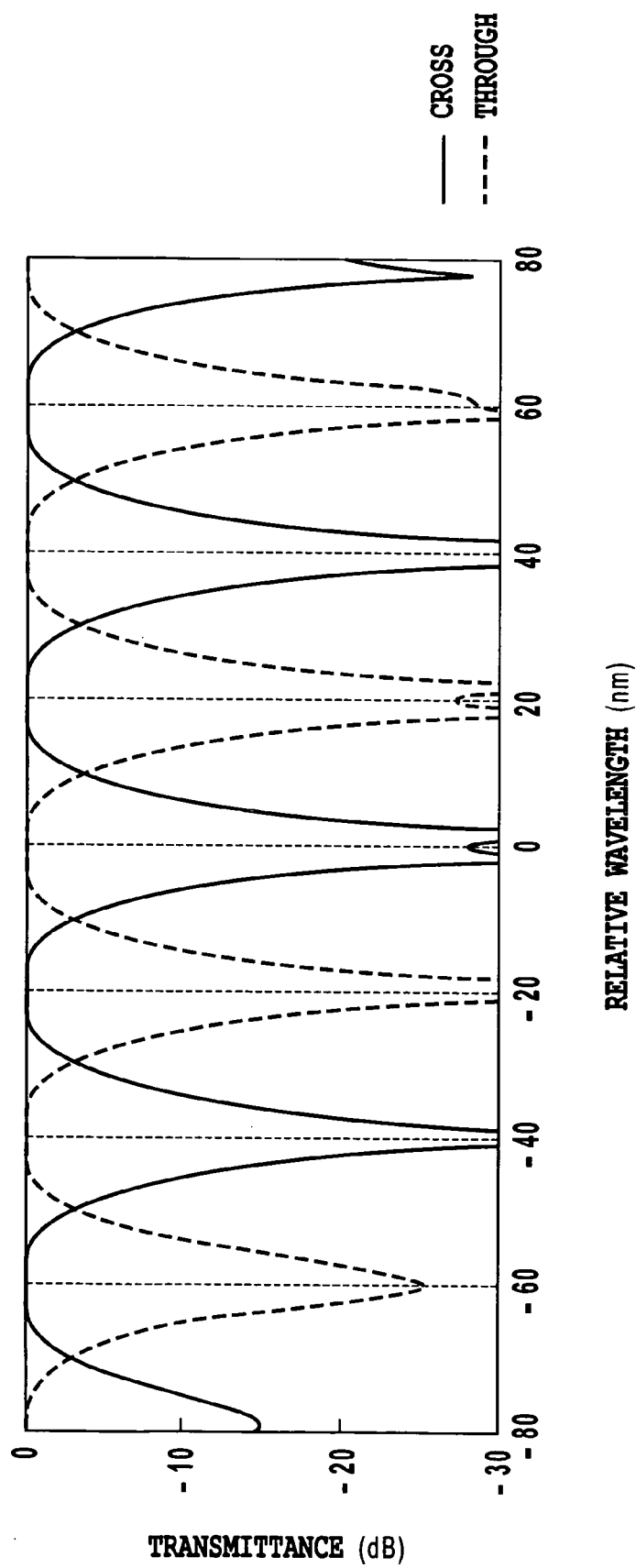
FIG. 46 is a diagram showing the relative wavelength dependence of the transmission characteristics of the uniform-wavelength-period interleave filter in the eighth embodiment of the present invention.

FIG. 46 shows the transmission characteristics of the lattice-type interleave filter of the present invention. The characteristic relating to light which is input through the input waveguide 102 and output through the output waveguide 103 is indicated as "CROSS", while the characteristic relating to light which is input through the input waveguide 102 and output through the output waveguide 104 is indicated as "THROUGH". The uniform-wavelength-interval interleave filter having a uniform wavelength period of 40 nm, i.e., a channel period of 20 nm, was realized by using the principle of the present invention.

In the uniform-wavelength-period interleave filter of the present invention, no loss and no crosstalk due to axial deviation occurred since there is no axial deviation from the CWDM grid. Therefore, the interleave filter of the present invention is most suitable for use as an optical multi/demultiplexing circuit for the CWDM system.

Thus, in this embodiment, a uniform-wavelength-period optical multi/demultiplexing circuit was realized in such a manner that in an interferometer-type optical circuit constituted by a phase generating optical coupler having at least one input and at least two outputs and an optical delay line coupled to the phase generating optical coupler, a phase designed to obtain a uniform-wavelength-period characteristic was applied to the optical delay line by a phase generating device.

To be more specific, a phase generating optical coupler characterized in that the output phase difference varies with respect to a passband was used as the phase generating device. More concretely, a lattice-form filter type phase generating optical coupler was used as the phase generating optical coupler, and the parameters for designing the phase generating optical coupler were optimized so that the optical coupler had the desired phase and amplitude coupling ratio, thus achieving success in enabling the phase generating optical coupler to function as desired. A conventional lattice-form-filter-type interleave filter was transformed into a uniform-wavelength-period lattice-form-filter-type interleave filter as an example of an optical multi/demultiplexing circuit.

The optical multi/demultiplexing circuit of the present invention, usable in a single state, may be used in a state of being connected to another optical circuit such as arrayed waveguide gratings, or in a state of being integrated with another optical circuit such as arrayed waveguide gratings on one chip so as to form an optical multi/demultiplexing module, as described above in the description of the fourth embodiment of the present invention. The uniform-wavelength-period optical multi/demultiplexing circuit of the present invention may be combined with a conventional optical circuit in this manner.

An arrayed waveguide grating, i.e., an interferometer constituted by an optical multi/demultiplexing device (slab waveguide) and an optical delay line (array waveguide), is an optical circuit which operates on a principle different from the principle on which the optical delay line circuit used in each embodiment of the present invention operates. Therefore, the optical characteristics of the arrayed waveguide grating differ from those of the optical delay line circuit of the present invention. Ordinarily, the optical characteristics of the arrayed waveguide are uniformly periodic with respect to wavelength period. It is known that the arrayed waveguide grating can be made uniformly periodic with respect to frequency by using a method different from that in the present invention.

Figure 47:
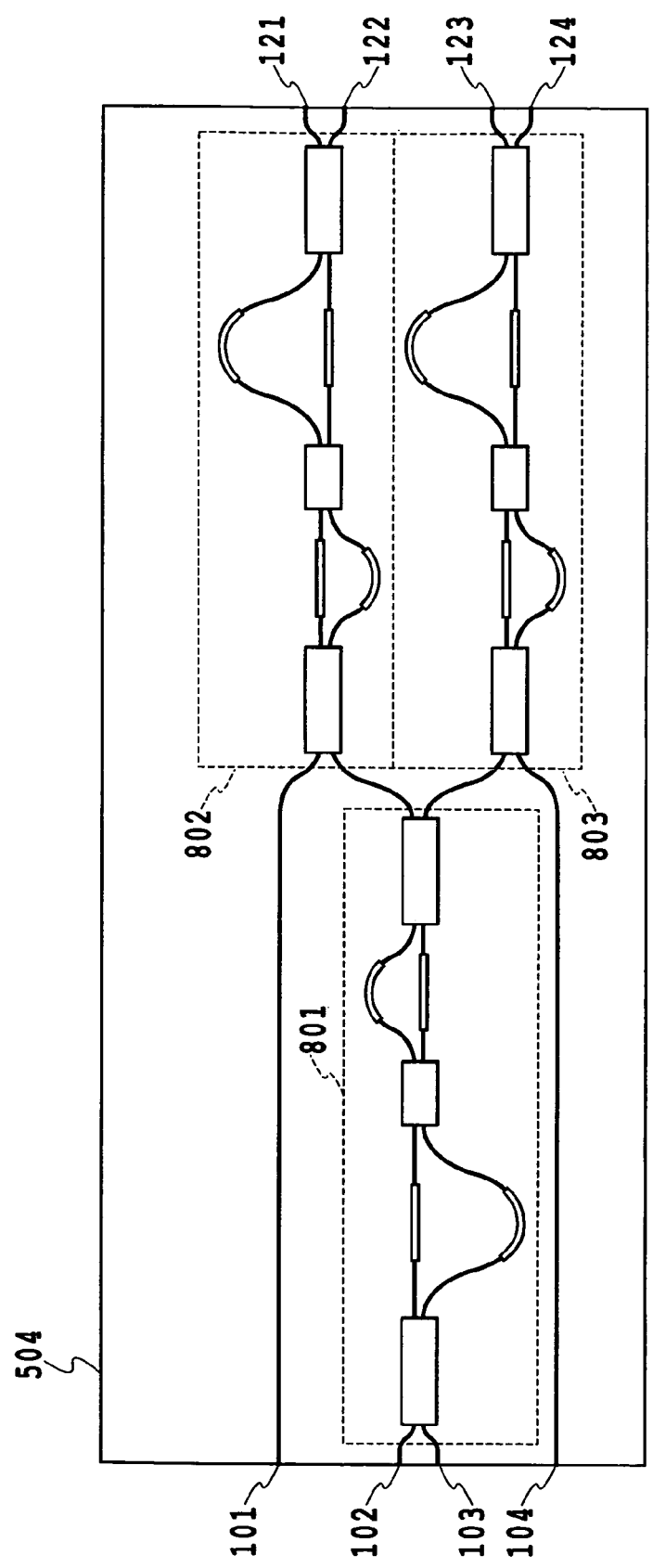
FIG. 47 is a diagram schematically showing a cascaded optical multi/demultiplexing circuit in the eighth embodiment of the present invention.

A method of cascading circuits to reduce crosstalk and wavelength dispersion in a conventional lattice-form interleave filer has been reported (see, M. Oguma et al., OFC 2002 TuK3). The same effect can be obtained by cascading uniform-wavelength-period multi/demultiplexing circuits in accordance with the present invention as shown in FIG. 47. The circuit is arranged so that when an optical signal is input through an input waveguide 103, it is output through an output waveguides 122 and 124. Also, the circuit is designed so that the center wavelength of an optical multi/demultiplexing circuit 801 in a front stage and the center wavelength of optical multi/demultiplexing circuits 802 and 803 in a rear stage differ by the half-wavelength value. Needless to say, other input and output ports may be used and there are a number of methods for cascading. Optical multi/demultiplexing circuits in accordance with the present invention may be cascaded in any configuration.

If the wavelength period of the optical multi/demultiplexing circuit 801 in the front stage and the wavelength period of the optical multi/demultiplexing circuits 802 and 803 in the rear stage are made different, a 1×4 interleave filter uniformly periodic with respect to wavelength, as described above in the description of the fifth embodiment can be realized. Needless to say, any P-input Q-output multi/demultiplexing circuit may be formed.

This embodiment is only an example of a possible use of a phase generating device to modify the optical characteristics of the conventional optical multi/demultiplexing circuits.

Ninth Embodiment

The embodiments of the present invention have been described with respect to the optical multi/demultiplexing circuits used mainly in a wavelength region. However, the principle of the present invention can be applied not only in a wavelength region but also in an optical frequency region. This embodiment will be described with respect to an example of such an application.

As described above in the description of the sixth embodiment, the transmission characteristics of an optical delay line circuit constituted by optical couplers and optical delay lines can be expressed by the following equation:

$$X(f) = \sum_{q=0}^{N} x_q \exp\left(\frac{-j2\pi q n \Delta L}{c} f\right) \quad (22)$$

where n is a refractive index having an optical frequency dependence, $\Delta L$ is the path length difference, c is the speed of light, and f is the optical frequency. A conventional optical delay line circuit is uniformly periodic in an optical frequency region, and its transmission characteristics are characterized by an optical frequency period $\Delta f$ and a center optical frequency fc. However, only the optical path length difference $\Delta L$ can be set freely in the conventional optical delay line circuit. Therefore, the optical frequency period $\Delta f$ and the center optical frequency fc cannot be set simultaneously; only one of them can be set.

More specifically, the path length difference $\Delta L$ is related to the optical frequency period $\Delta f$ and the center optical frequency fc as shown by the following two equations:

$$\Delta L = \frac{c}{N_g \cdot \Delta f} \quad (23)$$

$$\Delta L = \frac{c \cdot m}{n \cdot f_c} \quad (24)$$

where m is an integer and Ng is a group refractive index. Equations (23) and (24) are substituted in equation (22) to obtain the following equations for the transmission characteristics:

$$X(f) = \sum_{q=0}^{N} x_q \exp\left(\frac{-j2\pi q n}{N_{gc} \cdot \Delta f} f\right) \quad (25)$$

$$X(f) = \sum_{q=0}^{N} x_q \exp\left(\frac{-j2\pi q n m}{n_c \cdot f_c} f\right) \quad (26)$$

where nc is the refractive index at the center optical frequency, Ngc is the group refractive index at the center optical frequency. According to equation (25), the optical frequency period can be set to an arbitrary value and an optical multi/demultiplexing circuit uniformly periodic with respect to frequency and having the optical frequency period $\Delta f$ can be formed. However, the center optical frequency cannot be set. On the other hand, according to equation (26), the center optical frequency can be set to an arbitrary value and an optical multi/demultiplexing circuit uniformly periodic with respect to frequency and having the center optical frequency fc can be formed. However, the optical frequency period cannot be set.

Figure 48A:
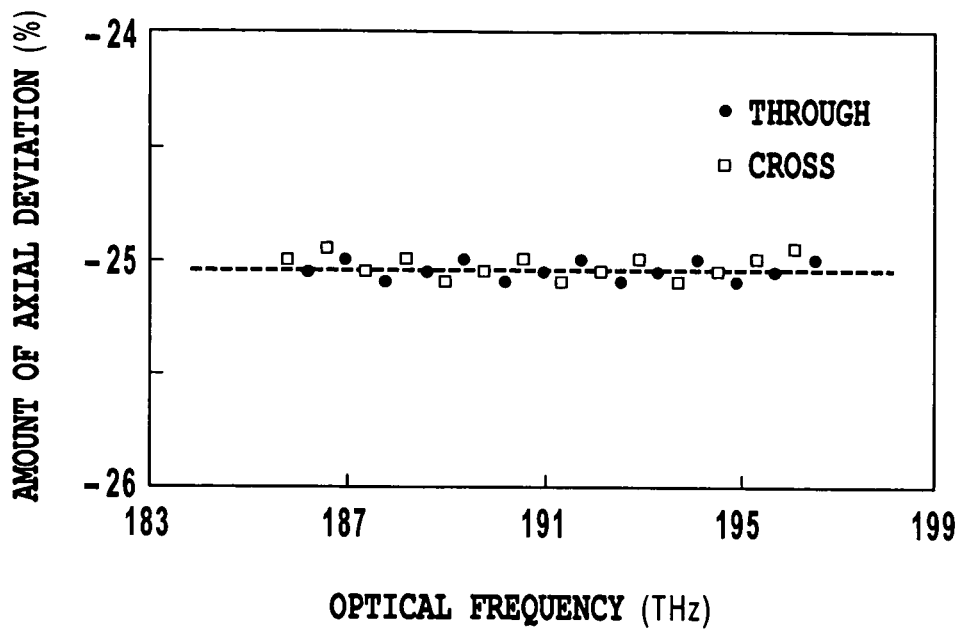
FIG. 48A is a diagram showing the amount of axial deviation from an optical frequency grid of the center position of the passband in the transmission characteristics of a conventional Mach-Zehnder interferometer when an optical frequency period is set.
Figure 48B:
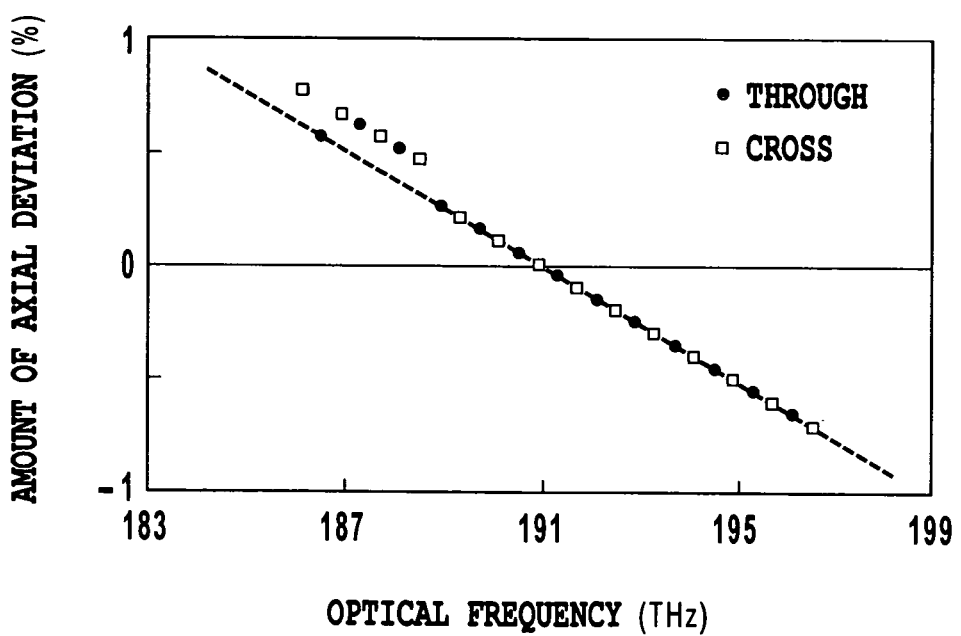
FIG. 48B is a diagram showing the amount of axial deviation from the optical frequency grid of the center position of the passband in the transmission characteristics of the conventional Mach-Zehnder interferometer when a center optical frequency is set.

FIGS. 48A and 48B shows a concrete example of the deviation from an optical frequency grid of the center point of the passbands in the transmission characteristics of a conventional Mach-Zehnder interferometer having an optical frequency period of 800 GHz. Here, the optical frequency grid is assumed to have a center optical frequency of 191 THz and an optical frequency period of 800 GHz.

FIG. 48A shows the amount of axial deviation in the case of designing using equation (25), and FIG. 48B shows the amount of axial deviation in the case of designing using equation (26). Referring to FIG. 48A, the amount of axial deviation is constant with respect to the optical frequency since the optical frequency period is set at 800 GHz, but the amount of axial deviation from the optical frequency grid is large since the center optical frequency cannot be set. Referring to FIG. 48B, the amount of deviation from the optical frequency grid is zero at the center of the frequency region since the center optical frequency is set at 191 THz, but the amount of axial deviation from the optical frequency grid is large at both ends of the frequency region.

Thus, the conventional optical delay line circuit is ordinarily capable of setting either the optical frequency period $\Delta f$ or the center optical frequency fc, but incapable of simultaneously setting both of them at arbitrary values. Needless to say, in a special case where $f_c = m_s N_{gc} \Delta f/n_c$ (ms: an integer) is satisfied, both the optical frequency period $\Delta f$ and the center optical frequency fc can be set simultaneously. However, both the optical frequency period $\Delta f$ and the center optical frequency fc can be set only in such a special case.

In this embodiment, a phase generating device having an optical frequency dependence is applied to enable both the optical frequency period $\Delta f$ and the center optical frequency fc to be set simultaneously at arbitrary values, as described below. The transmission characteristics of the optical delay line circuit of the present invention can be expressed as:

$$X(f) = \sum_{q=0}^{N} x_q \exp\left\{-j2\pi q \left[\frac{n \Delta L'}{c} f - \Psi(f)\right]\right\} \quad (27)$$

where c is the speed of light, $\Delta L'$ is the path length difference of the optical delay line, and $\Psi(f)$ is the phase generated by the phase generating device. From this equation, it can be understood that the transmission characteristics of the optical multi/demultiplexing circuit can be freely changed by suitably setting the phase $\Psi(f)$ having an optical frequency dependence. In this embodiment, a uniform-frequency-period optical delay line circuit having a transmission spectrum with optical frequency period $\Delta f$ and center optical frequency fc, for example, is to be obtained. Therefore, the nonlinear phase $\Psi(f)$ shown by the following equation may be applied to the optical delay line of the optical delay line circuit.

$$\Psi(f) = \left[\frac{n(\Delta L + \delta L)}{c} - \frac{1}{\Delta f}\right]f - \left(m_c - \frac{f_c}{\Delta f}\right) \quad (28)$$

where $\delta L$ ($=\Delta L' - \Delta L$) is a microscopic path length difference, $\Delta L$ is the path length difference of the conventional Mach-Zehnder interferometer, and mc is an integer.

The above-described principle is applied to a conventional Mach-Zehnder interferometer, which is an example of an optical delay line circuit, to realize a uniform-frequency-period optical delay line circuit having an arbitrary optical frequency period and center frequency, as described below. In this embodiment, a phase generating optical coupler is used as a phase generating device to generate an optical-frequency-dependent phase, whereby the desired optical characteristics are realized.

Figure 49:
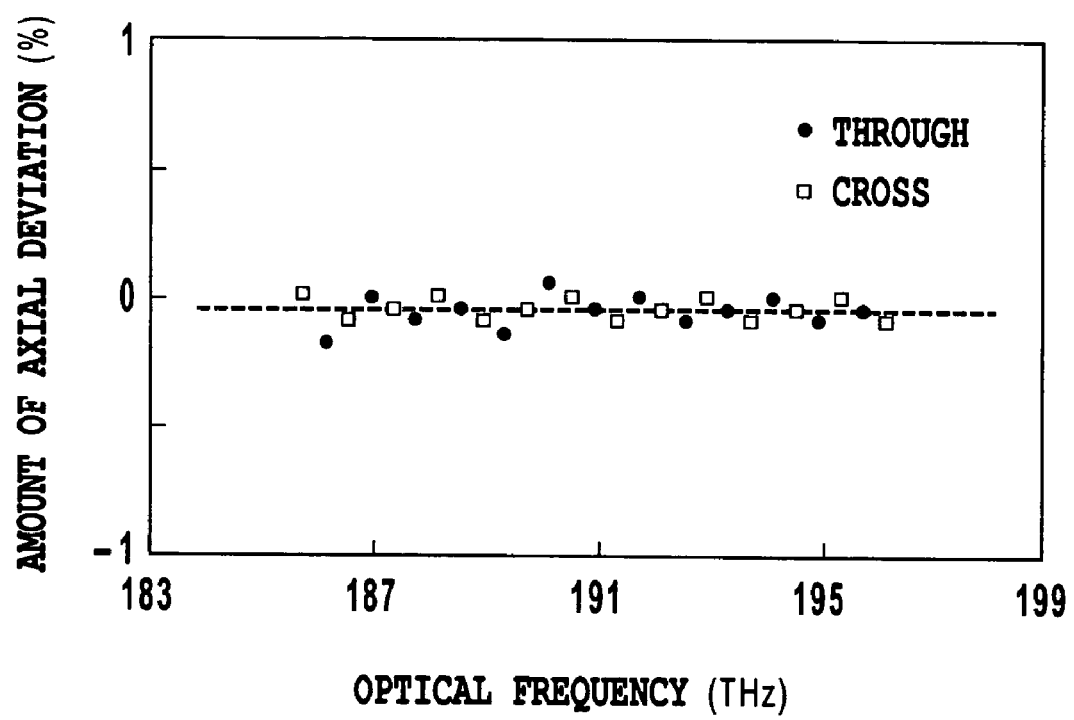
FIG. 49 is a diagram showing the amount of axial deviation from the optical frequency grid of the center position of the passband in the transmission characteristics of a Mach-Zehnder interferometer of the present invention in a ninth embodiment of the present invention.

FIG. 49 shows a concrete example of the deviation from an optical frequency grid of the center point of the passband in the transmission characteristics of the Mach-Zehnder interferometer having an optical frequency period of 800 GHz when the phase expressed by equation (28) is applied to the optical delay line of the Mach-Zehnder interferometer. It can be understood that since the center optical frequency is set at 191 THz and the optical frequency period is set at 800 GHz, the center point just coincides with the optical frequency grid so the axial deviation from the optical frequency grid is eliminated.

An interferometer type phase generating optical coupler constituted by optical couplers and optical delay lines was used. More specifically, in this embodiment, a lattice-form filter type optical multi/demultiplexing device constituted by M+1 (M: an integer equal to or larger than 1) optical couplers and M optical delay lines each interposed between adjacent pairs of the optical couplers.

The advantage of using an optical multi/demultiplexing device of this construction as a phase generating device resides in that the lattice-form filter theoretically has no loss, and that it is possible to make the optical multi/demultiplexing device function as a phase generating optical coupler by suitably setting the power coupling ratios (amplitude coupling ratios) of the M+1 optical couplers and the optical path length differences of the M optical delay lines. Also, a directional coupler formed of two optical waveguides placed close to each other is used as each optical coupler.

The transfer matrix of the n-th two-input two-output lattice-form-filter-type phase generating optical coupler of the optical multi/demultiplexing circuit in accordance with the present invention can be written as equation (12) shown above in the description of the sixth embodiment. In the equation, z is a complex variable replaced for exp(jωδl/c).

In the equation (12), $S_{n,p}$ (p=1 to $M_n$) is the transfer matrix of the fundamental circuit component formed of the p-th optical coupler and the p-th optical delay line:

$$S_{n,p} = \begin{pmatrix} \cos\theta_{n,p}\exp\left(\frac{-j\pi f \delta l_{n,p}}{c}\right) & -j\sin\theta_{n,p}\exp\left(\frac{-j\pi f \delta l_{n,p}}{c}\right) \\ -j\sin\theta_{n,p}\exp\left(\frac{j\pi f \delta l_{n,p}}{c}\right) & \cos\theta_{n,p}\exp\left(\frac{j\pi f \delta l_{n,p}}{c}\right) \end{pmatrix} \quad (29)$$

where $\theta_{n,p}$ is the amplitude coupling ratio of the p-th optical coupler in the n-th lattice-form-filter-type phase generating optical coupler, more specifically the angular expression of the optical-frequency-dependent amplitude coupling ratio.

The phase applied to the optical delay line of the Mach-Zehnder interferometer with the phase difference created by the phase generating optical couplers is shown by $$\Phi[\phi_1(f), \phi_2(f)] = \frac{\{\arg\lfloor -F_{1*}(z)\rfloor + \arg\lfloor F_2(z)\rfloor - \arg\lfloor H_{1*}(z)\rfloor - \arg\lfloor H_{2*}(z)\rfloor\}}{2\pi} \quad (30)$$

In the Mach-Zehnder interferometer of the present invention having an arbitrary optical frequency period and center optical frequency, one of the two optical couplers may be formed as a phase generating optical coupler or both of the two optical couplers may be formed as a phase generating optical coupler. In this embodiment, two phase generating optical couplers identical with each other were used and were placed so as to be line-symmetric about the middle point of the optical delay line of the Mach-Zehnder interferometer, as described above in the description of the first embodiment.

In this case, since the relations $H_{1*}(z)=H_{2*}(z)=H_*(z)$ and $-F_{1*}(z)=F_2(z)=-F_*(z)$ are satisfied, equation (30) can be simplified into:

$$\Phi[\phi_1(f), \phi_2(f)] = \frac{\{\arg\lfloor -F_*(z)\rfloor - \arg\lfloor H_*(z)\rfloor\}}{\pi} \quad (31)$$

Therefore, the Mach-Zehnder interferometer capable of simultaneously setting the optical frequency period Δf and the center optical frequency fc at arbitrary values can be realized by setting the phase generating optical couplers so that the phase generated by the phase generating optical couplers as shown by equation (31) is identical to equation (28), and so that the phase generating optical couplers function as 3-dB optical couplers having an amplitude coupling ratio of 0.5.

In this embodiment, the phase generating optical couplers are placed so as to be line-symmetric about the center of the optical delay line of the Mach-Zehnder interferometer. As a result of the optimization, each phase generating optical coupler was formed as a three-stage lattice-form filter. If the number of parameters was smaller, the phase generating optical coupler will become easier to fabricate. Accordingly, $\theta_{1,1}(\lambda)=\theta_{1,2}(\lambda)=\theta_{1,3}(\lambda)=\theta_{2,1}(\lambda)=\theta_{2,2}(\lambda)=\theta_{2,3}(\lambda)=\theta(\lambda)$ was set as a restrictive condition for optimization.

Needless to say, this restrictive condition is not necessary for derivation of parameters for the design of the phase generating optical coupler, and other restrictive conditions may be set. Also, the two phase generating optical couplers of the Mach-Zehnder interferometer may be designed differently from each other, and only one of them may be designed to function as a phase generating device. While a three-stage lattice-form filter was used as a phase generating optical coupler having a phase generating function in this embodiment, a two-stage lattice-form filter, a lattice-form filter having four or more stages or one-stage lattice-form filter, i.e., a Mach-Zehnder interferometer, may alternatively be used. Needless to say, any other optical multi/demultiplexing device may be made to function as the phase generating optical coupler.

Furthermore, a variable may be introduced into the target phase function to facilitate the approximation because there will be a larger flexibility in the design parameters of the phase generating optical coupler. Therefore, a variable $\delta L_1$ was introduced into the phase function for approximation. Needless to say, the variable is not indispensable to design the phase generating optical coupler, and a variable other than this may be used. The reason for incorporating $\delta L_1$ is that the variable can be easily reflected into the optical multi/demultiplexing circuit simply by setting the path length difference of the optical delay line of the optical multi/demultiplexing circuit at $\Delta L_1'(=\Delta L_1+\delta L_1)$.

The amplitude coupling ratios of the optical couplers constituting the phase generating optical coupler, the optical path length differences of the optical delay lines constituting the phase generating optical coupler and the variable $\delta L_1$ were optimized by the conjugate gradient method so that the generated phase difference $\Phi_1(\lambda)$ and the target phase $\Psi_1(\lambda)$ coincided with each other and the amplitude coupling ratio was 0.5.

Figure 50A:
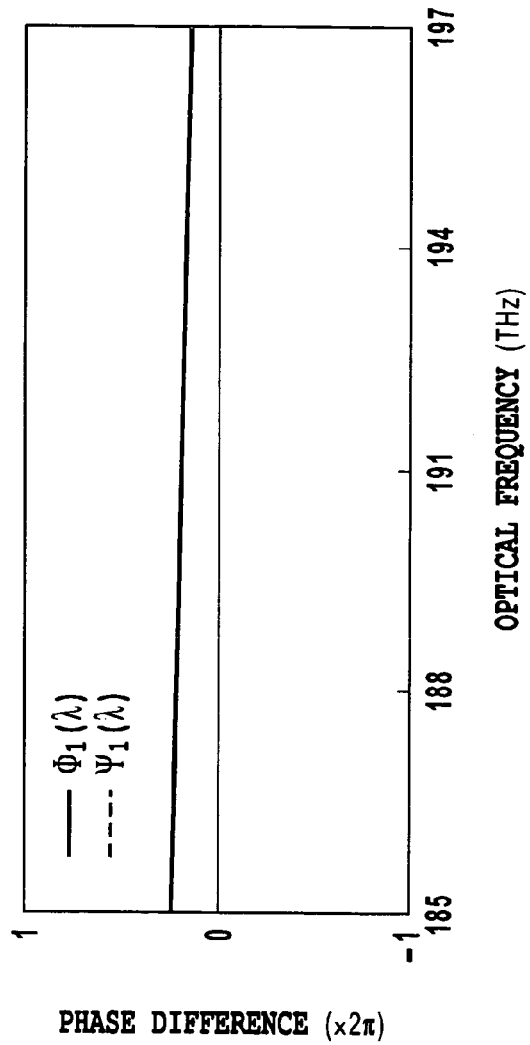
FIG. 50A a diagram showing the relative frequency dependences of the phase difference output from the phase generating optical couplers and the target phase.
Figure 50B:
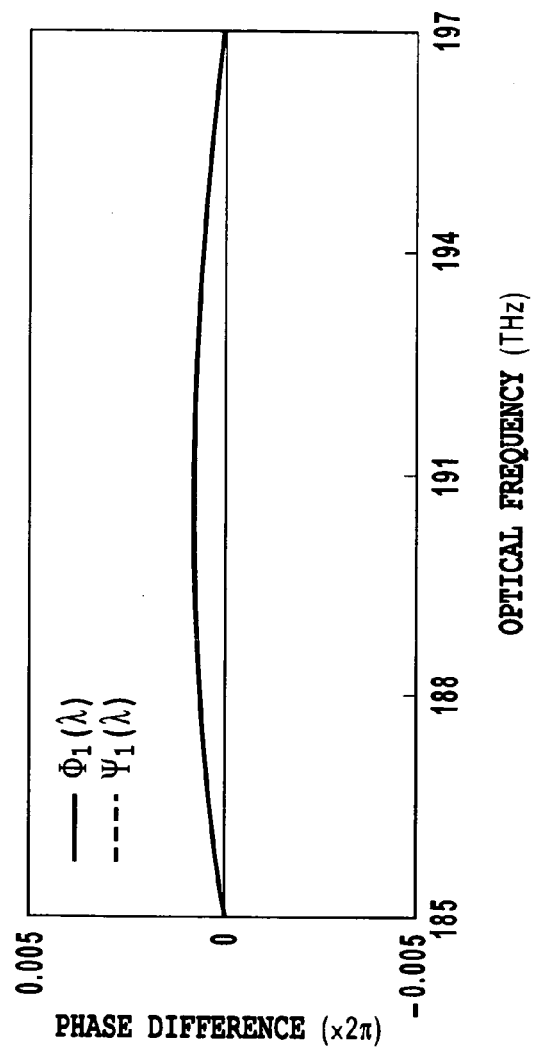
FIG. 50B is a diagram showing the relative frequency dependence of a nonlinear portion of the phase difference output from the phase generating optical couplers and the target phase.

As a result of the optimization, the phase difference $\Phi_1(\lambda)$ shown in FIG. 50A was produced by the phase generating optical couplers 111 and 112 and the phase $\Psi_1(\lambda)$ was suitably approximated. FIG. 50B shows the non-linear term of the phase extracted from FIG. 50A. A good correspondence between the target phase and the phase created by the phase generating optical coupler can be recognized.

Figure 51:
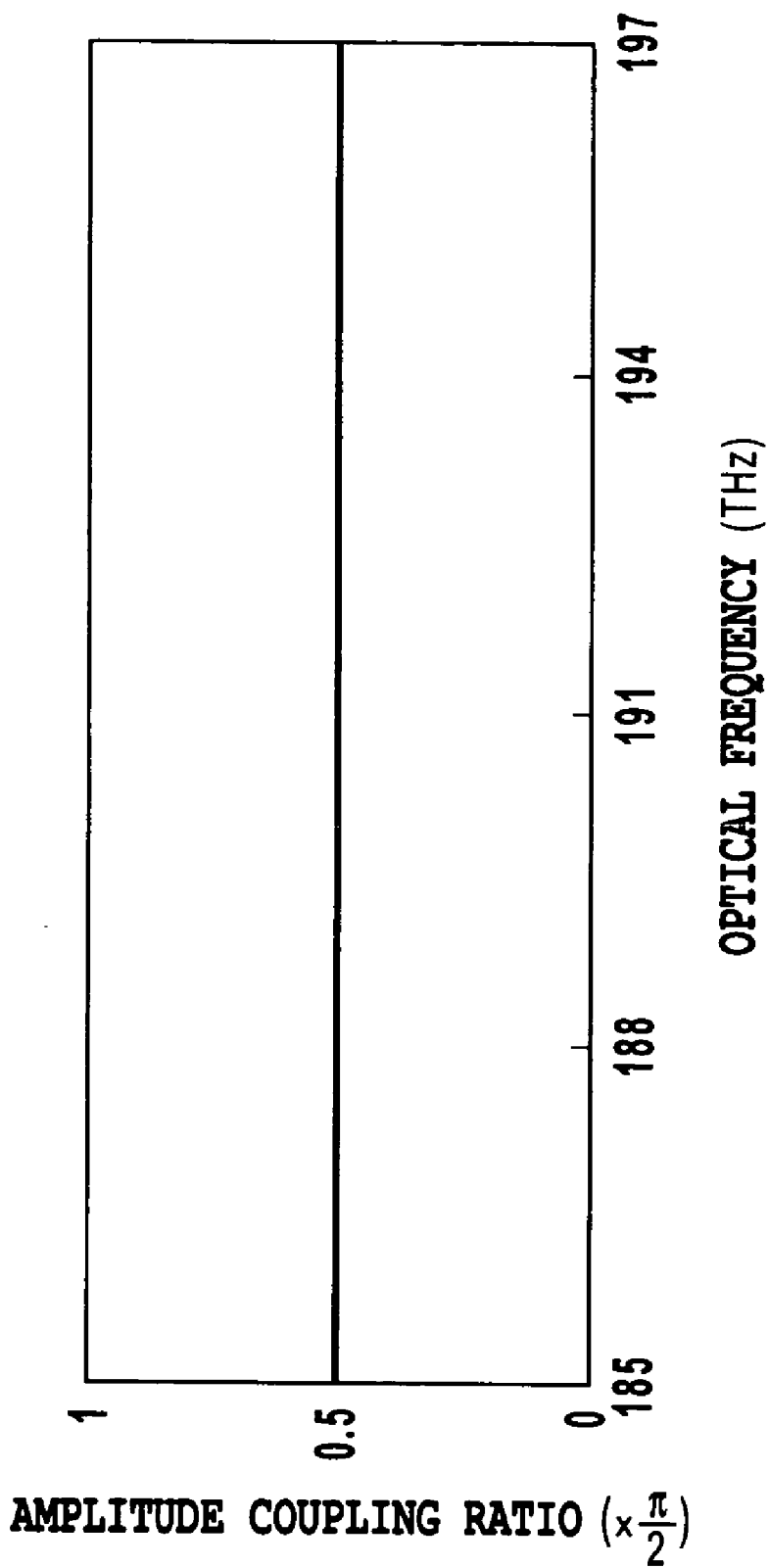
FIG. 51 is a diagram showing the relative frequency dependence of the amplitude coupling angle when the phase generating optical couplers are used as optical couplers.

Also, the phase generating optical couplers were capable of functioning as an optical coupler having an amplitude coupling ratio of 0.5, as shown in FIG. 51.

Figure 52:
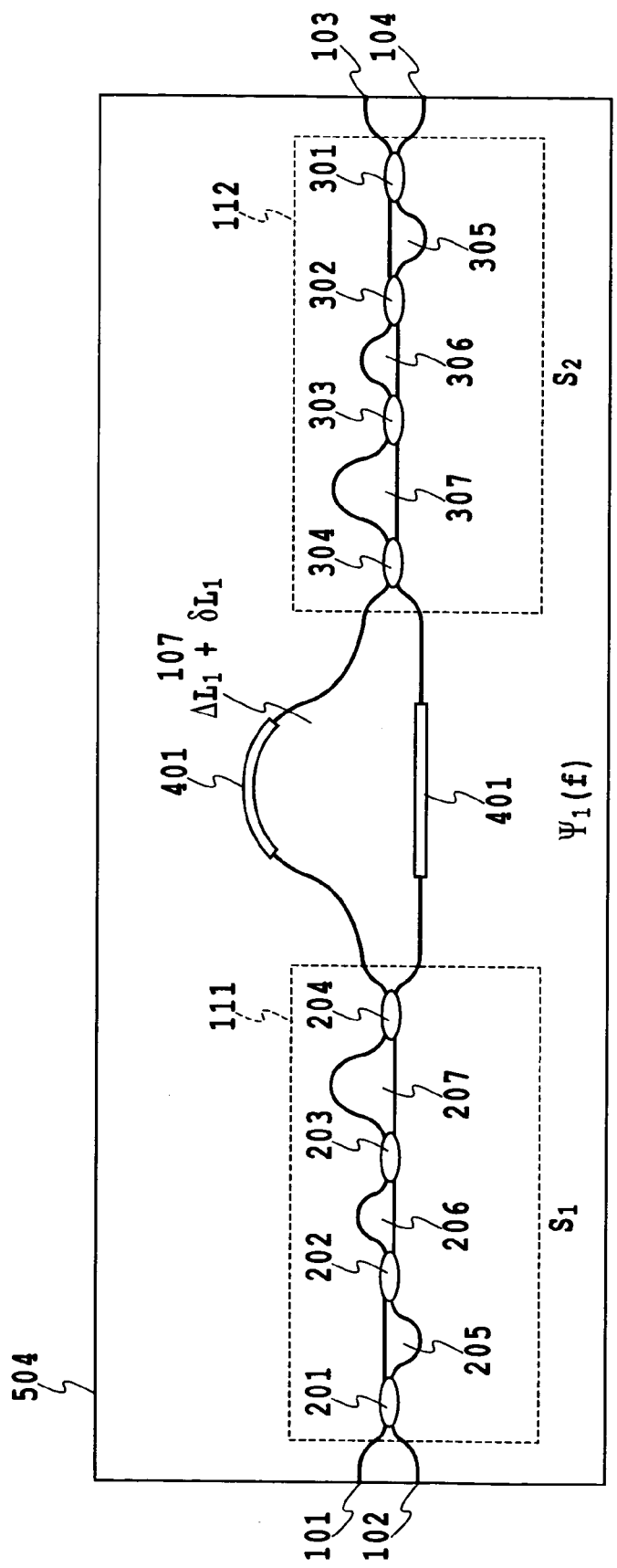
FIG. 52 is a diagram schematically showing the Mach-Zehnder interferometer in which the optical frequency period and the center optical frequency are set in the ninth embodiment of the present invention.

FIG. 52 is a diagram schematically showing the fabricated Mach-Zehnder interferometer in accordance with the present invention. The amplitude coupling ratio of each optical couplers 201 to 204, and 301 to 304 constituting the phase generating optical couplers 111 and 112 was set at $\theta(\lambda_c)=0.3$; the optical path length difference of each optical delay lines 205 and 305 of the phase generating optical couplers 111 and 112 was set at $\delta l_1=-0.2\lambda_c$; the optical path length difference of each optical delay lines 206 and 306 was set at $\delta l_2=0.3\lambda_c$; and the optical path length difference of each optical delay lines 207 and 307 was set at $\delta l_3=0.6\lambda_c$.

The path length difference of the optical delay line 107 of the Mach-Zehnder interferometer formed of two optical delay elements was set at $\Delta L_1'=\Delta L_1+\delta L_1$. $\Delta L_1$ is the path length difference of the optical delay line of the conventional Mach-Zehnder interferometer. The path length difference added to the optical delay line was set at $\delta L_1=-1.1\lambda_c$.

The above-described optical multi/demultiplexing circuit was fabricated by forming silica-based optical waveguides on a silicon substrate 504 by flame hydrolysis deposition, photolithography, and reactive ion etching. After the formation of the optical waveguides, thin film heaters having a width of 70 μm and a heater length of 2 mm were formed as a path length difference adjusting device 401 on the optical waveguides, and the refractive indices of the waveguides were changed by using the thin film heaters to correct fabrication errors of the optical path length differences of the optical delay lines. The waveguides were made so as to have a relative refractive index difference of 0.75%, a core thickness of 7 μm and a core width of 7 μm. The chip on which this Mach-Zehnder interferometer was fabricated was cut out by dicing, and an optical module was assembled by connecting single-mode fibers to the input and output waveguides.

Figure 53:
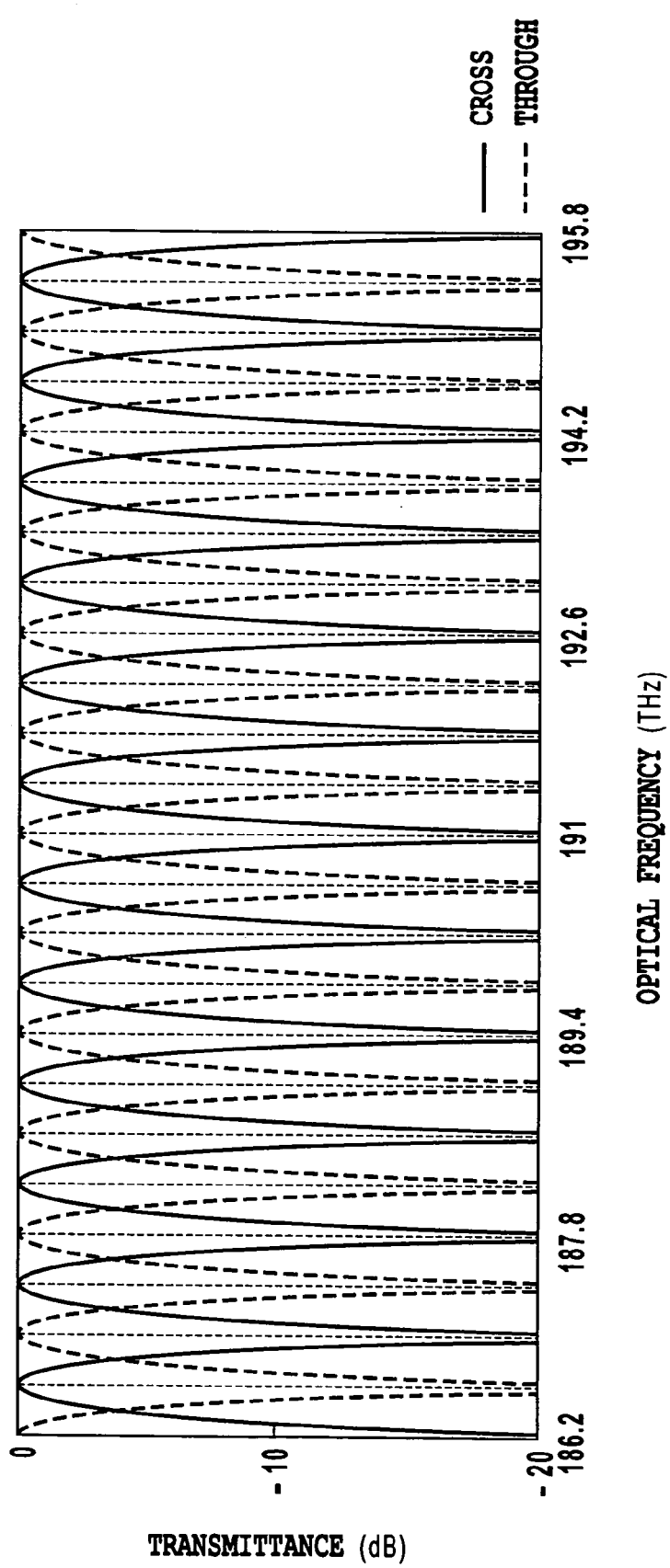
FIG. 53 is a diagram schematically showing the Mach-Zehnder interferometer in which the optical frequency period and the center optical frequency are set in the ninth embodiment of the present invention.

FIG. 53 shows the optical characteristics of the fabricated Mach-Zehnder interferometer module of the present invention. The characteristic relating to light which is input through the input waveguide 102 and output through the output waveguide 103 is indicated as "CROSS", while the characteristic relating to light which is input through the input waveguide 102 and output through the output waveguide 104 is indicated as "THROUGH". The optical multi/demultiplexing circuit having an optical frequency period of 800 GHz and a center optical frequency of 191 THz was realized by using the principle of the present invention. Needless to say, the optical frequency period and the center frequency may be set at 100 GHz and 191 THz, respectively, for adaptation to the ITU grid.

Figure 54:
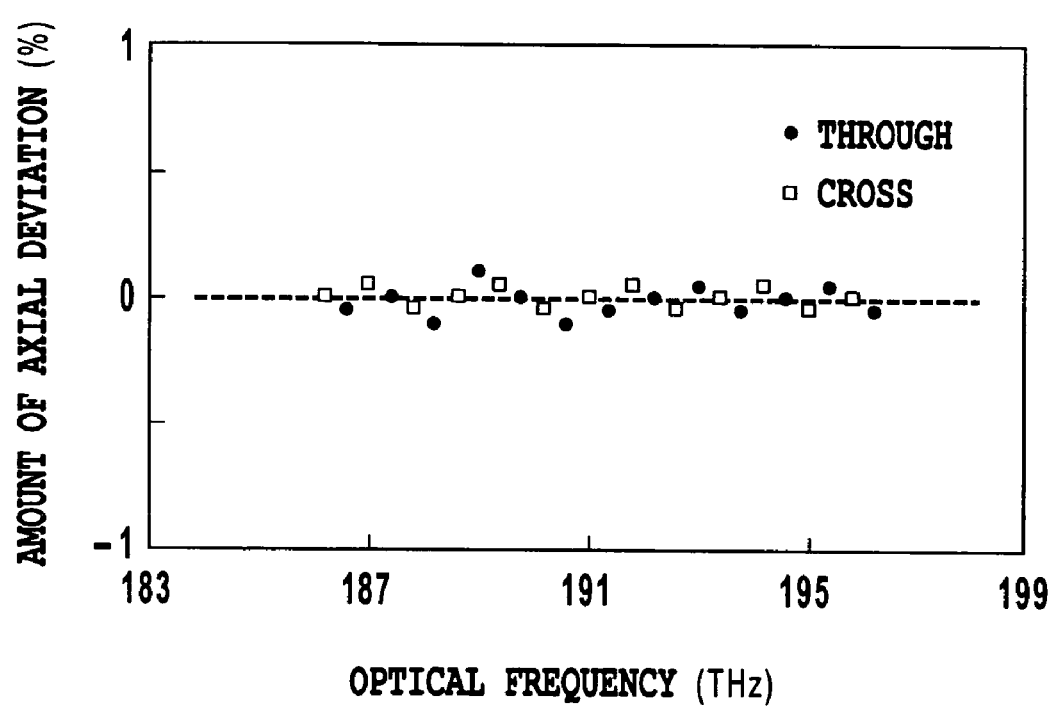
FIG. 54 is a diagram showing the amount of axial deviation from the optical frequency grid of the center position of the passband in the transmission characteristics of the Mach-Zehnder interferometer of the present invention in the ninth embodiment of the present invention.

FIG. 54 shows the deviation of the center point of the passbands of the Mach-Zehnder interferometer from an optical frequency grid (having an optical frequency period of 800 GHz and a center optical frequency of 191 THz) with respect to the optical frequency. No axial deviation occurred in the Mach-Zehnder interferometer of the present invention, and the characteristics shown in FIG. 49 were realized, as expected from the theory.

Thus, in this embodiment, an optical multi/demultiplexing circuit capable of simultaneously setting the optical frequency period and the center optical frequency to arbitrary values was realized in such a manner that in an interferometer-type optical circuit constituted by a phase generating optical coupler having at least one input and at least two outputs and an optical delay line coupled to the phase generating optical coupler, an optical-frequency-dependent phase was applied to the optical delay line by a phase generating device.

To be more specific, a phase generating optical coupler characterized in that the output phase difference varies with respect to a passband (having an optical frequency dependence) was used as the phase generating device. More concretely, a lattice-form filter type phase generating optical coupler was used as the phase generating optical coupler, and the parameters for designing the phase generating optical coupler were optimized so that the optical coupler had the desired phase and amplitude coupling ratio, thus achieving success in enabling the phase generating optical coupler to function as desired. The present invention is useful not only in the wavelength region but also in the optical frequency region.

Needless to say, the above-described series of design algorithms for the process of deriving the phase for realization of the desired characteristics and optimizing the parameters for designing the phase generating optical coupler by numerical analysis is one possible method for implementation of the present invention, and any other method, e.g., a method such as those described in the first embodiment where the target phase was derived directly from the transmittance spectra, may be used.

The target phase function is not limited to the one described in this embodiment, and other phase functions can be used to obtain the desired characteristics. Moreover, the present invention is not limited to optical multi/demultiplexing circuit capable of setting the optical frequency period and the center optical frequency simultaneously at arbitrary values. For example, the phase may be designed such that the frequency periods are different at different frequency regions.

Further, the way in which the phase is expressed is not uniquely determined. A plurality of ways of expression are possible for realization of the same characteristic. For example, the phase can be expressed as:

$$\Psi(f) = \left[\frac{n(\Delta L + \delta L)}{c} - \frac{1}{\Delta f}\right]f + \frac{m_c'}{2} \qquad (32)$$

when $f_c=m_s'\Delta f/2$.

Figure 55:
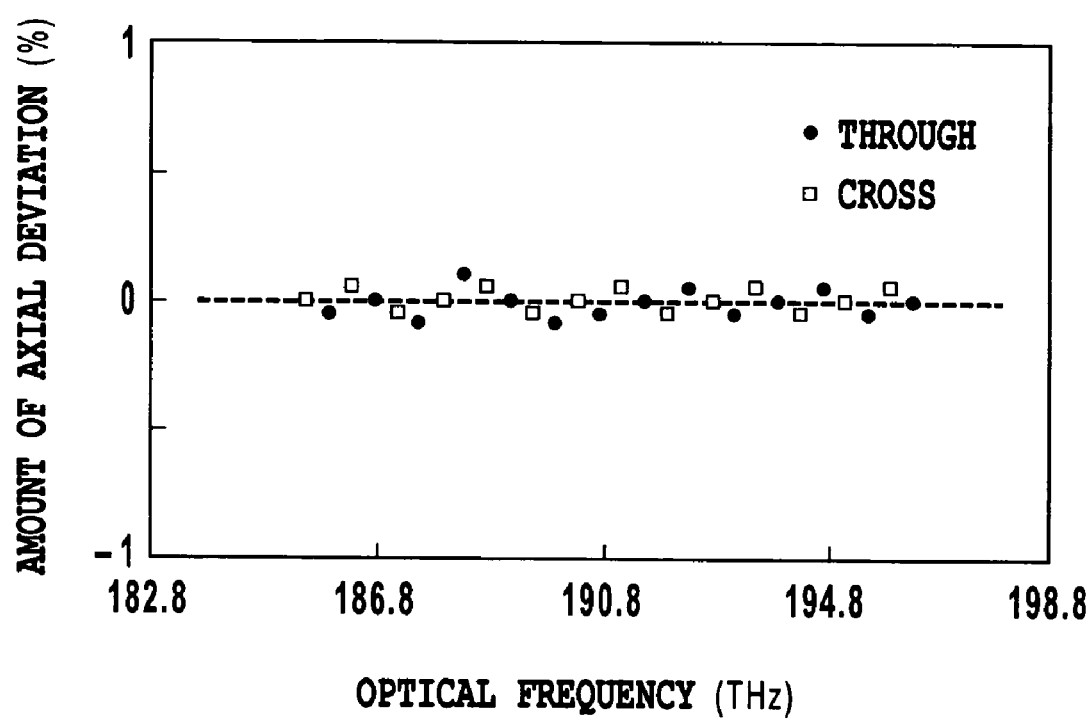
FIG. 55 is a diagram showing the amount of axial deviation from the optical frequency grid of the center position of the passband in the transmission characteristics of the Mach-Zehnder interferometer of the present invention in the ninth embodiment of the present invention.

FIG. 55 shows the deviation from an optical frequency grid of the center point of the passband in the transmission characteristics of a Mach-Zehnder interferometer having an optical frequency period of 800 GHz when the phase set as described above is applied to the optical delay line of the Mach-Zehnder interferometer. The center optical frequency and the optical frequency period of the optical frequency grid are set at 190.8 THz and 800 GHz, respectively.

Equation (32) can be used since $f_c=m_s'\Delta f/2$ is satisfied. It can be understood that the center point of the passband just coincides with the optical frequency grid and the axial deviation from the optical frequency grid is zero.

This embodiment is only an example of a possible use of a phase generating device to modify the optical characteristics of the conventional optical multi/demultiplexing circuits.

Tenth Embodiment

In the above-described embodiments of the present invention, a lattice-form filter type optical multi/demultiplexing device constituted by M+1 (M: an integer equal to or larger than 1) optical couplers and M optical delay lines each interposed between adjacent pairs of the optical couplers was mainly used as a phase generating device. This is because the lattice-form filter theoretically has no loss, and because it is possible to make lattice-form filter type optical multi/demultiplexing device function as a phase generating optical coupler by suitably setting the power coupling ratios (amplitude coupling ratios) of the M+1 optical couplers and the optical path length differences of the M optical delay lines. Also, a directional coupler formed of two optical waveguides placed close to each other was used as the optical coupler because the amplitude coupling ratio of the directional coupler can be changed simply by adjusting the coupling length of the directional coupler.

However, an optical multi/demultiplexing device formed by cascading lattice-form filters or any other interferometer-type optical multi/demultiplexing device constituted by an optical coupler and an optical delay line may be used as a phase generating device. This embodiment will be described with respect to the configuration of other examples of phase generating devices. The principle of the present invention can be applied regardless of the configuration of the phase generating device, and usable phase generating devices are not limited to the described configurations in the embodiments of the present invention.

Figure 56:
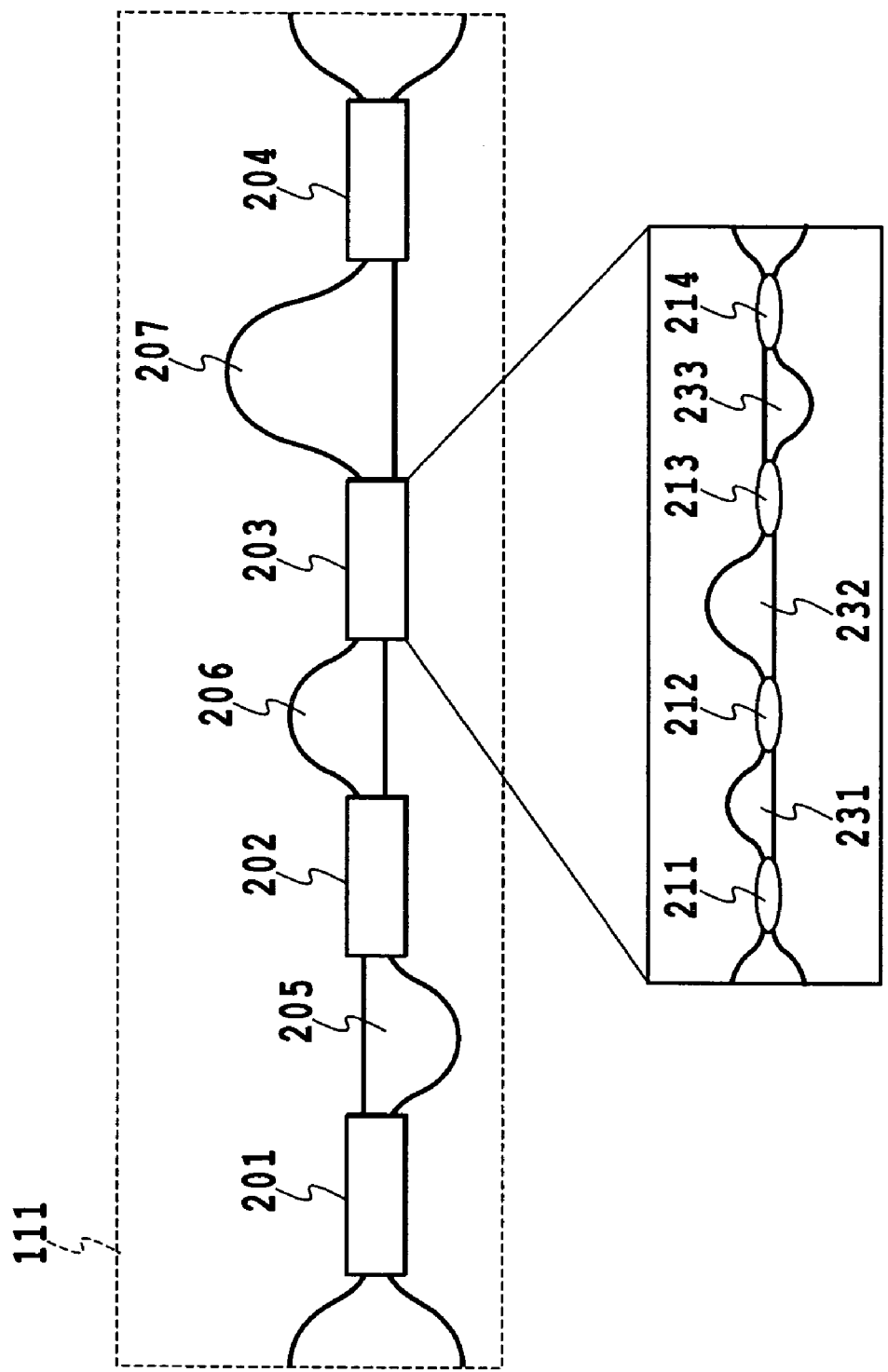
FIG. 56 is a diagram showing the configuration of a phase generating device in a tenth embodiment of the present invention.

FIG. 56 shows a phase generating device in a tenth embodiment of the present invention. This phase generating device is constituted by M+1 (M: an integer equal to or larger than 1) optical couplers 201 to 204, M optical delay lines 205 to 207 each interposed between adjacent pairs of the optical couplers 201 to 204, an input port connected to the first optical coupler 201, and an output port connected to the (M+1)-th optical coupler 204. A directional coupler formed of two optical waveguides placed close to each other was used as the optical couplers 201 to 204. Needless to say, any other kinds of coupler, e.g., a multimode interference coupler, a variable coupler, an X-branch coupler and a Y-branch coupler may be used. An interferometer type optical coupler may also be used. In this embodiment, a stabilized optical coupler capable of obtaining an amplitude coupling ratio with stability against manufacturing variation (see M. Oguma et al., OFC 2002 TuK3) was used, as shown in FIG. 56.

The stabilized optical coupler is a lattice-form circuit formed of four optical couplers (directional couplers) 211 to 214 and three optical delay lines 231 to 233), and the circuit of the stabilized optical coupler as a whole functions as a coupling element. The amplitude coupling ratio of each optical couplers (directional couplers) 211 to 214 is set at 0.5, and the optical path differences of the optical delay lines 231, 232, and 233 are set at $\lambda c/4$, $\gamma$, and $-\lambda c/4$ ($\lambda c$: center wavelength), respectively. The amplitude coupling ratio of the stabilized coulter can be set by adjusting the value of $\gamma$. If such an optical coupler is used as each optical couplers 201 to 204 constituting the phase generating optical coupler 111, the tolerance to manufacturing errors is increased.

A phase generating optical coupler was realized by optimizing the amplitude coupling ratios of the optical couplers constituting the optical multi/demultiplexing device 111, i.e., the stabilized couplers 201 to 204, and the optical path length differences of the optical delay lines 205 to 207 constituting the optical multi/demultiplexing device 111.

First Modification of Tenth Embodiment

Figure 57:
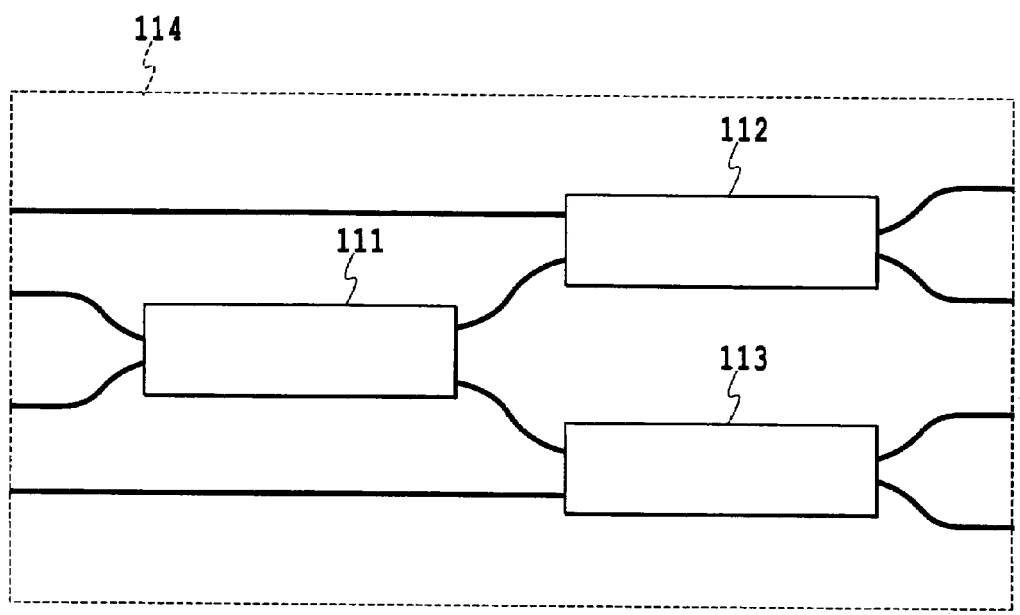
FIG. 57 is a diagram showing the configuration of a phase generating device in a first modification of the tenth embodiment of the present invention.

FIG. 57 shows a phase generating device in a first modification of the tenth embodiment of the present invention. An optical multi/demultiplexing device 114 shown in FIG. 57 is constituted by a plurality of optical multi/demultiplexing devices 111, 112, and 113. More concretely, the optical multi/demultiplexing devices 112 and 113 are connected to two output ports of the optical multi/demultiplexing device 111 in a cascading manner. The optical multi/demultiplexing device 114 is a phase generating optical coupler. Also, each of the optical multi/demultiplexing devices 111, 112, and 113 is a phase generating optical coupler. Thus, a plurality of optical multi/demultiplexing devices each functioning as a phase generating optical coupler may be used to form any P-input Q-output (P, Q: a natural number) phase generating optical coupler.

The arrangement shown in FIG. 57 is a four-input four-output phase generating optical coupler. However, any ports may be used as an input port or an output port. In the embodiments of the present invention, light is input through one input port of the phase generating optical coupler and the amplitude coupling ratio and the phase difference of light output from two output ports are used for the function of the phase generating optical coupler. However, the numbers of input and output ports are freely selected as in this embodiment. For example, in a case where four output ports are provided, the amplitude coupling ratios and the relative phase differences of light output from the output ports can be defined.

Figure 58:
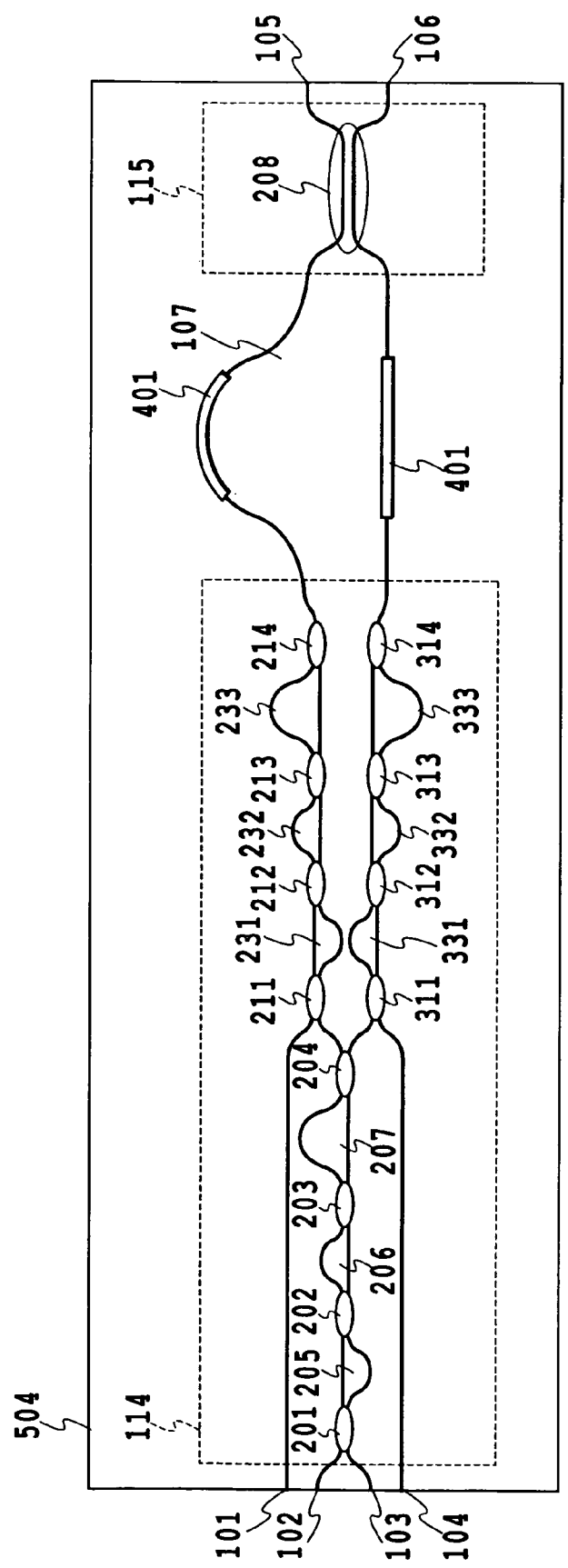
FIG. 58 is a diagram schematically showing the multi/demultiplexing circuit in the first modification of the tenth embodiment of the present invention.

FIG. 58 shows an optical multi/demultiplexing circuit using the optical multi/demultiplexing device 114 shown in FIG. 57. This circuit is a Mach-Zehnder interferometer constituted by N+1 (N=1) phase generating optical couplers 114 and 115, N (N=1) optical delay line 107 interposed between the adjacent pair of the phase-generating optical couplers, four input waveguides 101 to 104 connected to the first phase generating optical coupler 114, and two output waveguides 105 and 106 connected to the (N+1=2)-th (second) phase generating optical coupler 115.

The optical delay line 107 is formed of two optical delay elements and the optical path length difference thereof is set to $\Delta L_1+\delta L_1$. Any phase generating optical coupler can be used as the (N+1=2)-th (second) phase generating optical coupler 115. In this embodiment, a directional coupler provided as an optical coupler was used. A phase generating optical coupler whose output phase difference is wavelength dependent or optical frequency dependent with respect to a passband was used as the first phase generating optical coupler 114. This phase generating optical coupler is used as a phase generating device to apply a wavelength dependent or optical frequency dependent phase $\Psi_1$ to the optical delay line 107. The optical characteristics of the optical multi/ demultiplexing circuit as shown in FIG. 58 were set as desired by suitably setting this phase $\Psi_1$.

Second Modification of Tenth Embodiment

Figure 59:
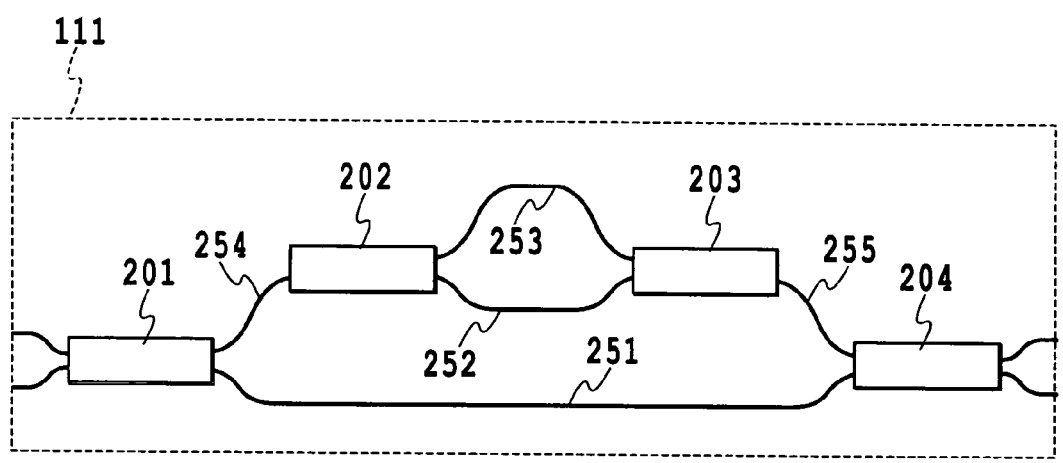
FIG. 59 is a diagram showing the configuration of a phase generating device in a second modification of the tenth embodiment of the present invention.

FIG. 59 shows a phase generating device in a second modification of the tenth embodiment of the present invention. A phase generating optical coupler 111 shown in FIG. 59 is constituted by optical couplers 201 to 204 and optical delay elements 251 to 255. The configuration of the phase generating optical coupler 111 may be called a transversal-form filter type optical multi/demultiplexing circuit in a broad sense.

This optical multi/demultiplexing circuit is constituted by the optical coupler 201, an input port connected to the optical coupler 201, the optical delay element 251 connected to one of two output ports of the optical coupler 201, the optical delay element 254 connected to the other output port of the optical coupler 201, the optical coupler 202 connected to the optical delay element 254, the optical delay elements 252 and 253 connected to the optical coupler 202, the optical coupler 203 connected to the optical delay elements 252 and 253, the optical coupler 204 connected to the optical coupler 203 and the optical delay element 251, and an output port connected to the optical coupler 204.

The amplitude coupling ratio of the optical couplers constituting the phase generating optical coupler 111 and the optical path length differences of the optical delay lines are suitably set to enable the phase generating optical coupler 111 to function as desired. Needless to say, there are a plurality of methods for forming the transversal-form filter type optical multi/demultiplexing circuit. This construction is one of those methods.

Figure 60:
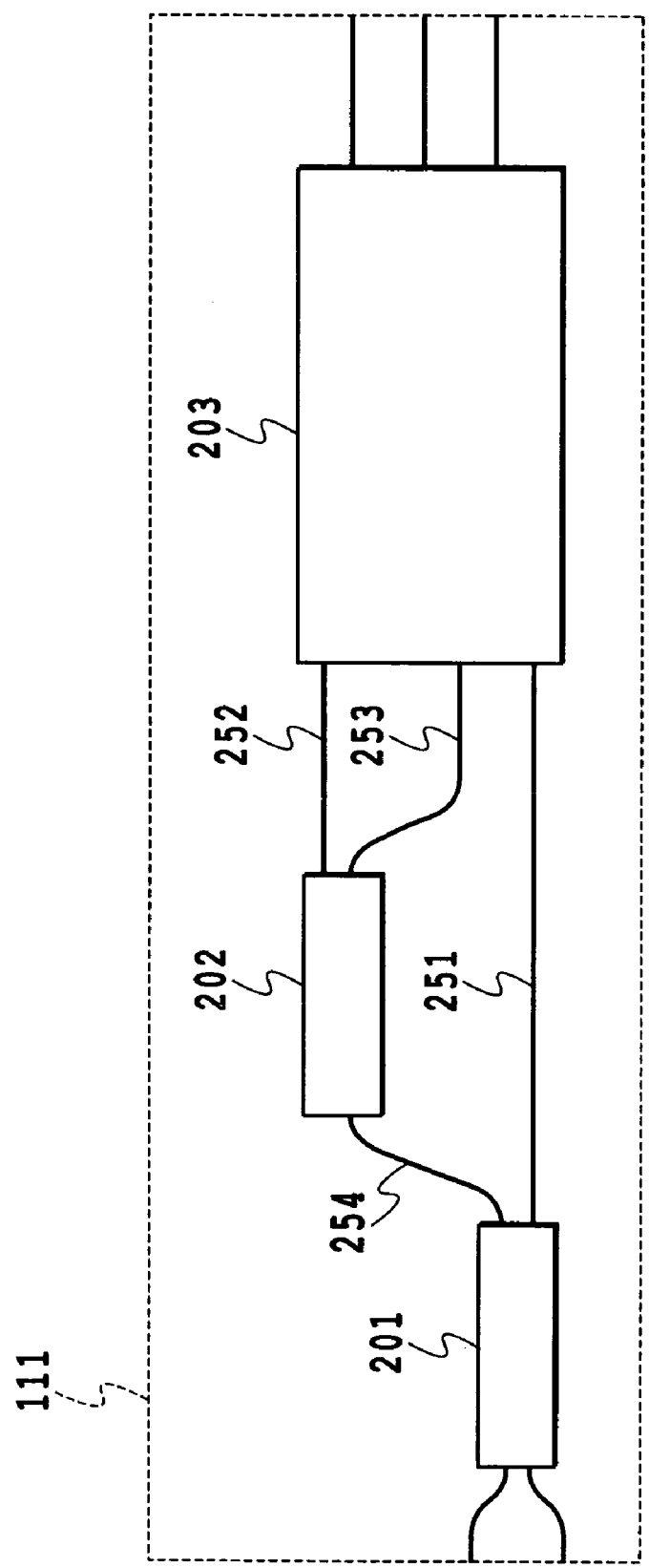
FIG. 60 is a diagram showing the configuration of a phase generating device in the second modification of the tenth embodiment of the present invention.

An arrangement such as one shown in FIG. 60 may also be called a transversal-form filter type optical multi/demultiplexing circuit in a broad sense. This optical multi/demultiplexing circuit is constituted by an optical coupler 201, an input port connected to the optical coupler 201, an optical delay element 251 connected to one of two output ports of the optical coupler 201, an optical delay element 254 connected to the other output port of the optical coupler 201, an optical coupler 202 connected to the optical delay element 254, optical delay elements 252 and 253 connected to the optical coupler 202, an optical coupler 203 connected to the optical delay elements 252 and 253 and to the optical delay element 251, and three output ports connected to the optical coupler 203. The optical coupler 203 may be formed of a three-input three-output multiple mode interferometer or the like or may be formed of a plurality of optical couplers. The amplitude coupling ratio of the optical couplers constituting the phase generating optical coupler 111 and the optical path length differences of the optical delay lines are suitably set to enable the phase generating optical coupler 111 to function as desired.

Eleventh Embodiment

Figure 61:
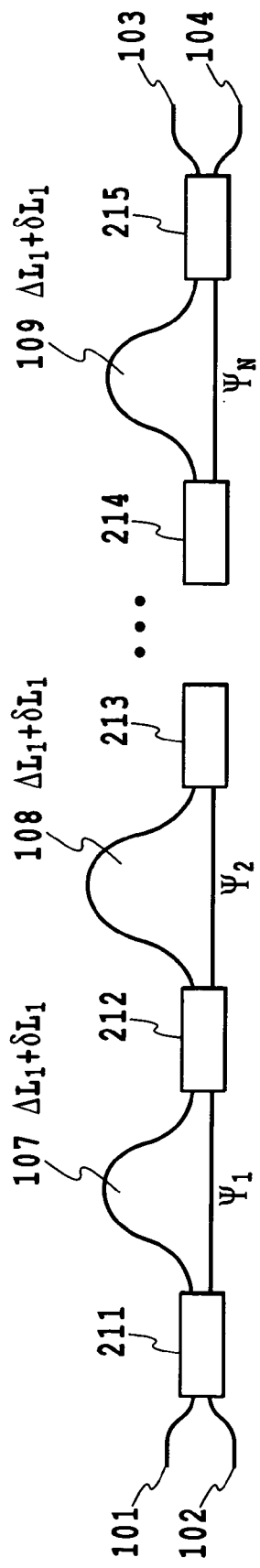
FIG. 61 is a diagram showing the configuration of a multi/demultiplexing circuit in an eleventh embodiment of the present invention.

FIG. 61 shows an optical multi/demultiplexing circuit in an eleventh embodiment of the present invention. This circuit is an N-stage lattice-form filter constituted by N+1 (N: an integer equal to or larger than 1) optical couplers 211 to 215, N optical delay lines 107 to 109 each interposed between adjacent pairs of the optical couplers, two input waveguides 101 and 102 connected to the first optical coupler 211, and two output waveguides 103 and 104 connected to the (N+1)-th optical coupler 215.

Each of the N optical delay lines 107, 108, and 109 is formed of two optical delay elements, and the optical path length differences thereof are set at $\Delta L_1+\delta L_1$, $\Delta L_2+\delta L_2$, ..., $\Delta L_N+\delta L_N$. Phases $\Psi_1$, $\Psi_2$, ..., $\Psi_N$ each having a wavelength dependence or an optical frequency dependence with respect to a pass band are applied to the optical delay lines 107, 108, and 109. The optical characteristics of the optical multi/demultiplexing circuit shown in FIG. 61 can be set as desired by suitably setting the above-mentioned phases shown above. As a means for applying phases $\Psi_1$, $\Psi_2$, ..., $\Psi_N$ each having a wavelength dependence or an optical frequency dependence, phase generating devices are provided in the optical delay lines.

Figure 62:
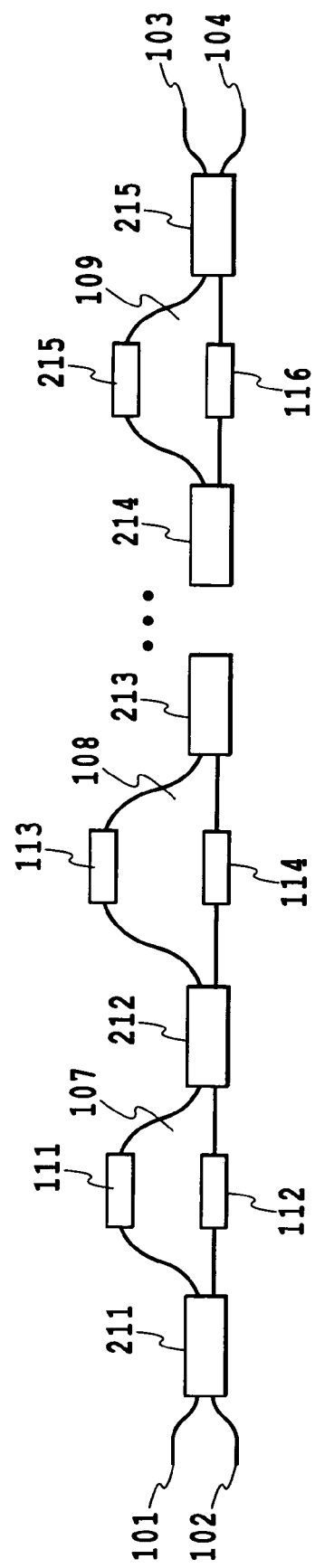
FIG. 62 is a diagram showing the configuration of a multi/demultiplexing circuit in the eleventh embodiment of the present invention.

FIG. 62 shows a state in which phase generating optical couplers 111 to 116 are provided in the pairs of optical delay elements forming the optical delay lines 107 to 109. As each phase generating optical coupler, a phase generating optical coupler formed by using optical couplers and optical delay lines can be used.

Figure 63:
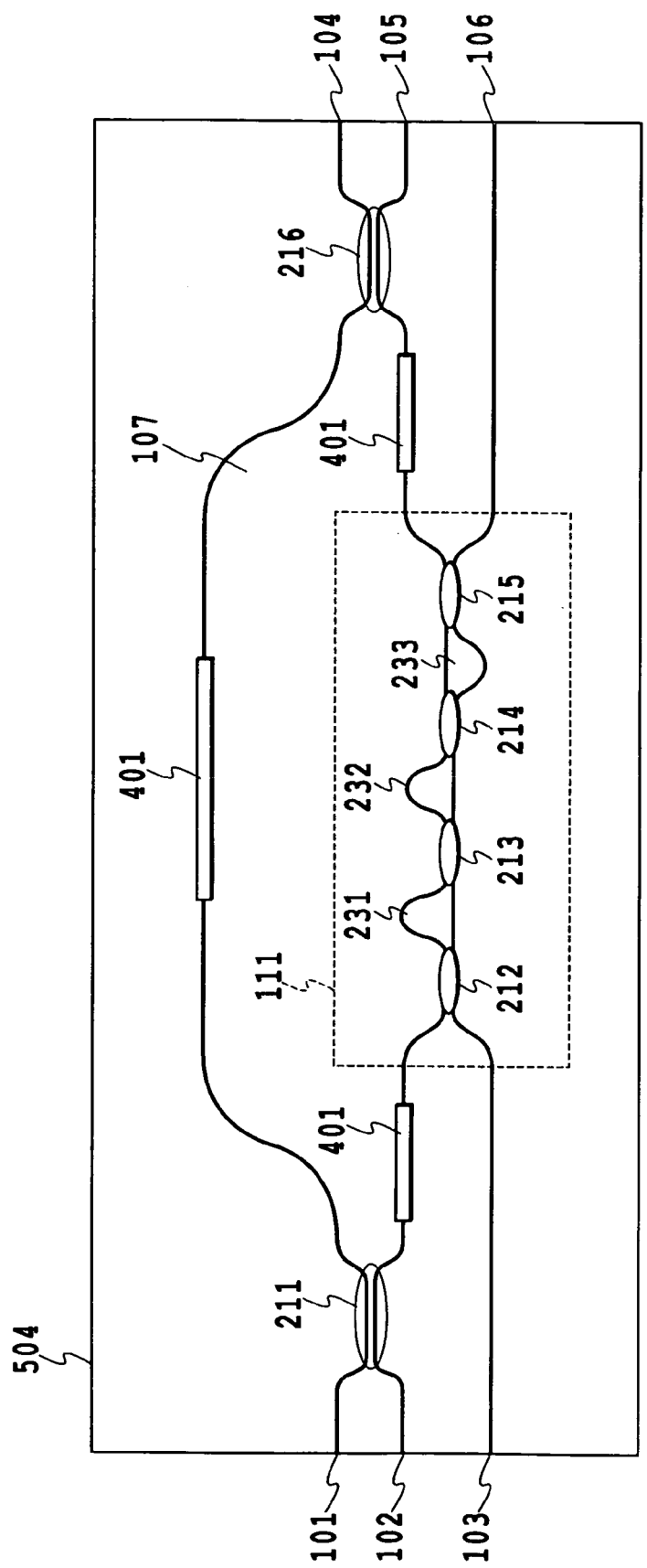
FIG. 63 is a diagram schematically showing the a multi/demultiplexing circuit in the eleventh embodiment of the present invention.

FIG. 63 is a diagram schematically showing a Mach-Zehnder interferometer as a simple example of the optical multi/demultiplexing circuit in this embodiment. This circuit is constituted by N+1=2 optical couplers 211 and 216, N=1 optical delay line 107 interposed between the adjacent pair of the optical couplers, two input waveguides 101 and 102 connected to the first optical coupler 211, two output waveguides 104 and 105 connected to the (N+1)-th optical coupler 216, a phase generating optical coupler 111 inserted in one of the optical delay elements of the optical delay line 107, an input waveguide 103 connected to the phase generating optical coupler 111, and an output waveguide 106 connected to the phase generating optical coupler 111. Thin film heaters provided as path length difference adjusting devices 401 for eliminating fabrication errors are formed in the optical delay line 107. The optical path length difference of the optical delay line 107 is adjusted to $\Delta L_1+\delta L_1$ by the two optical delay elements and the path length difference adjusting devices 401.

As the phase generating optical coupler 111, a lattice-form phase generating device constituted by optical couplers 212 to 215 and optical delay lines 231 to 233 each interposed between adjacent pairs of the optical couplers was used. The amplitude coupling ratios of the optical couplers constituting the phase generating optical coupler 111 and the optical path length differences of the optical delay lines were optimized to generate the phase $\Phi_1$ for approximation to the target phase $\Psi_1$.

Unused input/output ports of the phase generating optical coupler 111 can be used as a monitor port. In the arrangement shown in FIG. 63, the through ports of the phase generating optical coupler 111 are used. However, the cross ports may also be used. Needless to say, any P-input Q-output phase generating device may be used.

Figure 64:
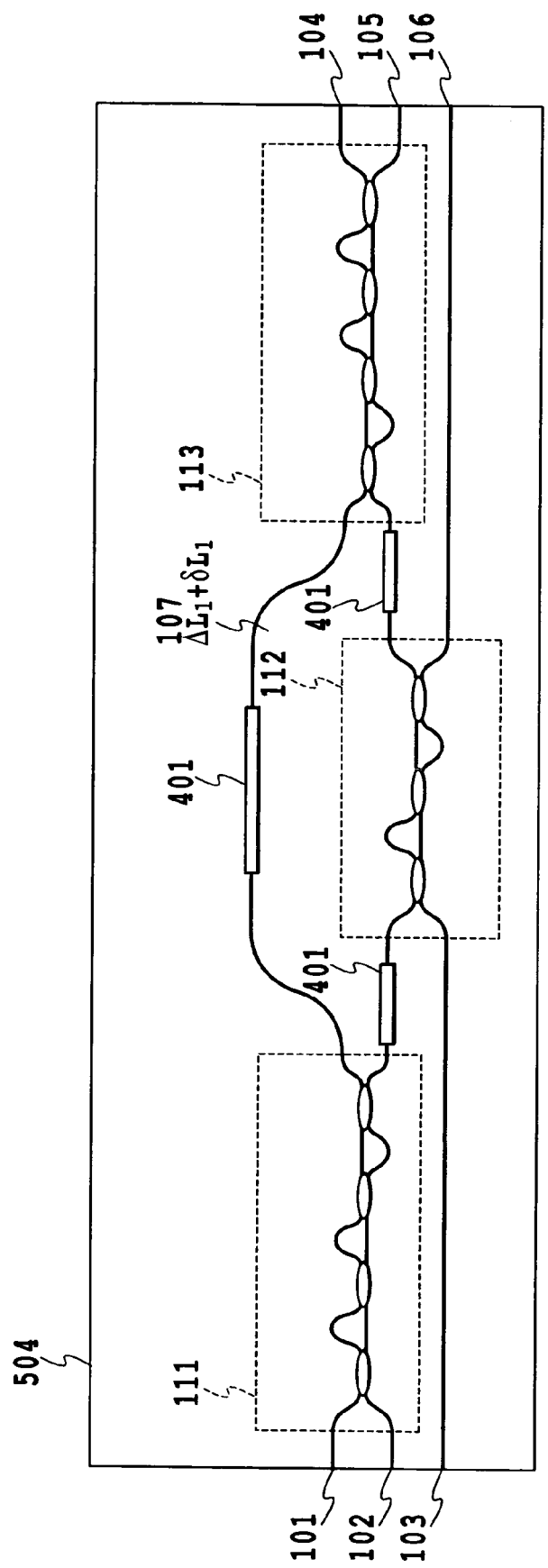
FIG. 64 is a diagram schematically showing the multi/demultiplexing circuit in the eleventh embodiment of the present invention.

In the configuration shown in FIG. 63, one phase generating device is provided in one of the optical delay elements. Alternatively, a plurality of phase generating devices may be provided in one optical delay element, or a phase generating device may be provided in each of the two optical delay elements of the optical delay line. Also, each of the optical couplers 211 and 216 in the Mach-Zehnder interferometer may be formed as a phase generating optical coupler having a phase generating function, as shown in FIG. 64.

Methods of providing a phase generating device in an optical delay line in an optical multi/demultiplexing circuit have been described and a simple configuration of a Mach-Zehnder interferometer has been illustrated by way of example.

Twelfth Embodiment

Figure 65:
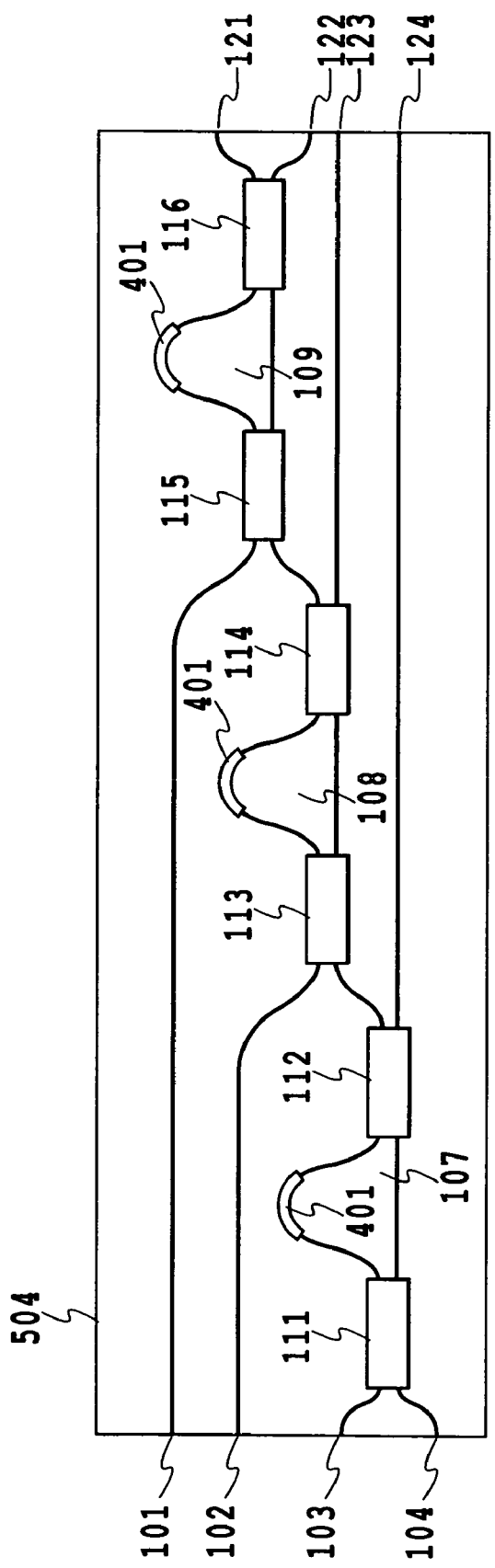
FIG. 65 is a diagram schematically showing the multi/demultiplexing circuit in a twelfth embodiment of the present invention.

FIG. 65 shows an optical multi/demultiplexing circuit in a twelfth embodiment of the present invention. While filter arrangements such as lattice-form filters and transversal-form filters are being ordinarily used as optical delay line circuits capable of realizing desired characteristics, a cascaded Mach-Zehnder interferometer described as this embodiment is also one of the filter arrangements capable of realizing desired characteristics.

In this circuit, Mach-Zehnder interferometers, one of which is constituted by two phase generating optical couplers 111 and 112 and one optical delay line 107 interposed between the adjacent pair of the phase generating optical couplers are cascaded. Two input waveguides 103 and 104 are connected to the phase generating optical coupler 111 in the first-stage Mach-Zehnder interferometer, an output waveguide 124 is connected to one of two outputs of the phase generating optical coupler 112, and the second-stage Mach-Zehnder interferometer is connected to the other output of the phase generating optical coupler 112. One input waveguide 102 is connected to a phase generating optical coupler 113 of the second-stage Mach-Zehnder interferometer, an output waveguide 123 is connected to one of two outputs of a phase generating optical coupler 114 of the second-stage Mach-Zehnder interferometer, and the third-stage Mach-Zehnder interferometer is connected to the other output of the phase generating optical coupler 114. One input waveguide 101 is connected to an phase generating optical coupler 115 of the third-stage Mach-Zehnder interferometer, and two output waveguides 121 and 122 are connected to a phase generating optical coupler 116 of the third-stage Mach-Zehnder interferometer.

The optical path length differences of optical delay lines 107, 108, and 109 are set at $\Delta L_1' = \Delta L + \delta L_1$, $\Delta L_2' = 2 \cdot \Delta L + \delta L_2$, $\Delta L_3' = 3 \cdot \Delta L + \delta L_3$. $\Delta L$ is the fundamental optical path length difference of a corresponding conventional Mach-Zehnder interferometer.

One or both of the phase generating optical couplers 111 and 112 is formed as a phase generating optical coupler to apply a phase to the optical delay line, thereby correcting the optical characteristics of the first-stage Mach-Zehnder interferometer for example making it uniformly periodic with respect to wavelength. One or both of the phase generating optical couplers 113 and 114 is formed as a phase generating optical coupler to apply a phase to the optical delay line, thereby correcting the optical characteristics of the second-stage Mach-Zehnder interferometer for example making it uniformly periodic with respect to wavelength.

Further, one or both of the phase generating optical couplers 115 and 116 is formed as a phase generating optical coupler to apply a phase to the optical delay line, thereby correcting the optical characteristics of the third-stage Mach-Zehnder interferometer for example making it uniformly periodic with respect to wavelength. If each of the cascaded Mach-Zehnder interferometers is made uniformly periodic with respect to wavelength, the optical multi/demultiplexing circuit is made as whole uniformly periodic with respect to wavelength.

This embodiment is only an example of a possible use of a phase generating device to modify the optical characteristics of the conventional optical multi/demultiplexing circuits.

Thirteenth Embodiment

Figure 66:
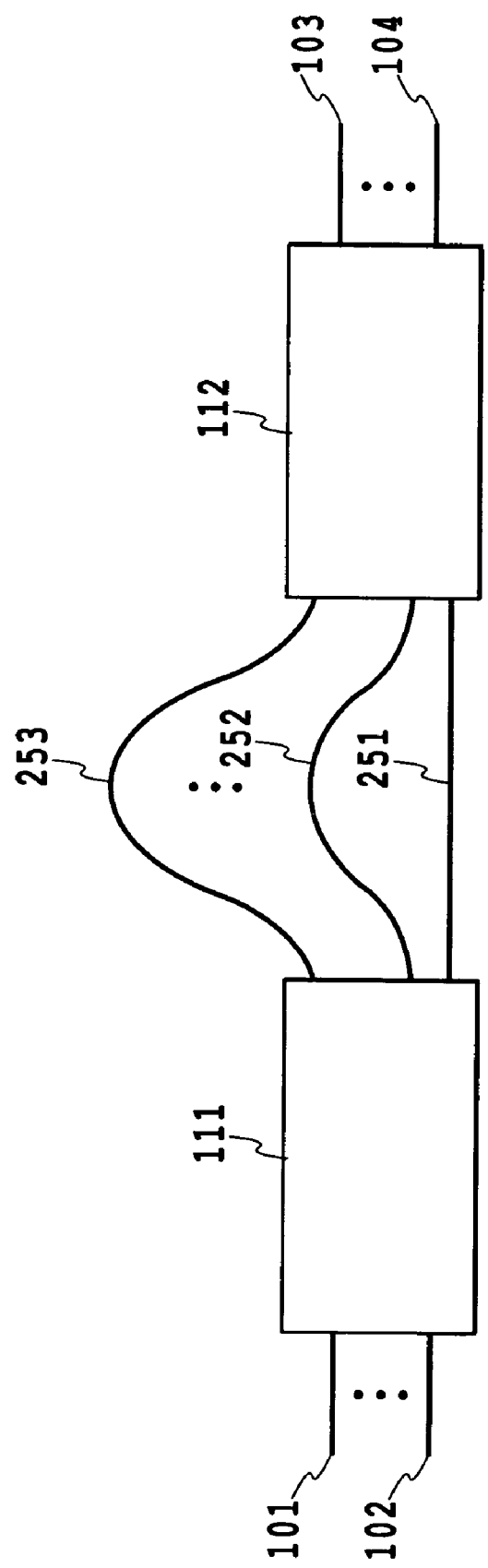
FIG. 66 is a diagram showing the configuration of a multi/demultiplexing circuit in a thirteenth embodiment of the present invention.

FIG. 66 shows an optical multi/demultiplexing circuit in a thirteenth embodiment of the present invention. This circuit is an interferometer constituted by phase generating optical couplers 111 and 112 each having one or more inputs and two or more outputs, and an optical delay line formed by optical delay elements 251 to 253 coupled to these phase generating optical couplers. This circuit is a transversal-form optical multi/demultiplexing circuit in a broad sense.

More specifically, this circuit is constituted by the phase generating optical coupler 111, one or more input waveguides 101 and 102 connected to the phase generating optical coupler 111, an optical delay line formed of three or more optical delay elements 251 to 253, the phase generating optical coupler 112 connected to the optical delay elements 251 to 253, and one or more output waveguides 103 and 104 connected to the phase generating optical coupler 112.

One of the phase generating optical couplers 111 and 112 may function in a single state as a phase generating device, or a plurality of phase generating optical couplers in combination may function as phase generating devices. These phase generating optical couplers can be used as a phase generating device to apply a wavelength dependent or optical frequency dependent phase $\Psi$ to the optical delay line. The optical characteristics of the optical multi/demultiplexing circuit shown in FIG. 66 can be set as desired by suitably setting this phase $\Psi$.

For example, if a phase generating device is incorporated in the transversal-form optical multi/demultiplexing circuit, the phase approximated by a nonlinear polynomial as described in the description of the embodiments of the present invention can be generated to modify the optical characteristics of the interferometer used in a wavelength region or in a frequency region. Further, in this embodiment, at least one of the phase generating optical couplers constituting the interferometer has the function of generating a wavelength dependent or optical frequency dependent phase.

Figure 67:
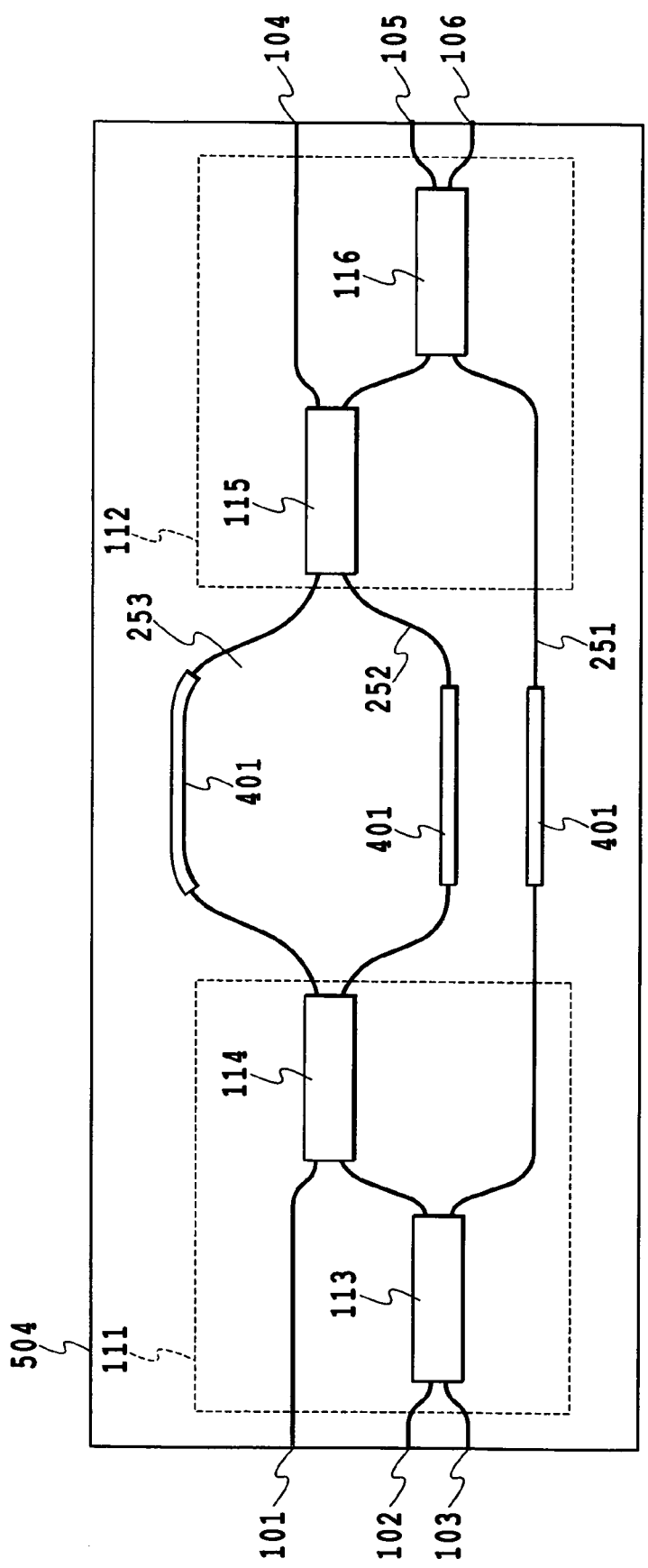
FIG. 67 is a diagram schematically showing the multi/demultiplexing circuit in the thirteenth embodiment of the present invention.

A conventional transversal-form interleave filter uniformly periodic with respect to frequency (see, T. Mizuno et al., Electron. Lett., vol. 38, pp1121–1122 (2002)), which is a concrete example of the optical multi/demultiplexing circuit, was transformed into a transversal-form interleave filter uniformly periodic with respect to wavelength by using phase generating devices. As shown in FIG. 67, phase generating optical couplers using combinations of phase generating optical couplers 113 and 114, and 115 and 116 each constituted by an optical coupler and an optical delay line and having a phase generating function were used as the phase generating optical couplers 111 and 112.

The phase generating optical coupler 111 is constituted by the phase generating optical coupler 113 having a phase generating function, two input ports connected to the phase generating optical coupler 113, one output port connected to the phase generating optical coupler 113, the phase generating optical coupler 114 connected to the phase generating optical coupler 113 and having a phase generating function, one input port connected to the phase generating optical coupler 114, and two output ports connected to the phase generating optical coupler 114.

The phase generating optical coupler 112 is constituted by the phase generating optical coupler 115 having a phase generating function, two input ports connected to the phase generating optical coupler 115, one output port connected to the phase generating optical coupler 115, the phase generating optical coupler 116 connected to the phase generating optical coupler 115 and having a phase generating function, one input port connected to the phase generating optical coupler 116, and two output ports connected to the phase generating optical coupler 116.

The relative optical path length difference of the optical delay element 251 was set to 0·ΔL+0.5λc, the relative optical path length difference of the optical delay element 252 was set to $\Delta L_1'=\Delta L_1+\delta L_1=\Delta L+\delta L_1$, and the relative optical path length difference of the optical delay element 253 was set to $\Delta L_2'=\Delta L_2+\delta L_2=3\cdot\Delta L+\delta L_2$. The amplitude coupling ratio of the phase generating optical coupler 113 was set at 0.55, the amplitude coupling ratio of the phase generating optical coupler 114 was set at 0.22, the amplitude coupling ratio of the phase generating optical coupler 115 was set at 0.22, and the amplitude coupling ratio of the phase generating optical coupler 116 was set at 0.5. The phase generating optical couplers 113, 114, 115, and 116 were used as phase generating optical couplers to apply phase $\Phi_1(\lambda)$ to the optical delay element 252 and phase $\Phi_2(\lambda)$ to the optical delay element 253.

This embodiment is only an example of a possible use of a phase generating device to modify the optical characteristics of the conventional optical multi/demultiplexing circuits.

Modification of Thirteenth Embodiment

Figure 68:
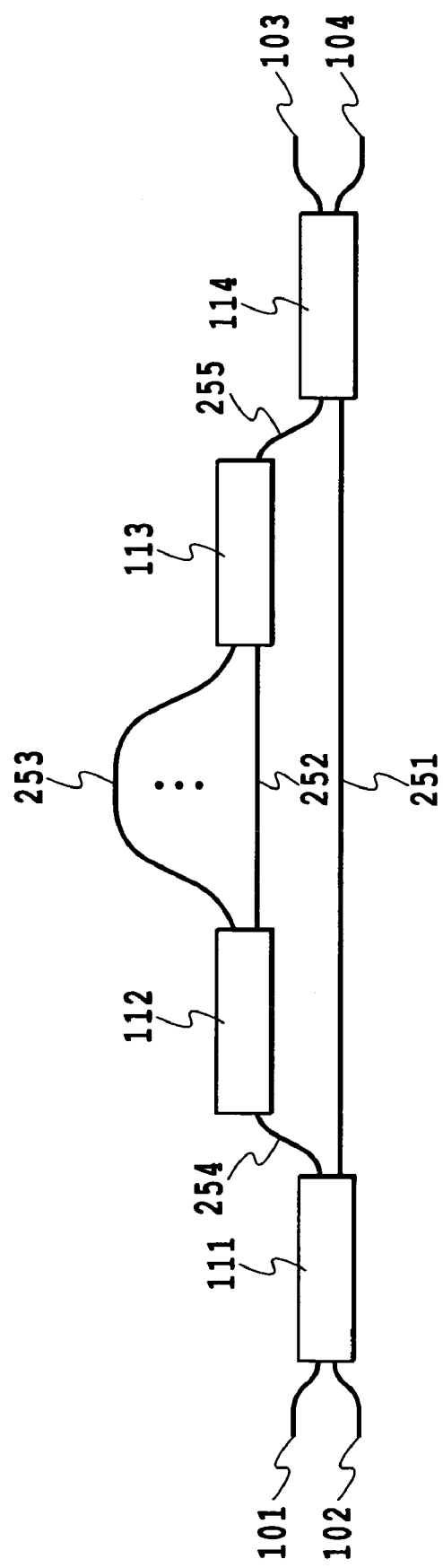
FIG. 68 is a diagram showing the configuration of a multi/demultiplexing circuit in a modification of the thirteenth embodiment of the present invention.

FIG. 68 shows an optical multi/demultiplexing circuit as an example of modification of the thirteenth embodiment. This circuit is an interferometer constituted by phase generating optical couplers 111, 112, 113, and 114 each having one or more inputs and two or more outputs, and an optical delay line formed by optical delay elements 251 to 255 coupled to these phase generating optical couplers. This circuit is a transversal-form optical multi/demultiplexing circuit in a broad sense.

More specifically, this circuit is a transversal-form optical multi/demultiplexing circuit in which phase generating optical couplers and optical delay elements to be connected to the phase generating optical couplers are interconnected. Also, a phase generating device having a wavelength dependence or an optical frequency dependence is provided in at least one of the phase generating optical couplers or the optical delay lines.

In the example shown in FIG. 68, if the phase generating device is provided in the phase generating optical couplers, the phase generating optical coupler 111 or 114 may be formed as a phase generating optical coupler characterized by having an output phase difference which varies with respect to a passband. If the phase generating device is provided in the optical delay line, the phase generating optical coupler 112 or 113 may be formed as a phase generating optical coupler.

For example, the phase generating optical coupler 112 is connected to the optical delay element 254 in the optical delay elements 251 and 254 forming the optical delay line. Therefore, if the phase generating optical coupler 112 is formed as a phase generating optical coupler, the phase generating device can be provided in the optical delay line formed by the optical delay elements 251 and 254.

In a concrete example of the optical multi/demultiplexing circuit, the transmission characteristics of a conventional transversal-form interleave filter uniformly periodic with respect to frequency were transformed into a transversal-form interleave filter uniformly periodic with respect to wavelength.

Figure 69:
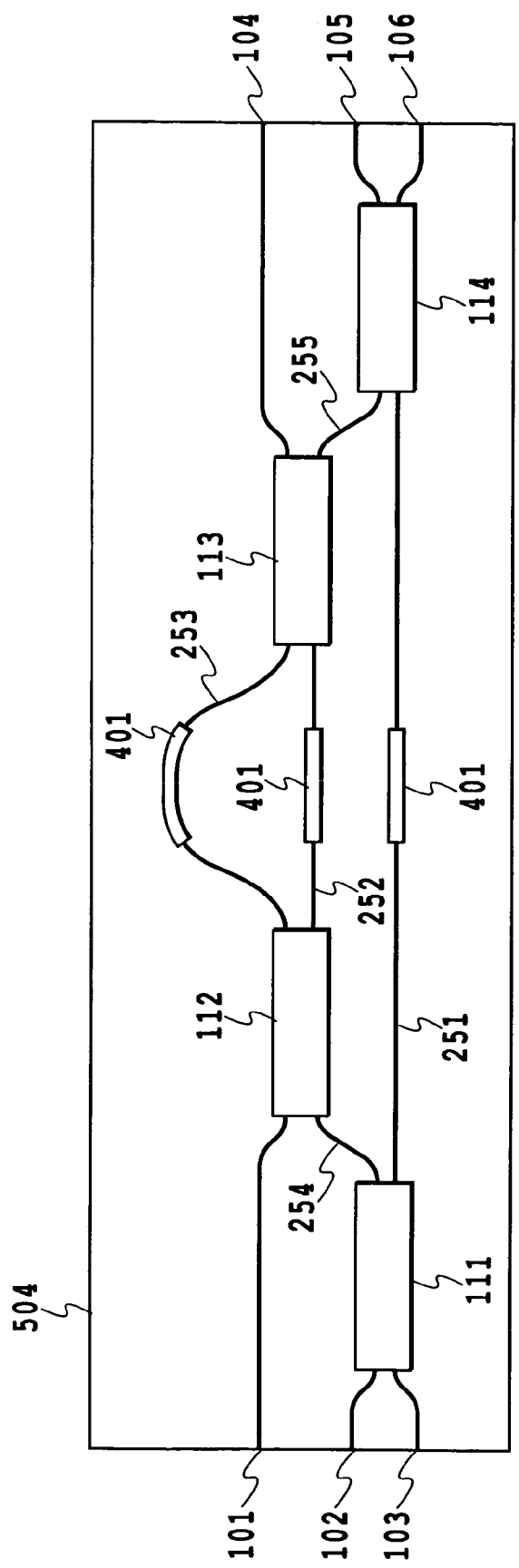
FIG. 69 is a diagram schematically showing the multi/demultiplexing circuit in the modification of the thirteenth embodiment of the present invention.

FIG. 69 is a diagram schematically showing an optical multi/demultiplexing circuit in a first modification of this embodiment. This circuit is constituted by a phase generating optical coupler 111, two input waveguides 102 and 103 connected to the phase generating optical coupler 111, two optical delay elements 251 and 254 connected to the phase generating optical coupler 111, a phase generating optical coupler 112 connected to the optical delay element 254, one input waveguide 101 connected to the phase generating optical coupler 112, two optical delay elements 252 and 253 connected to the phase generating optical coupler 112, a phase generating optical coupler 113 connected to the optical delay elements 252 and 253, one output waveguide 104 connected to the phase generating optical coupler 113, one optical delay element 255 connected to the phase generating optical coupler 113, a phase generating optical coupler 114 connected to the optical delay element 255 and the optical delay element 251, and two output waveguides 105 and 106 connected to the phase generating optical coupler 114.

Path length difference adjusting devices 401 were provided on the optical delay elements 251, 252, and 253 and were used to correct fabrication errors in the optical path length differences of the optical delay elements.

In this arrangement, a phase generating device is provided in each of the phase generating optical couplers and the optical delay line. More specifically, the phase generating optical couplers 111, 114, 112 and 113 are arranged to function as phase generating optical couplers, thus providing phase generating devices in the phase generating optical couplers and the optical delay line formed by the optical delay elements.

The relative optical path length difference of the optical delay element 251 was set to 0·ΔL+0.5λc, the relative optical path length difference of the optical delay element 252 to 0·ΔL, the relative optical path length difference of the optical delay element 254 to $\Delta L_1'=\Delta L_1+\delta L_1=\Delta L/2+\delta L_1$, the relative optical path length difference of the optical delay element 253 to $\Delta L_2'=\Delta L_2+\delta L_2=2\cdot\Delta L+\delta L_2$, and the relative optical path length difference of the optical delay element 255 to $\Delta L_3'=\Delta L_3+\delta L_3=\Delta L/2+\delta L_3$. The amplitude coupling ratio of the phase generating optical coupler 111 was set to 0.55, the amplitude coupling ratio of the phase generating optical coupler 112 to 0.22, the amplitude coupling ratio of the phase generating optical coupler 113 to 0.22, and the amplitude coupling ratio of the phase generating optical coupler 114 to 0.5. The phase generating optical couplers 111 to 114 were used as phase generating optical couplers to apply phase $\Phi_1(\lambda)$ to the optical delay element 254, phase $\Phi_2(\lambda)$ to the optical delay element 253 and phase $\Phi_3(\lambda)$ to the optical delay element 255.

Figure 70:
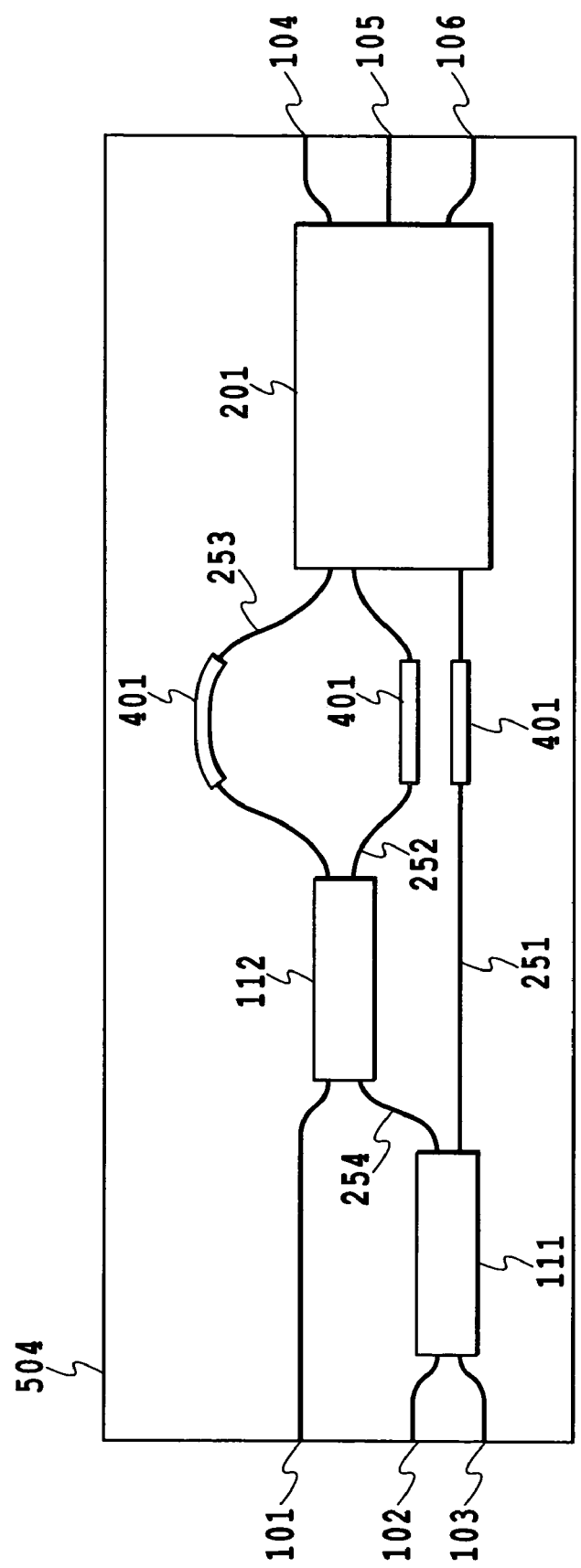
FIG. 70 is a diagram schematically showing the multi/demultiplexing circuit in the modification of the thirteenth embodiment of the present invention.

Needless to say, the arrangement shown in FIG. 69 is one of the embodiments of the present invention, and may be modified in other ways. For example, an optical multi/demultiplexing circuit may be formed as shown in FIG. 70. This circuit is an interferometer constituted by phase generating optical couplers 111 and 112 each having one or more inputs and two or more outputs, an optical coupler 201, and an optical delay line formed by optical delay elements 251 to 254 coupled to these phase generating optical couplers or optical coupler. This circuit is a transversal-form optical multi/demultiplexing circuit in a broad sense.

More specifically, this circuit is constituted by the phase generating optical coupler 111, two input waveguides 102 and 103 connected to the phase generating optical coupler 111, two optical delay elements 251 and 254 connected to the phase generating optical coupler 111, the phase generating optical coupler 112 connected to the optical delay element 254, one input waveguide 101 connected to the phase generating optical coupler 112, two optical delay elements 252 and 253 connected to the phase generating optical coupler 112, the optical coupler 201 connected to the optical delay line 251, and three output waveguides 104, 105 and 106 connected to the optical coupler 201. Path length difference adjusting devices 401 were provided on the optical delay elements 251, 252, and 253 and were used to correct fabrication errors in the optical path length differences of the optical delay elements.

While a three-input three-output multiple mode interferometer coupler was used as the optical coupler 201, any other optical coupler may be used and a plurality of optical couplers may be combined to function as one optical coupler.

The phase generating optical couplers 111 and 112 are used as phase generating optical couplers to apply phases on the optical delay elements 251 to 254, thereby correcting the optical characteristics of the conventional optical multi/demultiplexing circuit.

Fourteenth Embodiment

FIG. 71A shows an optical multi/demultiplexing circuit in a fourteenth embodiment of the present invention. Each of the optical multi/demultiplexing circuits described as the embodiments of the present invention as designed without consideration of polarization, because the polarization dependence of the fabricated circuit was small. However, if the polarization dependence is large, the circuit may be designed and fabricated by considering polarization to reduce the polarization dependence. Conversely, a suitable polarization dependence may be created to realize an optical multi/demultiplexing circuit having a polarization dependence, e.g., a polarization interleave filter or a polarization beam splitter.

The Mach-Zehnder interferometer shown in FIG. 71A has birefringence adjustment devices 411 and 412. Suitable birefringence maybe caused in the optical delay line to create a polarization dependence in the optical path length difference, thereby making the optical characteristics of the optical multi/demultiplexing circuit non-polarization dependent or polarization dependent.

The birefringence adjustment devices or means for forming the birefringence may be, for example, insertion of a waveplate, doping waveguides with a dopant, a stress applying thin film, control of the waveguide configuration, laser irradiation, or a thin film heater. Other means for providing a birefringence may be used.

Needless to say, birefringence control may be performed not only on the regions shown in FIG. 71A but also on the entire optical multi/demultiplexing circuit. Also, as shown in FIG. 71B for example, birefringence adjustment devices may be provided in the optical delay line in an optical multi/demultiplexing section used as a phase generating device to control the polarization characteristics of the phase generating optical coupler 111. The polarization characteristics of the phase generating device comprise a polarization dependent phase difference and amplitude coupling ratio. Further, the polarization characteristics of the phase generating optical coupler 111 may be designed in such a manner that the optical couplers 201 to 204 constituting the phase generating optical coupler 111 are formed as polarization dependent optical couplers to incorporate a polarization dependence of the amplitude coupling ratio. By controlling the polarization characteristics of the phase generating optical coupler 111, the phase differences $\Phi_{TE}(\lambda)$ and $\Phi_{TM}(\lambda)$ of TE polarization and TM polarization and the amplitude coupling ratios $\theta_{TE}(\lambda)$ and $\theta_{TM}(\lambda)$ of TE polarization and TM polarization, for example, can be set separately.

Figure 72:
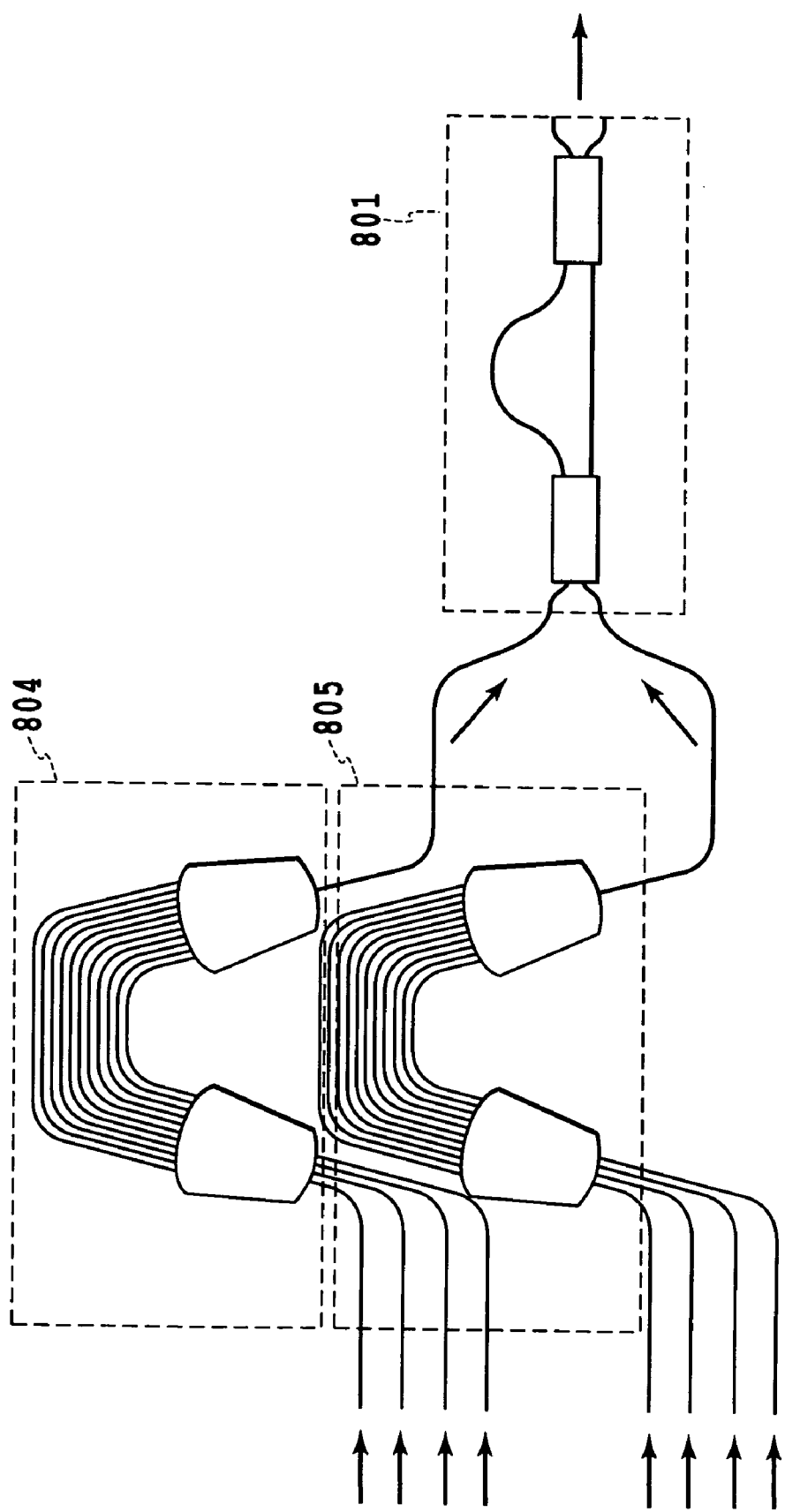
FIG. 72 is a diagram schematically showing the configuration of an optical multi/demultiplexing circuit in the fourteenth embodiment of the present invention.

Also, a circuit may be formed so that, as shown in FIG. 72, an optical signal enters the optical multi/demultiplexing circuit of this embodiment from the second slab of an array waveguide.

Figure 73:
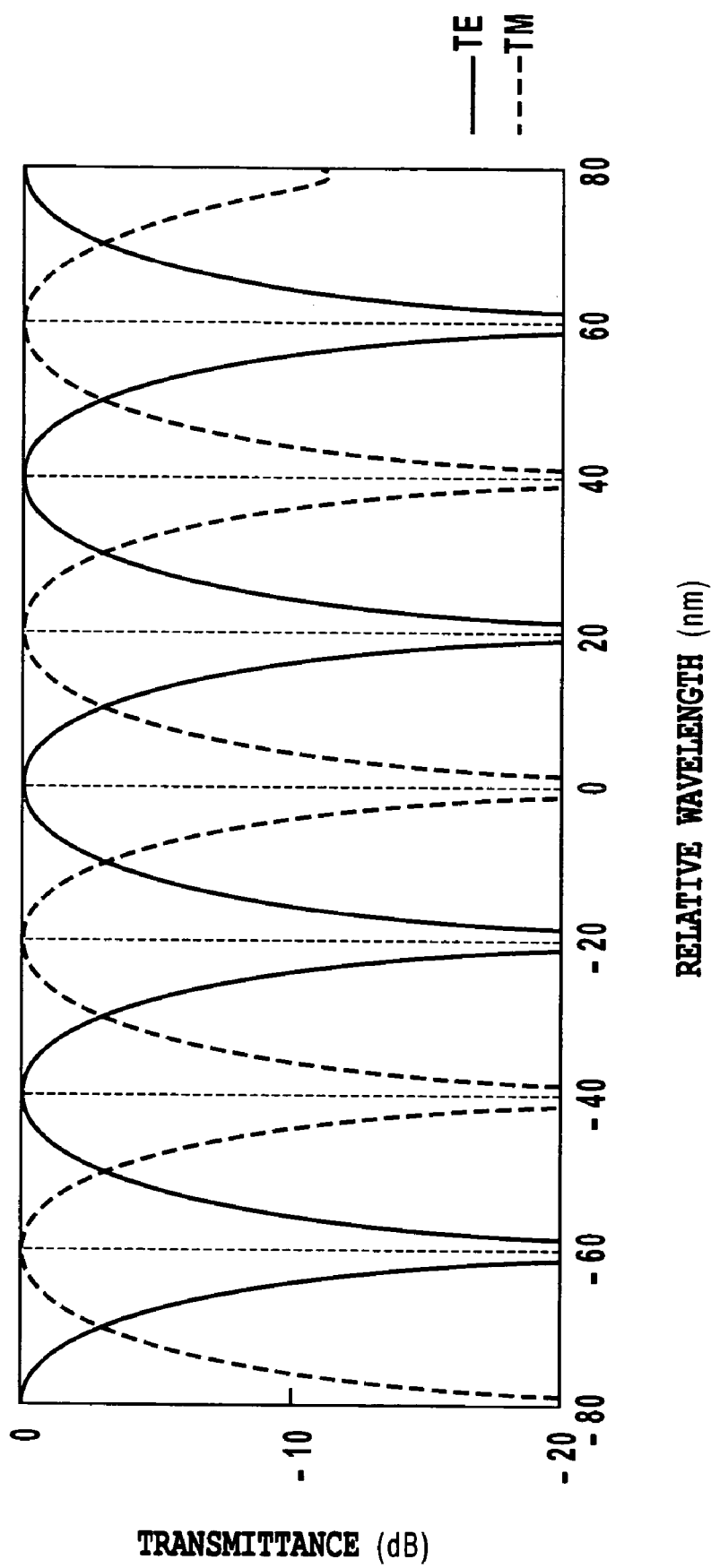
FIG. 73 is a diagram showing the optical characteristics of an optical multi/demultiplexing circuit in the fourteenth embodiment of the present invention.

FIG. 73 shows an example of the transmission characteristics of a Mach-Zehnder interferometer type polarization interleave filter. A polarization interleave filter uniformly periodic with respect to wavelength was realized by setting the wavelength period of TE polarization and TM polarization to 40 nm, and applying phases $\Psi_{TE}(\lambda)$ and $\Psi_{TM}(\lambda)$ differing with respect to TE polarization and TM polarization to the optical delay line so that the center wavelengths of TE polarization and TM polarization are shifted relative to each other by ½ (20 nm) of the wavelength period.

Fifteenth Embodiment

Finite impulse response (FIR) filters were mainly used as the optical delay lines in the embodiments of the present invention. For example, Mach-Zehnder interferometers, lattice-form filters and transversal-form filters are typical examples of FIR filers and are being widely used because their transmission characteristics can be designed freely. However, there are filters other than FIR filers, that is, the infinite impulse response (IIR) filters. The optical characteristics of IIR filters can be modified by using the principle of the present invention. An optical delay line circuit using a ring resonator is known as an IIR filter.

Figure 74:
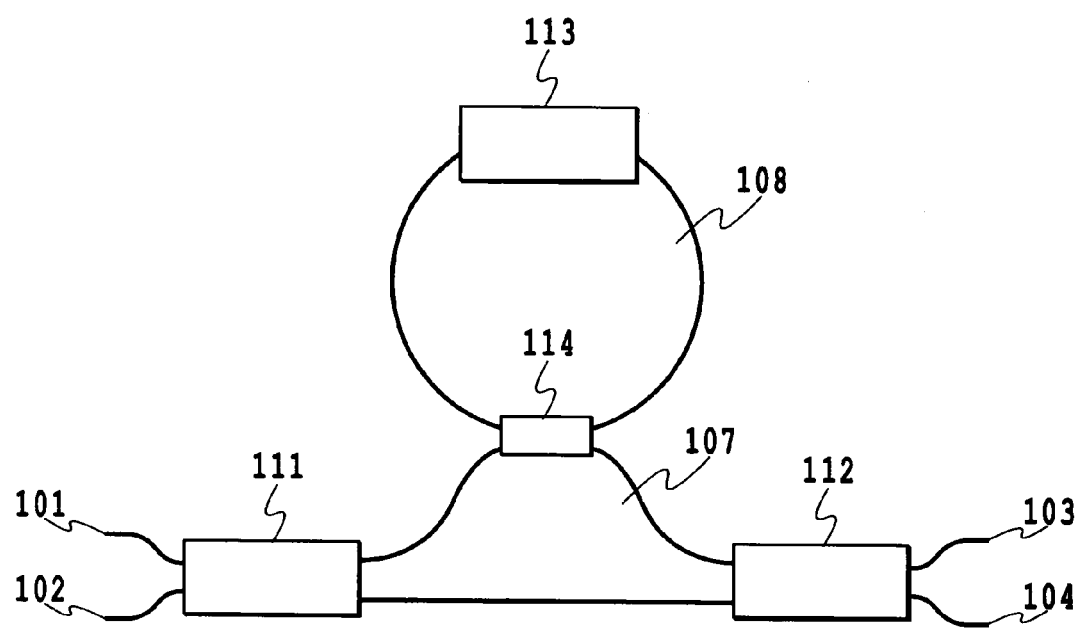
FIG. 74 is a diagram showing the configuration of an optical multi/demultiplexing circuit in a fifteenth embodiment of the present invention.

FIG. 74 shows an optical multi/demultiplexing circuit in a fifteenth embodiment of the present invention. This circuit is one of the simplest configurations for IIR filters. In this circuit, an optical multi/demultiplexing device 114 is provided in an optical delay line 107 in a Mach-Zehnder interferometer constituted by two phase generating optical couplers 111 and 112, the optical delay line 107 interposed between the phase generating optical couplers 111 and 112, and input waveguides 101 and 102 and output waveguides 103 and 104 respectively connected to the phase generating optical couplers 111 and 112, and an optical delay line 108 formed by a ring resonator (optical delay element) are connected to the Mach-Zehnder interferometer by the optical multi/demultiplexing device 114.

In this optical multi/demultiplexing circuit, a phase generating device having a wavelength dependence or an optical frequency dependence is used to modify the transmission characteristics. A phase generating optical coupler may be used a phase generating device. A phase generating optical coupler may be provided at least one of the optical multi/demultiplexing device and the optical delay lines. For example, the phase generating optical coupler 111 or 112 can be made to function as a phase generating device to modify the optical characteristics of this circuit, or a phase may be supplied by the optical multi/demultiplexing device 114 provided in the optical delay line to modify the optical characteristics of this circuit. Needless to say, an optical multi/demultiplexing device 113 may be formed on the ring resonator to function as a phase generating device.

This embodiment is only an example of a possible use of a phase generating device to modify the optical characteristics of the conventional IIR filters. The method of the present invention can be applied to any IIR filters.

Sixteenth Embodiment

Figure 75:
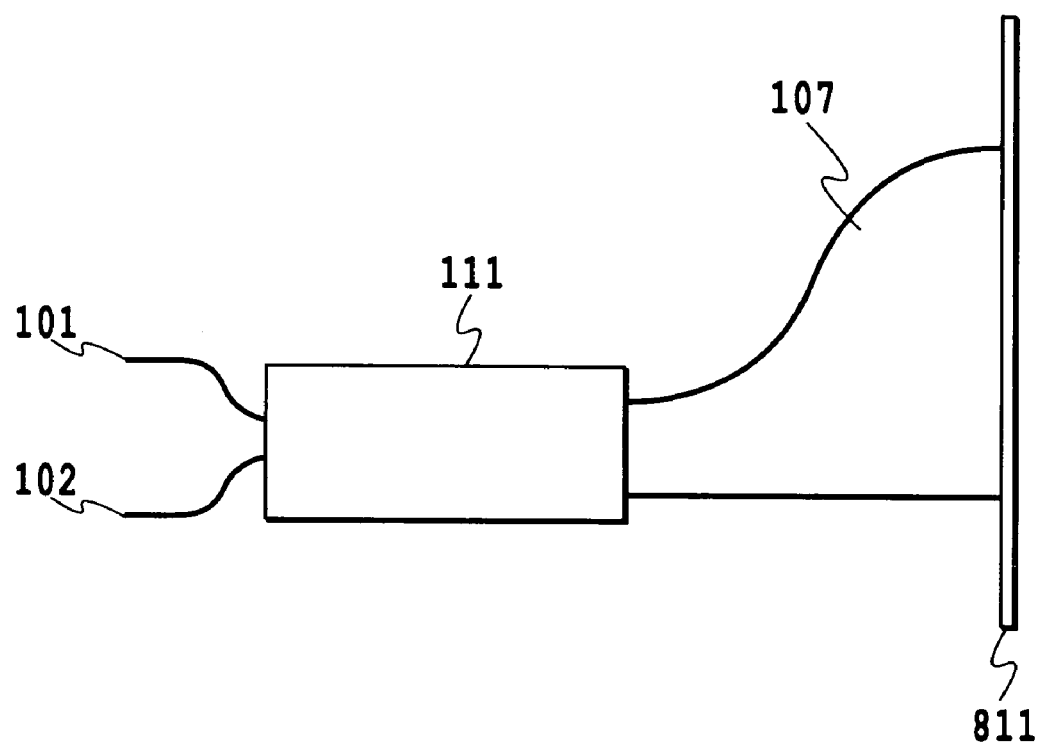
FIG. 75 is a diagram showing the configuration of an optical multi/demultiplexing circuit in a sixteenth embodiment of the present invention.

FIG. 75 shows an optical multi/demultiplexing circuit in a sixteenth embodiment of the present invention. This circuit is an interferometer constituted by a phase generating optical coupler 111 having one or more inputs and two or more outputs and an optical delay line 107 connected to the phase generating optical coupler 111. The phase generating optical coupler 111 is made to function as a phase generating optical coupler having an output phase difference which has a wavelength dependence or an optical frequency dependence.

A reflecting plate 811 provided as a device for reflecting light is formed in the optical delay line 107. Light propagating through the optical delay line is reflected by the reflecting device. Two input/output waveguides 101 and 102 are connected to the optical multi/demultiplexing device 111. Each of the input/output waveguides 101 and 102 can be used as an input waveguide or an output waveguide.

Figure 76:
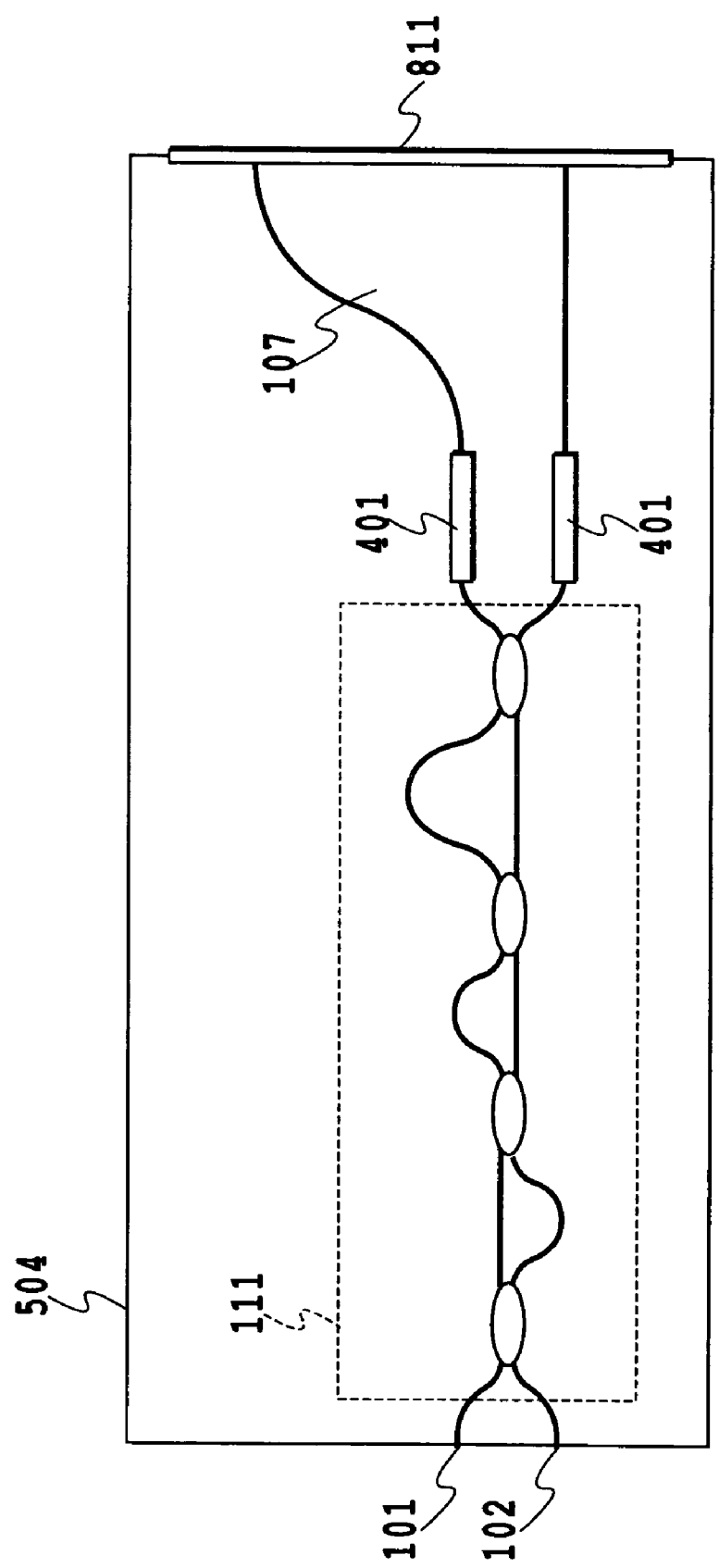
FIG. 76 is a diagram schematically showing an optical multi/demultiplexing circuit in a sixteenth embodiment of the present invention.

FIG. 76 shows a concrete example of this circuit. A lattice-form phase generating optical coupler was used as phase generating optical coupler 111. Thin film heaters were formed as path length difference adjusting device 401 and were used to adjust the optical path length difference of the optical delay line.

Seventeenth Embodiment

Figure 77:
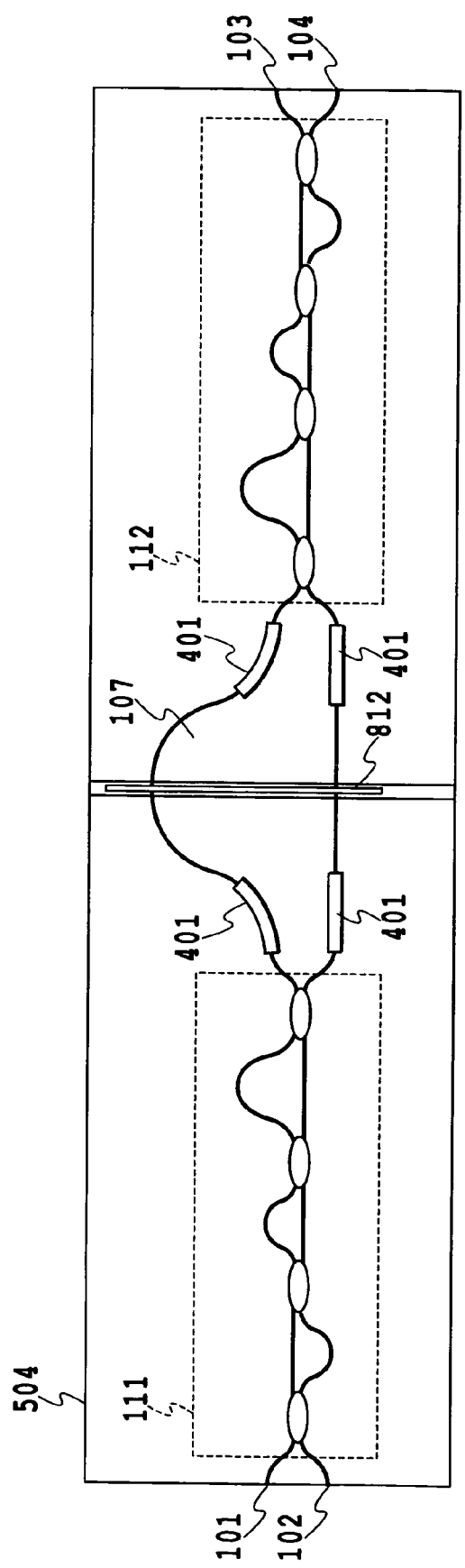
FIG. 77 is a diagram schematically showing an optical multi/demultiplexing circuit in a seventeenth embodiment of the present invention.

FIG. 77 shows the configuration of an optical multi/demultiplexing circuit in a seventeenth embodiment. This circuit is a Mach-Zehnder interferometer using a phase generating function. A groove is formed at a center of an optical delay line 107 of this circuit, and a thin film 812 is inserted in the groove.

If a half waveplate is used as the thin film 812, the polarization dependence can be reduced. Thus, a material different from the material forming the waveguides of the optical multi/demultiplexing circuit can be placed in the optical path in the waveguides of the optical multi/demultiplexing circuit of the present invention.

A material other than the thin film can be inserted. For example, a silicon resin may be introduced into the optical delay line to cancel out the temperature dependence of the refractive index of this circuit. In this manner, the optical multi/demultiplexing circuit can be made non-temperature dependent. Further, any other materials may be inserted not only in the optical delay line of the Mach-Zehnder interferometer but also in any other portion, e.g., an optical multi/demultiplexing device.

Other Embodiments

While the fabrication process in which an optical multi/demultiplexing device having a phase generating function is fabricated by using silica-based waveguides formed on a silicon substrate has been described in the description of the embodiments of the present invention (for reference to an example of fabrication, see Kawachi, M.: "Silica Waveguides on Silicon and Their Application to Integrated-Optic Components'. Opt. Qauntum Electron., 1990, 22, pp. 391–416), the configuration of the optical multi/demultiplexing circuit of the present invention is independent of the kind, the shape and the material of the optical waveguides.

For example, the waveguide material may be polyimide, silicon, a semiconductor, LiNbO$_3$, or the like. The substrate material may be a silica-based material or the like. The present invention can be applied to a device manufactured by spin coating, sol-gel processing, sputtering, chemical vapor deposition, ion diffusion, ion beam direct writing, or the like.

Figure 78:
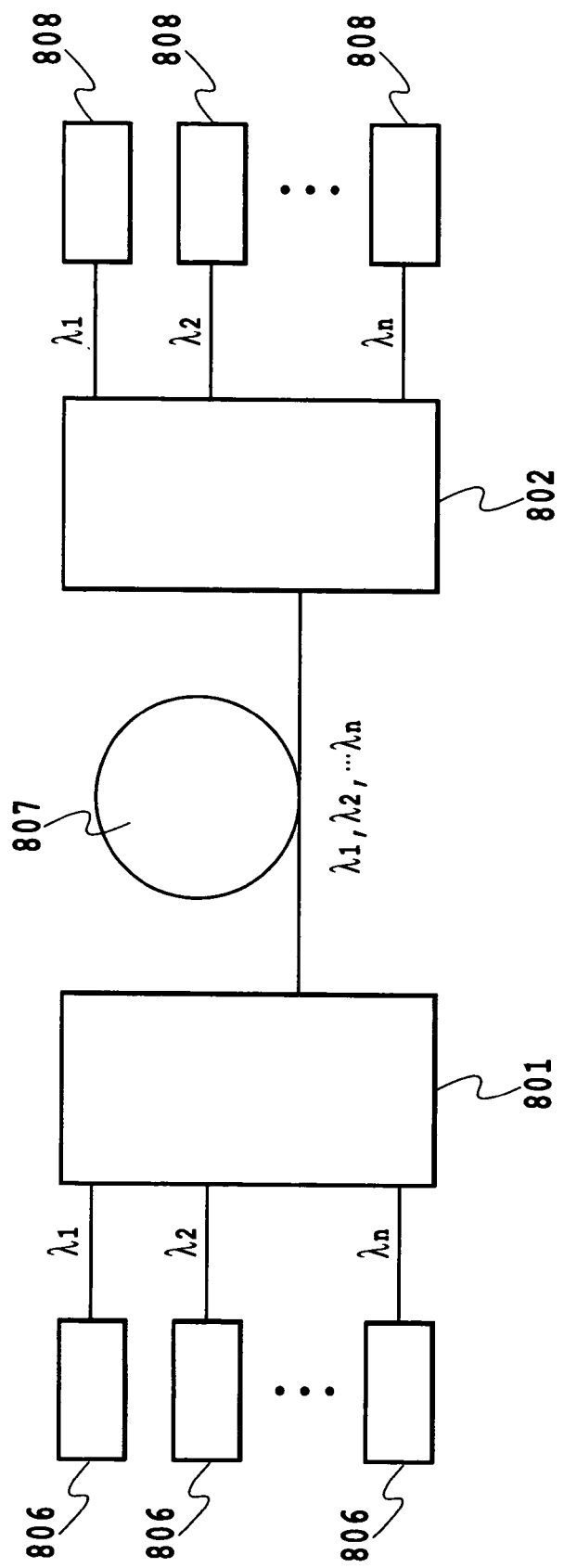
FIG. 78 is a block diagram showing an example of the use of an optical multi/demultiplexing circuit equipped with a phase generating device in accordance with the present invention.

The optical multi/demultiplexing device having the phase generating function described above with respect to use in one of the embodiments of the present invention may be used, for example, in an optical communication system shown in FIG. 78. When an optical signal is input to an optical multi/demultiplexing circuit 801 equipped with the phase generating devices in accordance with the present invention, it is wavelength-division-multiplexed. The multiplexed signal propagates through an optical fiber 807 and is demultiplexed in an optical multi/demultiplexing circuit 802 equipped with the phase generating devices in accordance with the present invention to be received in correspondence with wavelengths.

Figure 79:
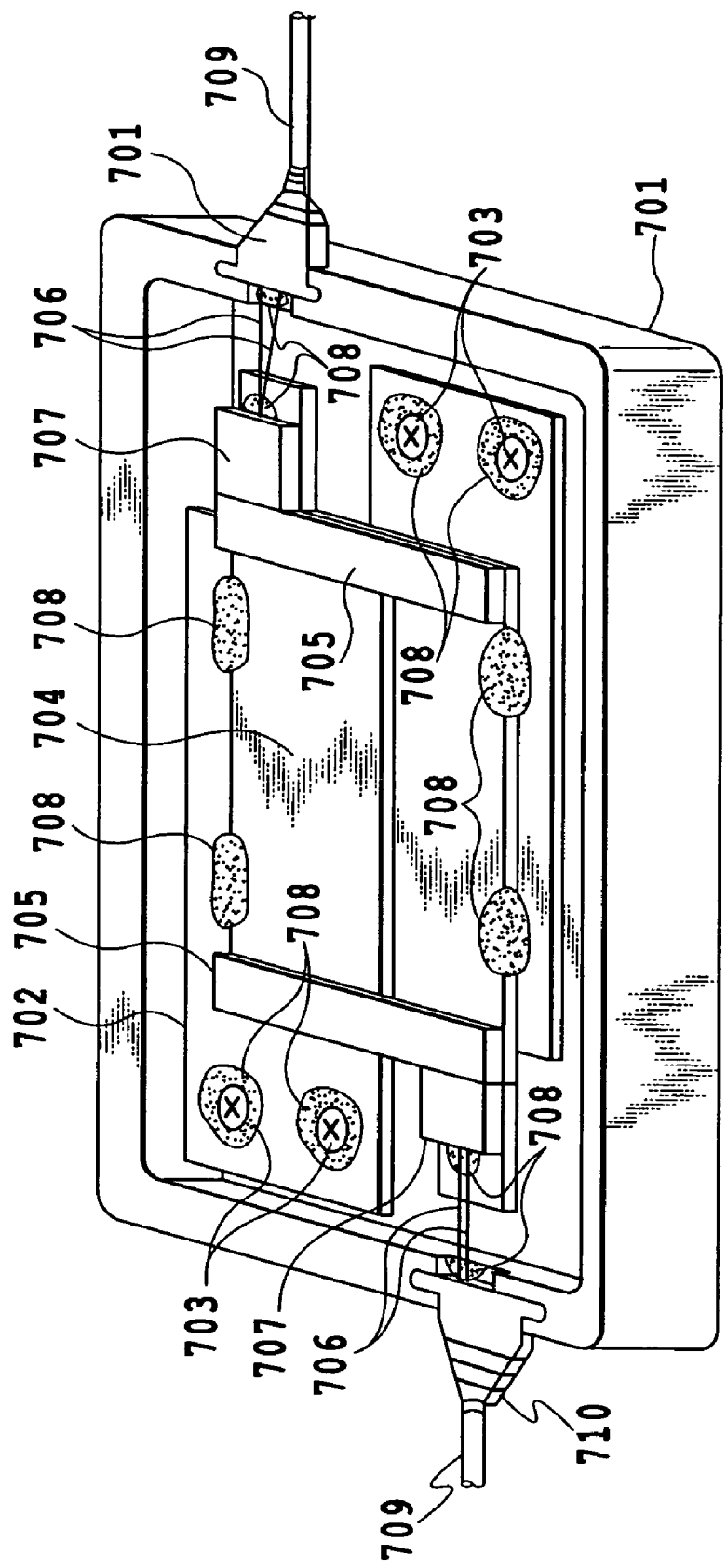
FIG. 79 is a perspective view of an optical module using an optical multi/demultiplexing circuit equipped with a phase generating device in accordance with the present invention.

An optical module including the optical multi/demultiplexing circuit equipped with the phase generating devices described with respect to use in one of the embodiments of the present invention was assembled as described below. As shown in FIG. 79, a Peltier supporting plate 702 for the optical module is fixed by fixing screws 703 on an inner portion of a module frame 701 having high thermal conductivity. A Peltier element and a temperature sensor (thermocouple) are placed close to each other in a recess (not shown) formed in the Peltier supporting plate 702 by machining. The Peltier element and the temperature sensor are placed in such positions (not shown) that an optical multi/demultiplexing circuit (PLC chip) 704 equipped with the phase generating devices is placed immediately above the Peltier element and the temperature sensor.

Glass plates 705 are bonded to end portions of the PLC chip 704 by an adhesive so as to be optically coupled to fiber blocks 707 on which fibers 706 are held. The fibers 706 are bonded by a heat insulating elastic adhesive 708 to recessed portions formed in edges of the module frame 701, and fiber boots 710 having fiber cords 709 are held by being fitted in the module frame 701. The PLC chip 704 is bonded to the Peltier supporting plate by heating insulating adhesive 708. Finally, a cover member is placed so as to cover the chip, etc., and is fixed with screws, thus assembling the optical module of the present invention. The cover member and screw-fixed portions are not shown in the figure.

The optical multi/demultiplexing circuits in accordance with the present invention may be fabricated on different chips. These chips may be directly connected to form one integral chip or a plurality of chips may be optically coupled to complete the optical module. Also, separate optical modules may be fabricated on different chips and connected to each other by fibers to obtain the same characteristics as those of the one integral module.

An optical module (not shown) formed by holding two or more chips such as those described above on a Peltier supporting plate in one module frame also had the same characteristics. Further, optical waveguides may be formed, for example, by using a stacked waveguide, an optical fiber or the like, and may be formed by combining different kinds of optical waveguides, e.g., a planar optical waveguide and an optical fiber.

A grating may be formed in the optical waveguide. An optical waveguide may be divided or cut at an intermediate position, and it can be a segmented waveguide.

Needless to say, the optical multi/demultiplexing circuit of the present invention is not limited to waveguides. An interferometer in accordance with the present invention may be formed in a spatial optical system in which light propagates through air. For example, such a spatial optical system may be constituted by a total reflection mirror or a multilayer film.

Figure 80:
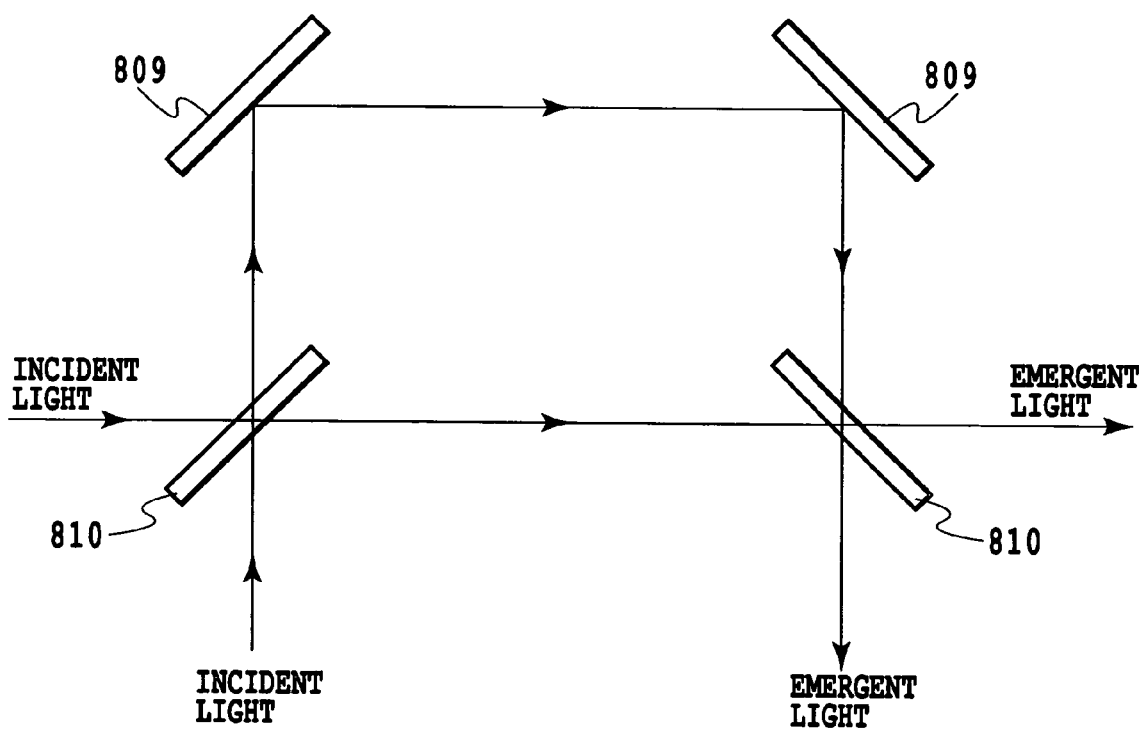
FIG. 80 is a diagram showing an example of the configuration of a Mach-Zehnder interferometer using a spatial optical system.

FIG. 80 shows an example of the configuration of a Mach-Zehnder interferometer using a spatial optical system. As shown in FIG. 80, an optical multi/demultiplexing device similar to that having a circuit constituted by a waveguide can also be realized by using a spatial optical system. The optical multi/demultiplexing circuit in each of the above-described embodiments is one of the examples of the configurations in accordance with the present invention, and the present invention is not limited to the described configurations.

The phase generating optical coupler constituted by the optical delay line and the optical coupler used in the above-described embodiments is only an example of the phase generating device whose phase characteristics are wavelength dependent or optical frequency dependent. A different phase generating device having an output phase difference which varies with respect to passbands may also be used.

As the optical coupler constituting the above-described phase generating device, any of various kinds of couplers, e.g., a multimode interference coupler, a variable coupler, an X-branch coupler and a Y-branch coupler other than the directional coupler may be used.

The values of the amplitude coupling ratios set for the above-described phase generating optical couplers and the values of the optical path length differences of the optical delay lines are also an example. For example, the amplitude coupling ratios r1, r2, r3, and r4 of the optical couplers constituting the phase generating optical coupler shown in FIG. 10 were set equal to each other. However, these values may differ from each other.

While square waveguides were used in each of the embodiments of the present invention, the waveguides used in the embodiments may have any other shape, e.g., a rectangular shape, a polygonal shape or a circular shape.

For example, the core width of a portion of the optical waveguide may be changed to set the refractive index of the portion different from the refractive index of the other portions.

Further, if the structure and the material of the waveguide, stress in the waveguide, etc., are selected so that the wavelength dependence of the refractive index of the waveguide is changed, the optical waveguide itself can be used as a phase generating device.

In conventional optical multi/demultiplexing circuits, such as Mach-Zehnder interferometers, lattice-form filters, transversal-form filters, and ring resonators, constituted by an optical delay line and an optical coupler, the intervals between transmission wavelengths are not uniform and the deviation from the wavelength grid is increased at a position remoter from the center wavelength, that is, there is uniform periodicity with respect to frequency. The present invention provides an optical multi/demultiplexing circuit equipped with a phase generating devices to transform the transmittance spectra from periodicity with respect to frequency to periodicity with respect to wavelength.

According to the principle of the designing, a circuit is formed which separates the above-mentioned deviation from a uniform wavelength period in upper and lower sections of the operating wavelength region into a linear portion and a nonlinear portion, computes the average amounts of deviation with respect to the linear portion, and corrects the deviation by phase adjustment. On the other hand, a plurality of Mach-Zehnder elements are cascaded to fit the non-linear portion to a polynomial of degree 2 or a higher degree. These correction methods are combined to correct the deviation.

Also, $\Phi$ to be generated by the phase generation device for approximation to a target phase $\Psi$ is designed to enable correction of the optical characteristics of the conventional optical multi/demultiplexing circuit.

If the phase generation device is designed to function as an optical coupler of amplitude coupling ratio $\Theta$, it can be made to function as a phase generating optical coupler.

According to the present invention, as described above in detail, an optical multi/demultiplexing circuit equipped with a phase generating devices usable in a uniform-wavelength-period CWDM system can be realized. A device for changing the optical path length difference $\Delta L$ with respect to a grid in a Mach-Zehnder interferometer is provided by means of an optical coupler portion, thereby adjusting a passband to the grid. This device ensures that in the optical multi/demultiplexing circuit of the present invention the passband is on the grid and, therefore, the insertion loss, the passband width and the extinction ratio are constant at different wavelengths. Thus, the wavelength dependence is small.

Also a conventional optical multi/demultiplexing circuits had a problem that only one of the optical frequency period or the center optical frequency can be set simultaneously, so the transmission characteristics becomes deteriorated even in the case where it is used in an optical frequency region. However, an optical multi/demultiplexing circuit capable of setting both the optical frequency period and the center optical frequency can be realized by using the phase generating device of the present invention.

The present invention has been described in detail with respect to preferred embodiments, and it will now be apparent from the foregoing to those skilled in the art that changes and modifications may be made without departing from the invention in its broader aspect, and it is the intention, therefore, in the apparent claims to cover all such changes and modifications as fall within the true spirit of the invention.

What is claimed is:

1. An optical multi/demultiplexing circuit with a phase generating function, where the optical multi/demultiplexing circuit multi/demultiplexes a plurality of optical signals in a whole passband, the whole passband being configured with a plurality of passbands, the plurality of passbands being arranged on a wavelength-domain grid or an optical frequency-domain grid, centers of each of the plurality of passbands being located on the wavelength-domain grid or the optical frequency-domain grid, the optical multi/demultiplexing circuit comprising:
   one or more optical multi/demultiplexing devices including at least one input section and a plurality of output sections; and
   at least one optical delay line device interposed between each of the optical multi/demultiplexing devices,
   at least one of the optical multi/demultiplexing devices or the optical delay line devices including a phase generating device wherein
   the phase generating device generates a wavelength-dependent or optical frequency-dependent phase $\Phi$ with respect to a wavelength or optical frequency of light over the whole passband of the optical multi/demultiplexing circuit, the phase $\Phi$ setting a wavelength period between the centers of the adjacent passbands which are located on the wavelength-domain grid or setting an optical frequency period between the centers of the adjacent passbands which are located on the optical frequency-domain grid, respectively.

2. The optical multi/demultiplexing circuit as claimed in claim 1, wherein the wavelength period is uniform with respect to wavelength.

3. The optical multi/demultiplexing circuit as claimed in claim 1, wherein the optical frequency period is uniform with respect to optical frequency period, and at the same time, a center frequency of one of the passbands of the optical multi/demultiplexing circuit located near the center of the whole passband is set to a desired value on the optical frequency-domain grid.

4. The optical multi/demultiplexing circuit as claimed in claim 1, wherein a transmission characteristic of the optical multi/demultiplexing circuit in the whole passband is given by an equation as follows:

$$X(\lambda) = \sum_{q=0}^{N} x_q \exp\left\{-j2\pi q\left[\frac{\Delta L'}{\lambda} - \Psi(\lambda)\right]\right\}$$

where N represents the order of the optical multi/demultiplexing circuit, $x_q$ represents the expansion coefficients, $\lambda$ represents a wavelength, $\Psi(\lambda)$ represents a target wavelength-dependent phase which is required to set the wavelength period between the centers of the adjacent passbands on the wavelength-domain grid, and $\Delta L'(=\Delta L+\delta L)$ represents the optical path length difference of the optical delay line device including wavelength-dependent refractive index, where $\Delta L$ is a fixed value and $\delta L$ is a minute optical path length difference, which is a variable changed according to the design of the phase generating device, and wherein the wavelength-dependent phase $\Phi$ generated by the phase generating device is equal to the target wavelength-dependent phase $\Psi(\lambda)$.

5. The optical multi/demultiplexing circuit as claimed in claim 4, wherein the wavelength period is uniform with respect to wavelength.

6. The optical multi/demultiplexing circuit as claimed in claim 5, wherein the wavelength-dependent phase $\Phi$ generated by the phase generating device is given by a function of a wavelength ($\lambda$) of light in the whole passband of the optical multi/demultiplexing circuit, and wherein the functions are a polynomial consisting of a quadratic or higher order function, and the target wavelength-dependent phase $\Psi(\lambda)$ is given by an equation as follows:

$$\Psi(\lambda) = \frac{(\Delta L + \delta L)}{\lambda} + \frac{\lambda}{\Delta \lambda} - \left(m + \frac{\lambda_c}{\Delta \lambda}\right)$$

where $\Delta\lambda$ represents the wavelength period of the optical multi/demultiplexing circuit on the wavelength-domain grid, $\lambda_c$ represents a center wavelength of one of the passbands of the optical multi/demultiplexing circuit located near the center of the whole passband, and m represents an integer.

7. The optical multi/demultiplexing circuit as claimed in claim 1, wherein a transmission characteristic of the optical multi/demultiplexing circuit in the whole passband is given by an equation as follows:

$$X(f) = \sum_{q=0}^{N} x_q \exp\left\{-j2\pi q\left[\frac{n\Delta L'}{c}f - \Psi(f)\right]\right\}$$

where N represents the order of the optical multi/demultiplexing circuit, $x_q$ represents the expansion coefficients, n represents a frequency-dependent refractive index, c represents the speed of the light, f represents an optical frequency, $\Psi(f)$ represents a target optical frequency-dependent phase which is required to set the optical frequency period between the centers of the adjacent passbands on the optical frequency-domain grid, and $\Delta L'(=\Delta L+\delta L)$ represents the path length difference of the optical delay line device, where $\Delta L$ is a fixed value and $\delta L$ is a minute optical path length difference, which is a variable changed according to the design of the phase generating device, and wherein the optical frequency-dependent phase $\Phi$ generated by the phase generating device is equal to the target optical frequency-dependent phase $\Psi(f)$.

8. The optical multi/demultiplexing circuit as claimed in claim 7, wherein the optical frequency period is uniform with respect to optical frequency period, and at the same time, a center frequency of one of the passbands of the optical multi/demultiplexing circuit located near the center of the whole passband is set to a desired value on the optical frequency-domain grid.

9. The optical multi/demultiplexing circuit as claimed in claim 8, wherein the optical frequency-dependent phase $\Phi$ generated by the phase generating device is given by a function of an optical frequency (f) of light in the whole passband of the optical multi/demultiplexing circuit, and wherein the functions are a polynomial consisting of a quadratic or higher order function, and the target optical frequency-dependent phase $\Psi(f)$ is given by an equation as follows:

$$\Psi(f) = \left[\frac{n(\Delta L + \delta L)}{c} - \frac{1}{\Delta f}\right]f - \left(m_c - \frac{f_c}{\Delta f}\right)$$

where $\Delta f$ represents the optical frequency period of the optical multi/demultiplexing circuit on the optical frequency-domain grid, $f_c$ represents a center optical frequency of one of the passbands of the optical multi/demultiplexing circuit located near the center of the whole passband, and $m_c$ represents an integer.

10. The optical multi/demultiplexing circuit as claimed in claim 1, wherein the phase generating device comprises (M+1) optical couplers and M optical delay lines interposed between the optical couplers, where M is an integer equal to or greater than two, and wherein the wavelength-dependent phase $\Phi$ is generated by appropriately setting respective coupling ratios of the optical couplers and respective optical path length differences of the optical delay lines.

11. The optical multi/demultiplexing circuit as claimed in claim 2, wherein the phase generating device comprises (M+1) optical couplers and M optical delay lines interposed between the optical couplers, where M is an integer equal to or greater than two, and wherein the wavelength-dependent phase $\Phi$ is generated by appropriately setting respective coupling ratios of the optical couplers and respective optical path length differences of the optical delay lines.

12. The optical multi/demultiplexing circuit as claimed in claim 3, wherein the phase generating device comprises (M+1) optical couplers and M optical delay lines interposed between the optical couplers, where M is an integer equal to or greater than two, and wherein the wavelength-dependent phase $\Phi$ is generated by appropriately setting respective coupling ratios of the optical couplers and respective optical path length differences of the optical delay lines.

13. The optical multi/demultiplexing circuit as claimed in claim 4, wherein the phase generating device comprises (M+1) optical couplers and M optical delay lines interposed between the optical couplers, where M is an integer equal to or greater than two, and wherein respective coupling ratios of the optical couplers, respective optical path length differences of the optical delay lines, and the minute optical path length difference δL are appropriately set such that the wavelength-dependent phase Φ is equal to the target wavelength-dependent phase Ψ(λ).

14. The optical multi/demultiplexing circuit as claimed in claim 7, wherein the phase generating device comprises (M+1) optical couplers and M optical delay lines interposed between the optical couplers, where M is an integer equal to or greater than two, and wherein respective coupling ratios of the optical couplers, respective optical path length differences of the optical delay lines, and the minute optical path length difference δL are appropriately set such that the optical frequency-dependent phase Φ is equal to the target optical frequency-dependent phase Ψ(f).

15. The optical multi/demultiplexing circuit as claimed in claim 2, wherein the optical multi/demultiplexing circuit consists of an optical interferometer, and wherein the optical interferometer comprises (N+1) optical multi/demultiplexing devices, and N optical delay line devices interposed between adjacent two of the optical multi/demultiplexing devices, where N is an integer equal to or greater than one.

16. The optical multi/demultiplexing circuit as claimed in claim 3, wherein the optical multi/demultiplexing circuit consists of an optical interferometer, and wherein the optical interferometer comprises (N+1) optical multi/demultiplexing devices, and N optical delay line devices interposed between adjacent two of the optical multi/demultiplexing devices, where N is an integer equal to or greater than one.

17. The optical multi/demultiplexing circuit as claimed in claim 15, wherein the optical multi/demultiplexing circuit consists of a Mach-Zehnder interferometer including two of the optical multi/demultiplexing devices, the optical delay line device interposed between the two optical multi/demultiplexing devices, at least one input waveguide connected to one of the optical multi/demultiplexing devices, and at least one output waveguides connected to the other of the optical multi/demultiplexing devices, and wherein the two optical multi/demultiplexing devices are disposed in left-right symmetry with respect to a middle line of the Mach-Zehnder interferometer;

the two optical multi/demultiplexing devices are a phase generating optical coupler which functions as a phase generating device; and the phase generating optical coupler includes four optical couplers, and three optical delay lines each interposed between adjacent two of the optical couplers.

18. The optical multi/demultiplexing circuit as claimed in claim 16, wherein the optical multi/demultiplexing circuit consists of a Mach-Zehnder interferometer including two of the optical multi/demultiplexing devices, the optical delay line device interposed between the two optical multi/demultiplexing devices, at least one input waveguide connected to one of the optical multi/demultiplexing devices, and at least one output waveguides connected to the other of the optical multi/demultiplexing devices, and wherein the two optical multi/demultiplexing devices are disposed in left-right symmetry with respect to a middle line of the Mach-Zehnder interferometer;

the two optical multi/demultiplexing devices are a phase generating optical coupler, which functions as a phase generating device; and the phase generating optical coupler includes four optical couplers, and three optical delay lines each interposed between adjacent two of the optical couplers.

19. The optical multi/demultiplexing circuit as claimed in claim 15, wherein the optical multi/demultiplexing circuit consists of a Mach-Zehnder interferometer including two of the optical multi/demultiplexing devices, the optical delay line device interposed between the two optical multi/demultiplexing devices, at least one input waveguide connected to one of the optical multi/demultiplexing devices, and at least one output waveguides connected to the other of the optical multi/demultiplexing devices, and wherein one of the two optical multi/demultiplexing devices is a phase generating optical coupler, which functions as a phase generating device; and the phase generating optical coupler includes (M+1) optical couplers, and M optical delay lines each interposed between adjacent two of the optical couplers, where M is an integer equal to or greater than two.

20. The optical multi/demultiplexing circuit as claimed in claim 16, wherein the optical multi/demultiplexing circuit consists of a Mach-Zehnder interferometer including two of the optical multi/demultiplexing devices, the optical delay line device interposed between the two optical multi/demultiplexing devices, at least one input waveguide connected to one of the optical multi/demultiplexing devices, and at least one output waveguides connected to the other of the optical multi/demultiplexing devices, and wherein one of the two optical multi/demultiplexing devices is a phase generating optical coupler which functions as a phase generating device; and the phase generating optical coupler includes (M+1) optical couplers, and M optical delay lines each interposed between adjacent two of the optical couplers, where M is an integer equal to or greater than two.

21. The optical multi/demultiplexing circuit as claimed in claim 15, wherein the optical multi/demultiplexing circuit consists of a lattice-form filter including first, second, and third optical multi/demultiplexing devices, two optical delay line devices each interposed between adjacent two of the three optical multi/demultiplexing devices, at least one input waveguide connected to the first optical multi/demultiplexing device, and at least one output waveguide connected to the third optical multi/demultiplexing device, and wherein the first and third optical multi/demultiplexing devices are a phase generating optical coupler, which functions as a phase generating device; and the phase generating optical coupler includes (M+1) optical couplers, and M optical delay lines each interposed between adjacent two of the optical couplers, where M is an integer equal to or greater than two.

22. The optical multi/demultiplexing circuit as claimed in claim 16, wherein the optical multi/demultiplexing circuit consists of a lattice-form filter including first, second, and third optical multi/demultiplexing devices, two optical delay line devices each interposed between adjacent two of the three optical multi/demultiplexing devices, at least one input waveguide connected to the first optical multi/demultiplexing device, and at least one output waveguide connected to the third optical multi/demultiplexing device, and wherein the first and third optical multi/demultiplexing devices are a phase generating optical coupler, which functions as a phase generating device; and the phase generating optical coupler includes (M+1) optical couplers, and M optical delay lines each interposed between adjacent two of the optical couplers, where M is an integer equal to or greater than two.

23. The optical multi/demultiplexing circuit as claimed in claim 2, wherein the optical multi/demultiplexing circuit consists of a transversal-form filter.

24. The optical multi/demultiplexing circuit as claimed in claim 3, wherein the optical multi/demultiplexing circuit consists of a transversal-form filter.

25. The optical multi/demultiplexing circuit as claimed in claim 2, wherein a plurality of wave light output from the optical multi/demultiplexing device or a plurality of wave light input into the optical multi/demultiplexing device are launched into or emitted from at least one of a first slab waveguide or second slab waveguide included in an arrayed waveguide grating, wherein the arrayed waveguide grating includes array waveguides having first ends connected to the first slab waveguide and second ends connected to the second slab waveguide.

26. The optical multi/demultiplexing circuit as claimed in claim 25, wherein the optical multi/demultiplexing circuit comprises two of the optical multi/demultiplexing devices, and the optical delay line device comprises two optical delay lines disposed between the optical multi/demultiplexing devices, and wherein one of the two optical multi/demultiplexing devices is connected to at least one of the input waveguides, and the other of the two optical multi/demultiplexing devices is connected to at least one of the first and the second slab waveguides of the arrayed waveguide grating.

27. An optical multi/demultiplexing circuit comprising a first optical multi/demultiplexing circuit as defined in claim 15, and at least one second optical multi/demultiplexing circuit as defined in claim 15, the at least one second optical multi/demultiplexing circuit being connected to at least one of the outputs of the first optical multi/demultiplexing circuit.

28. An optical multi/demultiplexing circuit comprising a first optical multi/demultiplexing circuit as defined in claim 16, and at least one second optical multi/demultiplexing circuit as defined in claim 16, the at least one second optical multi/demultiplexing circuit being connected to at least one of the outputs of the first optical multi/demultiplexing circuit.

29. An optical multi/demultiplexing circuit comprising a first optical multi/demultiplexing circuit as defined in claim 23, and at least one second optical multi/demultiplexing circuit as defined in claim 23, the at least one second optical multi/demultiplexing circuit being connected to at least one of the outputs of the first optical multi/demultiplexing circuit.

30. An optical multi/demultiplexing circuit comprising a first optical multi/demultiplexing circuit as defined in claim 24, and at least one second optical multi/demultiplexing circuit as defined in claim 24, the at least one second optical multi/demultiplexing circuit being connected to at least one of the outputs of the first optical multi/demultiplexing circuit.

31. The optical multi/demultiplexing circuit as claimed in claim 1, wherein the optical delay line device or the optical delay line include a path length difference adjusting device or undergoes path length adjustment.

32. The optical multi/demultiplexing circuit as claimed in claim 1, wherein the optical delay line device or the optical delay line include a birefringent adjustment device or undergoes birefringent adjustment.

33. The optical multi/demultiplexing circuit as claimed in claim 1, wherein the optical multi/demultiplexing circuit is composed of silica-based glass optical waveguides.

34. An optical multi/demultiplexing circuit module comprising an optical multi/demultiplexing circuit as defined in claim 1 installed in a casing, and having optical fibers held by the casing carry out input and output of an optical signal to and from the optical multi/demultiplexing circuit.

35. A method for designing an optical multi/demultiplexing circuit with a phase generating function, where the optical multi/demultiplexing circuit multi/demultiplexes a plurality of optical signals in a whole passband, the whole passband being configured with a plurality of passbands, the plurality of passbands being arranged on a wavelength-domain grid or an optical frequency-domain grid, centers of each of the plurality of passbands being located on the wavelength-domain grid or the optical frequency-domain grid, the optical multi/demultiplexing circuit comprising one or more optical multi/demultiplexing devices including at least one input section and a plurality of output sections; and at least one optical delay line device interposed between each of the optical multi/demultiplexing devices; at least one of the optical multi/demultiplexing devices or the optical delay line devices including a phase generating device that generates a wavelength-dependent or optical frequency-dependent phase $\Phi$ with respect to a wavelength or optical frequency of light over the whole passband of the optical multi/demultiplexing circuit, the method comprising:

determining a target wavelength-dependent phase $\Psi(\lambda)$ or a target optical frequency-dependent phase $\Psi(f)$, where the target phase $\Psi(\lambda)$ or $\Psi(f)$ is a phase required to set a wavelength period between the centers of the adjacent passbands which are located on the wavelength-domain grid or to set an optical frequency period between the centers of the adjacent passbands which are located on the optical frequency-domain grid, respectively; and configuring the phase generating device such that the wavelength-dependent or optical frequency-dependent phase $\Phi$ generated by the phase generating device is equal to the target wavelength-dependent phase $\Psi(\lambda)$ or the target optical frequency-dependent phase $\Psi(f)$.

36. The method of claim 35 wherein determining a target wavelength-dependent phase $\Psi(\lambda)$ or a target optical frequency-dependent phase $\Psi(f)$ comprises:

determining the target wavelength-dependent phase $\Psi(\lambda)$ such that a transmission characteristic of the optical multi/demultiplexing circuit in the whole passband is given by an equation as follows:

$$X(\lambda) = \sum_{q=0}^{N} x_q \exp\left\{-j2\pi q\left[\frac{\Delta L'}{\lambda} - \Psi(\lambda)\right]\right\}$$

where N represents the order of the optical multi/demultiplexing circuit, $X_q$ represents the expansion coefficients, $\lambda$ represents a wavelength, $\Psi(\lambda)$ represents a target wavelength-dependent phase which is required to set the wavelength period between the centers of the adjacent passbands on the wavelength-domain grid, and ΔL'(=ΔL+δL) represents the optical path length difference of the optical delay line device including wavelength-dependent refractive index, where ΔL is a fixed value and δL is a minute optical path length difference, which is a variable changed according to the design of the phase generating device.

37. The method of claim 35 wherein determining a target wavelength-dependent phase Ψ(λ) or a target optical frequency-dependent phase Ψ(f) comprises:

determining the target optical frequency-dependent phase Ψ(f) such that a transmission characteristic of the optical multi/demultiplexing circuit in the whole passband is given by an equation as follows:

$$X(f) = \sum_{q=0}^{N} x_q \exp\left\{-j2\pi q\left[\frac{n\Delta L'}{c}f - \Psi(f)\right]\right\}$$

where N represents the order of the optical multi/demultiplexing circuit, $X_q$ represents the expansion coefficients, n represents a frequency-dependent refractive index, c represents the speed of the light, f represents an optical frequency, Ψ(f) represents a target optical frequency-dependent phase which is required to set the optical frequency period between the centers of the adjacent passbands on the optical frequency-domain grid, and ΔL'(=ΔL+67 L) represents the path length difference of the optical delay line device, where ΔL is a fixed value and δL is a minute optical path length difference, which is a variable changed according to the design of the phase generating device.

38. The method of claim 35 wherein the phase generating device comprises (M+1) optical couplers and M optical delay lines interposed between the optical couplers, where M is an integer equal to or greater than two, and configuring the phase generating device comprises:

appropriately setting respective coupling ratios of the optical couplers and respective optical path length differences of the optical delay lines.

39. The method of claim 36 wherein the phase generating device comprises (M+1) optical couplers and M optical delay lines interposed between the optical couplers, where M is an integer equal to or greater than two, and configuring the phase generating device comprises:

appropriately setting respective coupling ratios of the optical couplers and respective optical path length differences of the optical delay lines.

40. The method of claim 37 wherein the phase generating device comprises (M+1) optical couplers and M optical delay lines interposed between the optical couplers, where M is an integer equal to or greater than two, and configuring the phase generating device comprises:

appropriately setting respective coupling ratios of the optical couplers and respective optical path length differences of the optical delay lines.

41. The method of claim 35 wherein determining a target wavelength-dependent phase Ψ(λ) or a target optical frequency-dependent phase Ψ(f) comprises:

fabricating an optical multi/demultiplexing circuit and measuring the transmission characteristic over the whole passband; and determining the target wavelength-dependent phase Ψ(λ) or the target optical frequency-dependent phase Ψ(f), based on deviations of each passband centers from desired positions on the wavelength-domain grid or the optical frequency-domain grid.

* * * * *